United States Patent
Weeber

(10) Patent No.: US 12,516,091 B2
(45) Date of Patent: Jan. 6, 2026

(54) REELIN COMPOSITIONS FOR TREATMENT OF NEUROLOGICAL DISORDERS

(71) Applicant: Edwin J. Weeber, Apollo Beach, FL (US)

(72) Inventor: Edwin J. Weeber, Apollo Beach, FL (US)

(73) Assignee: University of South Florida, Tampa, FL (US)

( * ) Notice: Subject to any disclaimer, the term of this patent is extended or adjusted under 35 U.S.C. 154(b) by 1046 days.

(21) Appl. No.: 16/264,896

(22) Filed: Feb. 1, 2019

(65) Prior Publication Data

US 2019/0169246 A1  Jun. 6, 2019

Related U.S. Application Data

(63) Continuation of application No. PCT/US2017/045307, filed on Aug. 3, 2017.

(60) Provisional application No. 62/486,729, filed on Apr. 18, 2017, provisional application No. 62/370,519, filed on Aug. 3, 2016.

(51) Int. Cl.
| | |
|---|---|
| A61K 38/00 | (2006.01) |
| A61K 9/00 | (2006.01) |
| A61K 35/761 | (2015.01) |
| A61K 38/17 | (2006.01) |
| A61K 48/00 | (2006.01) |
| A61P 25/28 | (2006.01) |
| C07K 14/47 | (2006.01) |
| C12N 15/113 | (2010.01) |
| C12N 15/62 | (2006.01) |

(52) U.S. Cl.
CPC .......... *C07K 14/473* (2013.01); *A61K 9/0019* (2013.01); *A61K 35/761* (2013.01); *A61K 38/1709* (2013.01); *A61K 48/0066* (2013.01); *A61K 48/0075* (2013.01); *A61K 48/0083* (2013.01); *A61P 25/28* (2018.01); *C12N 15/113* (2013.01); *C12N 15/62* (2013.01)

(58) Field of Classification Search
CPC .............. A61K 35/761; A61K 38/1709; A61K 48/005; A61K 48/0066; A61K 48/0075; A61K 48/0083; A61K 9/0019; A61P 25/28; C07K 14/47; C07K 14/473; C07K 2319/00; C12N 15/113; C12N 15/62; C12N 2750/14143
See application file for complete search history.

(56) References Cited

U.S. PATENT DOCUMENTS

| | | | |
|---|---|---|---|
| 6,323,177 B1 | 11/2001 | Curran et al. | |
| 7,341,844 B2 | 3/2008 | Fatemi et al. | |
| 7,682,806 B2 | 3/2010 | Fatemi et al. | |
| 8,912,315 B2 | 12/2014 | Hirai et al. | |
| 9,028,825 B2 | 5/2015 | Hochstrasser et al. | |
| 9,241,975 B2 | 1/2016 | Weeber et al. | |
| 9,890,364 B2 | 2/2018 | Joung et al. | |
| 9,962,426 B2 * | 5/2018 | Weeber | A61P 25/18 |
| 10,202,601 B2 | 2/2019 | Sætrom | |
| 10,391,184 B2 | 8/2019 | Davidson et al. | |
| 2002/0137095 A1 | 9/2002 | Mikoshiba et al. | |
| 2003/0165485 A1 | 9/2003 | Bertilsson et al. | |
| 2005/0196754 A1 | 9/2005 | Drmanac et al. | |
| 2006/0216292 A1 | 9/2006 | Hopf | |
| 2007/0141625 A1 | 6/2007 | Santos et al. | |
| 2007/0141652 A1 * | 6/2007 | Zheng | 435/7 |
| 2008/0255163 A1 | 10/2008 | Sugaya et al. | |
| 2009/0215896 A1 | 8/2009 | Morseman et al. | |
| 2010/0100333 A1 | 4/2010 | Pi et al. | |
| 2010/0280760 A1 | 11/2010 | Pi et al. | |
| 2011/0016539 A1 | 1/2011 | Weinstein et al. | |

(Continued)

FOREIGN PATENT DOCUMENTS

| | | |
|---|---|---|
| ES | 2421207 | 8/2013 |
| JP | 2014071016 | 4/2014 |

(Continued)

OTHER PUBLICATIONS

Hethorn et al. Reelin supplementation recovers synaptic plasticity and cognitive deficits in a mouse model for Angelman syndrome. European Journal of Neuroscience, vol. 41, pp. 1372-1380, 2015 (Year: 2015).*

(Continued)

*Primary Examiner* — Li N Komatsu
*Assistant Examiner* — Mercy H Sabila
(74) *Attorney, Agent, or Firm* — Meunier Carlin & Curfman LLC

(57) ABSTRACT

Changes in Reelin levels as well as Reelin signaling alter cognitive function. This can be accomplished by administering a therapeutically effective amount of a repeat fragment of Reelin, or a construct formed from fragment repeats of Reelin to a patient or subject. Changes to Reelin levels can be used to treat various neurodegenerative diseases, neuronal insults, or stroke, such as fragile X syndrome, William's syndrome, Rett syndrome, Down's syndrome, Angelman syndrome, autism, ischemia, hypoxia, Alzheimer's disease, and schizophrenia. Reelin can also be used to alter dendritic spine density, diminished long-term potentiation, and diminished synaptic plasticity and associative learning deficits. Constructs formed from repeat region 3 of full length Reelin and repeat region 5 of full length Reelin, or repeat region 3 of full length Reelin and repeat region 6 of full length Reelin have been found particularly useful.

2 Claims, 54 Drawing Sheets

Specification includes a Sequence Listing.

(56) References Cited

U.S. PATENT DOCUMENTS

| | | |
|---|---|---|
| 2011/0212060 A1 | 9/2011 | Hernandez et al. |
| 2011/0213219 A1 | 9/2011 | Bilello et al. |
| 2011/0311984 A1 | 12/2011 | Paek et al. |
| 2013/0149237 A1 | 6/2013 | Dennis |
| 2013/0184173 A1 | 7/2013 | Bar-Or et al. |
| 2015/0183850 A1 | 7/2015 | Davidson et al. |
| 2016/0038463 A1 | 2/2016 | Gallagher et al. |
| 2016/0265057 A1 | 9/2016 | Smith et al. |
| 2016/0271108 A1 | 9/2016 | Smith |
| 2018/0236028 A1 | 8/2018 | Weeber et al. |
| 2018/0296501 A1 | 10/2018 | During |
| 2019/0002906 A1 | 1/2019 | Limphong |
| 2019/0022027 A1 | 1/2019 | Testa et al. |
| 2019/0169246 A1 | 6/2019 | Weeber |
| 2019/0241633 A1 | 8/2019 | Fotin-Mleczek et al. |
| 2019/0247516 A1 | 8/2019 | Cotney et al. |
| 2019/0262401 A1 | 8/2019 | Schipper et al. |
| 2019/0298698 A1 | 10/2019 | Cohen et al. |
| 2020/0085838 A1 | 3/2020 | Martinez et al. |
| 2020/0095280 A1 | 3/2020 | Ko et al. |
| 2023/0054593 A1* | 2/2023 | Weeber ................ C07K 14/78 |

FOREIGN PATENT DOCUMENTS

| | | |
|---|---|---|
| JP | 2015520161 A | 7/2015 |
| JP | 2016-503405 A | 2/2016 |
| RU | 2012118224 | 11/2013 |
| WO | 2010007063 | 1/2010 |
| WO | WO2013172964 A | 11/2013 |
| WO | 201427668 | 2/2014 |
| WO | 2014131468 | 9/2014 |
| WO | 201513148 A2 | 1/2015 |
| WO | 2016100575 A1 | 6/2016 |
| WO | 2019084338 | 5/2019 |

OTHER PUBLICATIONS

O'Connor et al. Gene therapy for neurodegenerative diseases. Trends in Molecular Medicine, Aug. 2015, vol. 21, No. 8 (Year: 2015).*

Jossin et al. (J Neurosci. Jan. 14, 2004; 24(2): 514-521). The Central Fragment of Reelin, Generated by Proteolytic Processing In Vivo, Is Critical to Its Function during Cortical Plate Development (Year: 2004).*

Pesold, et al., Cortical bitufted, horizontal and Martinotti cells preferentially express and secrete Reelin into berineuronal nets, non-synaptically modulating gene expression. Proc. Natl. Acad. Sci. USA. 1999; 96: 3217-3222.

Hoe HS, Harris DC, Rebeck GW. Multiple pathways of apolipoprotein E signaling in primary neurons. J Neurochem 2005;93:145-155.

Hoe HS, Freeman J, Rebeck GW. Apolipoprotein E decreases tau kinases and phospho-tau levels in primary neurons. Mol Neurodegener 2006, 1:18.

Hoe HS, Pocivavsek A, Chakraborty G, et al. Apolipoprotein E receptor 2 interactions with the N-methyl-Daspartate receptor. J Biol Chem 2006, 281:3425-3431.

Schmid, et al. Reelin, integrin and DAB1 interactions during embryonic cerebral cortical development. Cereb Cortex 2005, 15(10): 1632-1636.

Kohno, et al., Mechanism and significance of specific proteolytic cleavage of Reelin. Biochem. Biophys. Res.Commun. 2009;380: 93-97.

Dulabon, et al., Reelin binds alpha3beta1 integrin and inhibits neuronal migration. Neuron. 2000;27:33-44.

Nakajima, et al., Disruption of hippocampal development in vivo by CR-50 mAb against reelin. Proc. Natl. Acad. Sci. U S A. 1997;94:8196-8201.

De Bergeyck, et al., A truncated Reelin protein is produced but not secreted in the 'Orleans' reeler mutation (Reln[rl-Orl]). Brain Res. Mol. Brain Res. 1997;50:85-90.

Saez-Valero, et al., Altered levels of cerebrospinal fluid reelin in frontotemporal dementia and Alzheimer's disease. J. Neurosci. Res. 2003;72:132-136.

Botella-López, et al. Reelin expression and glycosylation patterns arealtered in Alzheimer's disease. Proc. Natl. Acad. Sci. USA. 2006;103:5573-5578.

Fatemi, et al., Altered levels of Reelin and its isoforms in schizophrenia and mood disorders. Neuroreport. 2001;12:3209-3215.

Tinnes, et al., Epileptiform activity interferes with proteolytic processing of Reelin required for dentate granule cell positioning. FASEBJ. 2011;25:1002-1013.

Tinnes, et al., TIMP-1 inhibits the proteolytic processing of Reelin in experimental epilepsy. FASEBJ. 2013;27:2542-2552.

Kaneko, et al., Kainic acid-induced golgi complex fragmentation/dispersal shifts the proteolysis of reelin in primary rat heuronal cells: an in vitro model of early stage epilepsy. Mol. Neurobiol. 2016;53:1874-1883.

Madhusudan, et al., Accumulation of reelin-positive plaques is accompanied by a decline in basal forebrain projection neurons during normal aging. Eur J Neurosci. 2009; 30:1064-1076.

Knuesel, et al., Age-related accumulation of Reelin in amyloidlike deposits. Neurobiol Aging. 2009; 30:697-716.

Jossin, et al., Reelin signals through phosphatidylinositol 3-kinase and Akt to control cortical development and through mTor to regulate dendritic growth. Mol Cell Biol. 2007; 27:7113-7124.

Qiu, S., K. M. Korwek, A. R. Pratt-Davis, M. Peters, M. Y. Bergman, and E. J. Weeber. 2006. Cognitive disruption and altered hippocampus synaptic function in Reelin haploinsufficient mice. Neurobiol Learn Mem 85:228-242.

International Search Report and Written Opinion issued by the International Searching Authority on Jan. 18, 2018 for corresponding International Patent Application No. PCT/US17/45307.

International Preliminary Report on Patentability issued by the International Bureau on Feb. 14, 2019 for corresponding International Patent Application No. PCT/US17/45307.

D'Arcangelo, G. et al. Reelin is a Ligand for Lipoprotein Receptors. Neuron, vol. 24, 471-479, Oct. 1999.

Yasui, Norihisa, et al. "Structure of a receptor-binding fragment of reelin and mutational analysis reveal a recognition mechanism similar to endocytic receptors." Proceedings of the National Academy of Sciences 104.24 (2007): 9988-9993.

Patent Examination Report issued for New Zealand Application No. 750291, dated Jul. 27, 2020.

Office Action and Substantive Examination Report issued for Saudi Arabia Application No. 519401017, dated Oct. 10, 2021.

Office Action, dated Jul. 8, 2022, received in connection with corresponding EP Patent Application No. 17837688.5.

Notice of Preliminary Rejection, dated Jun. 23, 2022, received in connection with correspoding KR Patent Application No. 10-2019-7006269 (English translation).

Final Office Action, dated Jan. 21, 2022, received in connection with corresponding JP Patent Application No. 2019-505258 (English translation).

DeSilva, U., et al., "Definition: reelin [*Homo sapiens*]," GenBank Database, AAC51105 (retrieved on Jul. 21, 2022 from https://www.ncbi.nim.nih.gov/protein/AAC51105.1), 1997, 4 pages.

Office Action issued in New Zealand Application No. 750291, dated Mar. 15, 2021.

Deirdre M. O'connor et al: "Gene therapy for neurodegenerative diseases", Trends in Molecular Medicine, vol. 21, Iss. 8, pp. 504-512.

Office Action issued in Canadian Application No. 3,032,697, Dated Apr. 22, 2021.

Office Action issued in European U.S. Application No. 17837688, dated Apr. 23, 2021.

European Supplementary Search Report and Written Opinion issued for European U.S. Application No. 17837688, dated Apr. 2, 2020.

Lussier, April L., Edwin J. Weeber, and G. William Rebeck. "Reelin proteolysis affects signaling related to normal synapse function and neurodegeneration." Frontiers in cellular neuroscience 10 (2016): 75.

Daily, Jennifer L., et al. "Adeno-associated virus-mediated rescue of the cognitive defects in a mouse model for Angelman syndrome." PloS one 6.12 (2011).

(56) References Cited

OTHER PUBLICATIONS

Ranaivoson, Fanomezana M., Sventja von Daake, and Davide Comoletti. "Structural insights into Reelin function: present and future." Frontiers in cellular neuroscience 10 (2016): 1-8.
Orcinha, C., Münzner, G., Gerlach, J., Kilias, A., Follo, M., Egert, U., & Haas, C. A. (2016). Seizure-induced motility of differentiated dentate granule cells is prevented by the central Reelin fragment. Frontiers in cellular neuroscience, 10, 1-13.
Guidotti, et al., Decrease in reelin and glutamic acid decarboxylase 67 (GAD67) expression in schizophrenia and bipolar disorder: a postmortem brain study. Arch. Gen Psychiatry. 2000; 57: 1061-1069.
Chen, et al., Identification of a single nucleotide polymorphism at the 5' promoter region of human reelin gene and association study with schizophrenia. Mol. Psychiatry. 2002; 7: 447-448.
Fatemi, et al., Reelin glycoprotein in autism and schizophrenia. Int. Rev. Neurobiol. 2005; 71: 179-187.
Torrey, et al., Neurochemical markers for schizophrenia, bipolar disorder and major depression in postmortem brains. Biol. Psychiatry. 2005; 57: 252-26.
Fatemi, et al., Reduction in Reelin immunoreactivity in hippocampus of subjects with schizophrenia, bipolar disorder and major depression. Mol. Psychiatry. 2000; 5: 654-663.
Knable, et al., Molecular abnormalities of the hippocampus in severe psychiatric illness: postmortem findings from the stanley neuropathology consortium. Mol. Psychiatry. 2004; 9: 609-620.
Lussier, et al., Repeated exposure to corticosterone, but not restraint, decreases the number of Reelin-positive cells in the adult rat hippocampus. Neurosci. Lett. 2009; 460: 170-174.
Lussier, et al., Reelin as a putative vulnerability factor for depression: examining the depressogenic effects of repeated corticosterone in heterozygous reeler mice. Neuropharmacol. 2011; 60: 1064-1074.
Lussier, et al., The progressive development of depression-like behavior in corticosterone-treated rats is paralleled by slowed granule cell maturation and decreased reelin expression in the adult dentate gyrus. Neuropharmacol. 2013; 71C, 174-183.
Lussier, et al., Altered GABAergic and glutamatergic activity within the rat hippocampus and amygdala in rats subjected to repeated corticosterone administration but not restraint stress. Neurosci. 2013; 231: 38-48.
Fenton, et al., Imipramine protects against the deleterious effects of chronic corticosterone on depression-like behavior, hippocampal reelin expression and neuronal maturation. Prog. Neuropsychopharmacol. Biol.Psychiatry. 2015; 60: 52-59.
Hoe, et al., DAB1 and Reelin effects on amyloid precursor protein and ApoE receptor2 trafficking and processing. J. Biol Chem. 2006; 281: 35176-35185.
Hoareau, et al., Amyloid precursor protein cytoplasmic domain antagonizes Reelin neurite outgrowth inhibition of hippocampal neurons. Neurobiol. Aging. 2008; 29: 542-553.
Jossin, et al., The central fragment of Reelin, generated by proteolytic processing in vivo, is critical to its function during cortical plate development. J. Neurosci. 2004;24: 514-521.
Jossin, et al., Processing of Reelin by embryonic neurons is important for function in tissue but not in dissociated cultured neurons. J. Neurosci. 2007;27: 4243-4252.
Krstic, et al., Regulated proteolytic processing of Reelin through interplay of tissue plasminogen activator (tPA), ADAMTS-4, ADAMTS-5 and their modulators. PLoS One. 2012; 7:e47793.
Trotter, et al., Extracellular proteolysis of reelin by tissue plasminogen activator following synaptic potentiation. Neuroscience. 2014; 274: 299-307.
Nagy, et al., Matrix metalloproteinase-9 is required for hippocampal late-phase long-term potentiation and memory. J. Neurosci. 2006;26: 1923-1934.
Nogi, et al., Structure of a signaling-competent reelin fragment revealed by X-ray crystallography and electron tomography. EMBO J. 2006;25: 3675-3683.
Nakano, et al., The extremely conserved C-terminal region of Reelin is not necessary for secretion but is required for efficient activation of downstream signaling. J. Biol Chem. 2007;282: 20544-20552.
Hisanaga, et al., A disintegrin and metalloproteinase with thrombospondin motifs 4 (ADAMTS-4) cleaves Reelin in an soform-dependent manner. FEBS Lett. 2012; 586: 3349-3353.
D'Arcangelo, et al., Reelin is a secreted glycoprotein recognized by the CR-50 monoclonal antibody. J. Neurosci. 1997;17: 23-31.
Sato, et al., Determination of cleavage site of Reelin between its sixth and seventh repeat and contribution of meprin metalloproteases to the cleavage. J. Biochem. 2016;159: 305-312.
D'Arcangelo, et al., Reelin is a ligand for lipoprotein receptors. Neuron. 1999; 24: 471-479.
Weeber, et al., Reelin and ApoE receptors cooperate to enhance hippocampal synaptic plasticity and learning. J. Biol Chem. 2002; 277: 39944-39952.
Herz & Chen, Reelin, lipoprotein receptors and synaptic plasticity. Nat. Rev Neurosci. 2006;7, 850-859.
Niu, et al., Reelin promotes hippocampal dendrite development through the VLDLR/ApoER2-Dab1 pathway. Neuron. 2004; 41: 71-84.
Beffert, et al. Modulation of synaptic plasticity and memory by Reelin involves differential splicing of the lipoprotein receptor Apoer2. Neuron. 2005; 47: 567-579.
Chen, et al., Reelin modulates NMDA receptor activity in cortical neurons. J. Neurosci. 2005; 25, 8209-8216.
Qiu, et al., Differential reelin-induced enhancement of NMDA and AMPA receptor activity in the adult hippocampus. J. Neurosci. 2006; 26: 12943-12955.
Qiu & Weeber, Reelin signaling facilitates maturation of CA1 glutamatergic synapses. J. Neurophysiol. 2007;97: 2312- 2321.
Burrell, et al., (2014). Fyn tyrosine kinase increases Apolipoprotein E recep tor 2 levels and phosphorylation. PLoS One 9:e110845.
Divekar, et al., Ligand-induced homotypic and heterotypic clustering of Apolipoprotein E receptor 2. J. Biol Chem. 2014;289: 15894-15903.
Niu, et al., The Reelin signaling pathway promotes dendritic spine development in hippocampal neurons. J. Neurosci. 2008; 28: 10339-10348.
Rogers, et al., Reelin supplementation enhances cognitive ability, synaptic plasticity and dendritic spine density. Learn. Mem. 2011;18: 558-564.
Rogers, et al. Reelin supplementation recovers sensorimotor gating, synaptic plasticity and associative learning deficits in the heterozygous reeler mouse. J. Psychopharmacol. 2013;27: 386-395.
Beffert, et al., Reelin-mediated signaling locally regulates protein kinase B /Akt and glycogen synthase kinase 3 beta. J. Biol Chem. 2007;277: 49958-49964.
Beffert, et al., Reelin and cyclin-dependent kinase 5-dependent signals cooperate in regulating neuronal migration and synaptic transmission. J. Neurosci. 2004;24:1897-1906.
Chin, et al. Reelin depletion in the entorhinal cortex of human amyloid precursor protein transgenic mice and humans with Alzheimer's disease. J Neurosci 2007, 27:2727-2733.
Miettinen, et al. Reelin-immunoreactivity in the hippocampal formation of 9-month-old wildtype mouse: effects of APP/PS1 genotype and ovariectomy. J Chem Neuroanat. 2005, 30:105-1180.
Hethorn et al., Reelin supplementation recovers synaptic plasticity and cognitive deficits in a mouse model for Angelman syndrome. European Journal of Neuroscience, vol. 41, pp. 1372-1380, 2015.
Howell, et al., Mouse disabled (mDab1): a Src binding protein implicated in neuronal development. EMBO J. 1997;16: 121-132.
Hiesberger, et al., Direct binding of Reelin to VLDL receptor and ApoE receptor 2 induces tyrosine phosphorylation of disabled-1 and modulates tau phosphorylation. Neuron. 1999; 24: 481-489.
Strasser, et al., (2004). Receptor clustering is involved in Reelin signaling. Mol Cell Biol. 2004; 24: 1378-1386.
Trotter, et al., Dab1 is required for synaptic plasticity and associative learning. J. Neurosci. 2013;33: 15652-15668.
Ohkubo, et al. Apolipoprotein E and Reelin ligands modulate tau phosphorylation through an Apolipoprotein E receptor/disabled-1/

(56) References Cited

OTHER PUBLICATIONS glycogen synthase kinase-3beta cascae. The FASEB Journal express article published online Dec. 18, 2002.
Rogers & Weeber, Reelin and ApoE actions on signal transduction, synaptic function and memory formation. Neuron Glia Biol. 2008;4:259-270.
Zhao, et al., Balance between neurogenesis and gliogenesis in the adult hippocampus: role for Reelin. Dev. Neurosci. 2007; 29: 84-90.
Pujadas, et al., Reelin regulates postnatal neurogenesis and enhances spine hypertrophy and long-term potentiation. J. Neurosci. 2010;30: 4636-4649.doi.
Teixeira, et al., Cell-autonomous inactivation of the Reelin pathway impairs adult neurogenesis in the hippocampus. J. Neurosci. 2012;32: 12051-12065.
Notification of Reason(s) for Refusal in JP Patent No. 2019-505258. Jul. 13, 2021. 9 pages.
Office Action issued for Canadian Application No. 3,032,697 dated May 20, 2020.
Office Action issued for Colombian Application No. NC2019/0001060, dated May 13, 2020. .
Genbank, "*Homo sapiens* reelin (RELN), transcript variant 1, mRNA" Jun. 30, 2015.
Office Action issued for Israeli Office Action dated Oct. 6, 2022.
Office Action issued for Japanese Application No. 2019-505258, dated Oct. 12, 2022.
Office Action ans Search Report issued for SA Application No. 519401017, dated Oct. 27, 2022.
Office Action ans Search Report issued for Chinese Application No. dated Nov. 2, 2022.
Koie, Mari, et al. "Cleavage within Reelin repeat 3 regulates the duration and range of the signaling activity of Reelin protein." Journal of Biological Chemistry 289.18 (2014): 12922-12930.
Australian Examination Report for Application No. AU2017306558, dated Sep. 11, 2023.
Communication Pursuant to Article 94(3) EPC, issued for Application No. 17837688.5, dated Mar. 18, 2024.
Chinese Office Action issued in corresponding Application No. 201780057526.5, dated Oct. 26, 2023.
Brazilian Technical Requirement issued in corresponding Application No. BR112019002204-0, dated Nov. 16, 2023.
Office Action for Indian Application No. 201947007585 dated Jan. 31, 2023, 8 pages.
Office Action for Canadian Application No. 3,032,697 dated Feb. 13, 2023, 3 pages.
Notice before Acceptance for Israeli Application No. 264603 dated Feb. 15, 2023, 3 pages.
Decision for Grant for Korean Application No. 10-2019-7006269 dated Feb. 23, 2023, 3 pages.
Decision to Grant for Japanese Application No. 2019-505258 dated Feb. 24, 2023, 5 pages.
Gray, S. et al., 'Preclinical Differences of Intravascular AAV9 Delivery to Neurons and Glia: A Comparative Study of Adult Mice and Nonhuman Primates', The American Society of Gene & Cell Therapy', (Apr. 12, 2011), vol. 19, No. 6, pp. 1058-1069, doi: 10.1038/mt.2011.72.
Korecka, J. et al., 'Comparison of AAV Serotypes for Gene Delivery to Dopaminergic Neurones in the Substantia Nigra', Viral Gene Therapy, (Jul. 20, 2011), doi: 10.5772/18939.
Australian Examination Report issued for Application No. 2017306558, dated Aug. 19, 2024.

\* cited by examiner

| | |
|---|---|
| 1 | CACGCGTGGG CTCGGCGGGG GCCCGCTCCC AGGCCCGCTC |
| 101 | CCCGGCGTCT CCAAAACTGA ATGAGCGAGC GGCGCGTAGG |
| 201 | AGACTTTCCT CCTAGCGCTG TTGCTGGGGG CGACGCTGAG |
| 301 | CCACGGGGAG CTGGAAGGGG ATGGGGAGCA GGGCGAGGTG |
| 401 | GTGACAATTT CAACAAGCAC CTTTTTTGAC GGCTTGCTGG |
| 501 | CTTTCGGATT TGGGATCATG TCTGACCACC ACTTTGGTAA |
| 601 | TTTCATCTGG ATTGCTCCAC CTGCGGGCAC AGGCTGTGTG |

SacI

| | |
|---|---|
| 701 | CAGTTGTGTG AACAAGGAGC TCCAACAGAT GTCACTGTGC |
| 801 | ACCACCAACT GCAATTAAAT CCAAATATAT GGGTTGAATG |

NdeI

| | |
|---|---|
| 901 | CTGTGAACCA TATGGCCCAC GAGAACTGAT TACCACAGGC |
| 1001 | AGTTATTCAG ACCCAGCAT CATCGTGTTA TATGCCAAGA |
| 1101 | TCATCCATAT CCTCTACCTT CCTGAGGACG CCAAAGGGGA |

BclI

| | |
|---|---|
| 1201 | CTGGGCCTTA GATAACATCT TGATCATCAA TTCAGCTCAC |
| 1301 | CCAGGAGCTA CAGTTAAGCA TAGCTGTCAG TCAGATGGGA |

BglII

| | |
|---|---|
| 1401 | TAGATCTTTC CACAGAAGAT ATTCAAGAGC AATGGTCAGA |
| 1501 | TGGAACGATA GAATCAGGCT TATCAATGGT CTTCCTCAAA |
| 1601 | TTTTACTTTG TGATGGGAGG AATTTGTGAC CCTGGAAATT |
| 1701 | TGGATACCCT TTCCTATTCC TCATATAAGG TTCCGTCTTT |
| 1801 | AAAGAACCAT CAAGGACATA ATAGGAATGT CTGGGCTGTA |
| 1901 | ATCAATCTGG GATGTGGAAC GCATCAGCCT GGTAACAGTG |

BglII

| | |
|---|---|
| 2001 | TACCTGAGAT CTGTGCTGGA CCCCACCTCC CCCACAGCAC |
| 2101 | AGCACTAACC CGGAACACCA GGATTCGCTG GAGACAAACA |
| 2201 | AAATTCTGTT CTGGCAGAGG ACAGTGCACT AGACATGGTT |

FIG. 5

```
CCGAGCCCGT TCCGCTCCCG TCCGCCTTCT TCTCGCCTTC TCTCCGCGTG GCTCCTCCGT
GCGSCGGCGG CGGCGGCGGC GGCGGCGGCG GCGGCATGGA GCGCAGTGGC TGGGCCCGGC
GGCGCGCGCG GCGGCTGGCT ATTACCCCCG CTTTTCGCCC TTCTTTTTCC TGTGCACCCA
CTCATTTCCC TGCATATTGC GGGCAACCCC ACCTACTACG TTCCGGGACA GAATACCAT
TGACAGGACT ATACACATCT ACAAGTGTTC ACCTACTACG GAGCATTGGA GGTTCCAGTG
CCAGTTTATG TGCAGTGTGG TAGCCTCTCA CGTGAGTCAC CTGCCCACAA CGAACCTCAG
AATTTCATGG CTACAGCAAC ACACCGGGGC CAGGTTATTT TCAAAGATGC TTTAGCCCAG

ACCCACATCT AGCTGAAATA CATAGTGACA GCATTATCCT GAGAGATGAC TTTGACTCCT
                                            NsiI
TAACAACTGT GAGACTGGAG AACAGTGTGG CGCGATTATG CATGGCAATG CCGTCACCTT

CTTAATACAA CAACAGCTTC TGTCCTCCAA TTTTCCATTG GGTCAGGTTC ATGTCGCTTT
ATAACTCTGC GGACTGGATT CAGCTAGAGA AAATTAGAGC CCCTTCCAAT GTCAGCACAA
GAATGTCCAA TTTCAGTGGA AGCAGGAAAA TCTTCGTGTA GGTGAAGTGT ATGAAGCCTG

AGACAAGTCG TTTTAGAAGA TAGTCTCGAC CCAGTGGACA CAGGCAACTG GCTTTTCTTC
            NcoI
ACTCCATTTA TTTCCATGGA AATGAAGGCA GCGAGTTCAA TTTTGCCACC ACCAGGGATG

AGAATTTGAG AGCCAGCCTA CAGGATGGGA TGTCTTGGGA GCTGTCATTG GTACAGAATG
                                  NcoI        AgeI
GATGGAGAGA GGAAATTATG CACTCCATCC ATGGACACTA CCGGTTATGG GAACCTGAGG
CTCATGAAAA TGACATAATC CTGTATGCAA AAATTGAAGG AAGAAAAGAG CATATAACAC
GGTTTCTGTG GTCATCAATC CTGAACTTCA GACTCCTGCT ACCAAATTTT GTCTCAGGCA
GACTTTTCC ATGTCTTGCC TGTTCTCCCT TCTACAATGT CTCACATGAT ACAGTTTTCC
                NcoI
TCAGCTTGGA ATTTTCTACC AACCATGGGC GCTCCTGGTC CCTCCTTCAC ACTGAATGCT

TGTCTACTCC TCTGAAAACT ACAGTGGGTG GAACCGAATA ACAATTCCCC TTCCTAACGC
GGACCAATCC TTGGAAACAT GTGGGCAATT GATAATGTTT ACATTGGCCC GTCATGTCTC
GCAAGTGTGA CCCTGGATTT TCTGGCCCAG CTTGTGAGAT GGCATCCCAG ACATTCCCAA
```

FIG. 5 (Cont.1)

```
                              HindIII
       2301   TGTTTATTTC  TGAAAGCTTT  GGCACTTCCA  GGCTCTCCTC
       2401   CAGTGGTAAG  GCCCTGGTTT  TCAACAAAGA  AGGGCGGCGT

2501   CTGGGGAGCA  AATCTGTTCT  GAGCACGTGC  AGAGCCCCTG

2601   TCCTGGAGCA  TTATTCATAT  CTCAGCTATC  ATGAGCCCAG
       2701   GCAACCGTAT  CATTCTTCCC  AGAGAGAAGA  TGTATGGGCT
       2801   CTTGTGGAGG  TCACTCAGTC  TCTGGGATTC  TACCTTGGAA
       2901   CCTCAAGTAT  GCGCTATGTG  GAAACACAAT  CAATGCAGAT
                                                    ScaI
       3001   ACACATGGAC  AACCAGGTGA  AGCTGGAGTA  CTCAACCAAC
       3101   GAATTTACAT  CAGCAAGTAT  TTACCATGCC  AGTGAGTTTA
       3201   TCCGCTGGAG  CCAGAGCTAT  TACACAGCTC  AAGACGAGTG
                              NdeI                    KpnI
       3301   ATGCGATCAT  GGCATATGCA  GGTGTGACCA  GGGGTACCAA
       3401   CAGAATGGCT  GGGAGTCTGA  CTGGCAAGAA  GTTATTGGGG
                              PvuII
       3501   TCAGCAAGGC  TGGGAAAAGA  CAGCTGGTGA  GTTGGGACCT

3601   ATGCAACAAG  CCTGACAGCA  GAGAGGAGGG  CGTCCTCCTT
                                                    PvuII
       3701   TTCAGCAAAC  CCAGATTTGT  CTATCTGGAG  CTTCCAGCTG
       3801   ATGACCAGTG  GGCAGTCGAT  GACATCATCA  TTCTGTCCGA
       3901   GCCAGCTTTT  GATTACCCTA  TGAATCAGAT  GAGTGTGTGG
                                                    ClaI
       4001   GCAATGATAT  TTGGAAAATC  TGATGGAGAT  CGATTTGCAG
                                   ScaI
                                F  S  S  T  A  P  V  L  L  Q
Repeat 3  +2   GTGCCAATCA  ATTCAGCAGT ACTGCTCCAG TTCTTCTTCA PstI
       +2 +S A  G   K   G   C   E   G   N   S   R   E   L   S
          4201 TGCAGGCAAA GGATGCGAAG GAAACTCCAG AGAACTAAGT
```

FIG. 5 (Cont.2)

```
TTACCATAAC TTTTACTCTA TCCGTGGTGC TGAAGTGAGC TTTGGTTGTG GTGTCTTGGC
CAGCTAATTA CATCTTTCCT TGACAGCTCA CAATCCAGGT TTCTCCAGTT CACACTGAGA
```
BclI
```
ATCAGCCTGG TGAAGGAGTT TTGCTGCATT ATTCTTATGA TAATGGGATA ACTTGGAAAC
```
                                                  EcoRI
```
AATAATCTCC GTAGAACTAC CAGGTGATGC AAAGCAGTTT GGAATTCAGT TCAGATGGTG
ATTGATGAGA TTATCATGAC ATCTGTGCTT TTCAACAGCA TTAGTCTTGA CTTTACCAAT
ATGTTCAGCC ATACTGTGGC CACGACTGGA CCCTTTGTTT TACAGGAGAT TCTAAACTTG
AGGAGCATCC TATATGATTC AGTTCAGTTT GGTGATGGGA TGTGGCCAGA AATACACCCC

CACGGCCTTA CCTGGCACCT CGTCCAAGAA GAATGCCTTC CAAGTATGCC AAGTTGTCAG
CACAGTGGAG GAGAGTCATA GTGCTTCTTC CCCAGAAAAC TTGGTCCAGT GCTACCCGTT
GGCTTTGGAC AGCATTTACA TTGGGCAGCA GTGCCCCAAC ATGTGCAGTG GGCATGGCTC

GGCACTGAAT GCCACCCAGA AGCTGCCCTT CCGTCCACAA TTATGTCAGA TTTTGAGAAC
GAGAAATTGT AAAACCAGAA CAAGGGTGTG GTGTCATCTC TTCTGGATCA TCTCTGTACT

GGATACTTCT TGGGTGGACT TTGTCCAGTT CTACATCCAG ATAGGCGGAG AGAGTGCTTC
```
                                     NheI
```
CAGTACAGCA ACAATGGGGG CATCCAGTGG CACCTGCTAG CAGAGATGTA CTTTTCAGAC

CTGCCAAGAC CCCTTGCACC AGGTTCCGCT GGTGGCAGCC CGTGTTCTCA GGGGAGGACT
GAAGCAGAAG CAGATCATCC CAGTTATCAA TCCAACTTTA CCTCAGAACT TTTATGAGAA
TTGATGTTGG CTAATGAAGG AATGGTTAAA AATGAAACCT TCTGTGCTGC CACACCATCA
```
XhoI
```
TAACTCGAGA TTTGACCCTG AAACCTGGAT ATGTGCTACA GTTCAAGCTA AACATAGGTT
```
ScaI                                                                    PsiI
```
            Y  S  H  D  A  G  M  S  W  F  L  V  K  E  G  C  Y  P  A  S
           GTACTCTCAT GATGCTGGTA TGTCCTGGTT TCTGGTGAAA GAAGGCTGTT ACCCGGCTTC

E  P  T  M  Y  H  T  G  D  F  E  E  W  T  R  I  T  I  V  I
           GAGCCCACCA TGTATCACAC AGGGGACTTT GAAGAATGGA CAAGAATCAC CATTGTTATT
```

FIG. 5 (Cont.3)

```
                                                                    BamHI
         +2    P  R  S  L  A  S  S  K  T  R  F  R  W  I
       4301   CCAAGGTCTC TTCCATCCAG CAAGACCAGA TTCCGATGGA
                                     PstI       NcoI
         +2   -S  E  P  C  P  S  Y  C  S  G  H  G  D  C
       4401   CCGAGCCTTG TCCCAGTTAC TGCAGTGGCC ATGGGGACTG
         +2   -S  N  V  P  N  H  N  E  M  F  D  R  F  E
       4501   AAATGTCCCC AATCACAATG AGATGTTCGA TAGGTTTGAG
         +2    T  L  N  D  G  K  S  L  Y  F  N  G  P  G
       4601   ACACTTAACG ATGGCAAATC TCTCTACTTC AATGGCCCTG
         +2   +Y  I  Q  I  G  S  K  T  S  G  I  T  C  I
       4701   ATATACAAAT TGGAAGCAAA ACTTCAGGCA TTACCTGCAT
         +2   -L  W  H  L  L  R  E  L  D  F  M  S  F  L
       4801   CTGGCATTTG CTTCGAGAGT TGGACTTCAT GTCCTTCCTG
       4901   CGATGGTGGC AACCGCAACA TGGGAAGCAT TGAGCCCAGT
       5001   AATTTGATGG CTCTATAGAT TTGCAAGCCA ACTGGTATCG
         +2
       5101   TGAAAACATA GGAAAACCTC GTTATGCTGA GACCTGGGAT
         +2    F  S  N  S  H  S  V  Q  L  Q  Y  S  L  N
Repeat 4
       5201   TTCAGCAACT CCCACAGTGT ACAGCTCCAG TATTCTCTGA
         +2   -L  H  Y  T  E  S  S  I  Y  T  S  E  R  F
       5301   TGCATTACAC GGAAAGTTCA ATTTACACCT CGGAAAGATT
         +2   -L  F  R  W  I  Q  A  N  Y  T  V  G  A  D
       5401   GTTCAGATGG ATTCAGGCCA ACTACACTGT GGGGCTGAT
         +2    G  I  C  D  A  G  R  Y  T  C  D  R  G  F
       5501   GGGATTTGTG ATGCTGGACG CTGTGTGTGT GACCGGGGCT
         +2   -N  G  N  L  H  P  D  L  W  P  E  V  Y  G
       5601   ATGGGAATTT ACATCCTGAC CTTTGGCCTG AAGTGTATGG
                                                      XbaI
                                                 BglI
         +2   -K  G  E  G  L  R  M  L  I  S  R  D  L  D
       5701   AGGGGAAGGA CTAAGGATCC TTATTTCAAG AGATCTAGAT
```

FIG. 5 (Cont.4)

```
          Q  E  S  S  S  Q  K  N  V  P  P  F  G  L  D  G  V  Y  I  S
TCCAGGAGAG CAGCTCACAG AAAAACGTGC CTCCATTTGG TTTAGATGGA GTGTACATAT

I  S  G  V  C  F  C  D  L  G  Y  T  A  A  Q  G  T  C  V  S
CATTTCAGGA GTGTGTTTCT GTGACCTGGG ATATACTGCT GCACAAGGAA CCTGTGTGTC
 G  K  L  S  P  L  W  Y  K  I  T  G  A  Q  V  G  T  G  C  G
GGGAAGCTCA GCCCTCTGTG GTACAAGATA ACAGGTGCCC AGGTTGGAAC TGGCTGTGGA
 G  K  R  E  A  R  T  V  P  L  D  T  R  N  I  R  L  V  Q  F  Y
GGAAAAGGGA AGCCCGGACG GTCCCTCTGG ACACCAGGAA TATCAGACTT GTTCAATTTT
   K  P  R  T  R  N  E  G  L  I  V  Q  Y  S  N  D  N  G  I  L
CAAACCAAGA ACTAGAAATG AAGGGCTTAT TGTTCAGTAT TCAAATGACA ATGGGATACT

GAACCACAGA TCATTTCCAT TGACCTGCCA CAGGAGCCGA AGACACCTGC AACGGCATTT
GGGCTTTGGA TGATGTTCTT ATAGGAATGA ATGACAGCTC TCAAACTGGA TTTCAAGACA
AATCCAAGGA GGTCAAGTTG ATATTGACTG TCTCTCTCTG GATACTGCTC TGATATTCAC
                                                                P
TTTCATGTGT CAGCATCTAC CTTTTTGCAG TTTGAAATGA GCATGGGCTG TAGCAAGCCC
   N  G  K  D  W  H  L  V  T  E  E  C  V  P  P  T  I  G  C  L
ACAATGGCAA GGACTGGCAT CTTGTCACCG AAGAGTGTGT TCCTCCAACC ATTGGCTGTC
 Q  N  W  D  R  I  T  V  Y  L  P  L  S  T  P  S  P  R  T  R
CCAGAATTGG AAGCGGATCA CTGTCTACCT TCCACTCTCC ACCATTTCTC CAGGACCCG
   S  W  A  I  D  N  V  V  L  A  S  G  C  P  W  M  C  S  G  R
TCCTGGGCGA TTGATAATGT TGTACTGGCC TCAGGGTGCC CTTGGATGTG CTCAGGACGA
      G  G  P  Y  C  V  P  V  V  P  L  P  S  I  L  K  D  D  F  N
TTGGTGGACC CTATTGTGTT CCTGTTGTTC CTCTGCCCTC GATTCTTAAA GACGATTTCA
  A  E  R  G  N  L  N  G  E  T  I  K  S  I  L  K  D  D  F  N
TGCAGAGAGG GGGAATCTGA ATGGTGAAAC CATCAAATCT GGAACATCTC TAATTTTTAA

C  T  N  T  M  Y  V  Q  F  S  L  R  F  I  A  K  S  T  P  E
TGTACAAATA CAATGTATGT CCAGTTTTCA CTTAGATTTA TAGCAAAAAG TACCCCACAG
```

```
              BaIII
       +2   R  S  H  S  I  R  R  Q  F  S  I  S  G
     5801  AGATCTCACT CTATTCTGTT ACAATTCTCC ATCAGTGGAG
     5901  TCAATGTTCC CTTGCCATAC ACTGCCCAAA CCAATGCTAC
                       ClaI
     6001  TGACTTCATT ATCGATGGAA ATAATGTAAA CAACCCTGTG
     6101  GGTAACATCG GTCTTTATTG TCCATATTCT TCAAAGGGGG

+2
     6201  CCACCCGTGA CCTAAATGTG AATGAGAACA CCATCATACA
Repeat 5 +2  E F  S  R  D  F  G  A  T  W  H  L  L  L
     6301  ATTTTCAAGG GACTTCGGGG CGACCTGGCA CCTTCTGCTG +2   S  S  T  Y  A  G  T  M  Q  G  W  R
     6401  AGCAGCACCT ACTACGCAGG AACCATGCAG GGCTGGAGGA
         +2   Q  G  F  Y  Y  A  G  S  Q  P  V  T  W  A
     6501  AGGGATTTTA CCCTGCCGGC TCTCAGCCAG TGACATGGGC
         +2   Q  G  F  Y  T  K  C  I  C  D  P  G  Y  S
     6601  TATCAATGGA ACCAAATGTA TATGTGACCC TGGCTACTCA
         +2   G  L  E  T  D  R  F  L  L  M  S  G  G
     6701  CAGCTAGAAT CTGATAGATT CTTATTAATG AGTGGTGGGA
         +2   G  L  R  M  L  M  T  R  D  L  D  L  S  H
     6801  GCTTGCGCAT CTTGATGACA CGAGACCTGG ATTTATCACA
         +2   R  S  Q  P  V  L  L  Q  Y  S  L  N  G  G
     6901  GAGTCAACCC CTGCTCCTAC AGTATTCTCT CAACGGTGGC 7001  ATTGCCCTGG AGATACCCTT GAAAGCCCGT TCTGGTTCTA
                       ClaI
     7101  ATCAGATTCT TATTGGAGGA AATATTTCTG TCAAAGGGGG
     7201  CAAGATGCCC GTGTGTGGCT CTACTGGTGA TGCCCTGGTC +2                                          V
     7301  TCCTTCCTAC AGATAGACTT CGCTGCCTCC TGCTCAGTCA
```

```
         I  T  W  H  L  M  D  E  F  Y  F  P  Q  W  T
GAATCACTTG GCACCTGATG GATGAATTTT ACTTTCCTCA AACAACGAAT ATACTTTTCA
AAGATTCAGA CTCTGGCAAC CTTATAATAA CGGTAAGAAA GAAGAAATCT GGATTGTTGA

ATGCTCTTGG ATACATTTGA TTTTGGGCCC AGAGAAGACA ATTGGTTTTT CTATCCTGGT
CACCTGAAGA AGATTCAGCT ATGGTGTTTG TTTCAAATGA AGTTGGTGAG CATTCCATTA
                                                    BamHI
                          D  S  S  S  A  D  P  V  R  L  E
ATTTGAGATC AACGTTGGCT GTTCGACTGA TAGCTCATCC GCGGATCCAG TGAGACTGGA
 P  L  C  Y  H  S  S  S  H  V  S  S  L  C  S  T  E  H  H  P
CCCCTCTGCT ACCACAGCAG CAGCCACGTC AGCTCTTTAT GCTCCACCGA GCACCACCCC
                                                         KpnI
 R  E  V  V  H  F  G  K  L  H  L  C  G  S  V  R  F  R  W  Y  Q
GGGAGGTCGT GCACTTTGCC AAGCTGCACC TTTGTGGATC TGTCCGTTTC AGATGGTACC
 I  D  N  V  Y  I  G  P  Q  C  E  E  M  C  M  G  Q  G  S  C
CATTGATAAT GTCTACATCG GTCCCCAGTG TGAGGAGATG TGTAATGGAC AGGGGAGCTG
 G  P  T  C  K  I  S  T  K  N  P  D  F  L  K  D  D  F  E  G
GGTCCAACCT GTAAAATAAG CACCAAAAAT CCTGATTTTC TCAAAGATGA TTTCGAAGGT
 K  P  S  R  K  C  G  I  L  S  G  N  N  L  F  F  N  E  D  G
AACCATCTCG AAAGTGTGGA ATCCTTTCTA GTGGAAACAA CCTCTTTTTC AATGAAGATG
 A  R  F  V  Q  F  F  M  R  L  G  C  G  K  G  V  P  D  P  R
TGCTAGATTT GTGCAGTTCT TCATGAGACT GGGATGTGGT AAAGGCGTTC CTGACCCCAG
 L  S  W  S  L  L  Q  E  F  L  F  S  N  S  S
CTCTCGTGGA GTCTTCTTCA GGAGTTCCTT TTCAGCAATT CCAGCAATGT GGGCAGGTAC
                                                       ClaI
CTCGCCTTCG CTGGTGGCAA CCGTCTGAGA ATGGGCACTT CTACAGCCCC TGGGTTATCG

CTTGGAAGAT GATTTCACAA CCCTTGATAG TAGGAAATGG CTGCTTCACC CAGGAGGCAC
TTCATTGAAA AGGCCAGCAC CCGTTACGTG GTCAGCACAG ACGTTGCCGT GAATGAGGAT
                                                BglII
 T  D  S  C  Y  A  I  E  L  E  Y  S  V  D  L  G  L  S  W  H  P
CAGACTCTTG TTATGCGATT GAATTGGAAT ACTCAGTAGA TCTTGGATTG TCATGGCACC
```

FIG. 5 (Cont.7)

Repeat 6

```
         +2  -T L V R D C L P T N V E C S
        7401 CATTGGTAAG GGACTGTCTG CCTACCAATG TGGAATGCAG
         +2  -T L P L P P Y T R S Q A T R
        7501 TCTGCCTCTC CCTCCTTATA CCAGGTCCCA AGCCACTCGT
                                                    NcoI
         +2  Y I G D G C I D M C S G H
        7601 TATATCGGGG ATGGCTGCAT AGACATGTGC AGTGGCCATG

+2  -D P E T S L P T Q L K D N F
        7701 ACCCCGAGAC CTCTGTTCCA ACCCAACTCA AGACAACTT
         +2  -V C G A V A S G M A L H F S
        7801 GTGTGGAGCC GTGGCGTCGG GAATGGCTCT CCATTTCAGT
         +2  Q F Y F M Y G Q L I T P N
        7901 CAATTTTACT TCATGTATGG GTGCCTGATT ACACCAAACA
         +2  .L M E I F Y G Q Y S
        8001 TCATGGAGAT TTTCTATGAC CAGTACAGTA AGCCCGGATT
        8101 GCCAAGACAT GACGGCCTGG ATCAGAACGA CTGGGCCATT
                                                    PstI
        8201 AGCGCCCCAG TACCCCAGCA CGAGCGCTCC CCTGCAGATG
        8301 AGCACTGGCT ATTCCATGAT GATTGTACAG TAGAAAGATT

8401 AGTGACCCAT GACCTGACTC CCACTGAAGG CTGGATTATG
        8501 GTGCAGTATT CTACTGACTT CGGTGTGAGT TGGAATTATC

8601 TATTCTTTCC AACTAAAGGG TGGAAAAGGA TCACCTACCC
                              ClaI
        8701 CATGCAGTGG GCAATCGATA ATTTCTACCT GGGCCCTGGA
        8801 GGATACTCAG GGCCAAACTG CTACTTGACC CACACTCTGA
                      ScaI                   EcoRI
        8901 TAGAAGGTGG AAGTACTTGC ACTGAGTGTG GAATTCTTGC
        9001 GGATCTTCGA GGTGCAAAGT TCCTGCAATA CTGGGGGCGC
        9101 CTGTTGGACT ACTCTACCGA TGGAGGAATT ACCTGGACTT
```

FIG. 5 (Cont.8)

```
                    BamHI
       R  Y  H  L  Q  R  L  V  S  D  T  F  N  K  W  T  R  T
      TCGCTATCAT CTGCAACGGA TCCTGGTGTC AGACACTTTC AACAAGTGGA CTAGAATCAC
       F  R  W  H  Q  P  A  P  F  D  K  Q  Q  T  W  A  I  D  N  V
      TTCCGTTGGC ATCAACCAGC TCCTTTTGAC AATGCGCAGA CATGGGCAAT AGATAATGTC
          NsiI
       G  R  C  I  Q  G  N  C  V  C  D  T  Q  W  G  G  L  D  C  D  D
      GGAGATGCAT CCAGGGAAAC TGCGTCTGTG ATGAACAGTC GGGTGGCCTG TACTGTGATG
          SacI
       N  R  A  P  S  S  Q  N  W  L  T  V  N  G  G  K  L  S  T  V
      CAATCGAGCT CCATCCAGTC AGAACTGGCT GACTGTGAAC GGAGGGAAAT TGAGTACAGT
       G  G  C  S  R  L  L  V  T  V  D  L  N  L  T  N  A  E  F  I
      GGGGGGTTGTA GTCGATTATT AGTCACTGTG GATCTAAACC TCACTAATGC TGAGTTCATC
       N  R  N  Q  G  V  L  L  E  Y  S  V  N  G  I  T  W  N  L  L
      ACCGTAACCA AGGTGTTCTC TTGGAATATT CTGTCAATGG AGGCATTACC TGGAACCTGC

TGTGAATATC CTTCTCCCTC CTGATGATAA AGAGATTGCC ACTCGCTTCC GCTGGTGGCA
      GACAATGTCC TCATCTCAGG CTCTGCTGAC CAAAGGACCG TTATGCTGGA CACCTTCAGC

CCGGCCCTGT CGGGAGGATC GCCTTTGACA TGTTTATGGA AGACAAAACT TCAGTGAATG
      CTGTGACTCC CCTGATGGTG TGATGCTCTG TGGCAGTCAT GATGGACGGG AGGTGTATGC
           BglII
      CAATTCAAGA TCTCAGTTGG ATGTAAGGTG TCTGAAAAAA TTGCCCAGAA TCAAATTCAT
      TGGTCCCTCA GTGCTTGCCT GCTGACCCAA AATGCTCTGG AAGTGTTTCT CAGCCATCTG
           HindIII                                            ScaI
      ACTTCCTGAA AGCTTAGTGG GAAATCCGGT AAGGTTTAGG TTCTATCAGA AGTACTCAGA TGCTTGGACA ACTGCAGGGG CCATGGAGAT TGCTTAAGGG AACAGTGCAT CTGTGATCCG
      AGACTTTCCT GAAGGAACGC TTTGACAGTG AAGAAATCAA ACCTGACTTA TGGATGTCCT
                            BamHI
      CGAGGACACT GCACTCTATT TTGGGGGATC CACTGTGAGA CAAGCGGTTA CACAAGATTT
      ATCGGTAGTG AGAACAACAT GACCTCTTGC CATCGTCCCA TCTGCCGGAA GGAAGGCGTG
      TGCTCCATGA GATGGATTAC CAGAAATACA TTTCTGTTAG ACACGACTAC ATACTTCTTC
```

FIG. 5 (Cont.9)

| | |
|---|---|
| 9201 | CTGAAGATGC CCTCACCAAC ACAACTCGAC TTCGCTGGTC |
| 9301 | ACTGGACAAC ATTTTGATTG GTGGAGCAGA AATCAATCCC |
| 9401 | TACCCTAATG CTGTAAGGAC AGCAGGATTT TGTGGCAATC |
| 9501 | CCCGAGAACT CATTATACAG CCAGGATACA TGATGCAGTT |
| 9601 | ATACACTAAG GATGCAAGAT CGGATTCCTG GCAGCTCGTA |
| 9701 | GAAGCCACCA TCTACAACTC TGTCAACAGC TCAAGCTGGA |
| | BamHI |
| 9801 | TCCAGAAGGG AGAAGAAACT GAGAAGCAAA GCTGGGCAAT |
| | AgeI |
| 9901 | GACCGGTGCC ATCTGCATCT GCGACGAGAG CTTCCAAGGT |
| 10001 | GCAAGAGTCA CCGAGGCAAA CTGGGAGACC ATTCAAGGTG |
| 10101 | TTAATGGCTG TCAGATCAGG CAAGCAGCTA CCAAGCCTCT |
| | PvuII |
| 10201 | GGACAGCTGC AACAGTGACC TGAGTGGCCC CCACGCTGTG |
| 10301 | CAGCACCAGC CAAAGGACTT CACACAAGCT CAGAGAGTGT |
| | BclI |
| 10401 | GCCACAATGG AACAGGTCAT GATCAATGGG CTTTGGACCA |
| 10501 | ACATGGGCTC AGACATTTCT ACAACAGAAG ACGAAGGTCA |
| | EcoRV |
| 10601 | TTGCTCTCCA TTCTTTTAAA TCTCGCACTA CATCTGATAT |
| 10701 | CACCACTTTC CCACACTGTG AACTAATGAC AAGTGACTTA |
| 10801 | TATCAGTTAC AGTGGCAGTA TTGACAATAA GAAACAGTTT |
| 10901 | TAGCACAGTA TTTAACATTC TTGGTCACAA AGCTATTTAA |
| 11001 | TTATGTATTC TCTTCTACAA TACAACACAT TGAAACTGTA |
| 11101 | AATTAATTGA AATACCTATT CAAGAAGATA GTTGTAAAGA |
| 11201 | ATAAGAAAAA TGCTTGACCC TGAAATATTT TCTACTTTAA |
| 11301 | TTTTTAAGTG TTCTGTGGCT GATTTACTAA CAGTAACTGC |
| 11401 | TTCTTCGTGG ATTGTTTTTT CTGCGGGTCA TATTCATACC |
| 11501 | TTGTGTAACT GAAAGGTTGC ACTCTAGGGT GAACCAAGCT |

FIG. 5 (Cont.10)

```
                    BclI
GCAGCCTTTT GTGATCAGCA ATGGAATTGT GGTCTCTGGG GTGGAGCGTG CTCAGTGGGC
AGCCAATTGG TGGACACTTT TGATGATGAA GGCACTTCCC ATGAAGAAAA CTGGAGTTTT
CATCCTTTCA CCTCTATTGG CCAAATAAAA AGAAGGACAA GACTCACAAT GCTCTCTCCT
TAAAATTGTG GTGGGTTGTG AAGCCACTTC TTGTGGTGAC CTTCATTCCG TAATGCTGGA
CAGACCCAGT GCCTTCCTTC CTCTTCTAAC AGCATTGGCT GCTCCCTTT CCAGTTCCAT
                    PvuII                                    BamHI
AAAGAATCAC CATCCAGCTG CCTGACCATG TCTCCTCTAG TGCAACACAG TTCCGCTGGA
                                        PstI
TGACCACGTG TACATTGGAG AGGCTTGCCC CAAGCTCTGC AGCGGGCACG GATACTGCAC

GATGACTGCT CTGTTTTCAG TCACGACCTT CCCAGTTATA TTAAAGATAA TTTTGAGTCC
                              PvuII           NcoI
GAGTCATAGG AAGTGGCTGT GGGCAGCTGG CCCCCTACGC CCATGGAGAC TCACTGTACT
             XhoI
GGATCTCACT CGAGCAAGCA AAATCATGTT TGTTTTGCAA ATTGGGAGCA TGTCGCAGAC

GACAAGGCGG TGCTGCTGCA ATACAGCGTC AACAACGGGA TCACCTGGCA TGTCATCGCC
CTTACAATGT CCCCCTGGAG CGACGGATGA AGGAGTCTT ACTGCGCTGG TGGCAACCAC

TGTGGAGGTC GTCCTAGTAA GCACTCGCAA ACAAAATTAC ATGATGAATT TTTCACGACA
CTTAGGCGAT ACCCATGAAG AATCAAAAG TTTATTTTTT TTCTTCCAAC ATGTGATGTG

CAGGAAATAT CTGTGAAGGA CTTGGTGATT ACCTGAAAGC CCTTCTCAAG ACCGAGTGTA
TTTGCTCATA AGTAAATGTC TTCATGTTGA TGTGTCCGTG AAAGTTGTGA TCTGTTGTAA
AACAGAAAAA TGAAATTTAA GCACAAAAAA TTTAAGAGAT TTTATGTTTA AAATGGCATT
GTGGACTGTA TTTCAGCTAT GTCTCATGTT TTATATGATT AAATTATCAT GTTTGTCCT
                                                           PstI
TTTACTTGTT ATGTTGTAAT ATTTTGCTGC TGAATTTGGG GCTACTTATA TTCTGCAGAA
TATTGTATCT CCTTTAATAT ACTCCTTAAA AATGTATGTT GGTTTAGCGT TGTTTTGTGG
                                                           BglII
ATTGTGGATG AAGACCCTAT CTCCCACAAA TAAGTTCCCA TTTCCTTGTC TAAAGATCTT
CATTTTTTGT CTGTGATAAC AGAGTGATTT GTAAACAGT GGTTGTTTTT TCATTGTGTT

TTCTGATGAA GTTGTACAAC ACCAGCAACA TTATAATGGC CCTGTAGCTC TGAATGCTAT
ATAAAAGCCC ATGCTTAAAT AAAAATTATG TCCAAAAGCC
```

FIG. 5 (Cont.11)

```
                         HindIII      NcoI
                   +3                M  E  R  B  G  W  A  R  Q  T
Signal peptide      1   AAGCTTCCAC  CATGGAGCGC ACTGGCTGGG CCCGGCAGAC ScaI
                   +3  -A  P  V  L  L  Q  Y  S  H  D  A  G  M  S
                  101   TCCAGTTCTT CTTCAGTACT CTCATGATGC TGGTATGTCC +3   S  R  E  L  S  E  P  T  D  Y  H  T  G  D
                  201   TCCAGAGAAC TAAGTGAGCC CACCATGTAT CACACAGGGG BamHI
Repeat 3           +3  -T  R  F  R  W  I  G  E  S  S  S  G  K  N
                  301   CCAGATTCCG ATGGATCCCG GAGAGCAGCT CACAGAAAAA NcoI
                   +3  -S  G  H  G  D  C  I  S  G  V  C  F  C  D
                  401   TGGCCATGGG GACTGCATTT CAGGAGTGTG TTTCTGTGAC +3   F  D  R  F  E  G  K  L  S  P  L  W  Y  K
                  501   TTCGATAGGT TTGAGGGGAA GCTCAGCCCT CTGTCGTACA +3  -Y  F  N  G  P  G  K  R  E  A  R  T  V  P
                  601   ACTTCAATGG CCCTGGGAAA AGGGAAGCCC GGACGGTCCC +3  -S  G  I  T  C  I  K  P  R  T  R  N  E  G
                  701   AGGCATTACC TGCATCAAAC CAAGAACTAG AAATGAAGGG +3   F  M  S  F  L  E  P  Q  I  I  S  I  D  L
Loop 3-4          801   TTCATGTCCT TCCTGGAACC ACAGATCATT TCCATTGACC +3  -K  H  S  A  Q  W  A  L  C  C  V  L  I  G
                  901   AGCATTCAGC CCAGTGGGCT TTGGATGATG TTGTTATAGG
                 1001   TAGTAGGAAA TGGCTGCTTC TTGGATGATG CACCAAGATG Loop 5-6           +3
                 1101   GTGGTCAGCA CAGACGTTGC CGTGAATGAG GATTCCTTCC BglII
                   +3  -E  Y  S  V  D  L  G  L  S  W  H  P  L  V
Repeat 6         1201   AATACTCAGT AGATCTTGGA TTGTCATGGC ACCCATTGGT +3  -V  S  D  T  F  N  K  W  T  R  I  T  L  P
                 1301   GTCAGACACT TTCAACAACT GGACTAGAAT CACTCTGCCT +3   D  K  G  Q  T  F  A  I  D  N  V  Y  I  G  D
                 1401   GACAAGCAGC AGACATGGGC AATAGATAAT GTCTATATCG GGGAT +3  -C  D  E  Q  W  G  G  L  Y  C  D  D  P  E  T
                 1501   GTGATGAACA ATGGGTGGC  CTGTACTGTG ATGACCCCGA GACCT BsaI
                   +3  -W  L  T  V  N  G  G  K  L  S  T  V  C  G  A
                 1601   GCTGACTGTG AACGGAGGGA AAATTGAGTAC AGTGTGTGGA GCCGT +3   V  D  L  N  L  T  N  A  E  F  I  Q  F  Y  F
                 1701   GTGGATCTAA ACCTCACTAA TGCTGAGTTC ATCCAATTTT ACTTC +3  -Y  S  V  N  G  G  I  T  W  N  L  L  M  E  I
                 1801   ATTCTGTCAA TGGAGGCATT ACCTGGAACC TGCTCATGGA CATTT
```

```
                        HindIII    NcoI
                                    M   E   R   S   G   W   A   R   Q   T   F   L   L
Signal peptide  +3
                 1    AAGCTTCCAC CATGGAGCGC AGTGGCTGGG CCCGGCAGAC TTTCCTCCTA
                                                    ScaI
                +3   -L   N   I   G   C   A   N   Q   F   S   T   A   P   V   L   L
               101   AAACATAGGT TGTGCCAATC AATTCAGCAG TACTGCTCCA GTTCTTCTTC
                                        PstI
                +3    Y   P   A   S   A   G   K   G   C   E   G   N   S   R   E   L   S
               201   TACCCGGCTT CTGCAGGCAA AGGATGCGAA GGAAACTCCA GAGAACTAAG
                                        BglII
Repeat 3        +3   -T   I   V   I   P   R   S   L   A   S   S   K   T   R   F   R   W
               301   CCATTGTTAT TCCAAGATCT CTTGCATCCA GCAAGACCAG ATTCCGATGG
                                                                  PstI       NcoI
                +3   -G   V   Y   I   S   E   P   C   P   S   Y   C   S   G   H   G   D
               401   AGTGTACATA TCCGAGCCTT GTCCCAGTTA CTGCAGTGGC CATGGGGACT
                +3    T   C   V   S   N   V   P   N   H   N   E   M   F   D   R   F   E
               501   ACCTGTGTGT CAAATGTCCC CAATCACAAT GAGATGTTCG ATAGGTTTGA
                +3   -T   G   C   G   T   L   N   D   G   K   S   L   Y   F   N   G   P
               601   CTGGCTGTGG AACACTTAAC GATGGCAAAT CTCTCTACTT CAATGGCCCT
                +3    L   V   Q   F   Y   I   Q   I   G   S   K   T   S   G   I   T   C
               701   TGTTCAATTT TATATACAAA TTGGAAGCAA AACTTCAGGC ATTACCTGCA
                +3    N   G   I   L   W   H   L   L   R   E   L   D   F   M   S   F
               801   AATGGGATAC TCTGGCATTT GCTTCGAGAG TTGGACTTCA TGTCCTTCCT
                +3   -A   T   A   F   R   W   W   Q   P   Q   H   G   K   H   S   A   Q
Loop 3-4       901   CAACGGCATT TCGATGGTGG CAACCGCAAC ATGGGAAGCA TTCAGCCCAG
                +3   -G   F   Q   D   K   F   D   G   S   I   D   D   N   W   F   F   Y
              1001   ATTCAAGAC AAATTTGATG GCTCTATAGA TGACAATTGG TTTTTCTATC
                +3    E   E   D   S   A   M   V   F   V   S   N   E   V   G   E   H
Loop 4-5      1101   GAAGAAGATT CAGCTATGGT GTTTGTTTCA AATGAAGTTG GTGAGCATTC
                                                                  BamHI
Repeat 5        +3   -E   I   N   V   G   C   S   T   D   S   S   S   A   D   P   V   R
              1201   AGATCAACGT TGGCTGTTCG ACTGATAGCT CATCCGCGGA TCCAGTGAGA
                +3   -L   C   Y   H   S   S   S   H   V   S   S   L   C   S   T   E   H
              1301   CTGCTACCAC AGCAGCAGCC ACGTCAGCTC TTTATGCTCC ACCGAGCACC KpnI
                +3    V   V   H   F   G   K   L   H   L   C   G   S   V   R   F   R   W   Y
              1401   GTCGTGCACT TTGGGAAGCT GCACCTTTGT GGATCTGTCC GTTTCAGATG
                +3   -D   N   V   Y   I   G   P   Q   C   E   E   M   C   N   G   Q   G   S
              1501   ATAATGTCTA CATCGGTCCC CAGTGTGAGG AGATGTGTAA TGGACAGGGG
                +3   -P   T   C   K   I   S   T   K   N   P   D   F   L   K   D   D   F   E
              1601   AACCTGTAAA ATAAGCACCA AAAATCCTGA TTTTCTCAAA GATGATTTCG
                +3    S   R   K   C   G   I   L   S   S   G   N   N   L   F   F   N   E
              1701   TCTCGAAAGT GTGGAATCCT TTCTAGTGGA ACAACCTCT TTTTCAATGA
                +3   -R   F   V   Q   F   F   M   R   L   G   C   G   K   G   V   P   D   P
              1801   GATTTGTGCA GTTCTTCATG AGACTGGGAT GTGGTAAAGG CGTTCCTGAC +3   -S   W   S   L   L   Q   E   F   L   F   S   N   S   S   D   Y   K   D
              1901   GTGGAGTCTT CTTCAGGAGT TCCTTTTCAG CAATTCCAGC GATTACAAGG
```

FIG. 9

```
        A   L   L   L   G   A   T   L   R   A   R   A   L   Q   F   K L-
      GCGCTGTTGC TGGGGGCGAC GCTGAGGGCG CGCGCGCTAC AGTTCAAGCT
         ScaI
      Q   Y   S   H   D   A   G   M   S   W   F   L   V   K   E   G   C
      AGTACTCTCA TGATGCTGGT ATGTCCTGGT TTCTGGTGAA AGAAGGCTGT
          E   P   T   M   Y   H   T   G   D   F   E   E   W   T   R   I   T
      TGAGCCCACC ATGTATCACA CAGGGGACTT TGAAGAATGG ACAAGAATCA
         BamHI
              T   Q   E   S   S   S   Q   K   N   V   P   P   F   G   L   D   G
      ATCCAGGAGA GCAGCTCACA GAAAAACGTG CCTCCATTTG GTTTAGATGG
          C   I   S   G   V   C   F   C   D   L   G   Y   T   A   A   Q   G
      GCATTTCAGG AGTGTGTTTC TGTGACCTGG GATATACTGC TGCACAAGGA
                G   K   L   S   P   L   W   Y   K   I   T   G   A   Q   V   G   T
      GGGGAAGCTC AGCCCTCTGT GGTACAAGAT AACAGGTGCC CAGGTTGGAA
              G   K   R   E   A   R   T   V   P   L   D   T   R   N   I   R L-
      GGGAAAAGGG AAGCCCGGAC GGTCCCTCTG GACACCAGGA ATATCAGACT
          I   K   P   R   T   R   N   E   G   L   I   V   Q   Y   S   N   D
      TCAAACCAAG AACTAGAAAT GAAGGGCTTA TTGTTCAGTA TTCAAATGAC
          L   E   P   Q   I   I   S   I   D   L   P   Q   D   A   K   T   P   A
      GGAACCACAG ATCATTTCCA TTGACCTGCC ACAGGACGCG AAGACCCCTG
          W   A   L   D   D   V   L   I   G   M   N   D   S   S   Q   T   G
      TGGGCTTTGG ATGATGTTCT TATAGGAATG AATGACAGCT CTCAAACTGG
          P   G   G   N   I   G   L   Y   C   P   Y   S   S   K   G   A   P
      CTGGTGGTAA CATCGGTCTT TATTGTCCAT ATTCTTCAAA GGGGGCACCT
          S   I   T   T   R   D   L   N   V   N   E   N   T   I   I   Q   F   E
      CATTACCACC CGTGACCTAA ATGTGAATGA GAACACCATC ATACAATTTG
              L   E   F   S   R   D   F   G   A   T   W   H   L   L   L   P L-
      CTGGAATTTT CAAGGGACTT CGGGGCGACC TGGCACCTTC TGCTGCCCCT
              H   P   S   S   T   Y   Y   A   G   T   M   Q   G   W   R   R   E
      ACCCCAGCAG CACCTACTAC GCAGGAACCA TGCAGGGCTG GAGGAGGGAG
              Q   G   F   Y   P   A   G   S   Q   P   V   T   W   A   I   D
      GTACCAGGGA TTTTACCCTG CCGGCTCTCA GCCAGTGACA TGGGCCATTG
          C   I   N   G   T   K   C   I   C   D   P   G   Y   S   G P-
      AGCTGTATCA ATGGAACCAA ATGTATATGT GACCCTGGCT ACTCAGGTCC
          G   Q   L   E   S   D   R   F   L   L   M   S   G   G   K   P
      AAGGTCAGCT AGAATCTGAT AGATTCTTAT TAATGAGTGG TGGGAAACCA
          D   G   L   R   M   L   M   T   R   D   L   D   L   S   H   A   R
      AGATGGCTTG CGCATGTTGA TGACACGCGA CCTGGATTTA TCACATGCTA
          R   S   Q   P   V   L   L   Q   Y   S   L   N   G   G   L   S
      CCCAGGAGTC AACCCGTGCT CCTACAGTAT TCTCTCAACG GTGGCCTCTC
                                         XhoI
          D   D   D   K
      ATGACGACGA TAAGTGACTC GAG
```

FIG. 9 (Cont.)

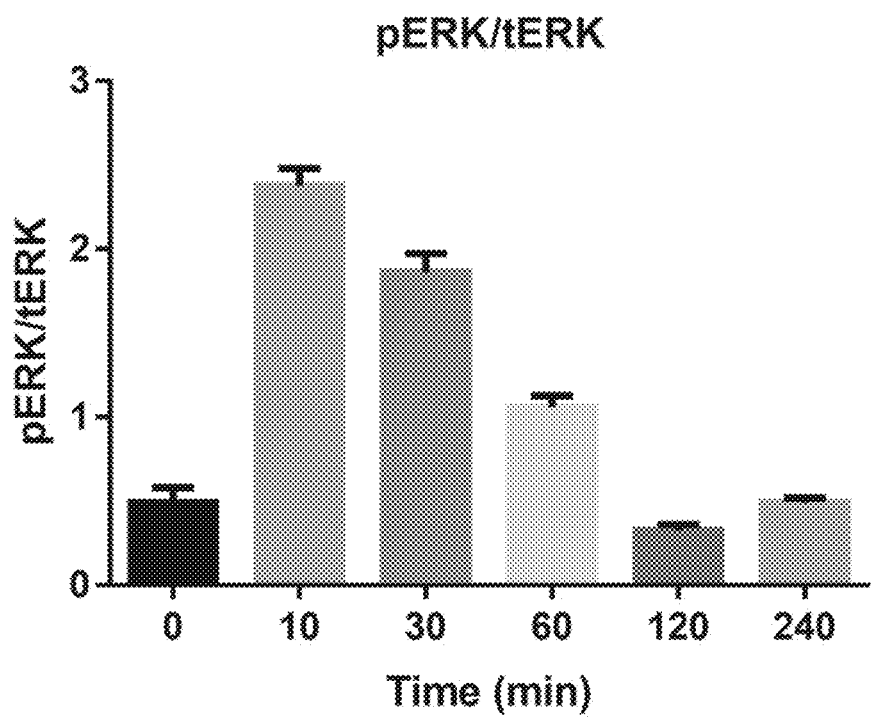
FIF. 13(G)
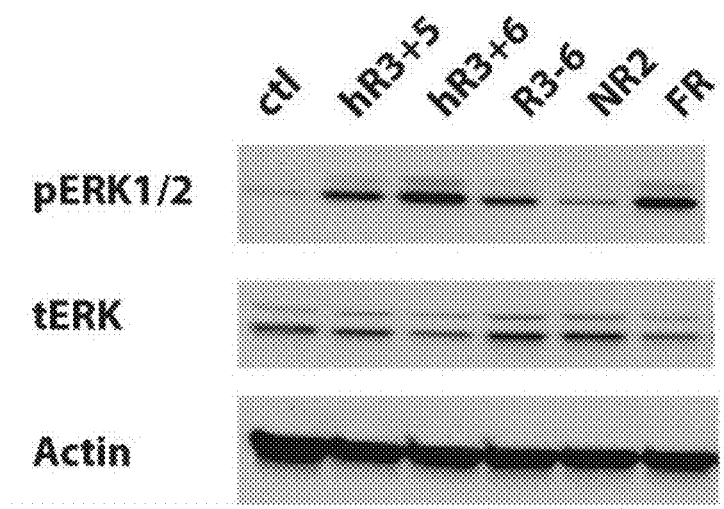
FIG. 14(A)

REELIN COMPOSITIONS FOR TREATMENT OF NEUROLOGICAL DISORDERS

CROSS-REFERENCE TO RELATED APPLICATIONS

This application is a continuation of and claims priority to International Patent Application No. PCT/US2017/045307, filed Aug. 3, 2017 which claims priority to U.S. Provisional Application No. 62/370,519, entitled "Reelin Compositions for Treatment of Neurological Disorders", and filed Aug. 3, 2016; and U.S. Provisional Application No. 62/486,729, entitled "Reelin Compositions for Treatment of Neurological Disorders", and filed Apr. 18, 2017; the contents of which are incorporated herein by reference.

BACKGROUND OF INVENTION

The lipoprotein receptor signaling system is known to play a significant role in the adult CNS, including cholesterol homeostasis, clearance of extracellular proteins, and modulation of memory formation, synaptic transmission, plasticity and maturation through the activation of numerous signal transduction pathways.

The extracellular matrix protein Reelin has been implicated in numerous neurological disorders, including schizophrenia (Guidotti, et al., Decrease in reelin and glutamic acid decarboxylase 67 (GAD67) expression in schizophrenia and bipolar disorder: a postmortem brain study. Arch. Gen Psychiatry. 2000; 57: 1061-1069; Chen, et al., Identification of a single nucleotide polymorphism at the 5' promoter region of human reelin gene and association study with schizophrenia. Mol. Psychiatry. 2002; 7: 447-448; Fatemi, et al., Reelin glycoprotein in autism and schizophrenia. Int. Rev. Neurobiol. 2005; 71: 179-187, Torrey, et al., Neurochemical markers for schizophrenia, bipolar disorder and major depression in postmortem brains, Biol. Psychiatry. 2005; 57: 252-26), bipolar disorder (Fatemi, et al., Reduction in Reelin immunoreactivity in hippocampus of subjects with schizophrenia, bipolar disorder and major depression. Mol. Psychiatry. 2000; 5: 654-663; Torrey, et al., Neurochemical markers for schizophrenia, bipolar disorder and major depression in postmortem brains. Biol. Psychiatry. 2005; 57: 252-260), depression (Kimble, et al., Molecular abnormalities of the hippocampus in severe psychiatric illness: postmortem findings from the stanley neuropathology consortium. Mol. Psychiatry. 2004; 9: 609-620; Lussier, et al., Repeated exposure to corticosterone, but not restraint, decreases the number of Reelin-positive cells in the adult rat hippocampus. Neurosci. Lett 2009; 460: 170-174; Lussier, et al., Reelin as a putative vulnerability factor for depression: examining the depressogenic effects of repeated corticosterone in heterozygous reeler mice. Neuropharmacol. 2011; 60: 1064-1074; Lussier, et al., The progressive development of depression-like behavior in corticosterone-treated rats is paralleled by slowed granule cell maturation and decreased reelin expression in the adult dentate gyrus. Neuropharmacol. 2013; 71C, 174-183; Lussier, et al., Altered GABAergic and glutamatergic activity within the rat hippocampus and amygdala in rats subjected to repeated corticosterone administration but not restraint stress. Neurosci. 2013; 231: 38-48; Fenton, et al., Imipramine protects against the deleterious effects of chronic corticosterone on depression-like behavior, hippocampal reelin expression and neuronal maturation. Prog. Neuropsychopharmacol. Biol. Psychiatry. 2015; 60: 52-59), autism (Fatemi, et al., Reelin glycoprotein in autism and schizophrenia. Int. Rev. Neurobiol. 2005; 71: 179-187), and Alzheimer's disease (AD) (Hoe, et al., DAB1 and Reelin effects on amyloid precursor protein and ApoE receptor2 trafficking and processing, J. Biol Chem. 2006; 281: 35176-35185; Hoareau, et al., Amyloid precursor protein cytoplasmic domain antagonizes Reelin neurite outgrowth inhibition of hippocampal neurons. Neurobiol. Aging. 2008; 29: 542-553). Currently. Reelin signaling involves triggering of an intracellular cascade event, as seen in FIG. 1.

Reelin signaling appears driven by directed proteolysis of sequestered, full length, extracellular Reelin, as opposed to the simple production and release of Reelin from interneurons, as with neuropeptides or small molecule transmitters. Reelin has been shown to have two main sites of cleavage, between EGF-like repeats 2-3 (R2-3) and repeats 6-7 (R6-7), as seen in FIG. 2 (Jossin, et al., The central fragment of Reelin, generated by proteolytic processing in vivo, is critical to its function during cortical plate development. J. Neurosci. 2004; 24: 514-521). These cleavage sites result in five major fragments that can be found in the adult and developing brain, seen in FIG. 3 (Jossin, et al., Processing of Reelin by embryonic neurons is important for function in tissue but not in dissociated cultured neurons. J. Neurosci. 2007; 27: 4243-4252; Krstic, et al., Regulated proteolytic processing of Reelin through interplay of tissue plasminogen activator (tPA), ADAMTS-4, ADAMTS-5 and their modulators. PLoS One. 2012; 7:e47793; Trotter, et al., Extracellular proteolysis of reelin by tissue plasminogen activator following synaptic potentiation. Neuroscience. 2014; 274: 299-307). The middle R3-6 fragment interacts with the VLDLR and ApoER2 and is considered the fragment that is involved in initiating the downstream signaling of the Reelin cascade (Jossin, et al., The central fragment of Reelin, generated by proteolytic processing in vivo, is critical to its function during cortical plate development. J. Neurosci. 2004; 24: 514-521).

Numerous attempts have been made to identify Reelin-cleaving enzymes, such as the serine protease tissue plasminogen activator (tPA), matrix metalloproteinases (MMP), and a disintegrin and metalloproteinase with thrombospondin motifs (ADAMTS), and the functional role of this proteolytic processing (Trotter, et al., Extracellular proteolysis of reelin by tissue plasminogen activator following synaptic potentiation. Neuroscience. 2014; 274: 299-307; Nagy, et al., Matrix metalloproteinase-9 is required for hippocampal late-phase long-term potentiation and memory. J. Neurosci. 2006; 26: 1923-1934; Nogi, et al., Structure of a signaling-competent reelin fragment revealed by X-ray crystallography and electron tomography. EMBO J. 2006; 25: 3675-3683; Nakano, et al., The extremely conserved C-terminal region of Reelin is not necessary for secretion but is required for efficient activation of downstream signaling. J. Biol Chem. 2007; 282: 20544-20552; Hisanaga, et al., A disintegrin and metalloproteinase with thrombospondin motifs 4 (ADAMTS-4) cleaves Reelin in an isoform-dependent manner. FEBS Lett. 2012; 586: 3349-3353; Krstic, et al., Regulated proteolytic processing of Reelin through interplay of tissue plasminogen activator (tPA), ADAMTS-4, ADAMTS-5 and their modulators. PLoS One. 2012; 7:e47793). One endogenous processing pathway for extracellular Reelin, is via serine protease tissue plasminogen activator (tPA) in the brain, which occurs between R6 and R7 in wild-type Reelin (Trotter, et al., Extracellular proteolysis of Reelin by tissue plasminogen activator following synaptic potentiation. Neuroscience. 2014; 274: 299-307). Proteolysis was not seen in tPA KO mice, supporting a role of this protease in NMDAR-independent LTP induced cleavage of Reelin (Trotter, et al., Extracellular proteolysis of Reelin by tissue plasminogen activator following synaptic potentiation. Neuroscience. 2014; 274: 299-307) and was blocked by serpin E1 inhibitor (Krstic, et al., Regulated proteolytic processing of Reelin through interplay of tissue plasminogen activator (tPA), ADAMTS-4, ADAMTS-5 and their modulators. PLoS One. 2012; 7:e47793), In further support, ex vivo incubation of tPA with Reelin for 45 min produced the N-R6 fragment (370 kDa), which was blocked with Plasminogen activator inhibitor (PAI-1; serpin E1) and diisopropyl fluorophosphates (a serine protease inhibitor), but not blocked by Aprotinin or CR-50 (an antibody that binds in the N-terminal region of Reelin; D'Arcangelo, et al., Reelin is a secreted glycoprotein recognized by the CR-50 monoclonal antibody. J. Neurosci. 1997; 17: 23-31; Trotter, et al., Extracellular proteolysis of Reelin by tissue plasminogen activator following synaptic potentiation. Neuroscience. 2014; 274: 299-307). Studies also implicate metalloproteases meprin α and β in Reelin cleavage between the R6 and R7 repeats (Sato, et al., Determination of cleavage site of Reelin between its sixth and seventh repeat and contribution of meprin metalloproteases to the cleavage, J. Biochem. 2016; 159: 305-312). However, neither WA knock-out mice (Trotter, et al., Extracellular proteolysis of reelin by tissue plasminogen activator following synaptic potentiation. Neuroscience, 2014; 274: 299-307) nor meprin β knock-out mice (Sato, et al., Determination of cleavage site of Reelin between its sixth and seventh repeat and contribution of meprin metalloproteases to the cleavage. J. Biochem. 2016; 159: 305-312) demonstrate differences in basal levels of full length Reelin or Reelin fragments, suggesting that combinations of proteases are involved in constitutive Reelin levels and proteolysis.

In the adult hippocampus, the glycoprotein Reelin is expressed by interneurons residing primarily in the hilar region of dentate gyrus, and the stratum lacunosum-moleculare layer of the hippocampus proper. Reelin-expressing cells can also be found in stratum oriens and stratum radiatum of area CA1 and CA3 and is associated with pyramidal cells of the hippocampus. Induction of long-term potentiation (LTP), a form of synaptic plasticity that results in a lasting increase in synaptic efficacy, requires NMDA receptors (NMDARs) activation and the subsequent up-regulation of AMPA receptor expression and function. Changes in AMPA receptors (AMPARs) can be achieved either by increased subunit phosphorylation or by increased subunit synthesis and trafficking to the specific synaptic sites. In contrast, NMDARs serve as coincidence detectors and play a major role in the induction of synaptic plasticity. The opening of NMDAR ion channels requires both glutamate binding and post-synaptic membrane depolarization. Some NMDAR subunits, such as NR1, NR2A and NR2B are also subjected to modulatory phosphorylation at serine/threonine or tyrosine residues. Phosphorylation of NMDAR subunits modulates both channel kinetics and trafficking to synaptic sites. It follows that if reelin were important for modulation of synaptic plasticity, then NMDARs and AMPARs would be logical targets given their importance in induction and expression of synaptic plasticity.

Reelin molecules have recently been discovered to form higher-order complexes in vitro and in vivo, such as Fc-RAP. This observation was further refined by showing that reelin is secreted in vivo as a disulfide-linked homodimer. Deletion of a short region, called the CR-50 epitope, located at the N-terminus of the molecule abolishes oligomerization. This mutated reelin fails to efficiently induce Dab1 phosphorylation in primary mouse neurons.

Reelin plays an active role in the processes of synaptic plasticity and learning. The invention also includes the identification and use of mechanisms for Reelin protein processing to enhance and/or repair cognitive function. For example, it is disclosed herein that: contextual fear learning and theta burst stimulation (tb-stim) cause changes in Reelin processing; the metalloproteinases, tPA and MMP-9 are differentially involved in Reelin processing during synaptic plasticity and learning; supplementation of Reelin fragment complement can enhance associative and spatial learning and memory; and Reelin fragments associate with Aβ plaques, its expression and processing is altered by AD-related mutations, and Reelin supplementation can overcome the LTP deficits found in the Tg2576 AD mouse model.

Once Reelin is secreted by GABAergic interneurons into the extracellular space it binds to the lipoprotein receptors, very-low-density lipoprotein receptor (VLDLR) and Apolipoprotein receptor 2 (ApoER2), which dimerize (D'Arcangelo, et al., Reelin is a ligand for lipoprotein receptors. Neuron. 1999; 24: 471-479; Weeber, et Reelin and ApoE receptors cooperate to enhance hippocampal synaptic plasticity and learning. J. Biol Chem. 2002; 277: 39944-39952; Herz & Chen, Reelin, lipoprotein receptors and synaptic plasticity. Nat. Rev Neurosci. 2006; 7, 850-859). The dimerized receptors tyrosine phosphorylate the intracellular adaptor protein Disabled-1 (Dab1) followed by phosphorylation of src family tyrosine kinases (SFK) tyrosines, like Fyn, and phosphorylation of N-methyl-D-aspartate receptor (NMDAR) (D'Arcangelo, et al., Reelin is a secreted glycoprotein recognized by the CR-50 monoclonal antibody. J. Neurosci. 1997; 17: 23-31; D'Arcangelo, et al., Reelin is a ligand for lipoprotein receptors. Neuron. 1999; 24: 471-479; Weeber, et al., Reelin and ApoE receptors cooperate to enhance hippocampal synaptic plasticity and learning, J. Biol Chem. 2002; 277: 39944-39952; Niu, et al., Reelin promotes hippocampal dendrite development through the VLDLR/ApoER2-Dab1 pathway. Neuron. 2004; 41: 71-84; Beffert, et al. Modulation of synaptic plasticity and memory by Reelin involves differential splicing of the lipoprotein receptor Apoer2. Neuron. 2005; 47: 567-579; Chen, et al., Reelin modulates NMDA receptor activity in cortical neurons. J. Neurosci. 2005; 25, 8209-8216; Qiu, et al., Differential reelin-induced enhancement of NMDA and AMPA receptor activity in the adult hippocampus. J. Neurosci. 2006; 26: 12943-12955; Qiu & Weeber, Reelin signaling facilitates maturation of CA1 glutamatergic synapses. J. Neurophysiol. 2007; 97: 2312-2321; Burrell, et al., (2014). Fyn tyrosine kinase increases Apolipoprotein E receptor 2 levels and phosphorylation. PLoS One 9:e110845; Divekar, et al., Ligand-induced homotypic and heterotypic clustering of Apolipoprotein E receptor 2. J. Biol Chem. 2014; 289: 15894-15903).

Increases in calcium influx due to NMDAR phosphorylation lead to depolarization of the post-synaptic membrane, maturation of NMDA receptors from the NR2B to NR2A receptor subtype, and α-amino-3-hydroxy-5-methyl-4-isoxazolepropionic acid receptor (AMPAR) insertion (Weeber, et al., Reelin and ApoE receptors cooperate to enhance hippocampal synaptic plasticity and learning. J. Biol Chem. 2002; 277: 39944-39952; Qiu, et al., Differential reelin-induced enhancement of NMDA and AMPA receptor activity in the adult hippocampus. J. Neurosci. 2006; 26: 12943-12955; Qiu & Weeber, Reelin signaling facilitates maturation of CA1 glutamatergic synapses. J. Neurophysiol. 2007; 97: 2312-2321). The increase in $Ca^{2+}$ influx and depolarization of the cell increases CREB phosphorylation and protein synthesis, which ultimately results in induction and enhancement of long-term potentiation (LTP) and increased synaptic plasticity and learning and memory (Niu, et al., The Reelin signaling pathway promotes dendritic spine development in hippocampal neurons. J. Neurosci. 2008; 28: 10339-10348; Rogers, et al., Reelin supplementation enhances cognitive ability, synaptic plasticity and dendritic spine density. Learn. Mem. 2011; 18: 558-564; Rogers, et al. Reelin supplementation recovers sensorimotor gating, synaptic plasticity and associative learning deficits in the heterozygous reeler mouse. J. Psychopharmacol. 2013; 27: 386-395). Concurrently, Dab1 phosphorylation results in activation of phosphatidylinositol-3-kinase (PI3K), protein kinase B (PKB/Akt), and modulation of Glycogen synthase kinase 3 beta (GSK3β), which inhibits Tau phosphorylation (Beffert, et al., Reelin-mediated signaling locally regulates protein kinase B/Akt and glycogen synthase kinase 3 beta. J. Biol Chem. 2007; 277: 49958-49964), as well as regulation of p35 to p25 conversion which is responsible for activation of CDK5, another pathway to Tau phosphorylation (Beffert, et al., Reelin and cyclin-dependent kinase 5-dependent signals cooperate in regulating neuronal migration and synaptic transmission. J. Neurosci. 2004; 24:1897-1906).

Thus, Reelin signaling is a useful target for therapies against synaptic and neuronal loss in a number of conditions. For example, Reelin has been shown to bind to both lipoprotein receptors and amyloid precursor protein (APP) and is known to be associated with Aβ plaques in a number of AD mouse models (Chin, et al. Reelin depletion in the entorhinal cortex of human amyloid precursor protein transgenic mice and humans with Alzheimer's disease. J Neurosci 2007, 27:2727-2733; Hoareau, et al. Amyloid precursor protein cytoplasmic domain antagonizes reelin neurite outgrowth inhibition of hippocampal neurons. Neurobiol Aging 2008, 29:542-553; Hoe, et al. DAB1 and Reelin effects on amyloid precursor protein and ApoE receptor 2 trafficking and processing. J Biol Chem 2006, 281:35176-35185; Miettinen, et al. Reelin-immunoreactivity in the hippocampal formation of 9-month-old wildtype mouse: effects of APP/PS1 genotype and ovariectomy. J Chem Neuroanat. 2005, 30:105-1180).

Moreover, Reelin signal transduction pathways appear to be particularly vulnerable in Alzheimer's disease (AD), potentially contributing to its pathogenesis (Hoe, et al. DAB1 and Reelin effects on amyloid precursor protein and ApoE receptor 2 trafficking and processing. J Biol Chem 2006, 281:35176-35185; Hoareau, et al., Amyloid precursor protein cytoplasmic domain antagonizes Reelin neurite outgrowth inhibition of hippocampal neurons. Neurobiol. Aging. 2008; 29: 542-553).

Similarly, Reelin can affect synaptic plasticity in adults. Mice with knockout of Reelin, ApoER2 and VLDLR, or Disabled-1 (Dab1) show deficits in synaptic plasticity (Weeber, et al., Reelin and ApoE receptors cooperate to enhance hippocampal synaptic plasticity and learning. J. Biol Chem. 2002; 277: 39944-39952, Qui, et al., 2006, Beffert, et al., Modulation of synaptic plasticity and memory by Reelin involves differential splicing of the lipoprotein receptor Apoer2. Neuron. 2005; 47:567-579). Therapeutic intervention, such as bilateral intraventricular injections (IVI) of Reelin, can be used as a therapy, and enhance learning and memory and synaptic plasticity in wild-type mice (Rogers, et al., Reelin supplementation enhances cognitive ability, synaptic plasticity and dendritic spine density. Learn. Mem. 2011; 18: 558-564), Reelin LVI has also shown recovery of learning and memory and LTP deficits seen in heterozygous reeler mice (Rogers, et al. Reelin supplementation recovers sensorimotor gating, synaptic plasticity and associative learning deficits in the heterozygous reeler mouse. J. Psychopharmacol. 2013; 27: 386-395), seen in FIG. 4, and in a mouse model of Angelman Syndrome (Hethom et al., 2016). Thus, supplementation of Reelin levels by protein administration or by gene therapy with the Reelin gene RELN may be a potential therapeutic intervention in a range of diseases.

Once Reelin is secreted by GABAergic interneurons into the extracellular space it binds to the lipoprotein receptors, very-low-density lipoprotein receptor (VLDLR) and Apolipoprotein receptor 2 (ApoER2), as shown in FIG. 1 (D'Arcangelo, et al., Reelin is a ligand for lipoprotein receptors. Neuron. 1999; 24: 471-479; Weeber, et at Reelin and Apo E receptors cooperate to enhance hippocampal synaptic plasticity and learning. J. Biol Chem. 2002; 277: 39944-39952; Herz & Chen, Reelin, lipoprotein receptors and synaptic plasticity. Nat. Rev Neurosci. 2006; 7, 850-859; Qiu, et al., Differential reelin-induced enhancement of NMDA and AMPA receptor activity in the adult hippocampus. J. Neurosci. 2006; 26: 12943-12955). Ligand interactions lead to receptor dimerization and tyrosine phosphorylation of the downstream intracellular adaptor protein Dab1 (Howell, et al., Mouse disabled (mDab1): a Src binding protein implicated in neuronal development. EMBO 1997; 16: 121-132; D'Arcangelo, et al., Reelin is a ligand for lipoprotein receptors. Neuron. 1999; 24: 471-479; Hiesberger, et al., Direct binding of Reelin to VLDL receptor and ApoE receptor 2 induces tyrosine phosphorylation of disabled-1 and modulates tau phospholation. Neuron. 1999; 24: 481-489; Strasser, et al., (2004). Receptor clustering is involved in Reelin signaling. Mol Cell Biol. 2004; 24: 1378-1386; Herz & Chen, Reelin, lipoprotein receptors and synaptic plasticity. Nat. Rev. Neurosci. 2006; 7, 850-859; Qiu, et al., Differential reelin-induced enhancement of NMDA and AMPA receptor activity in the adult hippocampus. J. Neurosci. 2006; 26: 12943-12955; Trotter, et al., Dab1 is required for synaptic plasticity and associative learning. J. Neurosci. 2013; 33: 15652-15668; Trotter, et al., Extracellular proteolysis of reelin by tissue plasminogen activator following synaptic potentiation. Neuroscience. 2014; 274: 299-307; Divekar, et al., Ligand-induced homotypic and heterotypic clustering of Apolipoprotein E receptor 2. J. Biol Chem. 2014; 289: 15894-15903). Dab1 phosphorylation activates Src family tyrosine kinases (SFK), such as Fyn, which phosphorylates N-methyl-D-aspartate (NMDA) receptors allowing increases in $Ca^{2+}$ influx (Chen, et al., Reelin modulates NMDA receptor activity in cortical neurons. J. Neurosci. 2005; 25, 8209-8216), Enhancement in $Ca^{2+}$ influx allows for maturation of NMDA receptors from the NR2B to NR2A receptor subtype, increased membrane α-amino-3-hydroxy-5-methyl-4-isoxazolepropionic acid (AMPA) receptor insertion, and can contribute to the induction and enhancement of long-term potentiation (LTP; Weeber, et al., Reelin and ApoE receptors cooperate to enhance hippocampal synaptic plasticity and learning. J. Biol. Chem. 2002; 277, 39944-39952; Beffert, et al., Modulation of synaptic plasticity and memory by Reelin involves differential splicing of the lipoprotein receptor Apoer2. Neuron. 2005; 47:567-579; Chen, et al., Reelin modulates NMDA receptor activity in cortical neurons. J. Neurosci. 2005; 25, 8209-8216; Herz & Chen, Reelin, lipoprotein receptors and synaptic plasticity. Nat. Rev. Neurosci. 2006; 7, 850-859; Qiu, et al., Differential reelin-induced enhancement of NMDA and AMPA receptor activity in the adult hippocampus. J. Neurosci. 2006; 26: 12943-12955; Qiu & Weeber, Reelin signaling facilitates maturation of CA1 glutamatergic synapses. J. Neurophysiol. 2007; 97, 2312-2321), In addition, Dab1-induced phosphorylation also can activate Phosphatidylinositol-3-kinase (PI3K) and protein kinase B (PKB/Akt) which then causes Glycogen synthase kinase 3 beta (GSK3β) inhibition (Beffert, et al., Reelin-mediated signaling locally regulates protein kinase B/Akt and glycogen synthase kinase 3beta. J. Biol. Chem. 2002; 277, 49958-49964), in turn suppressing tau hyperphosphorylation (Ohkubo, et al., Apolipoprotein E and Reelin ligands modulate tau phosphorylation through an Apolipoprotein E receptor/disabled-1/glycogen synthase kinase-3beta cascade. FASEB J. 2003; 17, 295-297).

As Reelin-positive cells are found in highest numbers in the CA1 stratum lacunosum and hilus, they are in prime locations to influence learning and memory, and neurogenesis, respectively. Indeed, Reelin has been shown to enhance synaptic plasticity and learning and memory (Weeber, et al., Reelin and ApoE receptors cooperate to enhance hippocampal synaptic plasticity and learning. J. Biol Chem. 2002; 277: 39944-39952; Herz & Chen, Reelin, lipoprotein receptors and synaptic plasticity. Nat, Rev Neurosci. 2006; 7, 850-859; Qiu, et al., Differential reelin-induced enhancement of NMDA and AMPA receptor activity in the adult hippocampus. J. Neurosci. 2006; 26: 12943-12955; Rogers & Weeber, Reelin and ApoE actions on signal transduction, synaptic function and memory formation. Neuron Glia Biol. 2008; 4:259-270), as well as alter migration of nascent adult neurons (Zhao, et al., Balance between neurogenesis and gliogenesis in the adult hippocampus: role for Reelin. Dev. Neurosci. 2007; 29: 84-90; Pujadas, et al., Reelin regulates postnatal neurogenesis and enhances spine hypertrophy and long-term potentiation. J. Neurosci. 2010; 30: 4636-4649.doi; Teixeira, et al., Cell-autonomous inactivation of the Reelin pathway impairs adult neurogenesis in the hippocampus. J. Neurosci, 2012; 32: 12051-12065). In the hippocampus, extracellular Reelin accumulates in the stratum lacunosum (Pesold, et al., Cortical bitufted, horizontal and Martinotti cells preferentially express and secrete Reelin into perineuronal nets, non-synaptically modulating gene expression. Proc. Natl. Acad. Sci. USA. 1999; 96: 3217-3222; Lussier, et al., Repeated exposure to corticosterone, but not restraint, decreases the number of Reelin-positive cells in the adult rat hippocampus. Neurosci. Lett 2009; 460: 170-174) which makes it in a prime location to influence synaptic activity in the CA1 (Weeber, et al., Reelin and ApoE receptors cooperate to enhance hippocampal synaptic plasticity and learning. J. Biol. Chem. 2002; 277: 39944-39952; Herz & Chen, Reelin, lipoprotein receptors and synaptic plasticity. Nat. Rev. Neurosci. 2006; 7, 850-859; Qiu, et al., Differential reelin-induced enhancement of NMDA and AMPA receptor activity in the adult hippocampus. J. Neurosci. 2006; 26: 12943-12955; Rogers & Weeber, Reelin and ApoE actions on signal transduction, synaptic function and memory formation. Neuron Glia Biol. 2008; 4:259-270). Endogenous cleavage of Reelin in these regions may be used to regulate Reelin's effects on these processes.

Furthermore, the lipoprotein receptor signaling system is known to play a significant role in the adult CNS such as cholesterol homeostasis, clearance of extracellular proteins, modulating memory formation, synaptic transmission, plasticity and maturation through the activation of numerous signal transduction pathways. Importantly, the lipoprotein receptor ligand apolipoprotein E (apoE) is one of the best validated risk factors for late-onset, sporadic Alzheimer's disease (AD) (Hoe H S, Harris D C, Rebeck G W. Multiple pathways of apolipoprotein E signaling in primary neurons, J Neurochem 2005; 93:145-155; Hoe H S, Freeman J, Rebeck G W. Apolipoprotein E decreases tau kinases and phospho-tau levels in primary neurons. Mol Neurodegener 2006, 1:18; Hoe H S, Pocivavsek A, Chakraborty G, et al. Apolipoprotein E receptor 2 interactions with the N-methyl-Daspartate receptor. J Biol Chem 2006, 281:3425-3431). Similarly, extracellular matrix protein reelin can bind to both lipoprotein receptors and amyloid precursor protein (APP) and is known to be associated with Aβ plaques in a number of AD mouse models (Chin J, Massaro C M, Palop J J, et al. Reelin depletion in the entorhinal cortex of human amyloid precursor protein transgenic mice and humans with Alzheimer's disease. J Neurosci 2007, 27:2727-2733; Hoareau C, Borrell V, Soriano E, Krebs M O, Prochiantz A, Allinquant B. Amyloid precursor protein cytoplasmic domain antagonizes reelin neurite outgrowth inhibition of hippocampal neurons. Neurobiol Aging 2008, 29:542-553; Hoe H S, Iran T S, Matsuoka Y, Howell B W, Rebeck G W. DAB1 and Reelin effects on amyloid precursor protein and ApoE receptor 2 trafficking and processing, J Biol Chem 2006, 281:35176-35185; and Miettinen R, Riedel A, Kalesnykas G, et al. Reelin-immunoreactivity in the hippocampal formation of 9-month-old wildtype mouse: effects of APP/PS1 genotype and ovariectomy. J Chem Neuroanat 2005, 30:105-1180). Aβ accumulation can influence reelin signaling and lipoprotein receptor function, thereby promoting AD pathogenesis and affecting synaptic and cognitive function.

Therefore, what is needed are specific agonists that act upon the lipoprotein receptor system in a manner similar to Reelin for use as therapeutics in the improvement of cognitive function as well as the treatment of neurological disease, such as AD and other age-related neurodegenerative disorders, neurological di.

SUMMARY OF THE INVENTION

The compositions and methods described herein relate generally to methods of influencing, and enhancing, cognitive function by increasing, and/or preventing interference with, Reelin levels as well as the cellular signal transduction initiated or maintained with Reelin or Reelin signaling.

The present invention provides a method of treating or correcting a disease or disorder of the nervous system through administration of a therapeutically effective amount of a recombinant Reelin fragment or Reelin splice fragment into a patient in need thereof. In some variations, the recombinant Reelin fragment or Reelin splice fragment is a Reelin fragment formed of repeat R3 through R5 (R3-R5), Reelin fragment repeat R3 joined to Reelin fragment repeat R5 (R3+R5), Reelin fragment repeat R3, a Reelin fragment formed of repeat R3 through R6 (R3-R6), Reelin fragment repeat R3 joined to Reelin fragment repeat R6 (R3+R6), where R3 is repeat region 3 of full length Reelin, R4 is repeat region 4 of full length Reelin, R5 is repeat region 5 of full length Reelin, and R6 is repeat region 6 of full length Reelin. Optionally, where the Reelin splice fragment is R3+R5, the two repeat regions, i.e. R3 and R5, are joined by the repeat region 3 loop, the repeat region 5 loop, or a combination thereof. Alternatively, where the Reelin splice fragment is R3+R6, the two repeat regions, i.e. R3 and R6, are joined by the repeat region 3 loop, the repeat region 6 loop, or a combination thereof. Is specific versions, the recombinant Reelin fragment or Reelin splice fragment is a Reelin fragment repeat R3, Reelin fragment repeat R4, Reelin fragment repeat R5, Reelin fragment repeat R6, Reelin fragment repeat R3 through R4, Reelin fragment repeat R3 through R5, Reelin fragment repeat R3 through repeat region R6, Reelin fragment repeat R4 through R5, Reelin fragment repeat R5 through R6, Reelin fragment repeat R3 joined to Reelin fragment repeat R5, Reelin fragment repeat R3 joined to Reelin fragment repeat R6, Reelin fragment repeat R4 joined to repeat RE, or a combination of the aforementioned Reelin fragment(s) or Reelin splice fragment(s). In some variations of the invention, the disease or disorder of the nervous system is a neurodegenerative disease, neuronal insult, neuronal disorder, or stroke. In specific variations, the neuronal disorder is selected from the group consisting of fragile X syndrome, William's syndrome, Rett syndrome, Down's syndrome, Angelman syndrome, autism, Reelin deficiency, bipolar disorder, depression, and schizophrenia. Alternatively, the disease or disorder of the nervous system is a neuronal insult or Alzheimer's disease.

Optionally, the Reelin fragment or Reelin splice fragment is administered by parenteral injection. In specific variations, the Reelin fragment or Reelin splice fragment is injected intraarterially, intravenously, intracerebrally, or intraventricularly In specific variations of the invention, Reelin fragment or Reelin splice fragment is bilaterally injected into the ventricles of the patient. In some variations, the Reelin fragment or Reelin splice fragment is administered to obtain a concentration of Reelin in the CNS fluid of about 10 µM to about 5 nM. Optional concentrations include 10 µM, 15 µM, 20 µM, 25 µM, 30 µM, 3 µM 40 µM 45 µM, 50 µM, 55 µM, 60 µM, 65 µM, 70 µM, 75 µM, 80 µM, 85 µM, 90 µM, 100 µM, 110 µM, 120 µM, 130 µM, 140 µM, 150 µM, 160 µM, 170 µM, 180 µM, 190 µM, 200 µM, 220 µM, 225 µM, 240 µM, 250 µM, 270 µM, 275 µM, 280 µM, 300 µM, 320 µM, 325 µM, 340 µM, 350 µM, 370 µM, 375 µM, 380 µM, 400 µM, 420 µM, 425 µM, 440 µM, 450 µM, 470 µM, 475 µM, 480 µM, 500 µM, 520 µM, 525 µM, 540 µM, 550 µM, 570 µM, 575 µM, 580 µM, 600 µM, 620 µM, 625 µM, 640 µM, 650 µM, 670 µM, 675 µM, 680 µM, 700 µM, 720 µM, 725 µM, 740 µM, 750 µM, 770 µM, 775 µM, 780 µM, 800 µM, 820 µM, 825 µM, 840 µM, 850 µM, 870 µM, 875 µM, 880 µM, 900 µM, 920 µM, 925 µM, 940 µM, 950 µM, 970 µM, 975 µM, 980 µM, 1 nM, 1.1 nM, 1.2 nM, 1.3 nM, 1.4 nM, 1.5 nM. 1.6 nM, 1.7 nM, 1.8 nM, 1.9 nM, 2.0 nM, 2.1 nM, 2.2 nM, 2.3 nM, 2.4 nM, 2.5 nM, 2.6 nM, 2.7 nM, 2.8 nM, 2.9 nM, 3.0 nM, 3.1 nM, 3.2 nM, 3.3 nM, 3.4 nM, 3.5 nM, 3.6 nM, 3.7 nM, 3.8 nM, 3.9 nM, 4.0 nM, 4.1 nM, 4.2 nM, 4.3 nM, 4.4 nM, 4.5 nM, 4.6 nM, 4.7 nM, 4.8 nM, 4.9 nM, and 5.0 nM. For example, the therapeutic concentration can be less than 100 nM, less than 50 nM, less than 25 nM, less than 10 nM, or about 5 nM. Dosages can be calculated based on distribution of the protein in the animal body and access through the blood brain barrier. A non-limiting example is where Reelin is administered at 1 µl of a 5 nM composition for each 30-36 g of patient mass. Furthermore, treatment can be ongoing, i.e. continuously, or the treatment regimen can last less than 1 year, less than 6 months, less than 3 months, less than 1 month, less than 1 week, or about 1 day.

In some variations of the invention, a construct formed from the recombinant Reelin fragment or Reelin splice fragment is inserted into a viral vector to form a Reelin vector, and the Reelin vector injected into the subject. Optional vectors include AAV9, AAV5, AAV1 and AAV4. However, other vectors, especially any suitable AAV known in the art, could be utilized in the invention and are contemplated for such use. In specific variations, the recombinant Reelin fragment or Reelin splice fragment is under the control of a CMV promotor.

The invention also includes a composition comprising a recombinant Reelin fragment or Reelin splice fragment, where the recombinant Reelin fragment or Reelin splice fragment is a Reelin fragment formed of repeat R3 through R5 (R3-R5), Reelin fragment repeat R3 joined to Reelin fragment repeat R5 (R3+R5), Reelin fragment repeat R3, a Reelin fragment formed of repeat R3 through R6 (R3-R6), Reelin fragment repeat R3 joined to Reelin fragment repeat R6 (R3+R6), where R3 is repeat region 3 of full length Reelin, R4 is repeat region 4 of full length Reelin, R5 is repeat region 5 of full length Reelin, and R6 is repeat region 6 of full length Reelin. Optionally, where the Reelin splice fragment is R3+R5, the two repeat regions, i.e. R3 and R5, are joined by the repeat region 3 loop, the repeat region 5 loop, or a combination thereof. Alternatively, where the Reelin splice fragment is R3+R6, the two repeat regions, i.e. R3 and R6, are joined by the repeat region 3 loop, the repeat region 6 loop, or a combination thereof.

In some variations of the composition, the recombinant Reelin fragment or Reelin splice fragment is integrated into a construct formed from the recombinant Reelin fragment or Reelin splice fragment inserted into a viral vector to form a Reelin vector, and the Reelin vector injected into the subject. Optional vectors include AAV9, AAV5, AAV1 and AAV4. However, other vectors, especially any suitable AAV known in the art, could be utilized in the invention and are contemplated for such use. In specific variations, the recombinant Reelin fragment or Reelin splice fragment is under the control of a CMV promotor.

The aforementioned compositions can also be used to treat a symptom of a disease or disorder of the nervous system, including neurodegenerative diseases, neuronal insults, and stroke. Nonlimiting examples include fragile X syndrome, William's syndrome, Rett syndrome, Down's syndrome, Angelman syndrome, autism, ischemia, hypoxia, Alzheimer's disease, Reelin deficiency, bipolar disorder, depression, schizophrenia, and stroke. Specific examples of symptoms of a disease or disorder of the nervous system include a deficiency in dendritic spine density, diminished long-term potentiation, diminished synaptic plasticity and associative learning deficits. Useful therapeutic compositions and amounts are disclosed above.

The aforementioned compositions can also be used to increase dendritic spine density in a subject. Useful therapeutic compositions and amounts are disclosed above.

The compostions disclosed above are also useful in increasing synaptic plasticity, learning, or improving cognitive function. The compositions and amounts that can be used in increasing synaptic plasticity, learning, or improving cognitive function are the same as those described above.

BRIEF DESCRIPTION OF THE DRAWINGS

For a fuller understanding of the invention, reference should be made to the following detailed description, taken in connection with the accompanying drawings, in which:

FIG. 5 is the sequence of full length Reelin. Recognition sites for endonucleases are depicted above their respective sequence. The repeat sequences are labels on the left side and repeat regions highlighted. Between each repeat region is a fusion loop, which is not highlighted.

FIG. 8 is the sequence of the 3+6 Reelin fragment. The fragment was formed by joining the 3-4 loop to the 5-6 loop, thereby attaching repeat 3 to repeat 6. The signal peptide region is highlighted in dark gray, followed by repeat region 3, highlighted in light gray. The joining loop region for 3-4 is in medium gray, followed by the joining loop region for 5-6 and repeat region 6, in dark gray.

FIG. 9 is the sequence of the 3+5 Reelin fragment. The fragment was formed by joining the 3-4 loop to the 4-5 loop, thereby attaching repeat 3 to repeat 5. The signal peptide region is highlighted in dark gray, followed by repeat region 3, highlighted in light gray. The joining loop region for 3-4 is in medium gray, followed by the joining loop region for 4-5 and repeat region 5, in dark gray.

FIG. 14(A) is a blot showing primary neuronal culture treated with 200 μM purified Reelin fragments representing Reelin repeats human sequence R3 and R5 (hR3+5), human repeats R3 through R6 (hR3-6) mouse Reelin repeats R3 through 6 (R3-6) mouse N terminal through R2 (NR2) and full length Reelin consisting of the full length sequence and all of the naturally occurring fragments (FR). Control (ctrl) consisted of non-treated cells. Reelin was incubated onto the cells for 60 minutes, and cells lysed. A representative Western blot was performed for total and phosphorylated extracellular regulated kinase (ERK).

DETAILED DESCRIPTION OF THE PREFERRED EMBODIMENT

Figure 1:
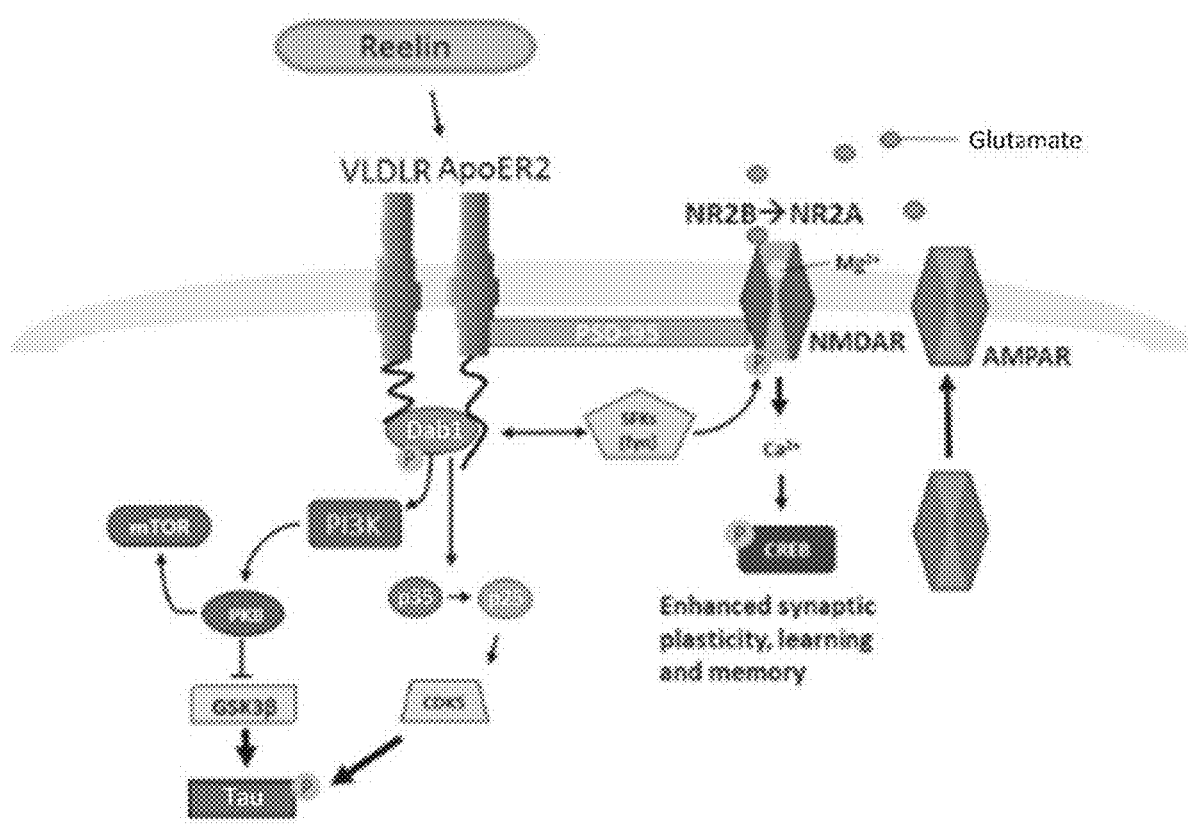
FIG. 1 is an illustration of the Reelin pathway in adult synaptic plasticity.
Figure 2:
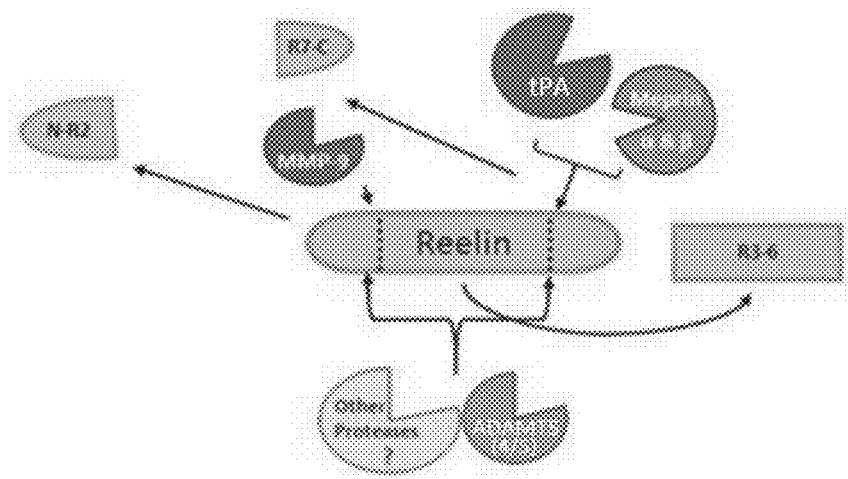
FIG. 2 is an illustration showing Reelin proteolysis in the adult brain. Full length Reelin is released into the extracellular space by GABAergic interneurons in the adult brain. This full length Reelin is enzymatically cleaved between epidermal growth factor (EGF) repeats 2-3 (R2-R3) and 6-7 (R6-R7; indicated by dotted lines; by a number of different enzymes. For example, tissue plasminogen activator (tPA), Meprin α and β have been shown to cleave Reelin between R6 and R7 (Kohno, et al., Mechanism and significance of specific proteolytic cleavage of Reelin. Biochem. Biophys. Res. Commun. 2009; 380: 93-97; Krstic, et al., Regulated proteolytic processing of Reelin through interplay of tissue plasminogen activator (tPA), ADAMTS-4, ADAMTS-5 and their modulators. PUS One. 2012; 7:e47793; Trotter, et al., Extracellular proteolysis of reelin by tissue plasminogen activator following synaptic potentiation. Neuroscience. 2014; 274: 299-307; Sato, et al., Determination of cleavage site of Reelin between its sixth and seventh repeat and contribution of meprin metalloproteases to the cleavage. J. Biochem, 2016; 159: 305-312), while matrix metalloproteinases (MMP)-9 cleaves Reelin between R2 and R3 (Krstic, et al., Regulated proteolytic processing of Reelin through interplay of tissue plasminogen activator (tPA), ADAMTS-4, ADAMTS-5 and their modulators. PUS One. 2012; 7:e47793). The ADAMTS 4 and 5 have been shown to cleave Reelin at both sites (Hisanaga, et al., A disintegrin and metalloproteinase with thrombospondin motifs 4 (ADAMTS-4) cleaves Reelin in an isoform-dependent manner. FEBS Lett. 2012; 586: 3349-3353; Krstic, et al., Regulated proteolytic processing of Reelin through interplay of tissue plasminogen activator (tPA), ADAMTS-4, ADAMTS-5 and their modulators. PLoS One. 2012; 7:e47793). Other, yet to be identified proteases, are also potentially involved in Reelin processing.

As used herein, the singular forms "a," "an" and "the" include plural referents unless the context clearly dictates otherwise. Thus, for example, reference to "a polypeptide" includes a mixture of two or more polypeptides and the like.

As used herein, "about" means approximately or nearly and in the context of a numerical value or range set forth means±15% of the numerical.

As used herein, "administration" or "administering" is used to describe the process in which compounds of the present invention, alone or in combination with other compounds, are delivered to a patient. The composition may be administered in various ways including oral, parenteral (referring to intravenous and intraarterial and other appropriate parenteral routes), intrathecally, intramuscularly, subcutaneously, colonically, rectally, and nasally, among others. Each of these conditions may be readily treated using other administration routes of compounds of the present invention to treat a disease or condition. The dosing of compounds and compositions of the present invention to obtain a therapeutic or prophylactic effect is determined by the circumstances of the patient, as known in the art. The dosing of a patient herein may be accomplished through individual or unit doses of the compounds or compositions herein or by a combined or prepackaged or pre-formulated dose of a compounds or compositions. An average 40 g mouse has a brain weighing 0.416 g, and a 160 g mouse has a brain weighing 1.02 g, a 250 g mouse has a brain weighing 1.802 g. An average human brain weighs 1508 g, which can be used to direct the amount of therapeutic needed or useful to accomplish the treatment described herein.

The pharmaceutical compositions of the subject invention can be formulated according to known methods for preparing pharmaceutically useful compositions. Furthermore, as used herein, the phrase "pharmaceutically acceptable carrier" means any of the standard pharmaceutically acceptable carriers. The pharmaceutically acceptable carrier can include diluents, adjuvants, and vehicles, as well as implant carriers, and inert, non-toxic solid or liquid fillers, diluents, or encapsulating material that does not react with the active ingredients of the invention. Examples include, but are not limited to, phosphate buffered saline, physiological saline, water, and emulsions, such as oil/water emulsions. The carrier can be a solvent or dispersing medium containing, for example, ethanol, polyol (for example, glycerol, propylene glycol, liquid polyethylene glycol, and the like), suitable mixtures thereof, and vegetable oils. Formulations are described in a number of sources that are well known and readily available to those skilled in the art. For example, *Remington's Pharmaceutical Sciences* (Martin E W [1995] Easton Pennsylvania, Mack Publishing Company, 19<sup>th</sup> ed.) describes formulations which can be used in connection with the subject invention.

As used herein "animal" means a multicellular, eukaryotic organism classified in the kingdom Animalia or Metazoa. The term includes, but is not limited to, mammals. Non-limiting examples include rodents, aquatic mammals, domestic animals such as dogs and cats, farm animals such as sheep, pigs, cows and horses, and humans. Wherein the terms "animal" or "mammal" or their plurals are used, it is contemplated that it also applies to any animals.

As used herein the phrase "conservative substitution" refers to substitution of amino acids with other amino acids having similar properties (e.g. acidic, basic, positively or negatively charged, polar or non-polar). The following Table 1 contains amino acids that are conservative substitutions for one another.

Table 1 shows the amino acids, based on functional group category, indicative of conservative substitutions. The redundant triplet code encoding each amino acid is shown for reference.

| Category | Amino acid 3 letter | Amino acid 1 letter |
|---|---|---|
| Nonpolar, aliphatic | Gly | G |
| | Ala | A |
| | Val | V |
| | Leu | L |
| | Met | M |
| | Ile | I |
| Aromatic | Phe | F |
| | Tyr | Y |
| | Trp | W |
| Negative charge | Asp | D |
| | Glu | E |
| Polar, uncharged | Ser | S |
| | Thr | T |
| | Cys | C |
| | Pro | P |
| | Asn | N |
| | Gln | Q |
| Positive charge | Lys | K |
| | His | H |
| | Arg | R |

As used herein "conservative mutation, refers to a substitution of a nucleotide for one which results in no alteration in the encoding for an amino acid, i.e. a change to a redundant sequence in the degenerate codons, or a substitution that results in a conservative substitution. An example of codon redundancy is shown in Table 2.

Table 2 shows the redundant triplet code and corresponding encoded amino acids.

| | | U | | C | | A | | G |
|---|---|---|---|---|---|---|---|---|
| U | UUU | Phe | UCU | Ser | UAU | Tyr | UGU | Cys |
| | UUC | Phe | UCC | Ser | UAC | Tyr | UGC | Cys |
| | UUA | Leu | UCA | Ser | UAA | END | UGA | END |
| | UUG | Leu | UCG | Ser | UAG | END | UGG | Trp |
| C | CUU | Leu | CCU | Pro | CAU | His | CGU | Arg |
| | CUC | Leu | CCC | Pro | CAC | His | CGC | Arg |
| | CUA | Leu | CCA | Pro | CAA | Gln | CGA | Arg |
| | CUG | Leu | CCG | Pro | CAG | Gln | CGG | Arg |
| A | AUU | Ile | ACU | Thr | AAU | Asn | AGU | Ser |
| | AUC | Ile | ACC | Thr | AAC | Asn | AGC | Ser |
| | AUA | Ile | ACA | Thr | AAA | Lys | AGA | Arg |
| | AUG | Met | ACG | The | AAG | Lys | AGG | Arg |
| G | GUU | Val | GCU | Ala | GAU | Asp | GGU | Gly |
| | GUC | Val | GCC | Ala | GAC | Asp | GGC | Gly |
| | GUA | Val | GCA | Ala | GAA | Glu | GGA | Gly |
| | GUG | Val | GCG | Ala | GAG | Glu | GGG | Gly |

Thus, conservative mutations to the codon UUA include UUG, CUU, CUC, CUA, and CUG.

Figure 3:
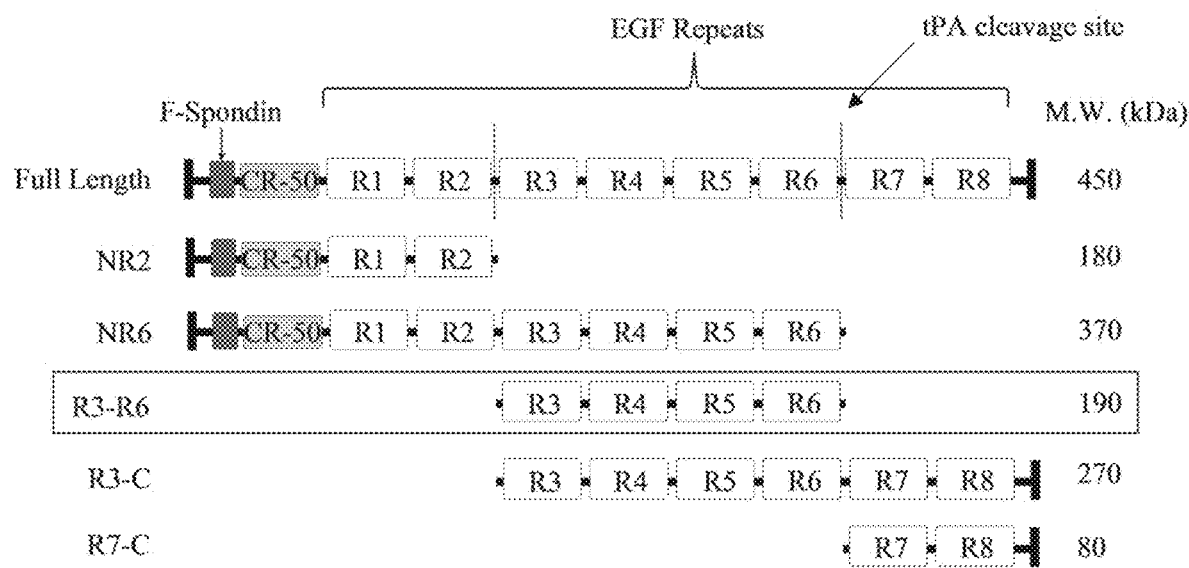
FIG. 3 is an illustration showing full length Reelin (450 kDa) and fragments of Reelin formed by cleavage by a number of enzymes which result in the production of five fragments that range from 370-80 kDa. The R3-R6 fragment [included in the full length Reelin (450 kDa), 370 kDa, 190 kDa, and 270 kDa fragments] has been shown to bind to the lipoprotein receptors, ApoER2 and VLDLR (Jossin, et al., The central fragment of Reelin, generated by proteolytic processing in vivo, is critical to its function during cortical plate development. J. Neurosci. 2004; 24: 514-521). The N-R2 fragment (180 kDa) has been shown to bind to $\alpha_3\beta_1$-integrins (Dulahon, et al., Reelin binds alpha3beta1 integrin and inhibits neuronal migration. Neuron. 2000; 27:33-44.) and neuronal migration has been shown to be disrupted in vivo by the CR-50 antibody (Nakajima, et al., Disruption of hippocampal development in vivo by CR-50 mAb against reelin. Proc. Natl. Acad. Sci. USA. 1997; 94:8196-8201). The C-terminal region (R7-C; 80 kDa) has been shown to be involved the secretion of Reelin, as well as its proper folding (de Bergeyck, et al., A truncated Reelin protein is produced but not secreted in the 'Orleans' reeler mutation (Reln[rl-Orl]). Brain Res. Mol. Brain Res. 1997; 50:85-90; Jossin, et al., The central fragment of Reelin, generated by proteolytic processing in vivo, is critical to its function during cortical plate development. J. Neurosci. 2004; 24: 514-521), and for downstream signaling efficacy (Nakano, et al., The extremely conserved C-terminal region of Reelin is not necessary for secretion but is required for efficient activation of downstream signaling. J. Biol. Chem. 2007; 282:20544-20552).
Figure 4:
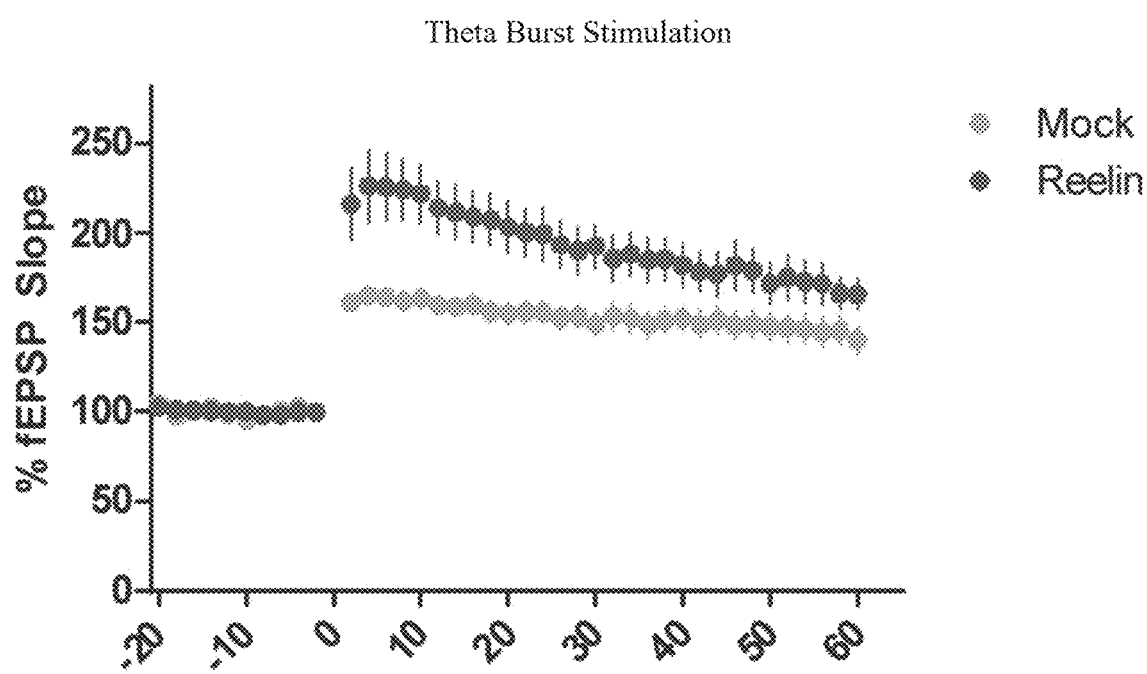
FIG. 4 is a graph showing LTP upon theta-burst stimulation.

As used herein the phrase "construct formed from fragment repeats of Reelin" refers to an artificial protein generated from fragments obtained from combining repeat regions of Reelin. As seen in the specification, full-length Reelin is comprised of regions of DNA or amino acids (for the protein) that are termed repeats, such as regions R1, R2, R3, R4, R5, R6, R7, and R8 as seen in the amino acid sequence of FIG. 3. Loop regions are located between these repeat regions, which are used in joining two repeat regions.

As used herein "loop region" means a section of a Reelin nucleic acid sequence that corresponds to an RNA loop structure, and which is disposed between two repeat regions, and joins the two repeat regions. The term "repeat region" means a section of a Reelin nucleic acid sequence that forms a fundamental recurring unit. Specific "repeat regions" are disclosed throughout the specification. In specific embodiments, the "loop region" is a structure formed by a single strand of nucleic acid having complementary regions that flank a particular single stranded nucleotide region hybridize in a way that the single stranded nucleotide region between the complementary regions is excluded from duplex formation or Watson-Crick base pairing.

As used herein the term "patient" is understood to include an animal, especially a mammal, and more especially a human that is receiving or intended to receive treatment.

The term "therapeutically effective amount" as used herein means that amount of active compound or pharmaceutical agent that elicits the biological or medicinal response in a tissue, system, animal or human that is being sought by a researcher, veterinarian, medical doctor or other clinician. In reference to a neurodegenerative disease or neurological insult, an effective amount comprises an amount sufficient to prevent further neuron degeneration or damage, to reduce symptoms of the neurodegenerative disease or neurological insult, or to improve dendrite density. In some embodiments, an effective amount is an amount sufficient to delay development of a neurodegenerative disease. In some embodiments, an effective amount is an amount sufficient to prevent or delay occurrence and/or recurrence of the neurodegenerative disease. An effective amount can be administered in one or more doses separated by 2 or more weeks dependent on need or individuals rate of reelin metabolism.

As used herein, "correcting" refers to resolution of the underlying neurodegenerative disease or damage. For example, correcting Alzheimer's disease refers to the cessation of neuron death.

As used herein, "treatment" or "treating" refers to obtaining beneficial or desired clinical results. Beneficial or desired clinical results include, but are not limited to, any one or more of: alleviation of one or more symptoms, diminishment of extent of neurodegenerative disease or damage from neurological insult, stabilization (i.e., not worsening) of the state of the neurodegenerative disease or neurological insult, preventing or delaying occurrence or recurrence of the neurodegenerative disease or neurological insult, delay or slowing of disease progression and amelioration of the disease state. The methods of the invention contemplate any one or more of these aspects of treatment.

As used herein, "neuronal insult" means neural tissue damage produced by sudden physical injury resulting from some external condition or conditions. Nonlimiting examples of such external conditions include violence or accident, a fracture, blow, or surgical procedure.

A "pharmaceutically acceptable" component is one that is suitable for use with humans and/or animals without undue adverse side effects (such as toxicity, irritation, and allergic response) commensurate with a reasonable benefit/risk ratio.

As used herein, "safe and effective amount" refers to the quantity of a component that is sufficient to yield a desired therapeutic response without undue adverse side effects (such as toxicity, irritation, or allergic response) commensurate with a reasonable benefit/risk ratio when used in the manner of this invention.

A "pharmaceutically acceptable carrier" is a carrier, such as a solvent, suspending agent or vehicle, for delivering the compound or compounds in question to the animal or human. The carrier may be liquid or solid and is selected with the planned manner of administration in mind. As used herein, "pharmaceutically acceptable carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Except insofar as any conventional media or agent is incompatible with the active ingredient, its use in the therapeutic compositions is contemplated.

The compounds of the present invention can be formulated as pharmaceutical compositions and administered to a patient, such as a human patient, in a variety of forms adapted to the chosen route of administration, e.g., orally or intraperitoneally, such as intravenously or intraarterially, or intracerebral routes.

The active compound may also be administered intracerebrally or intraperitoneally, such as intravenously or intraarterially, by infusion or injection. Solutions of the active compound or its salts can be prepared in water or other suitable solvent, optionally mixed with a non-toxic surfactant. Dispersions can also be prepared in glycerol, liquid polyethylene glycols, triacetin, and mixtures thereof and in oils. Under ordinary conditions of storage and use, these preparations contain a preservative to prevent the growth of microorganisms.

The pharmaceutical dosage forms suitable for injection or infusion can include sterile aqueous solutions or dispersions or sterile powders comprising the active ingredient which are adapted for the extemporaneous preparation of sterile injectable or infusible solutions or dispersions. In all cases, the ultimate dosage form must be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained by the maintenance of the required particle size in the case of dispersions or by the use of surfactants. In many cases, it will be preferable to include isotonic agents, for example, sugars, buffers or sodium chloride. Prolonged absorption of the injectable compositions can be brought about by the use in the compositions of agents delaying absorption, for example, aluminum monostearate and gelatin.

Sterile injectable solutions are prepared by incorporating the active compound in the required amount in the appropriate solvent with several of the other ingredients enumerated above, as required, followed by filter sterilization. In the case of sterile powders for the preparation of sterile injectable solutions, the preferred methods of preparation are vacuum drying and the freeze drying techniques, which yield a powder of the active ingredient plus any additional desired ingredient presenting the previously sterile-filtered solutions.

Useful solid carriers include finely divided solids such as talc, clay, microcrystalline cellulose, silica, alumina and the like. Useful liquid carriers include water, alcohols or glycols or water-alcohol/glycol blends, in which the present compounds can be dissolved or dispersed at effective levels, optionally with the aid of non-toxic surfactants.

Useful dosages of the compounds of the present invention can be determined by comparing their in vitro activity, and in vivo activity in animal models. Methods for the extrapolation of effective dosages in mice, and other animals, to humans are known to the art (U.S. Pat. No. 4,938,949 (Borch et al.)).

Accordingly, the invention includes a pharmaceutical composition comprising a compound of the present invention as described above, with or without a pharmaceutically acceptable carrier. Pharmaceutical compositions adapted for intraventricular, intracerebral, or parenteral administration, comprising an amount of one or more compounds effective to treat a neurodegenerative disease or neurological insult, are a preferred embodiment of the invention.

Example 1

Recombinant Reelin fragments were formed using a full-length, human sequence of Reelin (Gene ID: 5649, Nat'l Center for Biotechnology Information, U.S. Nat'l Library of Medicine, Bethesda, MD; Human Gene Nomenclature Committee, Cambridgeshire, UK, HGNC:HGNC:9957) to determine specific regions of repeats. The fragments were commercially produced and sequenced upon arrival, prior to construct construction and protein production.

Full length, human Reelin (SEQ ID No. 1)

```
CACGCGTGGGCTCGGCGGGGGCCCGCTCCCAGGCCCGCTCCCGAGCCCGTTCCGCTCCCGTCCGCCTTCTTCTC
GCCTTCTCTCCGCGTGGCTCCTCCGTCCCGGCGTCTCCAAAACTGAATGAGCGAGCGGCGCGTAGGGCGSCGGCG
GCGGCGGCGGCGGCGCGGCGGCGGCATGGAGCGCAGTGGCTGGGCCCGGCAGACTTTCCTCCTAGCGCTGTTGC
TGGGGGCGACGCTGAGGGCGCGCGCGGCGGCTGGCTATTACCCCCGCTTTTCGCCCTTCTTTTTCCTGTGCACCC
ACCACGGGGAGCTGGAAGGGGATGGGGAGCAGGGCGAGGTGCTCATTTCCCTGCATATTGCGGGCAACCCCACCT
ACTACGTTCCGGGACAAGAATACCATGTGACAATTTCAACAAGCACCTTTTTTGACGGCTTGCTGGTGACAGGAC
TATACACATCTACAAGTGTTCAGGCATCACAGAGCATTGGAGGTTCCAGTGCTTTCGGATTTGGGATCATGTCTG
ACCACCAGTTTGGTAACCAGTTTATGTGCAGTGTGGTAGCCTCTCACGTGAGTCACCTGCCCACAACCAACCTCA
GTTTCATCTGGATTGCTCCACCTGCGGGCACAGGCTGTGTGAATTTCATGGCTACAGCAACACACCGGGGCCAGG
TTATTTTCAAAGATGCTTTAGCCCAGCAGTTGTGTGAACAAGGAGCTCCAACAGATGTCACTGTGCACCCACATC
TAGCTGAAATACATAGTGACAGCATTATCCTGAGAGATGACTTTGACTCCTACCACCAACTGCAATTAAATCCAA
ATATATGGGTTGAATGTAACAACTGTGAGACTGGAGAACAGTGTGGCGCGATTATGCATGGCAATGCCGTCACCT
TCTGTGAACCATATGGCCCACGAGAACTGATTACCACAGGCCTTAATACAACAACAGCTTCTGTCCTCCAATTTT
CCATTGGGTCAGGTTCATGTCGCTTTAGTTATTCAGACCCCAGCATCATCGTGTTATATGCCAAGAATAACTCTG
CGGACTGGATTCAGCTAGAGAAAATTAGAGCCCCTTCCAATGTCAGCACAATCATCCATATCCTCTACCTTCCTG
AGGACGCCAAAGGGGAGAATGTCCAATTTCAGTGGAAGCAGGAAAATCTTCGTGTAGGTGAAGTGTATGAAGCCT
GCTGGGCCTTAGATAACATCTTGATCATCAATTCAGCTCACAGACAAGTCGTTTTAGAAGATAGTCTCGACCCAG
TGGACACAGGCAACTGGCTTTTCTTCCCAGGAGCTACAGTTAAGCATAGCTGTCAGTCAGATGGGAACTCCATTT
ATTTCCATGGAAATGAAGGCAGCGAGTTCAATTTTGCCACCACCAGGGATGTAGATCTTTCCACAGAAGATATTC
AAGAGCAATGGTCAGAAGAATTTGAGAGCCAGCCTACAGGATGGGATGTCTTGGGAGCTGTCATTGGTACAGAAT
GTGGAACGATAGAATCAGGCTTATCAATGGTCTTCCTCAAAGATGGAGAGAGGAAATTATGCACTCCATCCATGG
ACACTACCGGTTATGGGAACCTGAGGTTTTACTTTGTGATGGGAGGAATTTGTGACCCTGGAAATTCTCATGAAA
ATGACATAATCCTGTATGCAAAAATTGAAGGAAGAAAAGAGCATATAACACTGGATACCCTTTCCTATTCCTCAT
ATAAGGTTCCGTCTTTGGTTTCTGTGGTCATCAATCCTGAACTTCAGACTCCTGCTACCAAATTTTGTCTCAGGC
AAAAGAACCATCAAGGACATAATAGGAATGTCTGGGCTGTAGACTTTTTCCATGTCTTGCCTGTTCTCCCTTCTA
CAATGTCTCACATGATACAGTTTTCCATCAATCTGGGATGTGGAACGCATCAGCCTGGTAACAGTGTCAGCTTGG
AATTTTCTACCAACCATGGGCGCTCCTGGTCCCTCCTTCACACTGAATGCTTACCTGAGATCTGTGCTGGACCCC
ACCTCCCCCACAGCACTGTCTACTCCTCTGAAAACTACAGTGGGTGGAACCGAATAACAATTCCCCTTCCTAACG
CAGCACTAACCCGGAACACCAGGATTCGCTGGAGACAAACAGGACCAATCCTTGGAAACATGTGGGCAATTGATA
ATGTTTATATTGGCCCGTCATGTCTCAAATTCTGTTCTGGCAGAGGACAGTGCACTAGACATGGTTGCAAGTGTG
ACCCTGGATTTTCTGGCCCAGCTTGTGAGATGGCATCCCAGACATTCCCAATGTTTATTTCTGAAAGCTTTGGCA
GTTCCAGGCTCTCCTCTTACCATAACTTTTACTCTATCCGTGGTGCTGAAGTCAGCTTTGGTTGTGGTGTCTTGG
CCAGTGGTAAGGCCCTGGTTTTCAACAAAGAAGGGCGGCGTCAGCTAATTACATCTTTCCTTGACAGCTCACAAT
CCAGGTTTCTCCAGTTCACACTGAGACTGGGGAGCAAATCTGTTCTGAGCACGTGCAGAGCCCCTGATCAGCCTG
```

```
-continued
GTGAAGGAGTTTTGCTGCATTATTCTTATGATAATGGGATAACTTGGAAACTCCTGGAGCATTATTCATATCTCA

GCTATCATGAGCCCAGAATAATCTCCGTAGAACTACCAGGTGATGCAAAGCAGTTTGGAATTCAGTTCAGATGGT

GGCAACCGTATCATTCTTCCCAGAGAGAAGATGTATGGGCTATTGATGAGATTATCATGACATCTGTGCTTTTCA

ACAGCATTAGTCTTGACTTTACCAATCTTGTGGAGGTCACTCAGTCTCTGGGATTCTACCTTGGAAATGTTCAGC

CATACTGTGGCCACGACTGGACCCTTTGTTTTACAGGAGATTCTAAACTTGCCTCAAGTATGCGCTATGTGGAAA

CACAATCAATGCAGATAGGAGCATCCTATATGATTCAGTTCAGTTTGGTGATGGGATGTGGCCAGAAATACACCC

CACACATGGACAACCAGGTGAAGCTGGAGTACTCAACCAACCACGGCCTTACCTGGCACCTCGTCCAAGAAGAAT

GCCTTCCAAGTATGCCAAGTTGTCAGGAATTTACATCAGCAAGTATTTACCATGCCAGTGAGTTTACACAGTGGA

GGAGTCATAGTGCTTCTTCCCCAGAAAACTTGGTCCAGTGCTACCCGTTTCCGCTGGAGCCAGAGCTATTACACA

GCTCAAGACGAGTGGGCTTTGGACAGCATTTACATTGGGCAGCAGTGCCCCAACATGTGCAGTGGGCATGGCTCA

TGCGATCATGGCATATGCAGGTGTGACCAGGGGTACCAAGGCACTGAATGCCACCCAGAAGCTGCCCTTCCGTCC

ACAATTATGTCAGATTTTGAGAACCAGAATGGCTGGGAGTCTGACTGGCAAGAAGTTATTGGGGGAGAAATTGTA

AAACCAGAACAAGGGTGTGGTGTCATCTCTTCTGGATCATCTCTGTACTTCAGCAAGGCTGGGAAAAGACAGCTG

GTGAGTTGGGACCTGGATACTTCTTGGGTGGACTTTGTCCAGTTCTACATCCAGATAGGCGGAGAGAGTGCTTCA

TGCAACAAGCCTGACAGCAGAGAGGAGGGCGTCCTCCTTCAGTACAGCAACAATGGGGGCATCCAGTGGCACCTG

CTAGCAGAGATGTACTTTTCAGACTTCAGCAAACCCAGATTTGTCTATCTGGAGCTTCCAGCTGCTGCCAAGACC

CCTTGCACCAGGTTCCGCTGGTGGCAGCCCGTGTTCTCAGGGGAGGACTATGACCAGTGGGCAGTCGATGACATC

ATCATTCTGTCCGAGAAGCAGAAGCAGATCATCCCAGTTATCAATCCAACTTTACCTCAGAACTTTTATGAGAAG

CCAGCTTTTGATTACCCTATGAATCAGATGAGTGTGTGGTTGATGTTGGCTAATGAAGGAATGGTTAAAAATGAA

ACCTTCTGTGCTGCCACACCATCAGCAATGATATTTGGAAAATCAGATGGAGATCGATTTGCAGTAACTCGAGAT

TTGACCCTGAAACCTGGATATGTGCTACAGTTCAAGCTAAACATAGGTTGTGCCAATCAATTCAGCAGTACTGCT

CCAGTTCTTCTTCAGTACTCTCATGATGCTGGTATGTCCTGGTTTCTGGTGAAAGAAGGCTGTTACCCGGCTTCT

GCAGGCAAAGGATGCGAAGGAAACTCCAGAGAACTAAGTGAGCCCACCATGTATCACACAGGGGACTTTGAAGAA

TGGACAAGAATCACCATTGTTATTCCAAGGTCTCTTGCATCCAGCAAGACCAGATTCCGATGGATCCAGGAGAGC

AGCTCACAGAAAAACGTGCCTCCATTTGGTTTAGATGGAGTGTACATATCCGAGCCTTGTCCCAGTTACTGCAGT

GGCCATGGGACTGCATTTCAGGAGTGTGTTTCTGTGACCTGGGATATACTGCTGCACAAGGAACCTGTGTGTCA

AATGTCCCCAATCACAATGAGATGTTCGATAGGTTTGAGGGGAAGCTCAGCCCTCTGTGGTACAAGATAACAGGT

GCCCAGGTTGGAACTGGCTGTGGAACACTTAACGATGGCAAATCTCTCTACTTCAATGCCCTGGGAAAAGGGAA

GCCCGGACGGTCCCTCTGGACACCAGGAATATCAGACTTGTTCAATTTTATATACAAATTGGAAGCAAAACTTCA

GGCATTACCTGCATCAAACCAAGAACTAGAAATGAAGGGCTTATTGTTCAGTATTCAAATGACAATGGGATACTC

TGGCATTTGCTTCGAGAGTTGGACTTCATGTCCTTCCTGGAACCACAGATCATTTCCATTGACCTGCCACAGGAC

GCGAAGACACCTGCAACGGCATTTCGATGGTGGCAACCGCAACATGGGAAGCATTCAGCCCAGTGGGCTTTGGAT

GATGTTCTTATAGGAATGAATGACAGCTCTCAAACTGGATTTCAAGACAAATTTGATGGCTCTATAGATTTGCAA

GCCAACTGGTATCGAATCCAAGGAGGTCAAGTTGATATTGACTGTCTCTCTATGGATACTGCTCTGATATTCACT

GAAAACATAGGAAAACCTCGTTATGCTGAGACCTGGGATTTTCATGTGTCAGCATCTACCTTTTTGCAGTTTGAA

ATGAGCATGGGCTGTAGCAAG*CCCTTCAGCAACTCCCACAGTGTACAG*

*CTCCAGTATTCTCTGAACAATGGCAAGGACTGGCATCTTGTCACCGAAGA*

*GTGTGTTCCTCCAACCATTGGCTGTCTGCATTACACGGAAAGTTCAATTTA*

*CACCTCGGAAAGATTCAGAATTGGAAGCGGATCACTGTCTACCTTCCAC*

*TCTCCACCATTTCTCCCAGGACCCGGTTCAGATGGATTCAGGCCAACTAC*

*ACTGTGGGGCTGATTCCTGGGCGATTGATAATGTTGTACTGGCCTCAGG*
```

GTGCCCTTGGATGTGCTCAGGACGAGGGATTTGTGATGCTGGACGCTGT

GTGTGTGACCGGGGCTTTGGTGGACCCTATTGTGTTCCTGTTGTTCCTCT

GCCCTCGATTCTTAAAGACGATTTCAATGGGAATTTACATCCTGCCTTTG

GCCTGAAGTGTATGGTGCAGAGAGGGGAATCTGAATGGTGAAACCATC

AAATCTGGAACATCTCTAATTTTTAAAGGGGAAGGACTAAGGATGCTTAT

TTCAAGAGATCTAGATTGTACAAATACAATGTATGTCCAGTTTTCACTTAG

ATTTATAGCAAAAAGTACCCCAGAGAGATCTCACTCTATTCTGTTACAATT

CTCCATCAGTGGAGGAATCACTTGGCACCTGATGGATGAATTTTACTTTC

CTCAAACAACG

AATATACTTTTCATCAA

TGTTCCCTTGCCATACACTGCCCAAACCAATGCTACAAGATTCAGACTCTGGCAACCTTATAATAACGGTAAGAA

AGAAGAAATCTGGATTGTTGATGACTTCATTATCGATGGAAATAATGTAAACAACCCTGTGATGCTCTTGGATAC

ATTTGATTTTGGGCCCAGAGAAGACAATTGGTTTTTCTATCCTGGTGGTAACATCGGTCTTTATTGTCCATATTC

TTCAAAGGGGGCACCTGAAGAAGATTCAGCTATGGTGTTTGTTTCAAATGAAGTTGGTGAGCATTCCATTACCAC

CCGTGACCTAAATGTGAATGAGAACACCATCATACAATTTGAGATCAACGTTGGCTGTTCGACT<u>GATAGCTCATC</u>

<u>CGCGGATCCAGTGAGACTGGAATTTTCAAGGGACTTCGGGGCGACCTGGCACCTTCTGCTGCCCCTCTGCTACCA</u>

<u>CAGCAGCAGCCACGTCAGCTCTTTATGCTCCACCGAGCACCACCCCAGCAGCACCTACTACGCAGGAACCATGCA</u>

<u>GGGCTGGAGGAGGGAGGTCGTGCACTTTGGGAAGCTGCACCTTTGTGGATCTGTCCGTTTCAGATGGTACCAGGG</u>

<u>ATTTTACCCTGCCGGCTCTCAGCCAGTGACATGGGCCATTGATAATGTCTACATCGGTCCCCAGTGTGAGGAGAT</u>

<u>GTGTAATGGACAGGGGAGCTGTATCAATGGAACCAAATGTATATGTGACCCTGGCTACTCAGGTCCAACCTGTAA</u>

<u>AATAAGCACCAAAAATCCTGATTTTCTCAAAGATGATTTCGAAGGTCAGCTAGAATCTGATAGATTCTTATTAAT</u>

<u>GAGTGGTGGGAAACCATCTCGAAAGTGTGGAATCCTTTCTAGTGGAAACAACCTCTTTTTCAATGAAGATGGCTT</u>

<u>GCGCATGTTGATGACACGAGACCTGGATTTATCACATGCTAGATTTGTGCAGTTCTTCATGAGACTGGGATGTGG</u>

<u>TAAAGGCGTTCCTGACCCCAGGAGTCAACCCGTGCTCCTACAGTATTCTCTCAACCGGTGGCCTCTCGTGGAGTC</u>

TTCTTCAGGAGTTCCTTTTCAGCAATTCCAGC

<u>AATGTGGGCAGGTACATTGCCCTGGAGATACCCTTGAAAGCCCGTTCT</u>

<u>GGTTCTACTCGCCTTCGCTGGTGGCAACCGTCTGAGAATGGGCACTTCTA</u>

<u>CAGCCCCTGGGTTATCGATCAGATTCTTATTGGAGGAAATATTTCTGGTA</u>

<u>ATACGGTCTTGGAAGATGATTTCACAACCCTTGATAGTAGGAAATGGCTG</u>

<u>CTTCACCCAGGAGGCACCAAGATGCCCGTGTGTGGCTCTACTGGTGATGC</u>

<u>CCTGGTCTTCATTGAAAAGGCCAGCACCCGTTACGTGGTCAGCACAGACG</u>

<u>TTGCCGTGAATGAGGATTCCTTCCTACAGATAGACTTCGCTGCCTCCTGC</u>

<u>TCA</u><u> GTCACAGACTCTTGTTATGCGATTGAATTGGAATACTCAGTAGATC</u>

<u>TTGGATTGTCATGGCACCCATTGGTAAGGGACTGTCTGCCTACCAATGTGGAATGCAGTCGCTATCATCTGCAAC</u>

<u>GGATCCTGGTGTCAGACACTTTCAACAAGTGGACTAGAATACACTCTGCCTCTCCCTCCTTATACCAGGTCCCAAG</u>

<u>CCACTCGTTTCCGTTGGCATCAACCAGCTCCTTTTGACAAGCAGCAGACATGGGCAATAGATAATGTCTATATCG</u>

<u>GGGATGGCTGCATAGACATGTGCAGTGGCCATGGGAGATGCATCCAGGGAAACTGCGTCTGTGATGAACAGTGGG</u>

<u>GTGGCCTGTACTGTGATGACCCCGAGACCTCTCTTCCAACCCAACTCAAAGACAACTTCAATCGAGCTCCATCCA</u>

<u>GTCAGAACTGGCTGACTGTGAACGAGGGAAATTGAGTACAGTGTGGAGCCGTGGCGTCGGGAATGGCTCTCC</u>

<u>ATTTCAGTGGGGGTTGTAGTCGATTATTAGTCACTGTGGATCTAAACCTCACTAATGCTGAGTTCATCCAATTTT</u>

-continued

<u>*ACTTCATGTATGGGTGCCTGATTACACCAAACAACCGTAACCAAGGTGTTCTCTTGGAATATTCTGTCAATGGAG*</u>

<u>*GCATTACCTGGAACCTGCTCATGGAGATTTTCTATGACCAGTACAGT*</u>AAGCCCGGATTTGTGAATATCCTTCTCC

CTCCTGATGCTAAAGAGATTGCCACTCGCTTCCGCTGGTGGCAGCCAAGACATGACGGCCTGGATCAGAACGACT

GGGCCATTGACAATGTCCTCATCTCAGGCTCTGCTGACCAAAGGACCGTTATGCTGGACACCTTCAGCAGCGCCC

CAGTACCCCAGCACGAGCGCTCCCCTGCAGATGCCGGCCCTGTCGGGAGGATCGCCTTTGACATGTTTATGGAAG

ACAAAACTTCAGTGAATGAGCACTGGCTATTCCATGATGATTGTACAGTAGAAAGATTCTGTGACTCCCCTGATG

GTGTGATGCTCTGTGGCAGTCATGATGGACGGGAGGTGTATGCAGTGACCCATGACCTGACTCCCACTGAAGGCT

GGATTATGCAATTCAAGATCTCAGTTGGATGTAAGGTGTCTGAAAAAATTGCCCAGAATCAAATTCATGTGCAGT

ATTCTACTGACTTCGGTGTGAGTTGGAATTATCTGGTCCCTCAGTGCTTGCCTGCTGACCCAAAATGCTCTGGAA

GTGTTTCTCAGCCATCTGTATTCTTTCCAACTAAAGGGTGGAAAAGGATCACCTACCCACTTCCTGAAAGCTTAG

TGGGAAATCCGGTAAGGTTTAGGTTCTATCAGAAGTACTCAGACATGCAGTGGGCAATCGATAATTTCTACCTGG

GCCCTGGATGCTTGGACAACTGCAGGGGCCATGGAGATTGCTTAAGGGAACAGTGCATCTGTGATCCGGGATACT

CAGGGCCAAACTGCTACTTGACCCACACTCTGAAGACTTTCCTGAAGGAACGCTTTGACAGTGAAGAAATCAAAC

CTGACTTATGGATGTCCTTAGAAGGTGGAAGTACTTGCACTGAGTGTGGAATTCTTGCCGAGGACACTGCACTCT

ATTTTGGGGGATCCACTGTGAGACAAGCGGTTACACAAGATTTGGATCTTCGAGGTGCAAAGTTCCTGCAATACT

GGGGGCGCATCGGTAGTGAGAACAACATGACCTCTTGCCATCGTCCCATCTGCCGGAAGGAAGGCGTGCTGTTGG

ACTACTCTACCGATGGAGGAATTACCTGGACTTTGCTCCATGAGATGGATTACCAGAAATACATTTCTGTTAGAC

ACGACTACATACTTCTTCCTGAAGATGCCCTCACCAACACAACTCGACTTCGCTGGTGGCAGCCTTTTGTGATCA

GCAATGGAATTGTGGTCTCTGGGGTGGAGCGTGCTCAGTGGGCACTGGACAACATTTTGATTGGTGGAGCAGAAA

TCAATCCCAGCCAATTGGTGGACACTTTTGATGATGAAGGCACTTCCCATGAAGAAAACTGGAGTTTTTACCCTA

ATGCTGTAAGGACAGCAGGATTTTGTGGCAATCCATCCTTTCACCTCTATTGGCCAAATAAAAAGAAGGACAAGA

CTCACAATGCTCTCTCCTCCCGAGAACTCATTATACAGCCAGGATACATGATGCAGTTTAAAATTGTGGTGGGTT

GTGAAGCCACTTCTTGTGGTGACCTTCATTCCGTAATGCTGGAATACACTAAGGATGCAAGATCGGATTCCTGGC

AGCTCGTACAGACCCAGTGCCTTCCTTCCTCTTCTAACAGCATTGGCTGCTCCCCTTTCCAGTTCCATGAAGCCA

CCATCTACAACTCTGTCAACAGCTCAAGCTGGAAAAGAATCACCATCCAGCTGCCTGACCATGTCTCCTCTAGTG

CAACACAGTTCCGCTGGATCCAGAAGGGAGAAGAAACTGAGAAGCAAAGCTGGGCAATTGACCACGTGTACATTG

GAGAGGCTTGCCCCAAGCTCTGCAGCGGGCACGGATACTGCACGACCGGTGCCATCTGCATCTGCGACGAGAGCT

TCCAAGGTGATGACTGCTCTGTTTTCAGTCACGACCTTCCCAGTTATATTAAAGATAATTTTGAGTCCGCAAGAG

TCACCGAGGCAAACTGGGAGACCATTCAAGGTGGAGTCATAGGAAGTGGCTGTGGGCAGCTGGCCCCCTACGCCC

ATGGAGACTCACTGTACTTTAATGGCTGTCAGATCAGGCAAGCAGCTACCAAGCCTCTGGATCTCACTCGAGCAA

GCAAAATCATGTTTGTTTTGCAAATTGGGAGCATGTCGCAGACGGACAGCTGCAACAGTGACCTGAGTGGCCCCC

ACGCTGTGGACAAGGCGGTGCTGCTGCAATACAGCGTCAACAACGGGATCACCTGGCATGTCATCGCCCAGCACC

AGCCAAAGGACTTCACACAAGCTCAGAGAGTGTCTTACAATGTCCCCCTGGAGGCACGGATGAAAGGAGTCTTAC

TGCGCTGGTGGCAACCACGCCACAATGGAACAGGTCATGATCAATGGGCTTTGGACCATGTGGAGGTCGTCCTAG

TAAGCACTCGCAAACAAAATTACATGATGAATTTTTCACGACAACATGGGCTCAGACATTTCTACAACAGAAGAC

GAAGGTCACTTAGGCGATACCCATGAAGAATCAAAAAGTTTATTTTTTTCTTCCAACATGTGATGTGTTGCTCT

CCATTCTTTTAAATCTCGCACTACATCTGATATCAGGAAATATCTGTGAAGGACTTGGTGATTACCTGAAAGCCC

TTCTCAAGACCGAGTGTACACCACTTTCCCACACTGTGAACTAATGACAAGTGACTTATTTGCTCATAAGTAAAT

GTCTTCATGTTGATGTGTCCGTGAAAGTTGTGATCTGTTGTAATATCAGTTACAGTGGCAGTATTGACAATAAGA

AACAGTTTAACAGAAAAATGAAATTTAAGCACAAAAAATTTAAGAGATTTTATGTTTAAAATGGCATTTAGCACA

GTATTTAACATTCTTGGTTCACAAAGCTATTTAAGTGGACTGTATTTCAGCTATGTCTCATGTTTTATATGATTA

-continued

```
AATTATCATTGTTTGTCCTTTATGTATTCTCTTCTACAATACAACACATTGAAACTGTATTTACTTGTTATGTTG

TAATATTTTGCTGCTGAATTTGGGGCTACTTATATTCTGCAGAAAATTAATTGAAATACCTATTCAAGAAGATAG

TTGTAAAGATATTGTATCTCCTTTAATATACTCCTTAAAAATGTATGTTGGTTTAGCGTTGTTTTGTGGATAAGA

AAAATGCTTGACCCTGAAATATTTTCTACTTTAAATTGTGGATGAAGACCCTATCTCCCACAAATAAGTTCCCAT

TTCCTTGTCTAAAGATCTTTTTTTAAGTGTTCTGTGGCTGATTTACTAACAGTAACTGCCATTTTTTGTCTGTGA

TAACAGAGTGATTTGTAAAACAGTGGTTGTTTTTTCATTGTGTTTTCTTCGTGGATTGTTTTTTCTGCGGGTCAT

ATTCATACCTTCTGATGAAGTTGTACAACACCAGCAACATTATAATGGCCCTGTAGCTCTGAATGCTATTTGTGT

AACTGAAAGGTTGCACTCTAGGGTGAACCAAGCTATAAAAGCCCATGCTTAAATAAAAATTATGTCCAAAAGCC
```

*Bold sequence is Repeat 3; Bold underline sequence is Loop 3-4; Bold, italics sequence is Repeat 4; Italics sequence is Loop 4-5; Underline sequence is Repeat 5; Bold, underline, italics sequence is Loop 5-6; Italics underline sequence is Repeat 6.

A sequence map, including the Reelin repeat regions and some enzyme cleavage sites, is shown in FIG. 5.

HEK293 cells were stably transfected with the full-length Reelin gene in a pCrl vector to produce fragments for formation of recombinant Reelin. Full length Reelin was inserted into the HEK293 cells, as previously described (Weeber, et al., Reelin and ApoE receptors cooperate to enhance hippocampal synaptic plasticity and learning. J. Biol. Chem. 2002; 277:39944-39952; Sinagra, et al., Reelin, very-low-density lipoprotein receptor, and apolipoprotein E receptor 2 control somatic NMDA receptor composition during hippocampal maturation in vitro. J. Neurosci. 2005; 25:6127-6136). Once confluent, the cells were grown in low-glucose Dulbecco's modified Eagle's medium with 0.2% bovine serum albumin for 2 days, followed by media collection, sterile filtration, and concentration by Centricon Plus-80 centrifugal filter units (Millipore). Reelin was cleaved extracellularly at two sites, resulting in the generation of three major fragments: the N-terminus to repeat 2 (roughly 180 kDa), the central fragment from repeat 3-6 (roughly 190 kDa), and the C-terminal fragment consisting of repeats 7 and 8 (roughly 80 kDa) (Nakajima, et al., Disruption of hippocampal development in vivo by CR-50 mAb against reelin. Proc. Natl. Acad. Sci. USA. 1997; 94: 8196-820; de Rouvroit, et al., (1999) Reelin, the extracellular matrix protein deficient in reeler mutant mice, is processed by a metalloproteinase. Exp. Neurol. 1999; 156: 214-217; Utsunomiya-Tate, et al., Reelin molecules assemble together to form a large protein complex, which is inhibited by the function-blocking CR-50 antibody. Proc. Natl. Acad. Sci. USA. 2000; 97: 9729-9734; Jossin, et al., The central fragment of Reelin, generated by proteolytic processing in vivo, is critical to its function during cortical plate development. J. Neurosci. 2004; 24:514-521; Jossin, et al., Processing of Reelin by embryonic neurons is important for function in tissue but not in dissociated cultured neurons. J. Neurosci. 2007; 27:4243-4252; Koie, et al., Cleavage within Reelin repeat 3 regulates the duration and range of the signaling activity of Reelin protein. J. Biol. Chem. 2014; 289:12922-12930; Krstic, et al., Regulated proteolytic processing of Reelin through interplay of tissue plasminogen activator (tPA), ADAMTS-4, ADAMTS-5, and their modulators. PLoS One. 2012; 7:e47793; Trotter, et al., Extracellular proteolysis of reelin by tissue plasminogen activator following synaptic potentiation. Neuroscience. 2014; 274: 299-307). Additionally, two intermediate fragments are produced: one consisting of the N-terminus to repeat 6 (roughly 370 kDa), and one consisting of repeats 6-8 (roughly 270 kDa) (Jossin, et al., The central fragment of Reelin, generated by proteolytic processing in vivo, is critical to its function during cortical plate development. J. Neurosci. 2004; 24:514-521).

Cleavage of the full length Reelin was performed, as discussed above, to form sticky ends. For recombinant Reelin, two or more Reelin fragments were produced by ligating DNA sequencing representing specific reelin repeats. The resultant Reelin repeat regions were also sequenced to confirm the coding regions were maintained and reading frame was in the correct orientation. Reelin recombinant proteins were produced using standard techniques and amplified in bluescript holding vectors. Recombinant DNA was cloned into an expression vector and expressed in HEK293 cell culture.

Reelin Repeat 3 (SEQ ID No. 2)

```
TTCAGCAGTACTGCTCCAGTTCTTCTTCAGTACTCTCATGATGCTGGTAT

GTCCTGGTTTCTGGTGAAAGAAGGCTGTTACCCGGCTTCTGCAGGCAAAG

GATGCGAAGGAAACTCCAGAGAACTAAGTGAGCCCACCATGTATCACACA

GGGGACTTTGAAGAATGGACAAGAATCACCATTGTTATTCCAAGGTCTCT

TGCATCCAGCAAGACCAGATTCCGATGGATCCAGGAGAGCAGCTCACAGA

AAAACGTGCCTCCATTTGGTTTAGATGGAGTGTACATATCCGAGCCTTGT

CCCAGTTACTGCAGTGGCCATGGGGACTGCATTTCAGGAGTGTGTTTCTG

TGACCTGGGATATACTGCTGCACAAGGAACCTGTGTGTCAAATGTCCCCA

ATCACAATGAGATGTTCGATAGGTTTGAGGGGAAGCTCAGCCCTCTGTGG

TACAAGATAACAGGTGCCCAGGTTGGAACTGGCTGTGGAACACTTAACGA

TGGCAAATCTCTCTACTTCAATGGCCCTGGGAAAAGGGAAGCCCGGACGG

TCCCTCTGGACACCAGGAATATCAGACTTGTTCAATTTTATATACAAATT

GGAAGCAAAACTTCAGGCATTACCTGCATCAAACCAAGAACTAGAAATGA

AGGGCTTATTGTTCAGTATTCAAATGACAATGGGATACTCTGGCATTTGC

TTCGAGAGTTGGACTTCATGTCCTTCCTG
```

Reelin Repeat 4 (SEQ ID No. 3)

CCCTTCAGCAACTCCCACAGTGTACAGCTCCAGTATTCTCTGAACAATGG
CAAGGACTGGCATCTTGTCACCGAAGAGTGTGTTCCTCCAACCATTGGCT
GTCTGCATTACACGGAAAGTTCAATTTACACCTCGGAAAGATTCCAGAAT
TGGAAGCGGATCACTGTCTACCTTCCACTCTCCACCATTTCTCCCAGGAC
CCGGTTCAGATGGATTCAGGCCAACTACACTGTGGGGGCTGATTCCTGGG
CGATTGATAATGTTGTACTGGCCTCAGGGTGCCCTTGGATGTGCTCAGGA
CGAGGGATTTGTGATGCTGGACGCTGTGTGTGTGACCGGGGCTTTGGTGG
ACCCTATTGTGTTCCTGTTGTTCCTCTGCCCTCGATTCTTAAAGACGATT
TCAATGGGAATTTACATCCTGACCTTTGGCCTGAAGTGTATGGTGCAGAG
AGGGGGAATCTGAATGGTGAAACCATCAAATCTGGAACATCTCTAATTTT
TAAAGGGGAAGGACTAAGGATGCTTATTTCAAGAGATCTAGATTGTACAA
ATACAATGTATGTCCAGTTTTCACTTAGATTTATAGCAAAAAGTACCCCA
GAGAGATCTCACTCTATTCTGTTACAATTCTCCATCAGTGGAGGAATCAC
TTGGCACCTGATGGATGAATTTTACTTTCCTCAAACAACG

Reelin Repeat 5 (SEQ ID No. 4)

GATAGCTCATCCGCGGATCCAGTGAGACTGGAATTTTCAAGGGACTTCGG
GGCGACCTGGCACCTTCTGCTGCCCCTCTGCTACCACAGCAGCAGCCACG
TCAGCTCTTTATGCTCCACCGAGCACCACCCCAGCAGCACCTACTACGCA
GGAACCATGCAGGGCTGGAGGAGGGAGGTCGTGCACTTTGGGAAGCTGCA
CCTTTGTGGATCTGTCCGTTTCAGATGGTACCAGGGATTTTACCCTGCCG
GCTCTCAGCCAGTGACATGGGCCATTGATAATGTCTACATCGGTCCCCAG
TGTGAGGAGATGTGTAATGGACAGGGGAGCTGTATCAATGGAACCAAATG
TATATGTGACCCTGGCTACTCAGGTCCAACCTGTAAAATAAGCACCAAAA
ATCCTGATTTTCTCAAAGATGATTTCGAAGGTCAGCTAGAATCTGATAGA
TTCTTATTAATGAGTGGTGGGAAACCATCTCGAAAGTGTGGAATCCTTTC
TAGTGGAAACAACCTCTTTTTCAATGAAGATGGCTTGCGCATGTTGATGA
CACGAGACCTGGATTTATCACATGCTAGATTTGTGCAGTTCTTCATGAGA
CTGGGATGTGGTAAAGGCGTTCCTGACCCCAGGAGTCAACCCGTGCTCCT
ACAGTATTCTCAACGGTGGCCTCTCGTGGAGTCTTCTTCAGGAGTTCC
TTTTCAGCAATTCCAGC

Reelin Repeat 6 (SEQ ID No. 5)

GTCACAGACTCTTGTTATGCGATTGAATTGGAATACTCAGTAGATCTTGG
ATTGTCATGGCACCCATTGGTAAGGGACTGTCTGCCTACCAATGTGGAAT
GCAGTCGCTATCATCTGCAACGGATCCTGGTGTCAGACACTTTCAACAAG
TGGACTAGAATCACTCTGCCTCTCCCTCCTTATACCAGGTCCCAAGCCAC
TCGTTTCCGTTGGCATCAACCAGCTCCTTTTGACAAGCAGCAGACATGGG
CAATAGATAATGTCTATATCGGGGATGGCTGCATAGACATGTGCAGTGGC
CATGGGAGATGCATCCAGGGAAACTGCGTCTGTGATGAACAGTGGGGTGG

CCTGTACTGTGATGACCCCGAGACCTCTCTTCCAACCCAACTCAAAGACA
ACTTCAATCGAGCTCCATCCAGTCAGAACTGGCTGACTGTGAACGGAGGG
AAATTGAGTACAGTGTGTGGAGCCGTGGCGTCGGGAATGGCTCTCCATTT
CAGTGGGGGTTGTAGTCGATTATTAGTCACTGTGGATCTAAACCTCACTA
ATGCTGAGTTCATCCAATTTTACTTCATGTATGGGTGCCTGATTACACCA
AACAACCGTAACCAAGGTGTTCTCTTGGAATATTCTGTCAATGGAGGCAT
TACCTGGAACCTGCTCATGGAGATTTTCTATGACCAGTACAGT

Reelin Repeat Loop Region 3-4 (SEQ ID No. 6)

GAACCACAGATCATTTCCATTGACCTGCCACAGGACGCGAAGACACCTGC
AACGGCATTTCGATGGTGGCAACCGCAACATGGGAAGCATTCAGCCCAGT
GGGCTTTGGATGATGTTCTTATAGGAATGAATGACAGCTCTCAAACTGGA
TTTCAAGACAAATTTGATGGCTCTATAGATTTGCAAGCCAACTGGTATCG
AATCCAAGGAGGTCAAGTTGATATTGACTGTCTCTCTATGGATACTGCTC
TGATATTCACTGAAAACATAGGAAAACCTCGTTATGCTGAGACCTGGGAT
TTTCATGTGTCAGCATCTACCTTTTTGCAGTTTGAAATGAGCATGGGCTG
TAGCAAG

Reelin Repeat Loop Region 4-5 (SEQ ID No. 7)

AATATACTTTTCATCAATGTTCCCTTGCCATACACTGCCCAAACCAATGC
TACAAGATTCAGACTCTGGCAACCTTATAATAACGGTAAGAAAGAAGAAA
TCTGGATTGTTGATGACTTCATTATCGATGGAAATAATGTAAACAACCCT
GTGATGCTCTTGGATACATTTGATTTTGGGCCCAGAGAAGACAATTGGTT
TTTCTATCCTGGTGGTAACATCGGTCTTTATTGTCCATATTCTTCAAAGG
GGGCACCTGAAGAAGATTCAGCTATGGTGTTTGTTTCAAATGAAGTTGGT
GAGCATTCCATTACCACCCGTGACCTAAATGTGAATGAGAACACCATCAT
ACAATTTGAGATCAACGTTGGCTGTTCGACT

Reelin Repeat Loop Region 5-6 (SEQ ID No. 8)

AATGTGGGCAGGTACATTGCCCTGGAGATACCCTTGAAAGCCCGTTCTGG
TTCTACTCGCCTTCGCTGGTGGCAACCGTCTGAGAATGGGCACTTCTACA
GCCCCTGGGTTATCGATCAGATTCTTATTGGAGGAAATATTTCTGGTAAT
ACGGTCTTGGAAGATGATTTCACAACCCTTGATAGTAGGAAATGGCTGCT
TCACCCAGGAGGCACCAAGATGCCCGTGTGTGGCTCTACTGGTGATGCCC
TGGTCTTCATTGAAAAGGCCAGCACCCGTTACGTGGTCAGCACAGACGTT
GCCGTGAATGAGGATTCCTTCCTACAGATAGACTTCGCTGCCTCCTGCTC
A

Recombinant, human Reelin gene construct, R3 fragment conjugated to the R6 fragment, i.e. Reelin fragment R3+R6 (SEQ ID No. 9)

AAGCTTCCACCATGGAGCGCAGTGGCTGGGCCCGGCAGACTTTCCT

CCTAGCGCTGTTGCTGGGGGCGACGCTGAGGGCGCGCGCGTTCAG

CAGTACTGCTCCAGTTCTTCTTCAGTACTCTCATGATGCTGGTATGT

CCTGGTTTCTGGTGAAAGAAGGCTGTTACCCGGCTTCTGCAGGCAA

AGGATGCGAAGGAAACTCCAGAGAACTAAGTGAGCCCACCATGTAT

CACACAGGGGACTTTGAAGAATGGACAAGAATCACCATTGTTATTC

CAAGGTCTCTTGCATCCAGCAAGACCAGATTCCGATGGATCCAGGA

GAGCAGCTCACAGAAAAACGTGCCTCCATTTGGTTTAGATGGAGTG

TACATATCCGAGCCTTGTCCCAGTTACTGCAGTGGCCATGGGGACT

GCATTTCAGGAGTGTGTTTCTGTGACCTGGGATATACTGCTGCACA

AGGAACCTGTGTGTCAAATGTCCCCAATCACAATGAGATGTTCGAT

AGGTTTGAGGGGAAGCTCAGCCCTCTGTGGTACAAGATAACAGGTG

CCCAGGTTGGAACTGGCTGTGGAACACTTAACGATGGCAAATCTCT

CTACTTCAATGGCCCTGGGAAAAGGGAAGCCCGGACGGTCCCTCTG

GACACCAGGAATATCAGACTTGTTCAATTTTATATACAAATTGGAAG

CAAAACTTCAGGCATTACCTGCATCAAACCAAGAACTAGAAATGAA

GGGCTTATTGTTCAGTATTCAAATGACAATGGGATACTCTGGCATTT

GCTTCGAGAGTTGGACTTCATGTCCTTCCTGGAACCACAGATCATT

TCCATTGACCTGCCACAGGACGCGAAGACACCTGCAACGGCATTTC

GATGGTGGCAACCGCAACATGGGAAGCATTCAGCCCAGTGGGCTTT

GGATGATGTTCTTATAGGAATGAATGACAGCTCTCAAACTGGATTT

CAAGACAAATTTGATGGCTCTATA*ACCCTTGATAGTAGGAAATGGCTG*

*CTTCACCCAGGAGGCACCAAGATGCCCGTGTGTGGCTCTACTGGTGATGC*

*CCTGGTCTTCATTGAAAAGGCCAGCACCCGTTACGTGGTCAGCACAGACG*

*TTGCCGTGAATGAGGATTCCTTCCTACAGATAGACTTCGCTGCCTCCTGC*

*TCA*GTCACAGACTCTTGTTATGCGATTGAATTGGAATACTCAGTAGATC

TTGGATTGTCATGGCACCCATTGGTAAGGGACTGTCTGCCTACCAATGT

GGAATGCAGTCGCTATCATCTGCAACGGATCCTGGTGTCAGACACTTTC

AACAAGTGGACTAGAATCACTCTGCCTCTCCCTCCTTATACCAGGTCCC

AAGCCACTCGTTTCCGTTGGCATCAACCAGCTCCTTTTGACAAGCAGCA

GACATGGGCAATAGATAATGTCTATATCGGGGATGGCTGCATAGACATG

TGCAGTGGCCATGGGAGATGCATCCAGGGAAACTGCGTCTGTGATGAAC

AGTGGGGTGGCCTGTACTGTGATGACCCCGAGACCTCTCTTCCAACCCA

ACTCAAAGACAACTTCAATCGAGCTCCATCCAGTCAGAACTGGCTGACT

GTGAACGGAGGGAAATTGAGTACAGTGTGTGGAGCCGTGGCGTCGGGAA

TGGCTCTCCATTTCAGTGGGGGTTGTAGTCGATTATTAGTCACTGTGGA

TCTAAACCTCACTAATGCTGAGTTCATCCAATTTTACTTCATGTATGGG

*TGCCTGATTACACCAAACAACCGTAACCAAGGTGTTCTCTTGGAATATT*

*CTGTCAATGGAGGCATTACCTGGAACCTGCTCATGGAGATTTTCTATGA*

*CCAGTACAGTGATTACAAGGATGACGACGATAAGTGACTCGAG*

*Shaded, bold, underline sequence is signal peptide;
Bold sequence is Repeat 3;
Bold underline sequence is Loop 3-4;
Italics sequence is Loop 4-5;
Bold, underline, italics sequence is Loop 5-6;
Italics underline sequence is Repeat 6. Coding regions colored above in DNA sequence, plain white regions (without font modifications such as underlining, italicizing) not translated in protein.

Recombinant, human Reelin protein, R3 fragment conjugated to the 6 fragment, i.e. Reelin protein fragment R3+R6 (SEQ ID No. 10)

MERSGWWARQTFLLALLLGATLRARAFSSTAPVLLQYSHDAGMSWFLVKE

GVYPASAGKGCEGNSRELSEPTMYHTGDFEEWTRITIVIPRSLASSKTRF

RWIQESSSQKNVPPFGLDGVYISEPCPSYCSGHGDCISGVCFCDLGYTAA

QGTCVSNVPNHNEMFDRFEGKLSPLWYKITGAQVGTGCGTLNDGKSLYFN

GPGKREARTVPLDTRNIRLVQFYIQIGSKTSGITCIKPRTRNEGLIVQYS

NDNGILWHLLRELDFMSFLEPQIISIDLPQDAKTPATAFRWWQPQHGKHS

AQWALDDVLIGMNDSSQTGFQDKFDGSITLDSRKWLLHPGGTKMPVCGST

GDALVFIEKASTRYVVSTDVAVNEDSFLQIDFAASCSVTDSCYAIELEYS

VDLGLSWHPLVRDCLPTNVECSRYHLQRILVSDTFNKWTRITLPLPPYTR

SQATRFRWHQPAPFDKQQTWAIDNVYIGDGCIDMCSGHGRCIQGNCVCDE

QWGGLYCDDPETSLPTQLKDNFNRAPSSQNWLTVNGGKLSTVCGAVASGM

ALHFSGGCSRLLVTVDLNLTNAEFIQFYFMYGCLITPNNRNQGVLLEYSV

NGGITWNLLMEIFYDQYS

*Coding regions colored above in DNA sequence, plain white regions (without font modifications such as underlining, italicizing) not translated in protein.

Recombinant, human Reelin gene construct, R3 fragment conjugated to the R5 fragment, i.e. Reelin fragment R3+R5 (SEQ ID No. 11)

AAGCTTCCACCATGGAGCGCAGTGGCTGGGCCCGGCAGACTTTCCT

CCTAGCGCTGTTGCTGGGGGCGACGCTGAGGGCGCGCGCGTTCAG

CAGTACTGCTCCAGTTCTTCTTCAGTACTCTCATGATGCTGGTATGT

CCTGGTTTCTGGTGAAAGAAGGCTGTTACCCGGCTTCTGCAGGCAA

AGGATGCGAAGGAAACTCCAGAGAACTAAGTGAGCCCACCATGTAT

CACACAGGGGACTTTGAAGAATGGACAAGAATCACCATTGTTATTC

CAAGGTCTCTTGCATCCAGCAAGACCAGATTCCGATGGATCCAGGA

GAGCAGCTCACAGAAAAACGTGCCTCCATTTGGTTTAGATGGAGTG

TACATATCCGAGCCTTGTCCCAGTTACTGCAGTGGCCATGGGGACT

GCATTTCAGGAGTGTGTTTCTGTGACCTGGGATATACTGCTGCACA

-continued

```
AGGAACCTGTGTGTCAAATGTCCCCAATCACAATGAGATGTTCGAT

AGGTTTGAGGGGAAGCTCAGCCCTCTGTGGTACAAGATAACAGGTG

CCCAGGTTGGAACTGGCTGTGGAACACTTAACGATGGCAAATCTCT

CTACTTCAATGGCCCTGGGAAAAGGGAAGCCCGGACGGTCCCTCTG

GACACCAGGAATATCAGACTTGTTCAATTTTATATACAAATTGGAAG

CAAAACTTCAGGCATTACCTGCATCAAACCAAGAACTAGAAATGAA

GGGCTTATTGTTCAGTATTCAAATGACAATGGGATACTCTGGCATTT

GCTTCGAGAGTTGGACTTCATGTCCTTCCTGGAACCACAGATCATT

TCCATTGACCTGCCACAGGACGCGAAGACACCTGCAACGGCATTTC

GATGGTGGCAACCGCAACATGGGAAGCATTCAGCCCAGTGGGCTTT

GGATGATGTTCTTATAGGAATGAATGACAGCTCTCAAACTGGATTT

CAAGACAAATTTGATGGCTCTATAGAT*GACAATTGGTTTTTCTATC*

*CTGGTGGTAACATCGGTCTTTATTGTCCATATTCTTCAAAGGGGGC*

*ACCTGAAGAAGATTCAGCTATGGTGTTTGTTTCAAATGAAGTTGGT*

*GAGCATTCCATTACCACCCGTGACCTAAATGTGAATGAGAACACCA*

*TCATACAATTTGAGATCAACGTTGGCTGTTCGACT*GATAGCTCATC

CGCGGATCCAGTGAGACTGGAATTTTCAAGGGACTTCGGGGCGACC

TGGCACCTTCTGCTGCCCCTCTGCTACCACAGCAGCAGCCACGTCA

GCTCTTTATGCTCCACCGAGCACCACCCCAGCAGCACCTACTACGC

AGGAACCATGCAGGGCTGGAGGAGGGAGGTCGTGCACTTTGGGAAG

CTGCACCTTTGTGGATCTGTCCGTTTCAGATGGTACCAGGGATTTT

ACCCTGCCGGCTCTCAGCCAGTGACATGGGCCATTGATAATGTCTA

CATCGGTCCCCAGTGTGAGGAGATGTGTAATGGACAGGGGAGCTGT

ATCAATGGAACCAAATGTATATGTGACCCTGGCTACTCAGGTCCAA

CCTGTAAAATAAGCACCAAAAATCCTGATTTTCTCAAAGATGATTT

CGAAGGTCAGCTAGAATCTGATAGATTCTTATTAATGAGTGGTGGG

AAACCATCTCGAAAGTGTGGAATCCTTTCTAGTGGAAACAACCTCT

TTTTCAATGAAGATGGCTTGCGCATGTTGATGACACGAGACCTGGA

TTTATCACATGCTAGATTTGTGCAGTTCTTCATGAGACTGGGATGT

GGTAAAGGCGTTCCTGACCCCAGGAGTCAACCCGTGCTCCTACAGTA

TTCTCTCAACGGTGGCCTCTCGTGGAGTCTTCTTCAGGAGTTCCTTT

TCAGCAATTCCAGCGATTACAAGGATGACGACGATAAGTGACTCGAG
```

*Shaded, bold, underline sequence is signal peptide;
Bold sequence is Repeat 3;
Bold underline sequence is Loop 3-4;
Italics sequence is Loop 4-5;
Underline sequence is Repeat 5.

Recombinant, human Reelin protein, R3 fragment conjugated to the R5 fragment, i.e. Reelin protein fragment R3+R5 (SEQ ID No. 12)

```
MERSGWARQTFLLALLLGATLRARAFSSTAPVLLQYSHDAGMSWFLVKEG

CYPASAGKGCEGNSRELSEPTMYHTGDFEEWTRITIVIPRSLASSKTRFR

WIQESSSQKNVPPFGLDGVYISEPCPSYCSGHGDCISGVCFCDLGYTAAQ

GTCVSNVPNHNEMFDRFEGKLSPLWYKITGAQVGRTGCGTLNDGKSLYFN

GPGKREARTVPLDTRNIRLVQFYIQIGSKTSGITCIKPRTRNEGLIVQYS

NDNGILWHLLRELDFMSFLEPQIISIDLPQDAKTPATAFRWWQPQHGKHS

AQWALDDVLIGMNDSSQTGFQDKFDGSIDDNWFFYPGGNIGLYCPYSSKG

APEEDSAMVFVSNEVGEHSITTRDLNVNENTIIQFEINVGCSTDSSSADP

VRLEFSRDFGATWHLLLPLCYHSSSHVSSLCSTEHHPSSTYYAGTMQGWR

REVVHFGKLHLCGSVRFRWYQGFYPAGSQPVTWAIDNVYIGPQCEEMCNG

QGSCINGTKCICDPGYSGPTCKISTKNPDFLKDDFEGQLESDRFLLMSGG

KPSRKCGILSSGNNLFFNEDGLRMLMTRFLFLSHARFVQFFMRLGCGKGV

PDPRSQPVLLQYSLNGGLSWSLLQEFLFSNSS
```

*Coding regions colored above in DNA sequence, plain white regions (without font modifications such as underlining, italicizing) not translated in protein.

Example 2

Repeat regions from Reelin were isolated, as seen in Example 1. The R3 region was excised to provide sticky ends of the DNA. The Reelin gene was incubated with EcoRI and BatXI, and resulted in the excision of a segment around 6300 bp. The excised R3 fragment was then inserted into an AAV-9 or AAV-5 viral vector. The viral vector was cleaved after the CMV promotor, if the vector possesses the CMV promotor, such as pMDLg/pPRE or pAD3000. However, where the CMV promotor is not disposed in the vector at the time of transfection, such as with pAdEasy-1, the promotor was added with the Reelin fragment. A construct is formed with the complementary ends to EcoRI and BatXI, with the construct containing the Reelin fragment and CMV promotor. The construct was incubated with vector in an enzyme, such as ligase, forming a new vector containing the Reelin fragment and CMV promotor. The vector was inserted into cells for generation of viruses containing the Reelin fragments.

While the above example discussed Reelin R3, the method was used for other Reelin variants including fragment R3-5, fragment R3+5, and fragment R3+6, described in Example 1.

Example 3

Reelin fragments were formed as described in Example 1. The different variations of Reelin, including fragment R3-R6, R3+R5, and R3+R6, were examined using ApoER2 as a reporter in a luciferase assay. However, other alternative splicing variants, such as R2 (NR2), R6 (NR6), R3-C and R7-C are also considered useful aspects of the invention.

Figure 6:
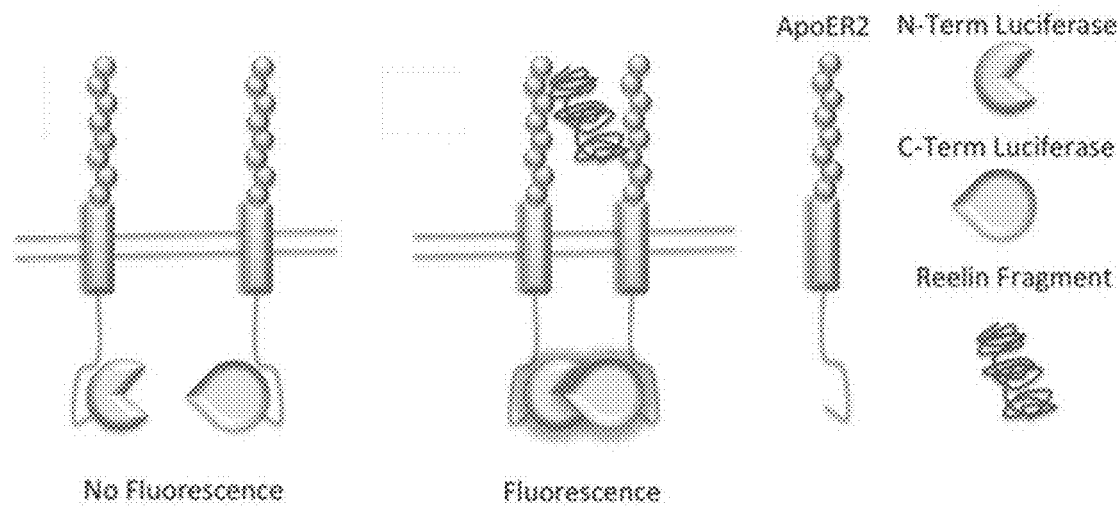
FIG. 6 is an illustration of the Reelin-dependent ApoER2 receptor, showing the unactivated receptor and dimerized receptor, which is active and fluoresces. The system is used in a receptor activation luciferase assay.
Figure 7:
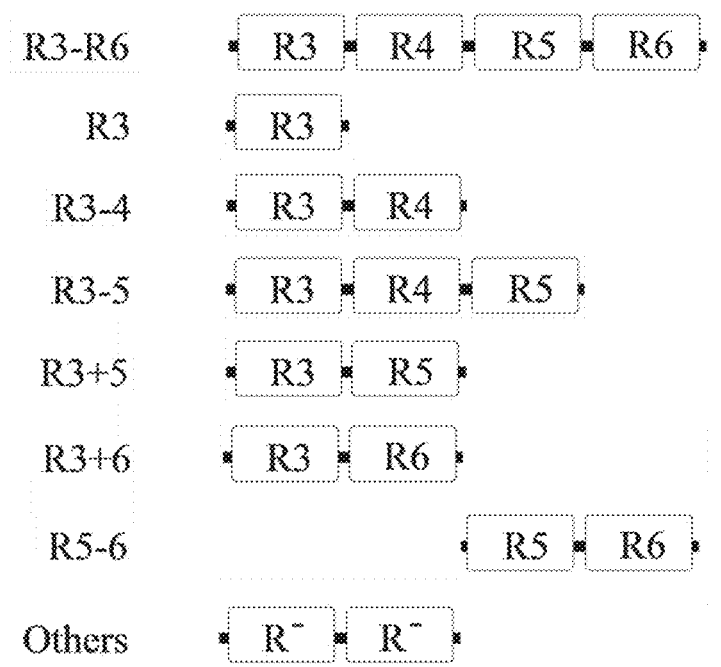
FIG. 7 is an illustration showing Reelin fragments of Reelin formed by cleavage by a number of enzymes which result in the production of various fragments. The R3-R6 fragment, is compared to Reelin fragments R3, which contains only the third splice region, R3-4, which contains the splice regions R3 and R4, spliced together, the R3-R5, which contains repeat regions R3, R4, and R5 spliced together, and the R5-R6 fragment, which includes regions R5 spliced to region R6. Also shown are fragments R3+R5 and R3+R6, which contain the R3 regions spliced to the R5 region or R6 region, respectively.
Figure 8:
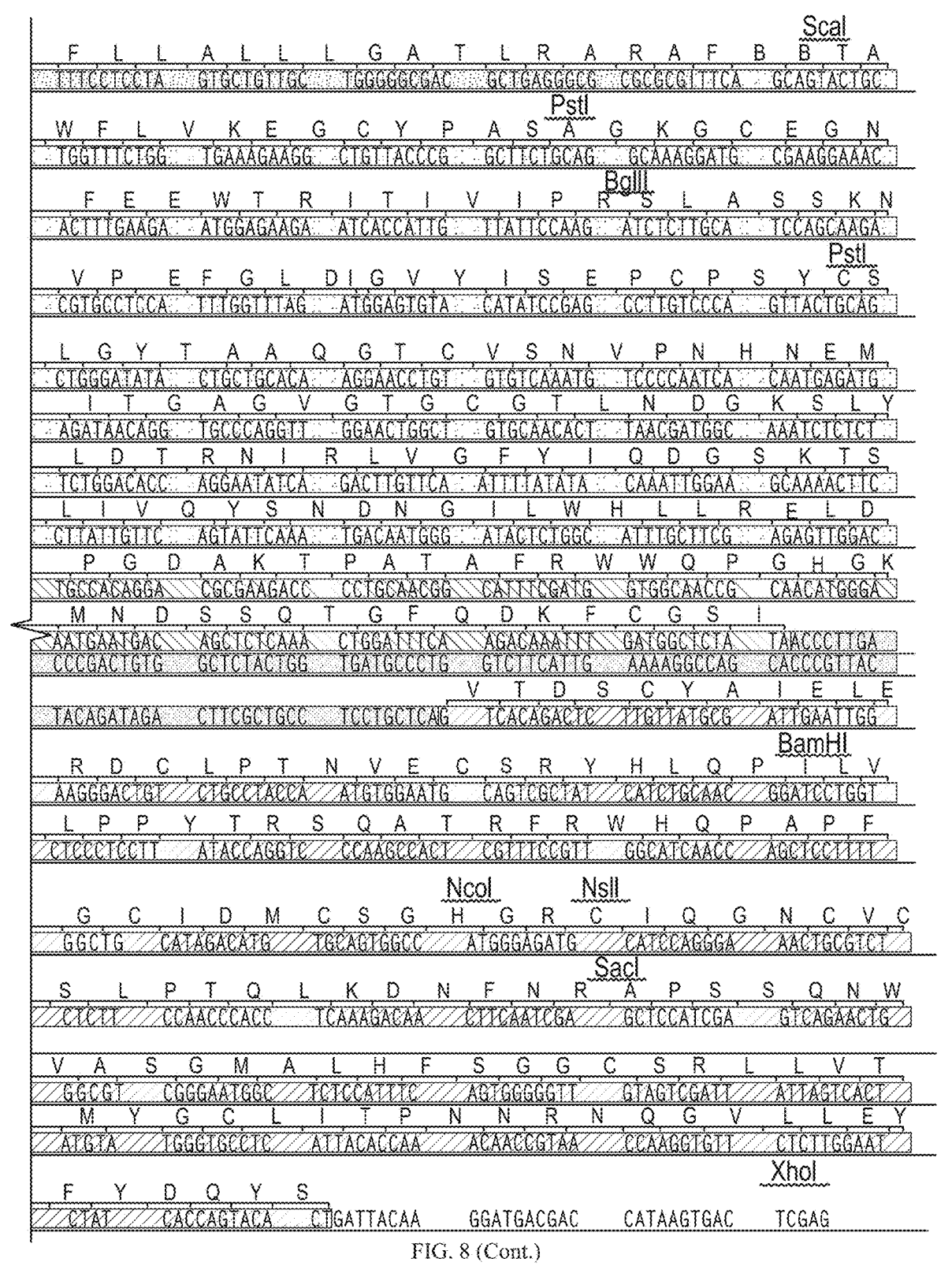

Luciferase assays were performed to determine ApoER2 receptor clustering via light emission increase when receptors cluster, shown in FIG. 6. The luciferase substrate was dissolved in luciferase buffer (1:1) and N-terminal luciferase conjugated to a first set of ApoER2 receptor proteins and C-terminal luciferase conjugated to a second set of ApoER2 receptor proteins. The luciferase-conjugated ApoER2 was added to each assay plate in 1:1 ratios (ie 50 μL C-terminal luciferase to 50 μL μL N-terminal luciferase). Different variations of human Reelin, seen in FIGS. 3, 7-9, were examined using ApoER2 as a reporter. After addition of 5 nM of the test Reelin, the mix was shaken for 10 min and light generation detected.

Figure 10:
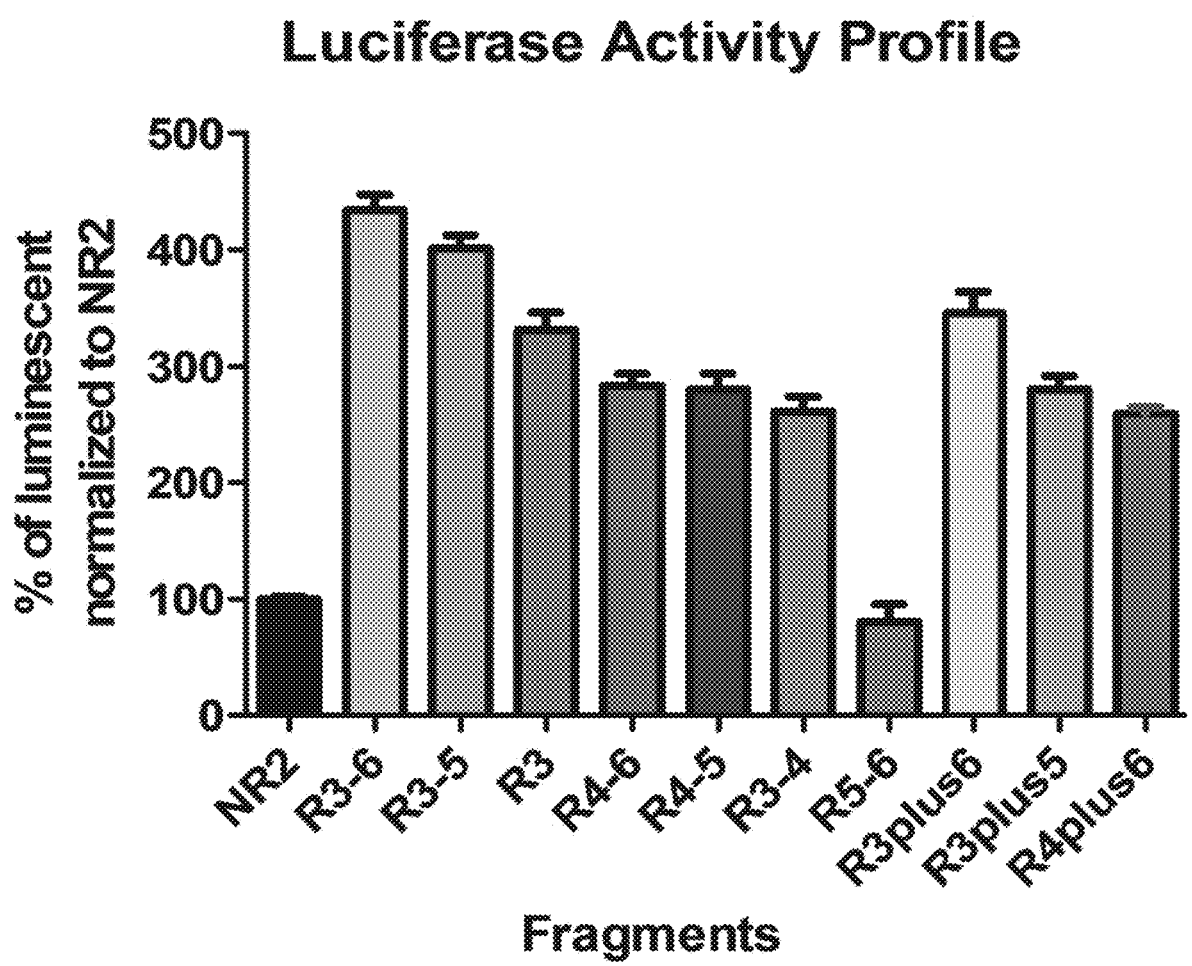
FIG. 10 is a graph showing an ApoER2 luciferase assay using mouse Reelin fragments.
Figure 11:
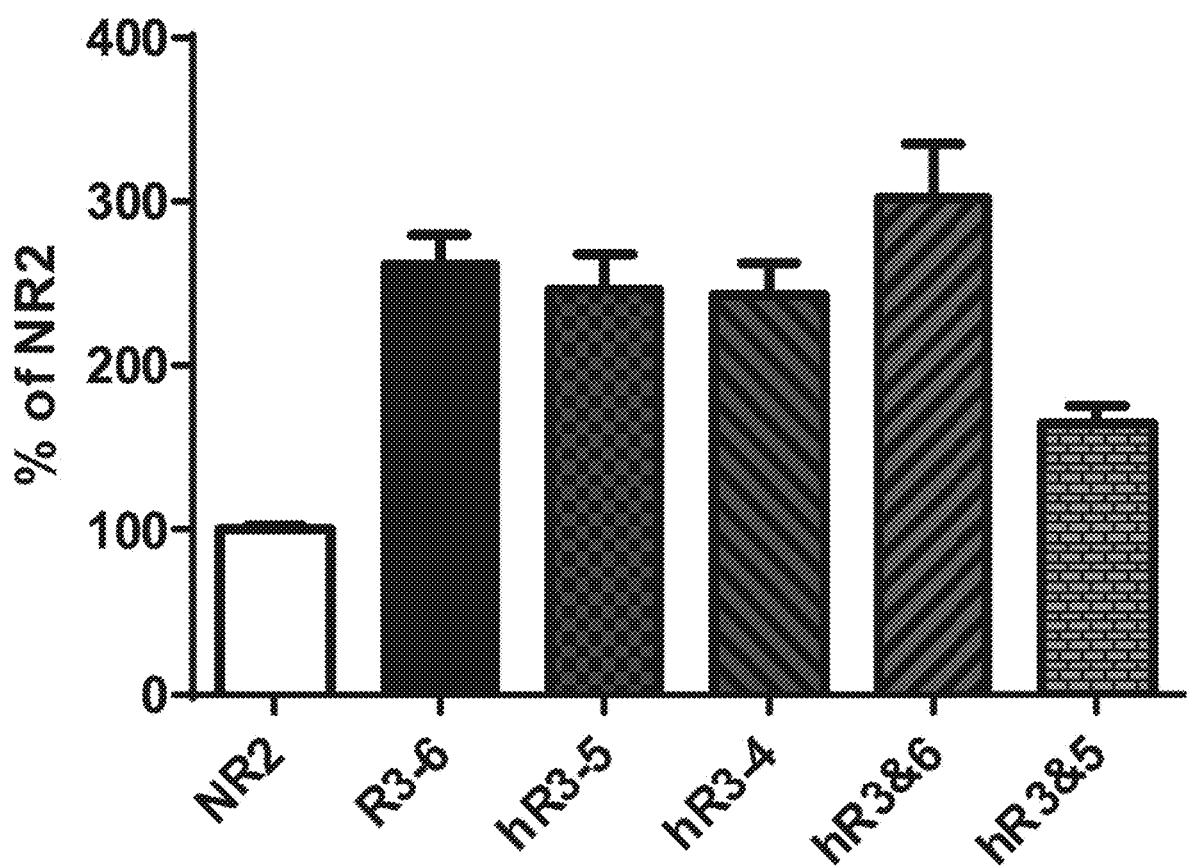
FIG. 11 is a graph showing an ApoER2 luciferase assay using human Reelin fragments.
Figure 12:
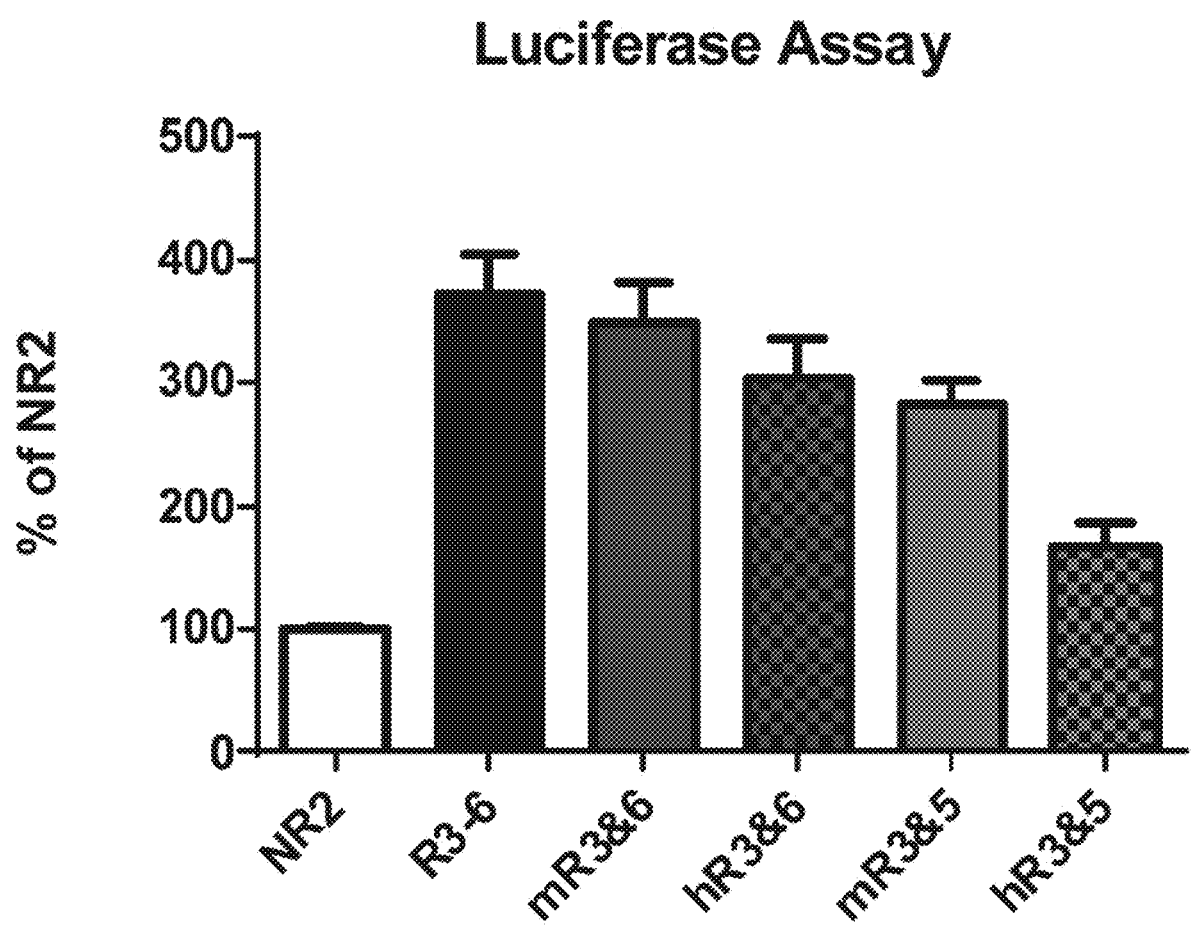
FIG. 12 is a graph comparing ApoER2 luciferase assay of mouse Reelin fragments and human Reelin fragments.

All mouse Reelin fragments, except R5-6, resulted in a 2-fold to 4-fold increase in light emission, as seen in FIG. 10. Use of human Reelin fragments increased emission signal, with most showing a 2.5-fold to 3-fold increase over control, as seen in FIG. 11. Further, the activity of most human Reelin fragments was comparable with the most effective Reelin from FIG. 10, as human R3-5, human R3-4, and human R3+R6 exhibited luciferase activity that was about the same or higher than R3-6. Human R3+R5 exhibited about 50% the activity of R3-6, or comparable to R3+R6, R3+R5, and R4+R6, seen in FIG. 10. As seen in FIG. 1, mouse and human fragments were both effective in inducing receptor clustering as evidenced by the increase in luciferase signaling.

Example 4

The effects of Reelin cell signaling and processing were analyzed by testing the activation of ApoER receptor. Recent work has highlighted the importance of Reelin signaling in normal learning and memory (Weeber, et al. Reelin and ApoE receptors cooperate to enhance hippocampal synaptic plasticity and learning. *J Biol Chem* 2002, 277:39944-39952), as well as pathological instances where this signaling is perturbed. For example, lipoprotein receptors have a role in cognitive processes and implicated this receptor family in the pathological processes that underlie the progression of Alzheimer's disease (AD). Two of the major ligands for these receptors, apoE and Reelin, appear to have signaling capabilities that can significantly impact synaptic function. APC is now a candidate modulator of Reelin signaling, as it appears to have the structural moieties to bind to ApoER2 and activate downstream effectors. It is of immense scientific and clinical relevance that APC modulation of Reelin signaling be tested, as it could yield novel therapeutic avenues.

The effects of Reelin of ApoER receptor activation and signaling pathways were analyzed. Primary neuronal culture was made from embryonic day 17 mice and grown in serum-free Neurobasal medium (Gibco BRL) supplemented with B27 (Gibco BRL) and 1-glutamine at 37° C. in 5% $CO_2$. The cells were allowed to mature in culture for 8 days. Cultures were treated with 200 µM purified Reelin fragment representing Repeats 3-6 (R3-6). Cells were lysed at specific times (0, 10, 30, 60, 120 or 240 minutes) after Reelin treatment. Western for total ApoER2 expression, AKT, phosphorylation of AKT, phosphorylated extracellular regulated kinase (ERK) and total extracellular regulated kinase (ERK) was determined and standardized to no treatment (time 0). The phosphorylation state of ERK is a direct detection of ERK activity and represents upstream signaling pathway activation.

Figure 13A:
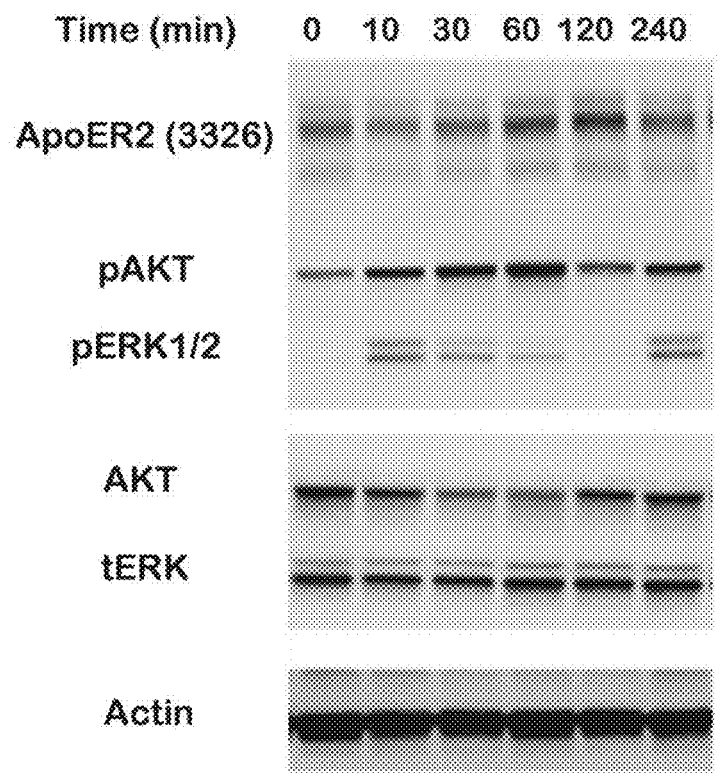
FIG. 13(A) is a blot showing primary neuronal culture treated with 200 µM purified Reelin fragment representing Repeats 3-6 (R3-6) and lysed at specific times (0, 10, 30, 60, 120 or 240 minutes) after Reelin treatment. A representative Western blot showing ApoER2 and activity and the phosphorylation state of AKT and ERK. ERK phosphorylation is a direct detection of ERK activity and represents upstream signaling pathway activation.
Figure 13B:
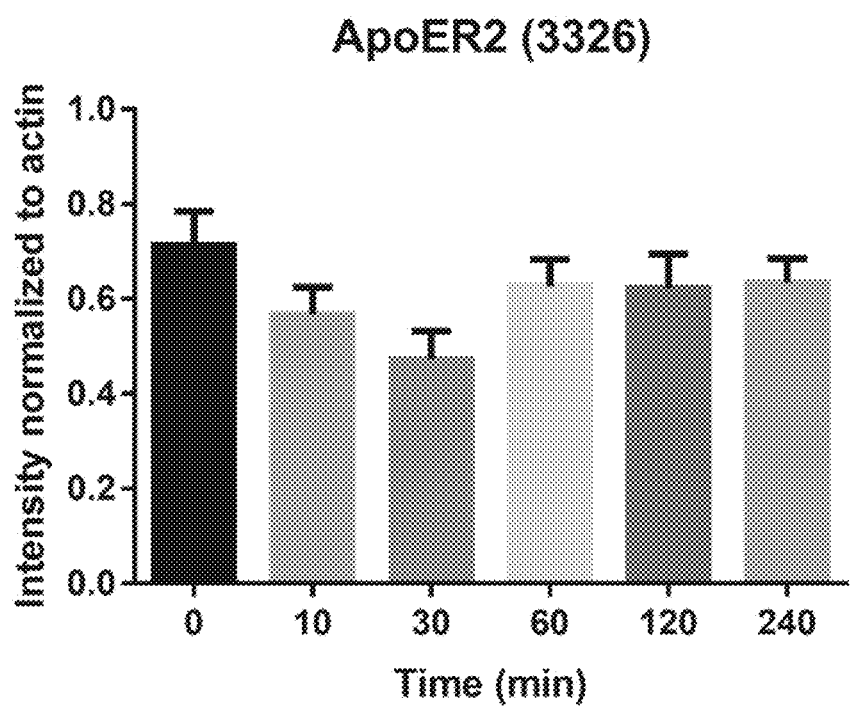
FIG. 13(B) is a graph showing primary neuronal culture treated with 200 µM purified Reelin fragment representing Repeats 3-6 (R3-6) and lysed at specific times (0, 10, 30, 60, 120 or 240 minutes) after Reelin treatment. The activity of ApoER2 was measured at the various time points and normalized to actin. All graphs show mean±S.E.M. Sample size is 5-6.
Figure 13C:
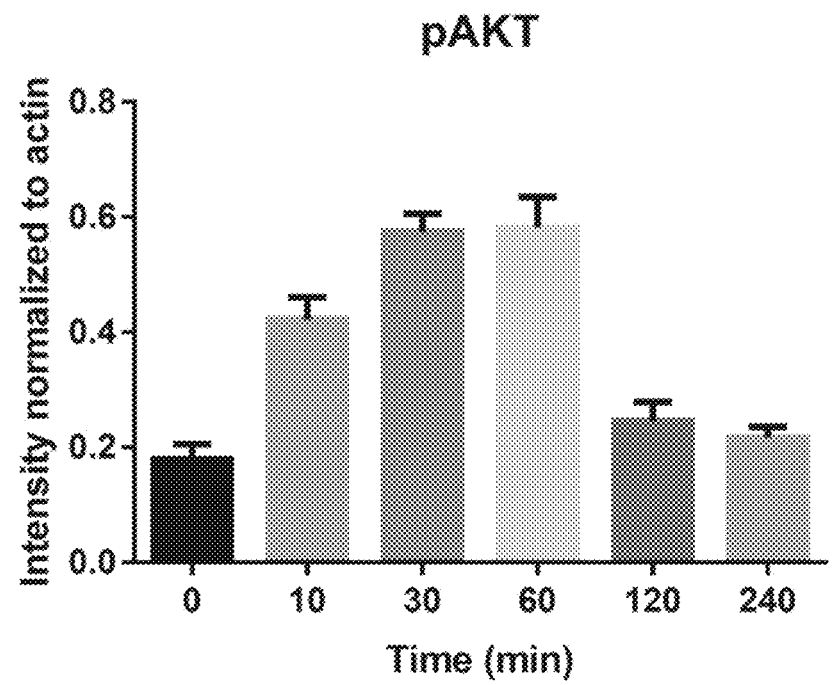
FIG. 13(C) is a graph showing primary neuronal culture treated with 200 µM purified Reelin fragment representing Repeats 3-6 (R3-6) and lysed at specific times (0, 10, 30, 60, 120 or 240 minutes) after Reelin treatment. The phosphorylation level of AKT was measured at the various time points and normalized to actin. All graphs show mean±S.E.M. Sample size is 5-6.
Figure 13D:
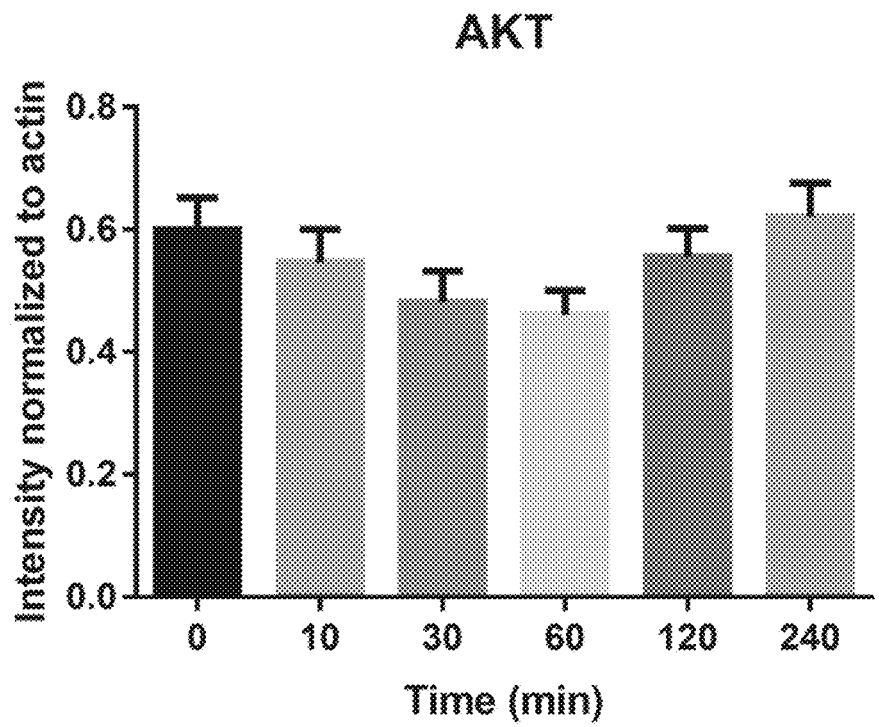
FIG. 13(D) is a graph showing primary neuronal culture treated with 200 µM purified Reelin fragment representing Repeats 3-6 (R3-6) and lysed at specific times (0, 10, 30, 60, 120 or 240 minutes) after Reelin treatment. The level of total AKT was measured at the various time points and normalized to actin. All graphs show mean±S.E.M. Sample size is 5-6.
Figure 13E:
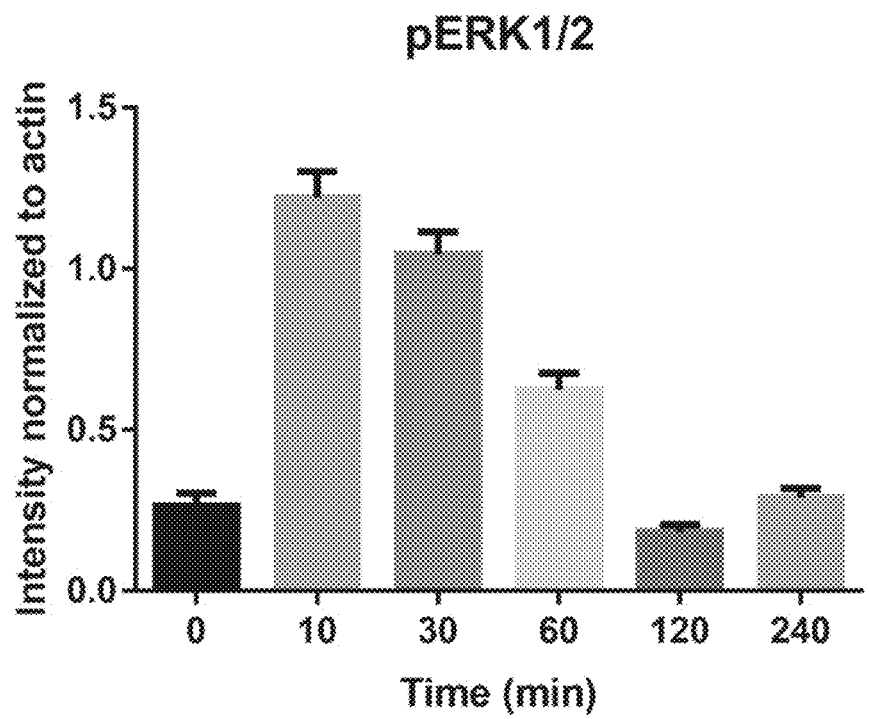
FIG. 13(E) is a graph showing primary neuronal culture treated with 200 µM purified Reelin fragment representing Repeats 3-6 (R3-6) and lysed at specific times (0, 10, 30, 60, 120 or 240 minutes) after Reelin treatment. The phosphorylation level of extracellular regulated kinase (ERK) was measured at the various time points and normalized to actin. All graphs show mean±S.E.M. Sample size is 5-6.
Figure 13:
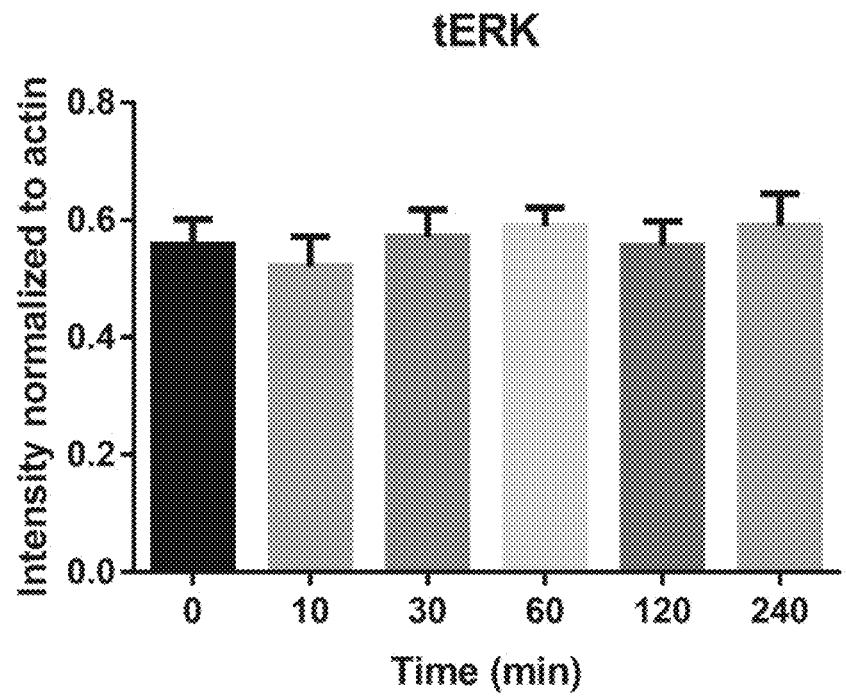
FIG. 13(F) is a graph showing primary neuronal culture treated with 200 µM purified Reelin fragment representing Repeats 3-6 (R3-6) and lysed at specific times (0, 10, 30, 60, 120 or 240 minutes) after Reelin treatment. The total level of extracellular regulated kinase (ERK) was measured at the various time points and normalized to actin. All graphs show mean±S.E.M. Sample size is 5-6.
FIG. 13(G) is a graph showing primary neuronal culture treated with 200 μM purified Reelin fragment representing Repeats 3-6 (R3-6) and lysed at specific times (0, 10, 30, 60, 120 or 240 minutes) after Reelin treatment. The ratio of phosphorylated extracellular regulated kinase (ERK) to total extracellular regulated kinase (ERK) was determined and standardized to no treatment (time 0). The phosphorylation state of ERK is a direct detection of ERK activity and represents upstream signaling pathway activation. All graphs show mean±S.E.M. Sample size is 5-6.

A representative Western blot, seen in FIG. 13(A) shows relatively stable ApoER2 expression. When normalized to actin, ApoER2 expression was found to drop for the first 30 minutes after Reelin exposure, followed by stabilization of expression levels, as seen in FIG. 13(B). AKT levels dropped over 60 minutes after Reelin exposure, while phosphorylated AKT increased, as seen in FIG. 13(A). Normalization of AKT and pAKT to actin mirrored the blot trends, with AKT levels dropping through 60 minutes after Reelin exposure, followed by an increase back to pre-exposure levels, as seen in FIG. 13(D). Phosphoryalted AKT increased dramatically through 60 minutes post-exposure, then quickly dropped down to pre-exposure levels, as seen in FIG. 13(C). Total ERK appeared consistent through the experiment, while phosphorylated ERK 1 and 2 were seen at 10 minutes and 240 minutes after Reelin exposure, as seen in FIG. 13(A). Normalization of ERK and pERK1/2 to actin matched the blot trends, showing strong phosphorylation at 10 minutes after Reelin exposure with a slight secondary increase at 240 minutes after Reelin, as seen in FIGS. 13(E) and (F). The ratio of pERK to total ERK was found to peak at 10 minutes after Reelin, which then slowly dropped through 120 minutes after Reelin, and a slight increase afterwards, as seen in FIG. 13(G).

To confirm the results were not specific to the Reelin fragment used (R-3-6), the primary neuronal culture experiment was repeated with other Reelin fragments, as seen in FIG. 14(A). The primary neuronal cultures were treated with 200 µM purified Reelin fragments representing Reelin repeats human sequence R3 and R5 (hR3+5), human repeats R3 and R6 (hR3+6) mouse Reelin repeats R3 through 6 (R3-6) mouse N terminal through repeat R2 (NR2) and full length Reelin consisting of the full length sequence and all of the naturally occurring fragments (FR). Control (ctrl) consisted of non-treated cells. Reelin was incubated onto the cells for 60 minutes. Cells were lysed and Western blots performed as described above for total ERK and phosphorylated ERK.

Figure 14B:
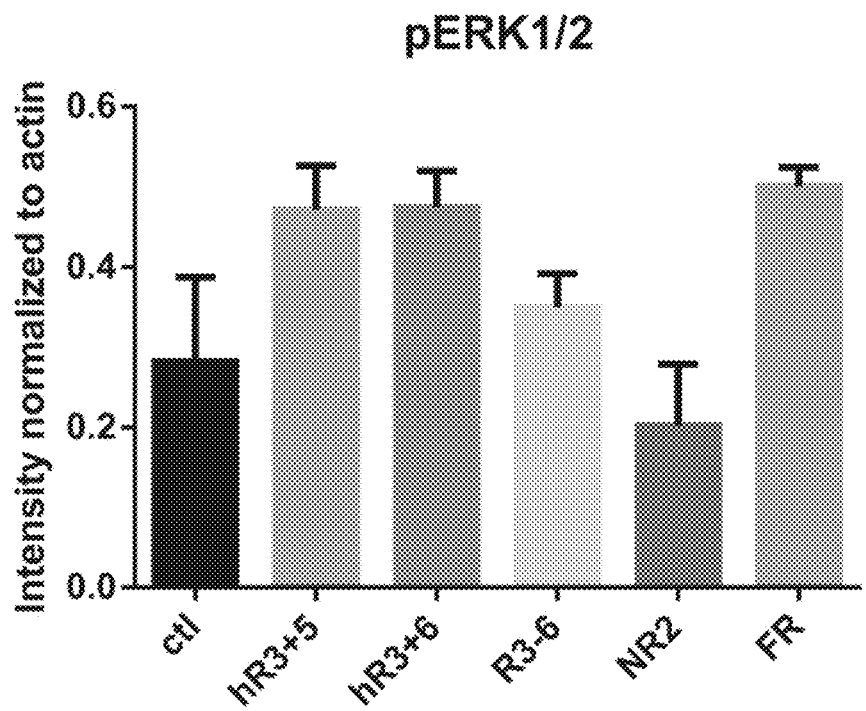
FIG. 14(B) is a graph showing primary neuronal culture treated with 200 μM purified Reelin fragments representing Reelin repeats human sequence R3 and R5 (hR3+5), human repeats R3 through R6 (hR3-6) mouse Reelin repeats R3 through 6 (R3-6) mouse N terminal through R2 (NR2) and full length Reelin consisting of the full length sequence and all of the naturally occurring fragments (FR). Control (ctrl) consisted of non-treated cells. Reelin was incubated onto the cells for 60 minutes, and cells lysed. The level of phosphorylated extracellular regulated kinase (ERK) was measured at the various time points and normalized to actin. All graphs show mean±S.E.M. Sample size is 4.
Figure 14C:
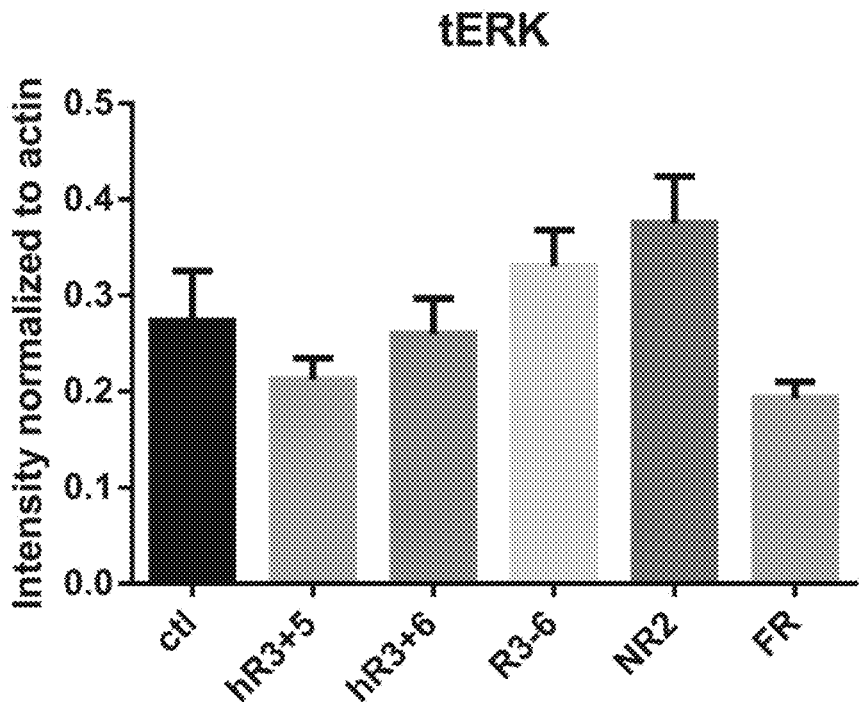
FIG. 14(C) is a graph showing primary neuronal culture treated with 200 μM purified Reelin fragments representing Reelin repeats human sequence R3 and R5 (hR3+5), human repeats R3 through R6 (hR3-6) mouse Reelin repeats R3 through 6 (R3-6) mouse N terminal through R2 (NR2) and full length Reelin consisting of the full length sequence and all of the naturally occurring fragments (FR). Control (ctrl) consisted of non-treated cells. Reelin was incubated onto the cells for 60 minutes, and cells lysed. The total level of extracellular regulated kinase (ERK) was measured at the various time points and normalized to actin. All graphs show mean±S.E.M. Sample size is 4.

A representative Western blot, seen in FIG. 14(A) showed the Reelin treatment had no discernible affect on total ERK levels. In fact, normalizing the results to actin showed the human Reelin recombinant fragments (hR3+5 and hR3+6) resulted in a slight drop in total ERK levels, as did full length Reelin, as seen in FIG. 14(C), while mouse fragment (R3-6 and NR2) had a slight increase in total ERK. However, human Reelin recombinant fragments (hR3+5 and hR3+6) resulted in strong increases in phosphorylated ERK1/2, similar to full length Reelin treatment, as seen in FIG. 14(B). Mouse Reelin fragment formed of repeats 3-6 (R3-6) showed a slight increase in phosphorylated ERK, which overlapped with the control. By contrast, the mouse N-terminal fragment (NR2) showed a drop in phosphorylated ERK. Comparing the levels of phosphorylated ERK to total ERK showed mouse fragment R3-6 showed phosphorylation was about equivalent to total ERK (1.15 for R3-6), which conforms to the results seen in FIG. 13(G). Control cultures with mock treatment has a ratio of 1.09. The mouse N-terminal fragment did not trigger phosphorylation of ERK, as levels were about 50% that of control (0.53). The human Reelin fragments (R3+5 and R3+6) resulted in phosphorylation of ERK (2.22 and 2, respectively), which was similar to full length Reelin (2.5). These results show that human Reelin fragments display stronger effects on ApoER2 signaling than the mouse fragments, and will likely be more efficacious in treatments.

Example 5

The effects of Reelin on cellular pathways was analyzed by testing for Reelin pathway protein modifications. Changes in Reelin fragment complement appear to be correlated with alterations in downstream Reelin signaling, as indicated by phosphorylation of the major downstream component, Dab-1.

The phosphorylation of DAB-1 was analyzed using a DAB-1 reporter conjugated to VLDLR and ApoEr. Primary neuronal culture was made from embryonic day 17 mice as discussed above. The cells were allowed to mature in culture for 8 days. Plates (96-well, 24 well) were coated with a 0.1 mg/mL (0.01%) poly-L-lysine solution (diluted from 1 mg/mL) with 50 µL or 100 µL of poly-L-lysine added to each well. The well or wells were incubated 37° C. for a minimum of 1 hour and the solution removed by vacuum aspiration or other means. The wells were washed with 150 µL of water. Cells were suspended 1:10 in high glucose medium and added to plates until 80-90% confluence (for 20-24 hours).

Opti M (w/o serum aka not complete) and High Glucose Complete Medium were heated to 37° C. Opti-M (500 µL) was added to each of two Eppendorf tubes. DNA (20 µL) was added to the first of the two Eppendorf tubes and lipofectamine (20 µL) was added to the second Eppendorf tube. The contents of each tube was mixed and the two solutions incubated at room temperature for 5 minutes. The DNA for the two ApoER2 fusion proteins and lipofectamine was mixed together and incubated at room temperature for 20 minutes. The transfection mix was added at 10 µL for each well of a 96 well plate containing cells and the mix incubated.

After 48 hours, luciferase activity was measured. The Reelin R3-6 fragment was boiled at 100° C. for 10 min to serve as a control. The luciferase substrate was dissolved in luciferase buffer (1:1) and luciferase added to each transfected plate in 1:1 ratios (ie 50 uL luciferase to 50 uL transfection soln). The mix was shaken for 10 min and light generation detected.

Figure 15:
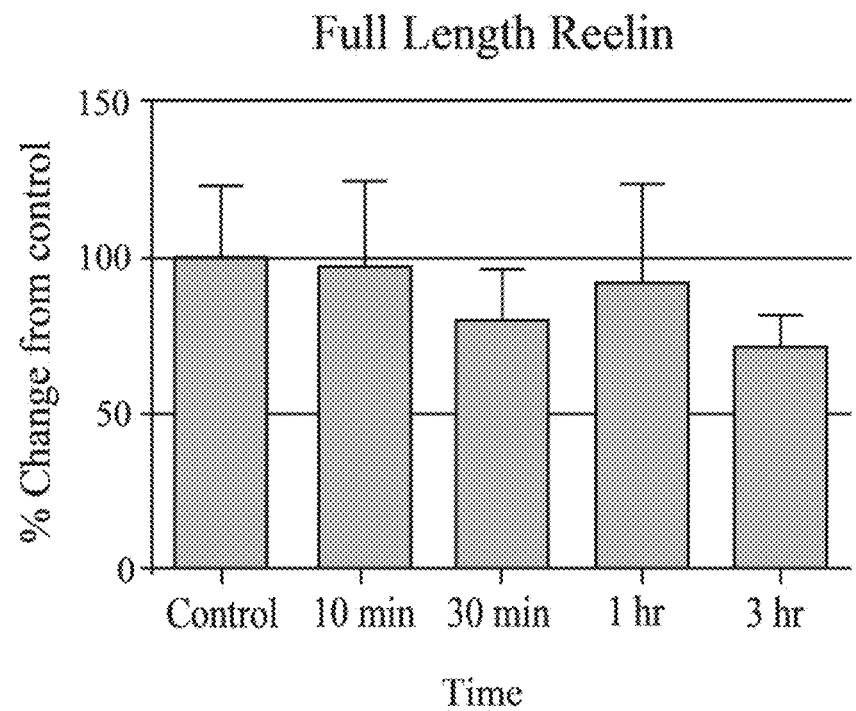
FIG. 15 is a graph showing Dab-1 phosphorylation assays using full length Reelin.
Figure 16:
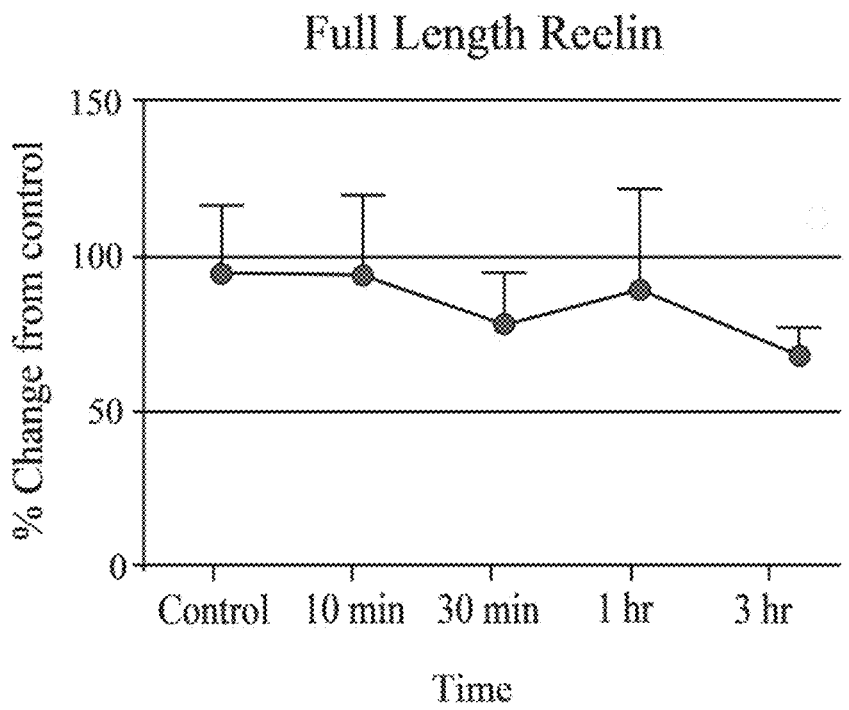
FIG. 16 is a line graph showing Dab-1 phosphorylation over time after exposure to full length Reelin.
Figure 17:
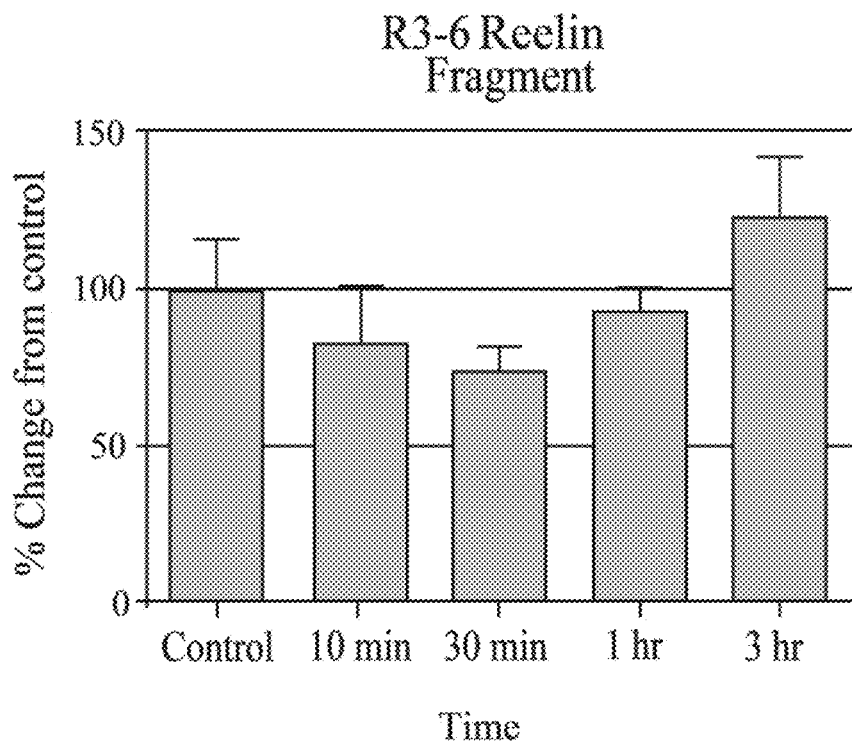
FIG. 17 is a graph showing Dab-1 phosphorylation assays using the R3-6 Reelin fragment.
Figure 18:
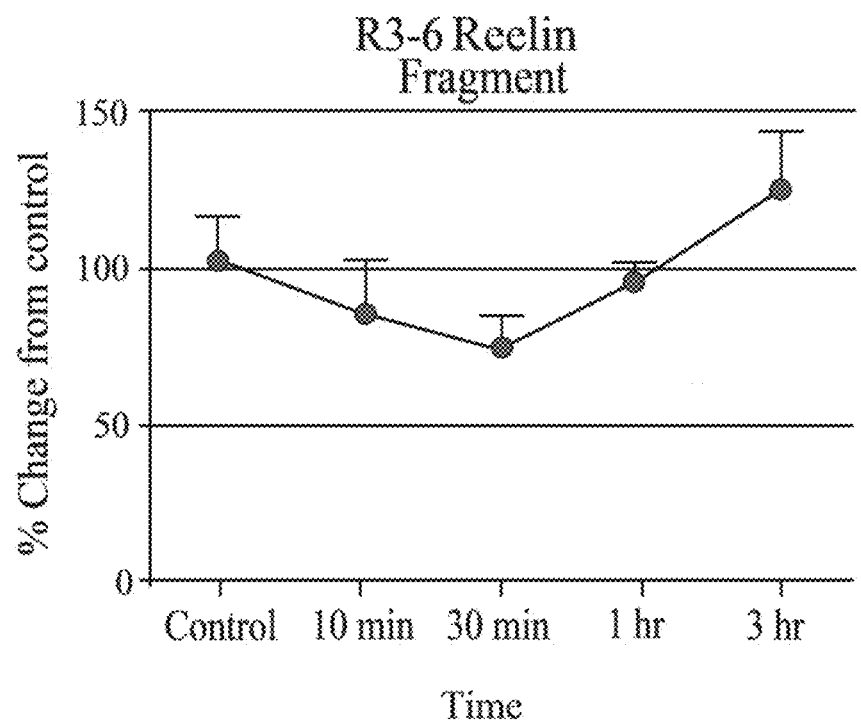
FIG. 18 is a line graph showing Dab-1 phosphorylation over time after exposure to the R3-6 Reelin fragment.

Upon binding of Reelin, the treatment with full-length Reelin resulted in reproducible effects on Dab-1, with little alteration in phosphorylation status as seen in FIGS. 15 and 16. By contrast, contacting the hippocampal slices with the R3-6 fragment showed a time-dependent effect on Dab-1 phosphorylation, as seen in FIGS. 17 and 18. APC-treated monocytes demonstrated increased active Dab1 (Tyr220-p), Akt Ser473-p, and GSK3β Ser9-p levels. Pre-treatment with RAP or knocking down of ApoER2 was found to attenuate these effects, while inhibitors of EPCR and PAR1 had no effect. Interestingly, APC was found to bind to ApoER2 with 30 nM affinity, but not to soluble VLDLR. To relate APC's effects to ApoER2 signaling, Receptor Associated Protein (RAP) was found to block APC-mediated inhibition of endotoxin-induced tissue factor pro-coagulant activity of U937 cells.

Reelin molecules have recently been discovered to form higher-order complexes in vitro and in vivo, such as Fc-RAP. This observation was further refined by showing that reelin is secreted in vivo as a disulfide-linked homodimer. Deletion of a short region, called the CR-50 epitope, located at the N-terminus of the molecule abolishes oligomerization. This mutated reelin fails to efficiently induce Dab1 phosphorylation in primary mouse neurons. Similarly, antibody against the CR-50 epitope antagonizes Reelin function in vitro and in vivo.

Figure 19:
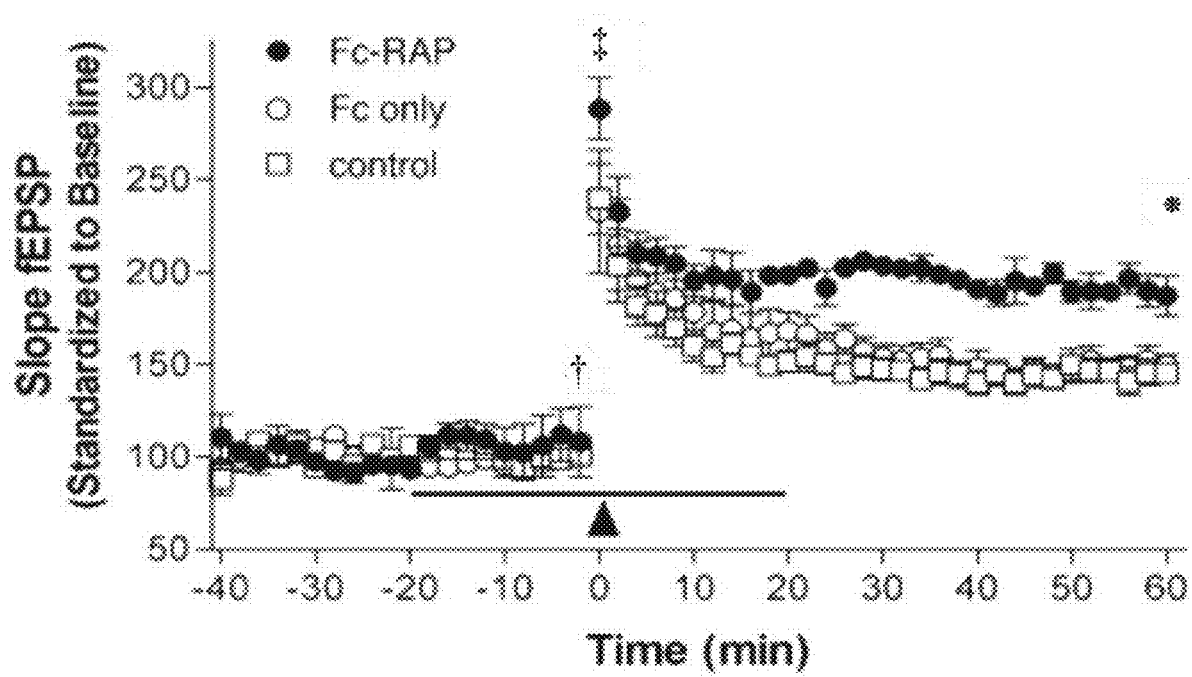
FIG. 19 Perfusion with Fc-RAP enhances hippocampal LTP induction. Hippocampal slices were perfused with Fc-RAP (10 μg/ml), Fe (10 μg/ml), or control medium. Baseline synaptic responses (†) and potentiation immediately following HFS (‡) and up to 60 min after HFS (*) were recorded. The arrowhead represents LIP induced with two trains of 1-s-long, 100-Hz stimulation, separated by 20 s. The horizontal line indicates application of Fe-RAP, Fe, or control medium. Results are shown as means standard errors of the mean. fEPSP, field excitatory postsynaptic potential Strasser et al 2004.
Figure 20A:
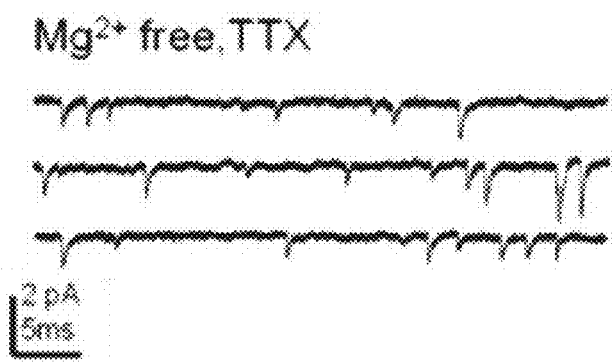
FIG. 20(A) is an electrogram showing Reelin enhances NMDAR currents through postsynaptic mechanisms. Illustration of measurement of $EPSC_{NMDA}$. The lines represent no treatment, mock treatment, and Reelin treatment showing Reelin treatment increases NMDA receptor function via calcium conductance.
Figure 20B:
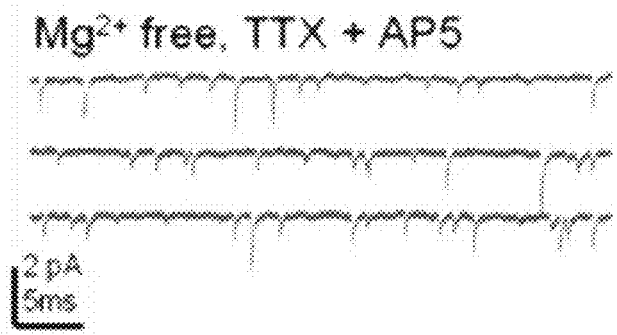
FIG. 20(B) is an electrogram showing Reelin enhances NMDAR currents through postsynaptic mechanisms. Illustration of measurement of $EPSC_{NMDA}$ with AP5. The lines represent no treatment, mock treatment, and Reelin treatment showing Reelin treatment increases NMDA receptor function via calcium conductance.
Figure 21A:
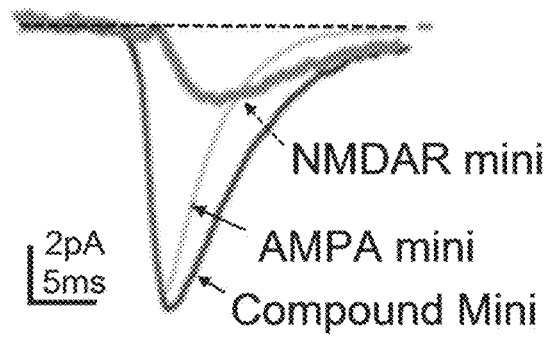
FIG. 21(A) is a graph showing measurement of $EPSC_{NMDA}$. The thick gray trace in represents the $mEPSC_{NMDA}$.
Figure 21B:
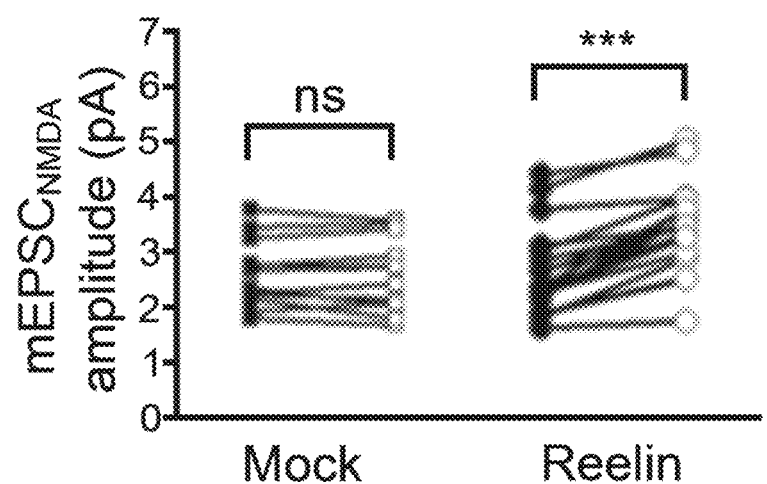
FIG. 21(B) is a graph showing Reelin treatment significantly increased $mEPSC_{NMDA}$ amplitude (closed circle, before reelin; open circle, after reelin; ***p<0.001; n=18; paired t test). Treatment with mock was without effect [closed square, before mock; open square, after mock; not significant (ns), p>0.05; n=13; paired t test].
Figure 21C:
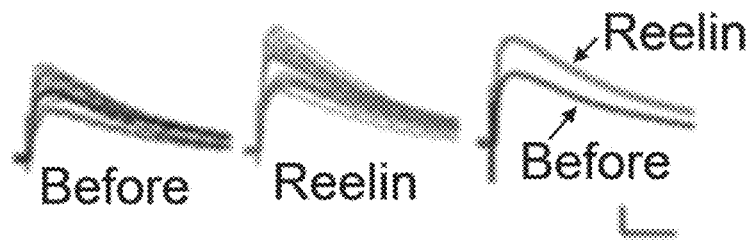
FIG. 21(C) is a graph showing synaptic transmission at three time points, no Reelin treatment, treatment with Reelin and composite graph comparing the two.
Figure 21D:
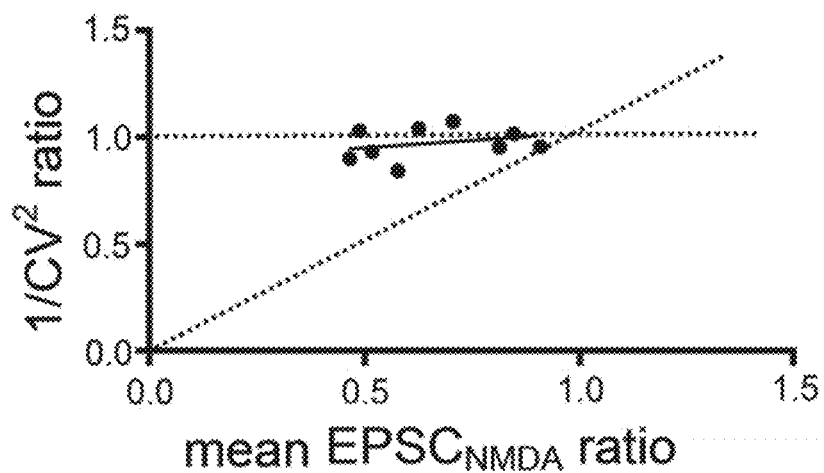
FIG. 21(D) is a graph showing there is no correlation of $1/CV^2$ ratios and mean $EPSC_{NMDA}$ ratios (after/before reelin) was revealed based on recordings from nine cells (r=0.31; p=0.4; Spearman's test).

RAP is an intracellular protein that can bind with very high affinity to the family of lipoprotein receptors. The Fc-RAP fusion protein is an engineered protein consisting of two RAP molecules connected to form a rough 'dumb bell' shape using the Fc region of an antibody. Instead of binding to and inhibiting ApoER2 and VLDLR, the Fc-RAP can cause receptor clustering and ApoER2 activation. The addition of Fc-RAP has the identical effect as reelin application by increasing LTP induction, as seen in FIG. 19. The main difference is that the Fc-RAP is likely to bind all lipoprotein receptors, but only clusters ApoER2 and VLDLR.

Clustering of ApoER2 and/or VLDLR induces Dab1 phosphorylation and downstream events including activation of SFKs and modulation of PKB/Akt. Furthermore, modulation of long-term potentiation (LTP), one of the biological effects of reelin, is also mimicked by reelin-independent receptor clustering. These findings strongly suggest that receptor-induced dimerization or oligomerization is sufficient for Dab1 tyrosine phosphorylation and downstream signaling events without the need for an additional co-receptor providing tyrosine kinase activity. Without being bound to any specific theory, this suggests the therapeutic potential of Reelin fragments is through appropriate receptor dimerization and downstream signaling.

Example 6

Reelin has the ability to potentiate CA1 glutamatergic responses. In cultured hippocampal neurons, Reelin signaling is required for normal development of dendritic structures. In the absence of Reelin or the intracellular adaptor protein Dab1, neurons exhibit stunted dendritic growth and a reduction in dendritic branches, a phenotype analogous to that seen in neurons lacking the reelin receptors apoER2 and VLDLR (Niu, et al., Reelin promotes hippocampal dendrite development through the VLDLR/ApoER2-Dab1 pathway. *Neuron.* 2004; 41:71-84). The HRM exhibits a deficit in hippocampal-dependent contextual fear conditioned learning and synaptic plasticity in area CA1 of the hippocampus. It is believed that these behavioral and physiologic phenotypes of the HRM are due in part to reduced or inhibited synaptic connectivity. This is supported by the observation that HRM have a reduction in spine density.

Mixed hippocampal and cortical neuronal cultures were obtained from embryonic day (E) 18-19 mouse embryos. The cells were plated at high density (~750 cells mm$^{-2}$), and grown in Neurobasal medium (Gibco BRL) supplemented with B27 (Gibco BRL). The cells were subcultured when at 80% confluence.

ApoER2 is present post-synaptically and forms a functional complex with NMDARs in CA1. The derivation of mEPSC-NMDA is illustrated in FIGS. 20(A)-(B) and 21(A)-(D). Cells treated with mock had miniature excitatory postsynaptic current due to NMDA receptors (mEPSC$_{NMDA}$) that were not significantly changed compared with that before mock treatment (p>0.05). Treatment with Reelin was found to significantly increase mEPSC$_{NMDA}$ amplitude (p<0.001).

To further verify that synaptic NMDAR response was increased as a result of postsynaptic effects of Reelin, the coefficient of variation (CV) of synaptically-evoked NMDAR whole-cell current was analyzed. When 1/CV2 ratios were plotted versus mean EPSC$_{NMDA}$ ratios before and after a 30 minute reelin application in nine experiments, no correlation was established, seen in FIGS. 21(C) and (D). However, the 1/CV2 ratios remain relatively unchanged across varying mean EPSC$_{NMDA}$ ratios, confirming reelin activation through a postsynaptic mechanism in CA1 to enhance NMDAR activity.

Chronic Reelin treatment can increase the AMPA component of synaptic response, altering EPSC$_{NMDA}$ kinetics and ifenprodil sensitivity. The effect of on Reelin in CA1 on expression levels of ANWAR and NMDAR subunits was tested. Both total and surface levels of GluR1, NR1, NR2A, and NR2B were probed by Western blotting. GluR1, an AMPAR subunit that is increasingly expressed during developmental maturation and subjected to regulate trafficking during synaptic plasticity, was analyzed on CA1 cell surfaces.

Figure 22A:
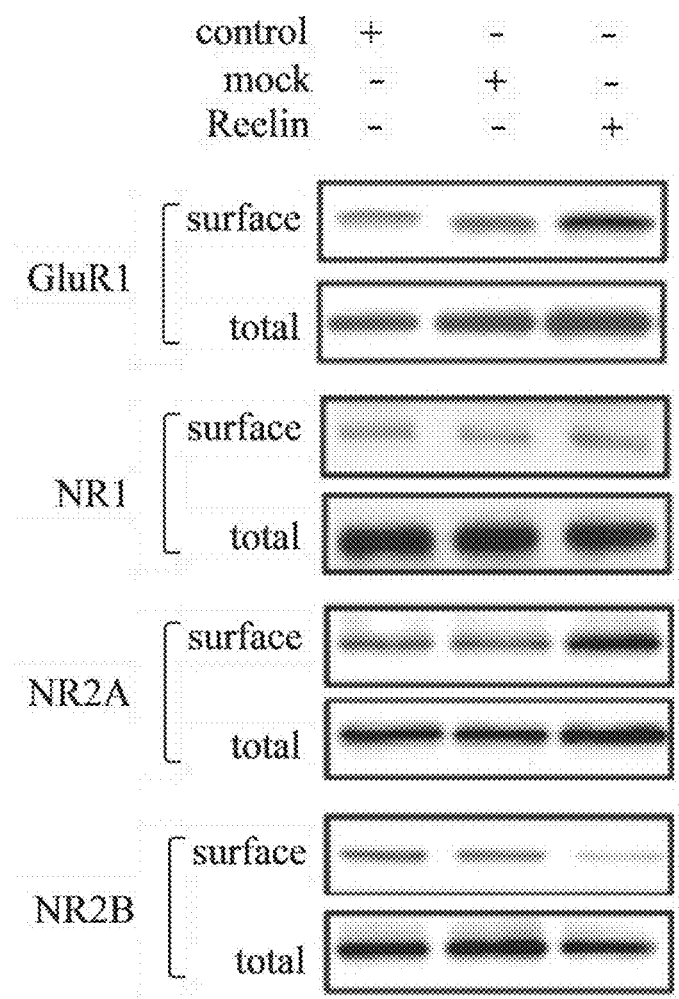
FIG. 22(A) is a Western blot showing Reelin signaling alters surface expression and total levels of glutamate receptor subunits. Representative blots show levels of both surface and total GluR1, NR1, NR2A, and NR2B.
Figure 22B:
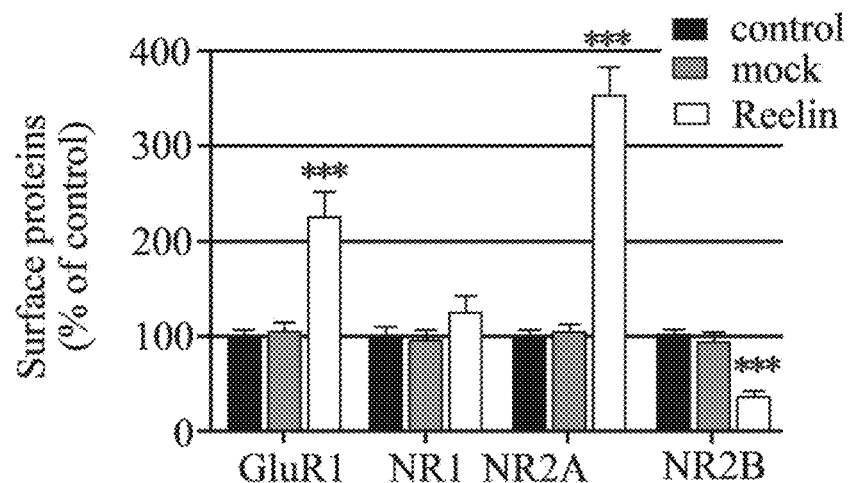
FIG. 22(B) Quantitative results of surface glutamate receptor subunits pooled from 4 experiments of Western blots. Compared with mock groups, both surface GluR1 and NR2A were significantly increased [GluR1, F(2,11)=15.56, *P<0.001; NR2A, F(2,11)=44.9, *P<0.001], and the level of surface NR2B was significantly reduced [F(2,11)=22.6, ***P<0.001] after chronic Reelin treatment.
Figure 22C:
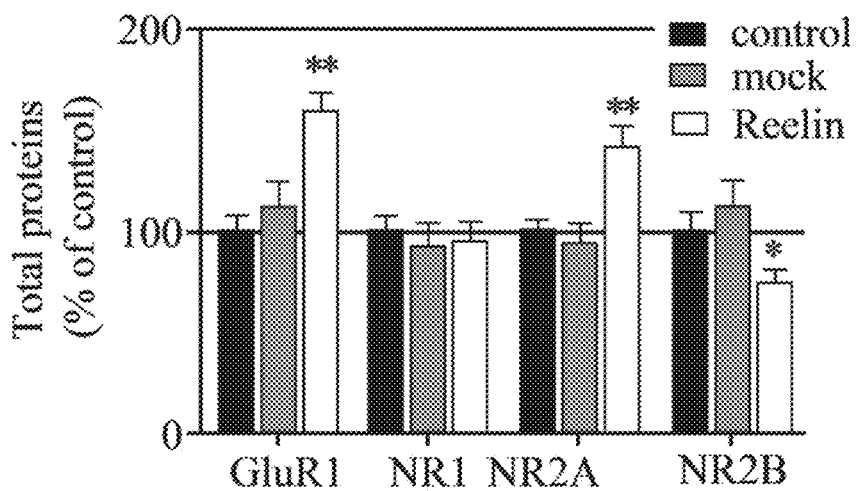
FIG. 22(C) Quantitative results of total protein levels pooled from 4 experiments of Western blots. Reelin treatment significantly increased levels of total GluR1 [F(2,11)=11.2, P<0.01], NR2A [F(2,14)=9.75, P<0.01], and decreased level of total NR2B [F(2,11)=4.1, *P<0.05]. In contrast, neither total nor surface (in B) levels of NR1 was observed.

FIGS. 22(A)-(C) shows that reelin treatment significantly increased levels of surface GluR1 compared with mock-treated groups, indicating regulated expression and surface insertion via increased $mEPSC_{AMPA}$ and AMPA/NMDA current ratio after chronic Reelin treatment. No changes of either surface or total NR1 levels were observed. In comparison, both total and surface NR2A expression levels were significantly increased after reelin treatment versus mock treatment. Moreover, both total and surface NR2B protein levels were significantly decreased following reelin treatment. Mock treatment had no effect on different glutamate receptor subunit levels compared with non-treated control groups.

The effects of Reelin on hippocampal dendrites were analyzed. Hippocampal cells were cultured from FIRM embryos were created from 6-7 day-old wild-type, HRM and Reelin-deficient mice and treated with 5 nm Reelin for 21 days. Treatment of organotypic cultures consisted of repeated 5 nM Reelin application every 3 days for 21 days or non-transfected HEK cell media. The cells were cultured as described above and a fluorescent dye was injected into neuronal cells by administering whole cell patch clamp current and the cells were visualized under the confocal microscope after fixation.

Dendritic spines are small protrusions that cover the surface of dendrites and bear the postsynaptic structures that form excitatory synapses. Abnormal shapes or reduced numbers of dendritic spines are found in a number of cognitive diseases. A reduction in the number of dendritic spines suggests that a constitutive level of Reelin/lipoprotein receptor-mediated signaling is required for development of dendritic structures, which are crucial for intensive information processing by the neurons. This notion is in agreement with studies showing that heterozygote reeler mice (HRM) exhibit reduced dendritic spine densities and impaired performance in certain learning and memory behaviors.

Figure 23A:
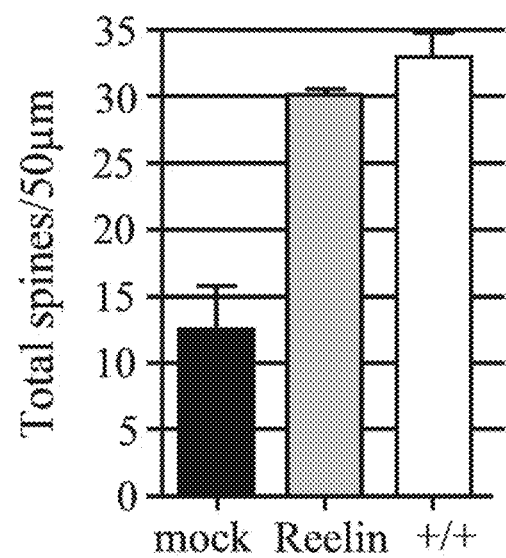
FIG. 23(A) is a graph showing Reelin effects on dendritic spine density. Reelin was applied chronically to primary hippocampal neuronal cultures to examine its effect on dendritic spine density. Dendritic spines on a WT neuron are shown in an enlarged photo of a representative primary dendrite.
Figure 23B:
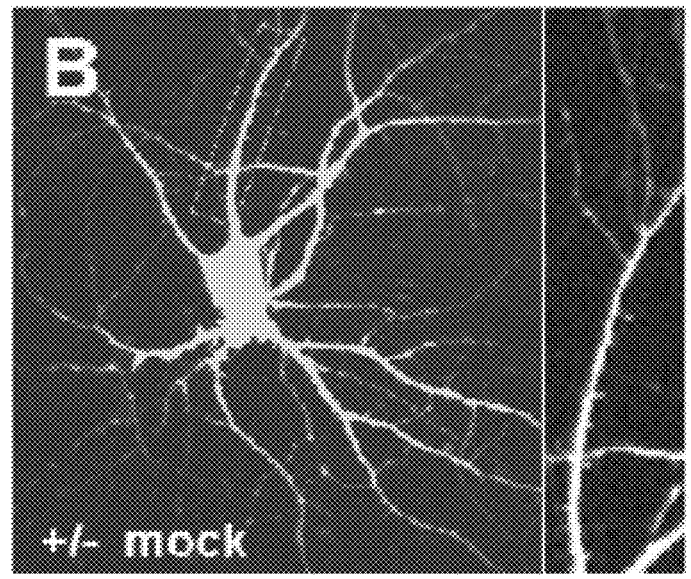
FIG. 23(B) is an image showing Reelin effects on dendritic spine density. Reelin was applied chronically to primary hippocampal neuronal cultures to examine its effect on dendritic spine density. Dendritic spines are reduced in the HRM compared to WT mice but after treatment with reelin, spine density is rescued. Dendritic spines were defined as any protrusion from a primary dendrite excluding any secondary dendrites. Dendritic spines were counted and measured every 50 μm of the dendrite. There is a significant increase in spines in reelin-treated cells (n=3) versus mock-treated cells (n=3).
Figure 23C:
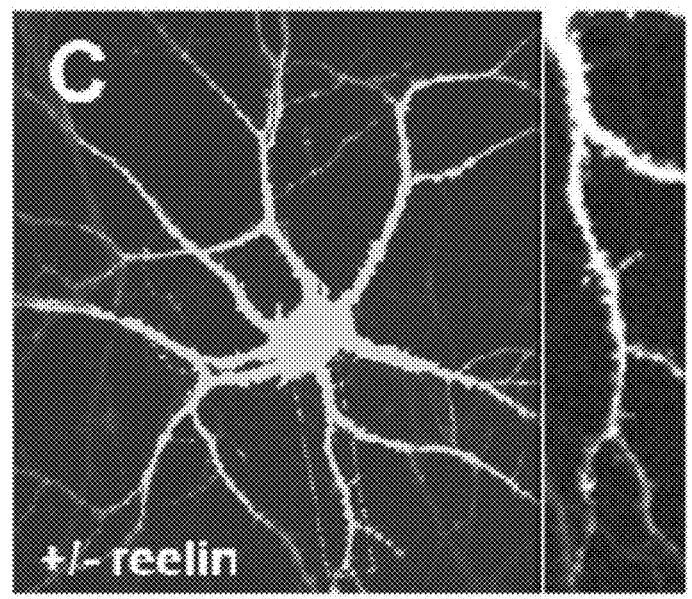
FIG. 23(C) is an image showing Reelin effects on dendritic spine density. Reelin was applied chronically to primary hippocampal neuronal cultures to examine its effect on dendritic spine density. Dendritic spines are reduced in the HRM compared to WT mice but after treatment with reelin, spine density is rescued. Dendritic spines were defined as any protrusion from a primary dendrite excluding any secondary dendrites. Dendritic spines were counted and measured every 50 μm of the dendrite. There is a significant increase in spines in reelin-treated cells (n=3) versus mock-treated cells (m=3).
Figure 23D:
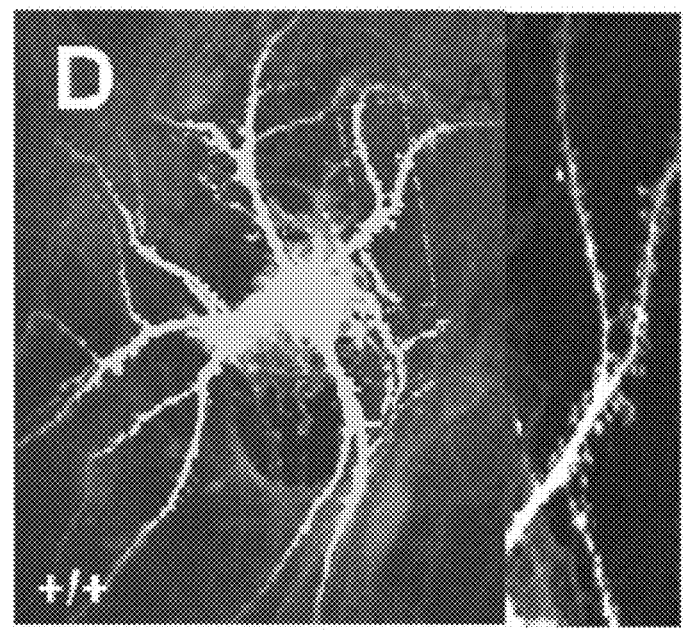
FIG. 23(D) is an image showing Reelin effects on dendritic spine density. Reelin was applied chronically to primary hippocampal neuronal cultures to examine its effect on dendritic spine density. Dendritic spines are very sparse in the knockout reelin mice but after treatment with reelin, spine density deficits are rescued. Dendritic spines were defined as any protrusion from a primary dendrite excluding any secondary dendrites. Dendritic spines were counted and measured every 50 μm of the dendrite. There is a significant increase in spines in reelin-treated cells (n=3) versus mock-treated cells (n=3).
Figure 23E:
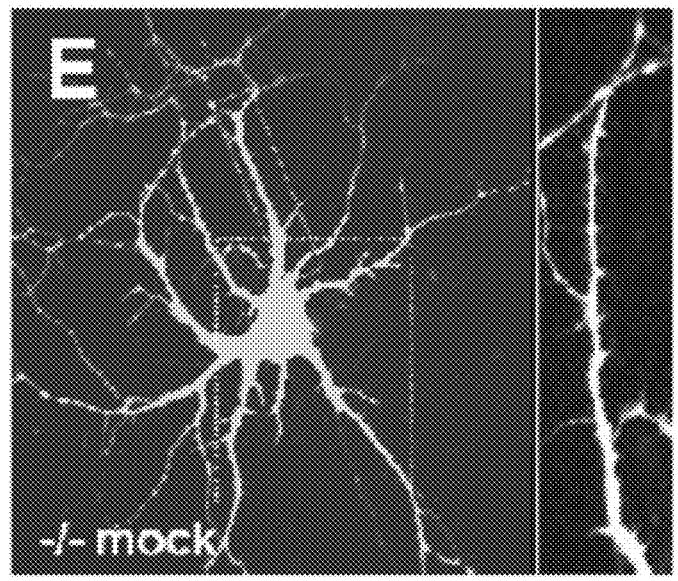
FIG. 23(E) is an image showing Reelin effects on dendritic spine density. Reelin was applied chronically to primary hippocampal neuronal cultures to examine its effect on dendritic spine density. Dendritic spines are very sparse in the knockout reelin mice but after treatment with reelin, spine density deficits are rescued. Dendritic spines were defined as any protrusion from a primary dendrite excluding any secondary dendrites. Dendritic spines were counted and measured every 50 μm of the dendrite. There is a significant increase in spines in reelin-treated cells (n=3) versus mock-treated cells (n=3).
Figure 23F:
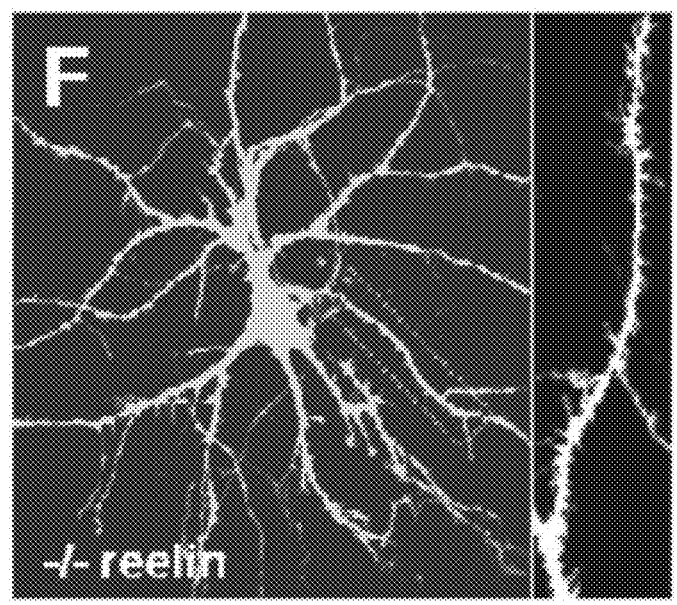
FIG. 23(F) is an image showing Reelin effects on dendritic spine density. Reelin was applied chronically to primary hippocampal neuronal cultures to examine its effect on dendritic spine density. Dendritic spines were quantified using a confocal microscope. Dendritic spines were defined as any protrusion from a primary dendrite excluding any secondary dendrites. Dendritic spines were counted and measured every 50 um of the dendrite. There is a significant increase in spines in reelin-treated cells (n=3) versus mock-treated cells (n=3).
Figure 24A:
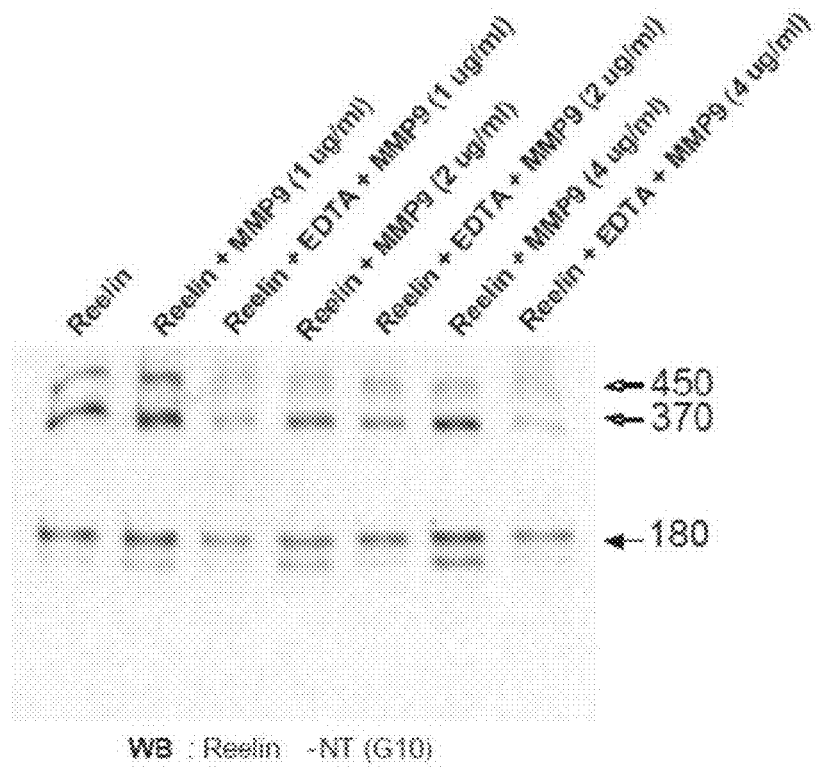
FIG. 24(A) is a blot showing MMP-9 modulates Reelin processing. The ability of MMP-9 (active; Calbiochem, PF140) to affect Reelin processing was determined by reacting Reelin (50 nM) with different concentrations of MMP-9 (1-4 ug/ml) in PBS at 37° C. for 3 hours. EDTA (10 mM) was included as a negative control, as it blocks MMP9 activity. Western blots were run on 1:10 of the reaction and probed with anti-Reelin (G-10).

Hippocampal neurons cultured had significantly fewer dendritic spines, a phenotype that can be rescued by addition of exogenous recombinant reelin to the culture. Reelin-treated HRM cells showed an increase in dendritic spine density after 21 days compared to age matched neurons from wild-type culture, as seen in FIG. 23(B). In contrast, mock (conditioned media from non-stably transfected cells) application showed no change in spine density, as seen in FIG. 23(C). The same experiment in Reelin knockout mice showed that Reelin application also rescued the dendritic spine density compared to mock controls, as seen in FIGS. 23(C) and 23(F). Both the reelin treated cells resembled the dendritic spine morphology seen in WT cells, as seen in FIG. 23(D), and when quantified, dendritic spines significantly increased in Reelin-treated HRM cultures compared to mock treated controls and are similar to spine density levels observed in wild-type cultures, as seen in FIG. 24(A).

Figure 25:
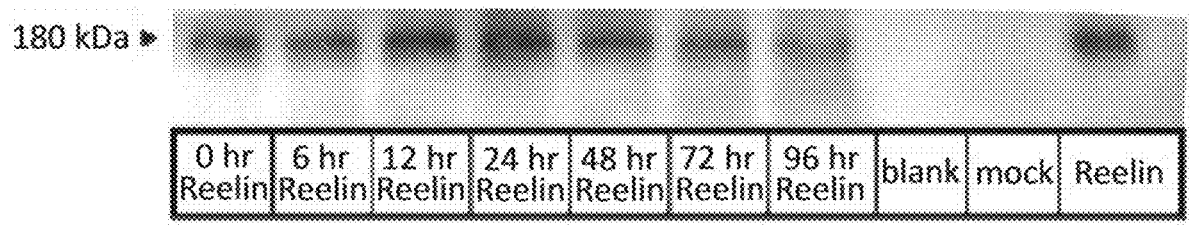
FIG. 25 is a blot showing Reelin effects on dendritic spine density. Reelin was applied chronically to primary hippocampal neuronal cultures to examine its effect on dendritic spine density. Reelin levels in culture were determined by a Western Blot. Samples were taken out of culture at 0, 6, 12, 24, 48, 72, and 96 hours to determine the levels of reelin degradation in vitro. The last column of reelin represents the native in the concentration administered to the culture. Reelin was present up until 96 hours after introduction to culture and degradation did not begin until 72 hours.

To verify that this application protocol represented a chronic application of reelin, and reelin was not being degraded or actively removed from the media, the inventors removed 15 µl of media from culture plates at times of 0, 6, 12, 24, 48, 72, and 96 hours following reelin application. Western analysis of these aliquots showed no degradation or reduction in Reelin, as seen in FIG. 25. Thus, the increase in spine density is due to reelin present at physiologic relevant levels for the entire 21-day application.

Example 7

Lipoprotein receptors have a role in cognitive processes and implicated this receptor family in the pathological processes. Two of the major ligands for these receptors, apoE and Reelin, appear to have signaling capabilities that can significantly impact synaptic function. Reelin heterozygotes show deficits in both synaptic plasticity and cognitive function. An approximate 50% reduction of Reelin expression results in deficits in both synaptic plasticity and cognitive function (Qiu, et al., Cognitive disruption and altered hippocampus synaptic function in Reelin haploinsufficient mice. Neurobiol Learn Mem. 2006; 85:228-242). Recent work has highlighted the importance of Reelin signaling in normal learning and memory (Weeber, et al. Reelin and ApoE receptors cooperate to enhance hippocampal synaptic plasticity and teaming, J Biol Chem 2002, 277:39944-39952), as well as pathological instances where this signaling is perturbed. APC is now a candidate modulator of Reelin signaling, as it appears to have the structural moieties to bind to ApoER2 and activate downstream effectors.

To confirm learning and cognitive effects of Reelin, mice were bilaterally infused with the lipoprotein antagonist RAP (receptor associated protein), which effectively blocks Reelin binding to its receptors.

Ten-week old C57Bl/6 mice (n=55, male) were housed under normal conditions (20° C., 50% relative humidity, and a 12-h light/dark cycle) and allowed water and food ad libitum. After normalizing to the environment, the mice were separated into groups, sham treatment (no injection) without shock, RAP injection with shock, sham treatment (no injection) with shock, and Reelin treatment with shock. Reelin treated animals consisted of a 2 µl injection with full-length recombinant, purified Reelin protein at a 5 nM concentration. 3 hours after treatment, contextual fear conditioning was performed. Necessary precautions were taken to reduce pain and suffering of animals throughout the study. All studies were performed by personnel blinded to the treatment condition. At time of treatment, the mice had a weight of 12-45 g.

For bilateral injection, Mice were anesthetised with isoflurane and placed on a stereotaxic surgery apparatus (Stoelting Co.). A sagittal incision was made mid-cranium, and the skin gently pushed back to enlarge the opening. Two holes were drilled through the skull to allow passage of the Hamilton needle through the brain, into the ventricles (AP−0.35 mm, L±0.75 mm, and V−2.5 mm from bregma). Mice were injected bilaterally with 0.5 µL mock control or Reelin to yield a 5 nm total hemisphere concentration of Reelin at a rate of 1 µL/min, as previously established (Weeber, et al., Reelin and ApoE receptors cooperate to enhance hippocampal synaptic plasticity and learning. J. Biol. Chem. 2002; 277:39944-39952; Rogers, et al., Reelin supplementation recovers sensorimotor gating, synaptic plasticity and associative learning deficits in the heterozygous reeler mouse. J. Psychopharmacol. 2013; 27:389-395). The needle was then removed, holes sealed with dental cement, and incisions were sutured. Mice were observed post-operatively for 2 h in individual cages on a warm heating pad. The rectal temperature was measured daily to monitor inflammatory or infectious responses; any mouse with a temperature of 100.5° F. or higher was euthanised via $CO_2$ inhalation. The animals were allowed to recover for 5 days. It was previously shown that this time course is optimal for behavioral examination post-intraventricular injection (Rogers, et al., Reelin supplementation enhances cognitive ability, synaptic plasticity, and dendritic spine density. Learn. Memory, 2011; 18:558-564; Rogers, et al., Reelin supplementation recovers sensorimotor gating, synaptic plasticity and associative learning deficits in the heterozygous reeler mouse. J. Psychopharmacol. 2013; 27:389-395).

Fear conditioning training was conducted in a square sound attenuation chamber (25×25 cm) with a wire grid flooring. In training, mice were placed in the chamber with background white noise and allowed to explore for 3 min before the conditioned stimulus was presented (90 dB tone) for 30 s. At 28 s, the unconditioned stimulus [a mild (0.5 mA) foot shock] was administered for a total of 2 s. After a period of 90 s, a second conditioned stimulus/unconditioned stimulus pairing was conducted, followed by another 90 s period, for a total of 7 min. Contextual fear conditioning was conducted 24 h after the training in the same chamber, with no tone, for 3 min, and freezing was assessed. Cued fear conditioning was conducted following the contextual trial, in which the chamber was altered by scent, lighting, and floor texture. The mice were placed into the altered chamber and given a 3 min habituation phase (no tone) followed by the 90 dB conditioned stimulus (tone) for the last 3 min of the test. Behavior was monitored via ANY-Maze software (Stoelting Co.). Freezing was assessed as immobility for at least 2 s.

Figure 26A:
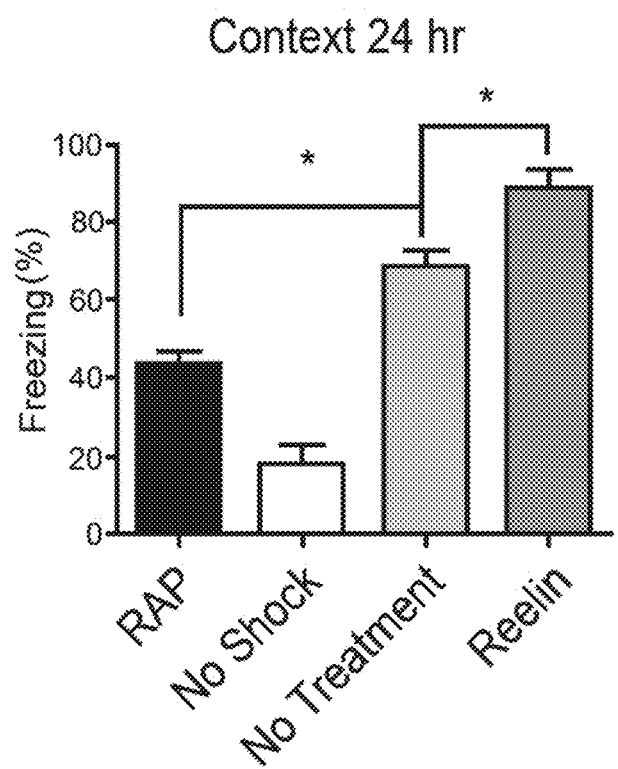
FIG. 26(A) is a graph showing Reelin supplementation can improve associative learning and spatial learning. Wild type Mice were given either 5 nM RAP or 5 nM Reelin by bilateral injection into the ventricles 3 hours prior to receiving fear conditioning. 24 hrs after training, mice were placed into the context and freezing measured. RAP was found to inhibit learning and memory while Reelin led to an enhancement (RAP n=9, no shock n=5, no treatment n=7, Reelin n=5; p>0.05).

The sham treated mice that did not receive training shock exhibited very little freezing, with only about 15% of the mice freezing upon hearing the tone. For mice without injections, but that received shock training, about 70% froze upon hearing the tone, which was exceeded only by Reelin-treated mice, which exhibited a 90% freeze rate, as seen in FIG. 26(A). By comparison, administration of RAP, which inhibits Reelin receptor binding, reduced response to the tone to only 45%, though the mice were shock-trained. Analysis showed there was a significant difference in response between non-treated, but shock-trained mice and RAP-treated mice.

The mice were also exposed to water maze testing. The hidden platform water maze was used to assess spatial learning and memory. A 10 cm diameter platform was submerged just below the surface in a 1.2 m diameter pool filled with opaque water, deep enough that mice could not touch the bottom. Large visual cues were positioned around the room. Mice were placed in the pool and allowed to swim for a maximum of 60 s to find the platform. Training consisted of five training days with four trials per day, separated by a 15 min intertrial interval. On days six and eight, the platform was removed and the ANY-Maze video-tracking software (Stoelting Co.) was used to track each mouse's swim pattern for 60 s (probe trials).

Figure 26B:
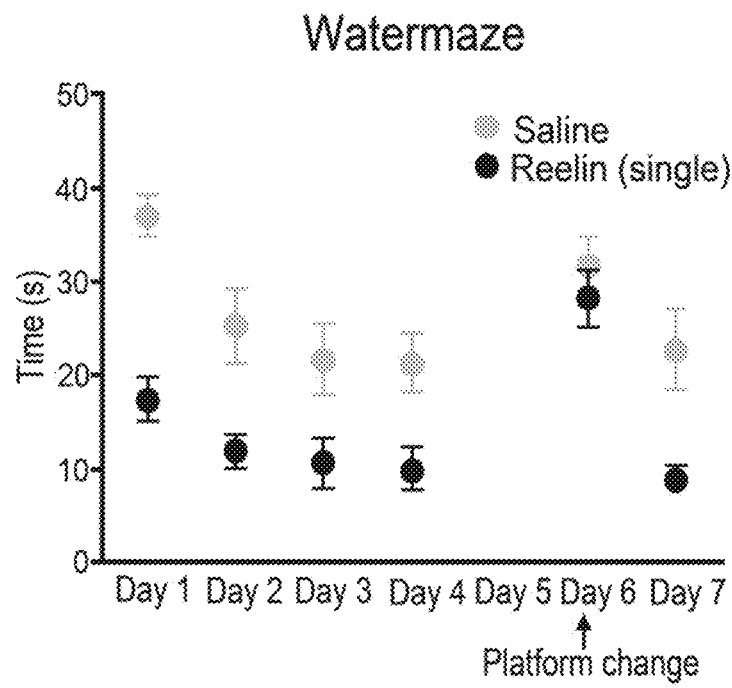
FIG. 26(B) is a graph showing Reelin supplementation can improve associative learning and spatial learning. Wild type mice were trained to find a hidden platform through the Morris Water maze. Mice were given a single injection of either 5 nM Reelin (red circle, n=4) or Vehicle (open circle, n=6). On day 5, a probe trial was given then the mice were trained to find a new platform location on day 6. Mice were given a single injection of either 5 nM Reelin (n=4) or Vehicle (n=6).
Figure 26C:
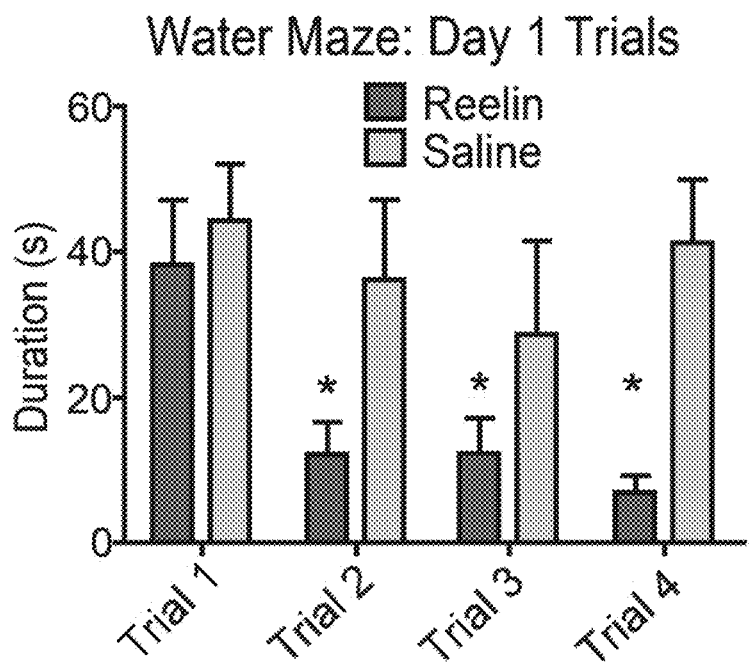
FIG. 26(C) is a graph showing Reelin supplementation can improve associative learning and spatial learning. Wild type mice were trained to find a hidden platform through the Morris Water maze. Mice were given a single injection of either 5 nM Reelin (red circle, n=4) or Vehicle (open circle, n=6). Examination of latencies from individual trials on day 1. (*=p>0.05). Mice were given a single injection of either 5 nM Reelin (n=4) or Vehicle (n=6).

A single injection of Reelin into the ventricles improved spatial learning in the hidden platform water maze, as seen in FIG. 26(B). Mice that were retrained to find a different platform location (opposite) on day 6 continued to show increased learning ability compared to saline injected mice. Mice receiving a single Reelin injection 5 days prior to training show a lower latency to find the platform on day one. The latency to find the platform is significantly reduced after a single exposure to the training paradigm, as seen in FIG. 26(C). Mice that were retrained to find a different platform location continued to show differences between reelin and saline injections. Swim speeds and all other measurements of activity between treated and non-treated animals remained the same. These data dramatically illustrate the ability of Reelin to modulate in vivo learning and memory formation and the importance of research aimed to identify the mechanisms controlling Reelin protein processing and how the fragments subsequently modulate cognitive function.

The functional tests showed that lower Reelin levels result in reduced associative learning. The effect of Reelin deficiency on synaptic function is compensated for when Reelin concentrations are enhanced. Direct bilateral ventricle infusion of recombinant Reelin fragment compliment 3 hours prior to associative tear conditioning training enhanced memory formation when tested 24 hours after training in 3-4 month-old wild-type mice, seen in FIGS. 26(A)-(C). These results demonstrate a requirement for Reelin for normal memory formation and raise the interesting question of whether increasing Reelin signaling can enhance memory.

The effect of the contextual fear conditioning on Reelin levels was then analyzed. Wild type mice were trained with a 3-shock, contextual fear conditioning protocol (CFC) as discussed above. Non-shocked mice (CS) were used as a negative control and shocked, context-exposed mice (CS/US) had their hippocampus removed at 1, 5, 15, 30, and 180 minutes after training, as well as 18 hours post-training=4, time point), and hippocampal homogenates analyzed using anti-Reelin (G10).

Figure 27A:
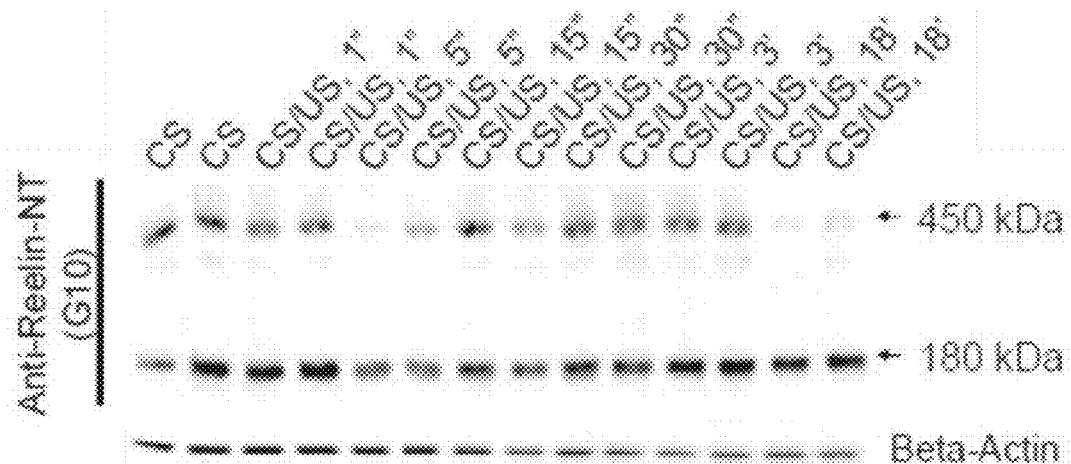
FIG. 27(A) is a blot showing contextual fear conditioning alters Reelin levels. Wild type mice were trained with a 3-shock, contextual tear conditioning protocol (CFC). Non-shocked mice (CS) were used as a negative control and shocked, context-exposed mice (CS/US) had their hippocampus removed at 1, 5, 15, 30, and 180 minutes after training, as well as 18 hours post-training (n=4, time point). Reelin was detected in hippocampal homogenates using anti-Reelin (G10).
Figure 27B:
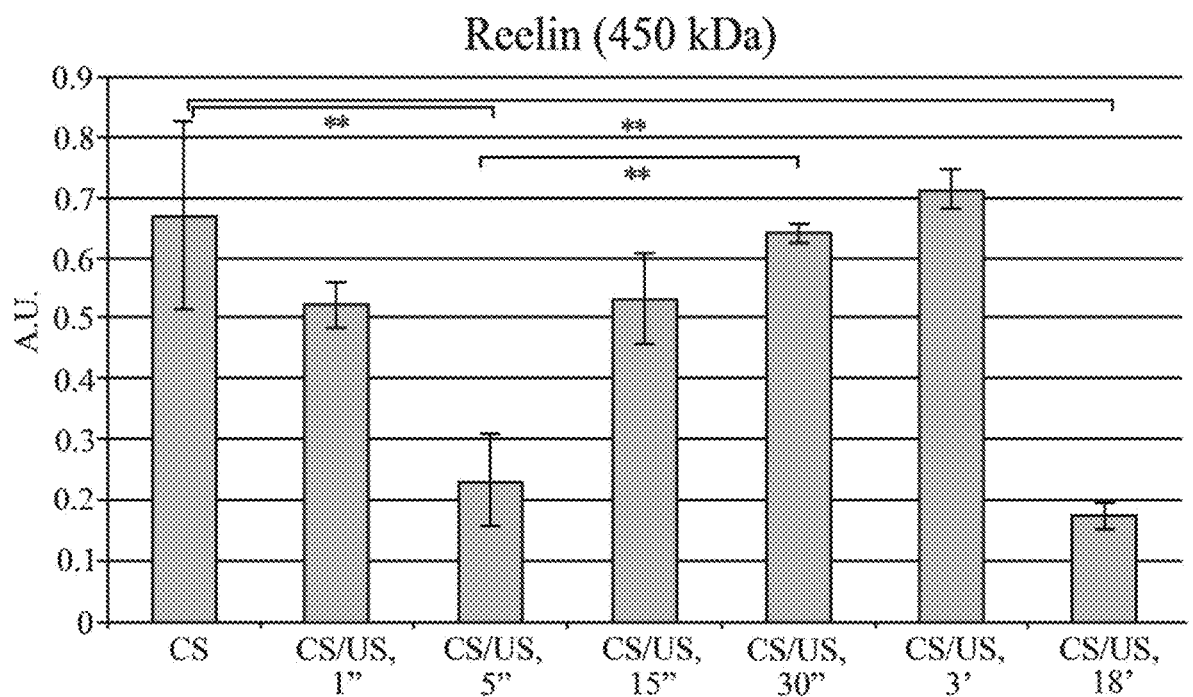
FIG. 27(B) is a graph showing contextual fear conditioning alters Reelin levels. Wild type mice were trained with a 3-shock, contextual fear conditioning protocol (CFC). Non-shocked mice (CS) were used as a negative control and shocked, context-exposed mice (CS/US) had their hippocampus removed at 1, 5, 15, 30, and 180 minutes after training, as well as 18 hours post-training (n=4, time point). Reelin levels of full-length Reelin were quantitated. The asterisks denote statistical significance following a two-tailed t-test, where p<0.5.

Fear conditioned learning produces a dramatic change in Reelin expression and fragment complement over the 18 hours following contextual fear conditioning, particularly in the 450 and 180 kDa fragments, as seen in FIGS. 27(A) & (B). Moreover, theta burst stimulation delivered to the Schaffer collateral pathway led to significant increases in Reelin expression and fragment cleavage at 15 minutes post-stimulation, as seen in FIGS. 27 (A) & (B). These results show that integration and control of Reelin signaling responsible for alterations in synaptic plasticity and modulation of learning and memory involves the processing of Reelin into functionally-distinct fragments.

Example 8

Reelin signaling is involved in a variety of physiologic changes to the excitatory synapse, as well as normal mammalian cognitive function. Recent work has highlighted the importance of Reelin signaling in normal learning and memory (Weeber, et al. Reelin and ApoE receptors cooperate to enhance hippocampal synaptic plasticity and learning. *J Biol. Chem* 2002, 277:39944-39952), as well as pathological instances where this signaling is perturbed. APC is now a candidate modulator of Reelin signaling, as it appears to have the structural moieties to bind to ApoER2 and activate downstream effectors.

Lipoprotein receptors have a role in cognitive processes and implicated this receptor family in the pathological processes that underlie the progression of Alzheimer's disease (AD). Two of the major ligands for these receptors, apoE and Reelin, appear to have signaling capabilities that can significantly impact synaptic function, directly interact with APP and modulate its metabolism, and are sensitive to Aβ accumulation. Aβ accumulation disrupts lipoprotein receptor signaling, resulting in concomitant disruption of cognitive function. Furthermore, interference of Reelin and/or lipoprotein receptor signaling results in aberrant APP metabolism and Aβ clearance that in turn exacerbates Aβ accumulation and plaque deposition. Therefore, increased Reelin signaling through direct Reelin protein application, or by DNA gene therapy or RNA constructs, or usage of other lipoprotein receptor agonists can be used to mitigate Aβ-dependent cognitive disruption and progression of plaque pathology.

Support for the role of Reelin proteolysis in human disease has been found in both neuropsychiatric and neurodegenerative disorders. For example, the N-R2 fragment is increased in AD and frontotemporal dementia patients when compared to non-demented patients (Sáez-Valero, et al., Altered levels of cerebrospinal fluid reelin in frontotemporal dementia and Alzheimer's disease. J. Neurosci. Res. 2003; 72:132-136; Botella-López, et al. Reelin expression and glycosylation patterns are altered in Alzheimer's disease. Proc. Natl. Acad. Sci, USA. 2006; 103:5573-5578). In patients with confirmed diagnosis for depression and bipolar disorder, the N-R2 fragment is found to be decreased in blood samples, while for schizophrenia patients the N-R6 fragment is increased (Fatemi, et al., Altered levels of Reelin and its isoforms in schizophrenia and mood disorders. Neuroreport 2001; 12:3209-3215). Reelin may also play a role in seizure control: epilepsy models have altered Reelin processing (Tinnes, et al., Epileptiform activity interferes with proteolytic processing of Reelin required for dentate granule cell positioning. FASEBJ. 2011; 25:1002-1013; Tinnes, et al., TIMP-1 inhibits the proteolytic processing of Reelin in experimental epilepsy. FASEBJ. 2013; 27:2542-2552; Kaneko, et al., Kainic acid-induced golgi complex fragmentation/dispersal shifts the proteolysis of reelin in primary rat neuronal cells: an in vitro model of early stage epilepsy. Mol. Neurobiol. 2016; 53:1874-1883), which may be MMP-dependent. These differences in Reelin fragment levels point to an importance in Reelin levels and proteolytic dysfunction in disease states.

Figure 28A:
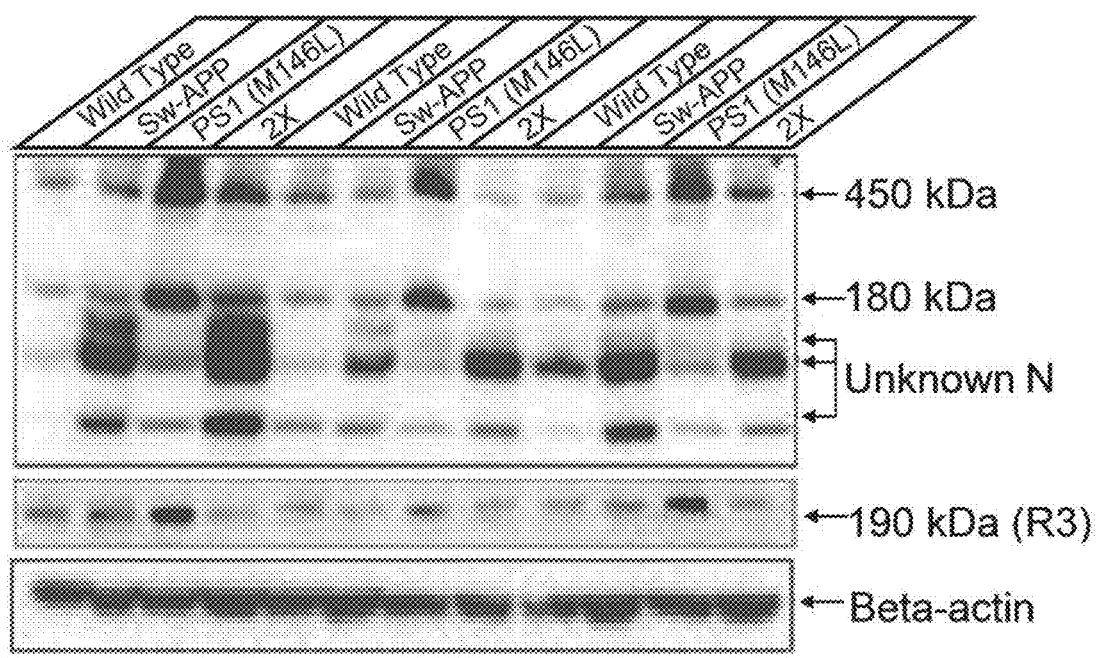
FIG. 28(A) is a blot showing Reelin signaling is altered in AD mouse models. Western blots of isolated cortices from 14-month old wild type, Tg2576 (SweAPP), PS1-FAD (M146L), and 2× (SweAPP×M146L) were subjected to analysis (n=4). No significant differences were detected in Reelin 450, 190 and 180 kDa products in Tg2576 versus wild type, but unidentified N-terminal species recognized by G10 were significantly elevated in Tg2576 and 2× mice. In contrast. Reelin 450 and 180 kDa products were significantly elevated in PS1-FAD and 2× mice (p<0.05).
Figure 28B:
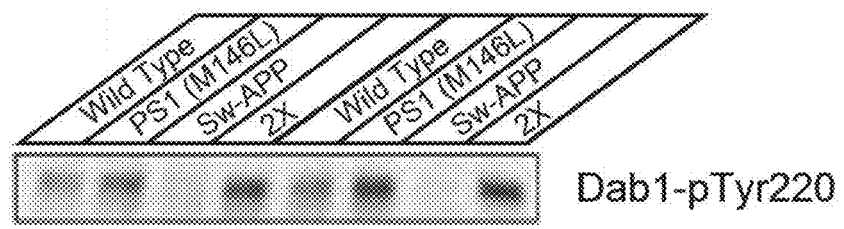
FIG. 28(B) is a blot showing Reelin signaling is altered in AD mouse models. Western blots of isolated cortices from 14-month old wild type, PS1-FAD (M146L), and 2× (Swe-APP×M146L) were subjected to analysis (n=4). There were significant reductions in Dab1-pTyr220 in Tg2576 mice, and significant elevations in both PS1-FAD and 2× mice.

Testing of Reelin indicates that Reelin metabolism is altered in three mouse models for AD (PS1-FAD, SweAP-PxPS1, and Tg2576). Fourteen-month old wild type (unaltered littermates), Tg2576 (SweAPP), PS1-FAD (M146L), and 2× (SweAPPxM1461) were housed under normal conditions (20° C., 50% relative humidity, and a 12-h light/dark cycle) and allowed water and food ad libitum. After normalizing to the environment, the cotices of the mice were removed and lysates run on Western blots for different Reelin fragments. Reelin metabolism is altered in three mouse models for AD (PS1-FAD, SweAPPxPS1, and Tg2576), as seen in FIG. 28(A). No significant differences were detected in Reelin 450, 190 and 180 kDa products in Tg2576 versus wild type, but unidentified N-terminal species recognized by G10 were significantly elevated in Tg2576 and 2× mice. By contrast, Reelin 450 and 180 kDa products were significantly elevated in PS1-FAD and 2× mice. These changes in Reelin fragment complement appear to be correlated with alterations in downstream Reelin signaling. Testing of the cortices for phosphorylation of the major downstream component, Dab-1, showed increased DAB-1 phosphorylation in the SweAPPXPS1 and PS1-FAD, and significantly decreased in the single SweAPP (Tg2576) mouse, as seen in FIG. 28(B). These data suggest that Reelin metabolism is particularly sensitive to changes in APP processing and/or Aβ accumulation.

The alterations in Reelin fragment compositions and Dab-1 phosphorylation in the Tg2576 mice may represent a compromised Reelin signaling system, a phenomenon that if true could be responsible for the synaptic plasticity deficits reported in these mice (Mitchell, et al., X11 beta rescues memory and long-term potentiation deficits in Alzheimer's disease APPswe Tg2576 mice. *Hum Mol Genet.* 2009; 18:4492-4500; Kotilinek, et al., Cyclooxygenase-2 inhibition improves amyloid-beta-mediated suppression of memory and synaptic plasticity. *Brain.* 2008; 131:651-664; Jacobsen, et al., Early-onset behavioral and synaptic deficits in a mouse model of Alzheimer's disease. *Proc Natl Acad USA.* 2006; 103:5161-5166).

Figure 28C:
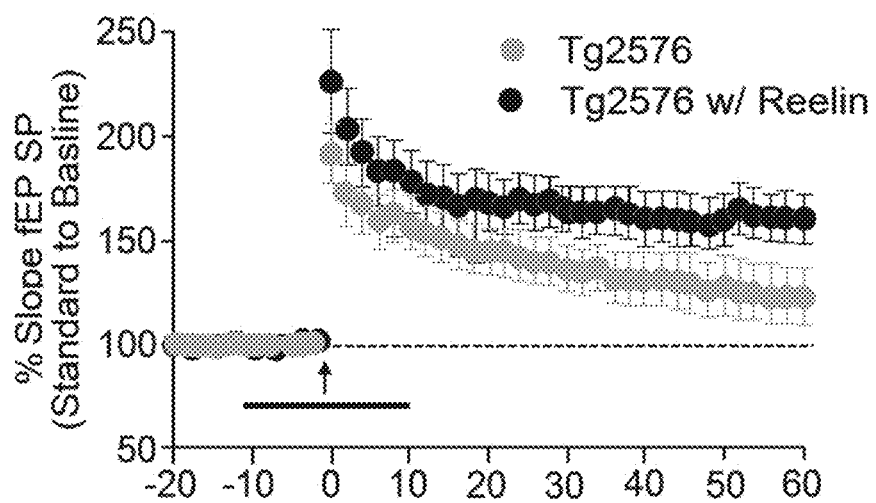
FIG. 28(C) is a graph showing Reelin signaling is altered in AD mouse models. Application of Reelin (5 nM) prior to stimulation was able to rescue deficits in HFS-stimulated LTP in area CA1 of Tg2576 mice.
Figure 29A:
FIG. 29(A) is an image showing Reelin signaling is altered in AD mouse models. The 3-epitope strategy for mapping Reelin processing in vivo was employed on 14-month old Tg2576 horizontal sections. Reelin-CT (G20) detected Reelin fragments containing R7-8, sequestered at the core of a dense-core plaque detected with 6E10 (anti-Aβ).
Figure 29B:
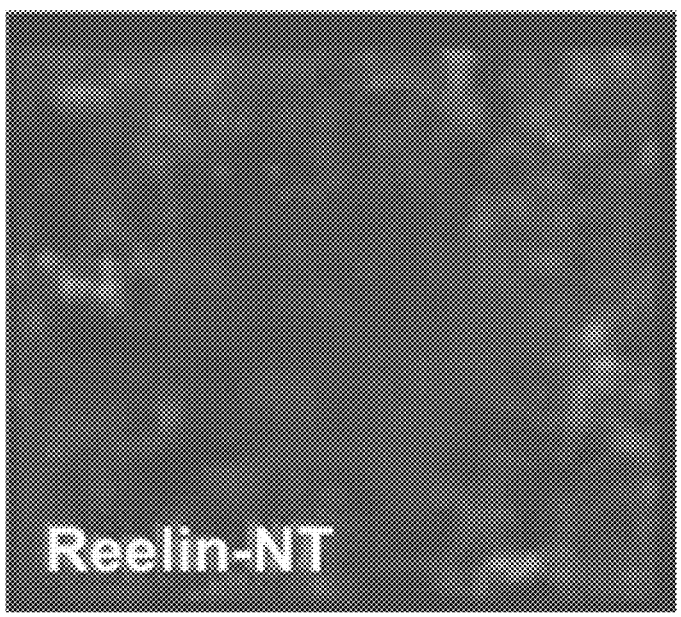
FIG. 29(B) is an image showing Reelin signaling is altered in AD mouse models. The 3-epitope strategy for mapping Reelin processing in vivo was employed on 14-month old Tg2576 horizontal sections. Reelin-NT detected Reelin fragments containing N-R2, sequestered at the core of a dense-core plaque detected with 6E10 (anti-Aβ).
Figure 29C:
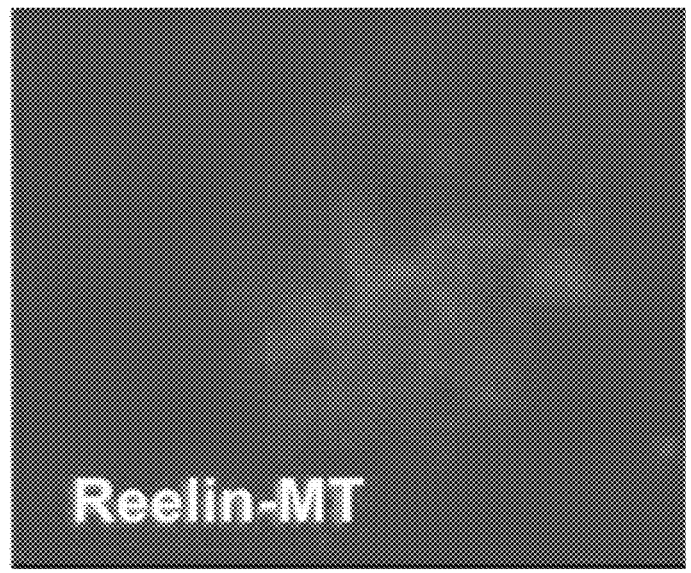
FIG. 29(C) is an image showing Reelin signaling is altered in AD mouse models. The 3-epitope strategy for mapping Reelin processing in vivo was employed on 14-month old Tg2576 horizontal sections. Reelin-MT (AF3820) detected Reelin fragments containing R3-6, sequestered at the core of a dense-core plaque detected with 6E10 (anti-Aβ).
Figure 29D:
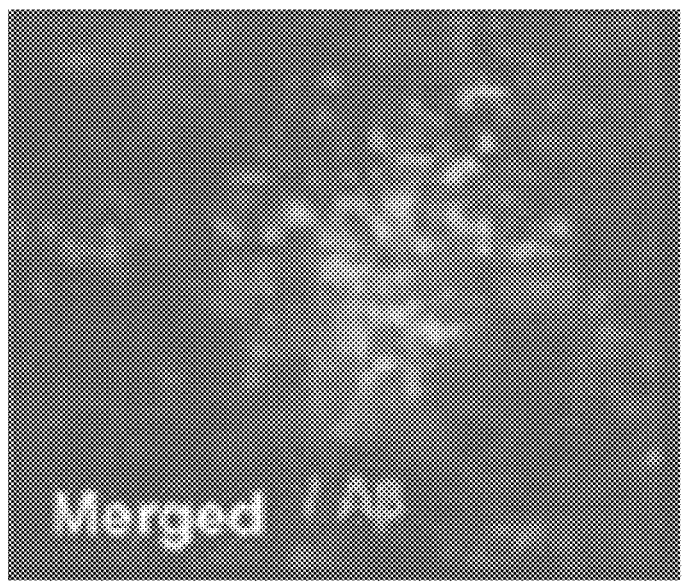
FIG. 29(D) is an image showing Reelin signaling is altered in AD mouse models. The immunofluorescence image of the 14-month old. Tg2576 horizontal sections for Reelin-CT (G20) and -MT (AF3820) were combined sequestered at the core of a dense-core plaque detected with 6E10 (anti-Aβ).
Figure 29E:
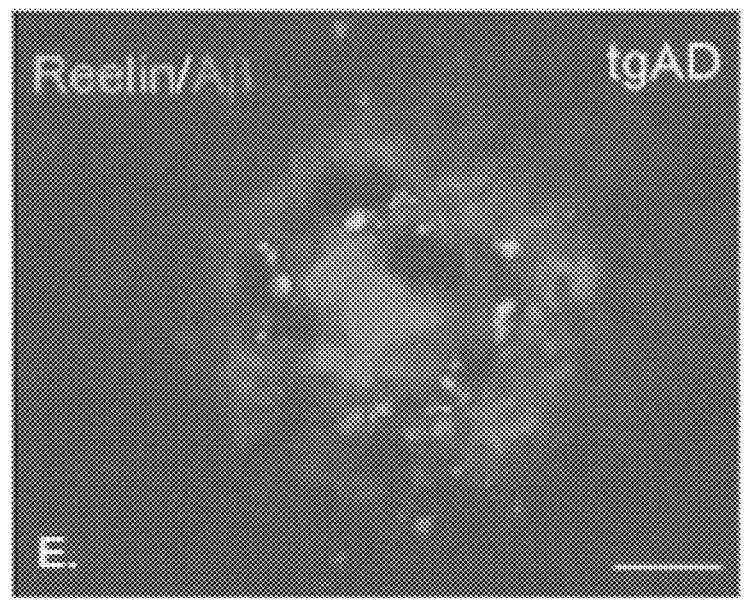
FIG. 29(E) is an image showing Reelin signaling is altered in AD mouse models. The immunofluorescence image of the 14-month old Tg2576, magnified, shows Reelin-NT fragments (N-R2) surrounded the plaque core in the tg2576 mouse model. Scale bar=15 μm.
Figure 30:
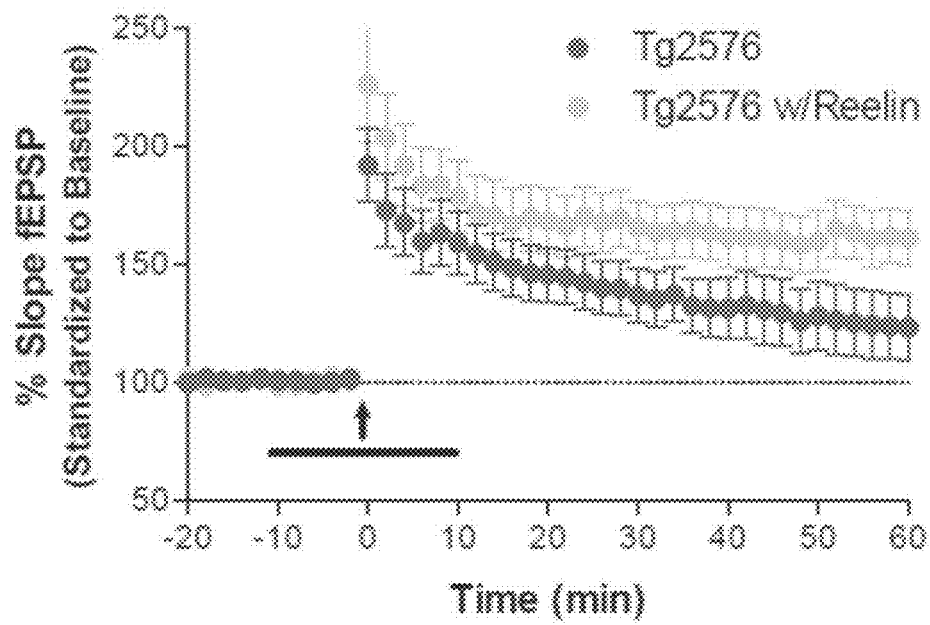
FIG. 30 LTP induction using a standard 2-train, 100 Hz HFS was given to hippocampal slices from 12 month-old Tg2576 mice. A set of slices were perfused with 5 nM reelin. Reelin treated slices showed an increase of LTP induction to that of wild-type levels.

To determine th effect of exogenous Reelin, acute hippocampal slices from 8 month-old Tg2576 mice were perfused with 5 nM recombinant Reelin fragment complement R3-6. Reelin fragment application rescued the LTP defect in aged Tg2576 mice, as seen in FIG. 28(C), suggesting that the biochemical and structural machinery involved in Reelin signaling downstream of Reelin protein processing is intact in these mice. Furthermore, it is important to note that normal levels of synaptic plasticity are obtainable in this mouse model. Reelin fragments are also associated with dense core plaques in aged (15 month-old) Tg2576 mice, as seen in FIGS. 29(A)-(D). Moreover, reelin and related lipoprotein receptor agonists can rescue deficits in synaptic plasticity and cognitive function that result from Aβ accumulation and/or plaque pathology. Reelin rescued the LTP deficit in 12 month-old mice modeled for AD (Tg2576), as seen in FIG. 30.

These data are supported by findings that Reelin associated with Aβ-containing plaques detected in the hippocampus of aged wild-type mice (Madhusudan, et al., Accumulation of reelin-positive plaques is accompanied by a decline in basal forebrain projection neurons during normal aging. *Eur Neurosci.* 2009; 30:1064-1076; Knuesel, et al., Age-related accumulation of Reelin in amyloidlike deposits. *Neurobiol Aging.* 2009; 30:697-716). In light of the established role for Reelin in synaptic function, changes in the integrity of Reelin metabolism and signaling plays a profound role in the learning and memory changes previously established in AD mouse models.

Surprisingly, a single exogenous Reelin application enhances learning and memory for at least eleven days in adult wild-type mice. The role of lipoprotein receptors in Aβ clearance, and the identification of Reelin association to Aβ plaques in an AD mouse model, evidences the value of focusing on Reelin as a therapeutic target in the etiology and pathogenesis of AD as an AD therapeutic intervention aimed toward removal of Aβ and improvement of cognitive function.

Therefore, increased Reelin signaling through direct Reelin protein application, or by DNA gene therapy or RNA constructs, or usage of other lipoprotein receptor agonists can be used to mitigate Aβ-dependent cognitive disruption and progression of plaque pathology.

Example 9

Traumatic brain injury (TBI) can result from various origins, such as seizures, head trauma, status epilepticus (SE), and ischemia, (Shetty & Hattiangady, Prospects of Stem Cell therapy for Temporal Lobe Epilepsy, Stem Cells, 2007; 25:2396-2407; Ogawa, et al., ischemia-induced neuronal cell death and stress response. 2007; 9:573-587; Acharya, et al., Progress in neuroprotective strategies for preventing epilepsy. Prog Neurobiol. 2008:363-404; Pitkänen, et al., From traumatic brain injury to posttraumatic epilepsy: what animal models tell us about the process and treatment options. Epilepsia. 2009; 50 (Suppl 2):21-9). During the acute phase of the injury, neural stem cells (NSCs) located in the subgranular zone (SGZ) increase neurogenesis in an attempt to heal the damage (Parent, et al., Dentate granule cell neurogenesis is increased by seizures and contributes to aberrant network reorganization in the adult rat hippocampus. J Neurosci. 1997; 17:3727-3738; Hatnangady, et al., Chronic temporal lobe epilepsy is associated with severely declined dentate neurogenesis in the adult hippocampus. Neurobiol Dis. 2004; 17:473-490; Shetty, et al., Hippocampal neurotrophin levels in a kainate model of temporal lobe epilepsy: a lack of correlation between brain-derived neurotrophic factor content and progression of aberrant dentate mossy fiber sprouting. J Neurochem. 2003; 87:147-159; Hattiangady, et al., Brain-derived neurotrophic factor, phosphorylated cyclic AMP response element binding protein and neuropeptide Y decline as early as middle age in the dentate gyms and CA1 and CA3 subfields of the hippocampus. Exp Neurol. 2005; 195:353-371). However, the physiological responses to these injuries fail to improve functional recovery, and result in learning deficits and memory and mood dysfunction (Jorge R E, Acion L, Starkstein S E, Magnolia V. Hippocampal volume and mood disorders after traumatic brain injury. Biol Psychiatry. 2007; 62:332-338; Potvin, et al., Performance on spatial working memory tasks after dorsal or ventral hippocampal lesions and adjacent damage to the subiculum. Behav Neurosci. 2006; 120:413-422). Many of the chronic problems from TBI is caused by poor neuronal differentiation of NSCs, improper migration or differentiation of neuronal cells from the NSCs, and poor or improper synaptogenesis on basal dendrites projecting from the neuronal cells (Sanchez, et al., Synaptic connections of hilar basal dendrites of dentate granule cells in a neonatal hypoxia model of epilepsy. Epilepsia. 2012; 53 (Suppl 1):98-108).

To test the effects of administration of Reelin with respect to traumatic brain injury (TBI), a battery of motor behavioral tests, EBST, forelimb akinesia, and paw-grasp tests were conducted.

Ten-week old C57Bl/6 mice (n=55, male) were housed under normal conditions (20° C., 50% relative humidity, and a 12-h light/dark cycle) and allowed water and food ad libitum. After normalizing to the environment, the mice were subjected to TBI using a controlled cortical impactor (CCI; Pittsburgh Precision Instruments, Inc, Pittsburgh, PA). Experimental procedures were approved by an animal care and use committee. The mice were separated into groups, sham treatment (no TBI) without injection, TBI without injection, TBI with mock treatment of saline group, and TBI with Reelin. Reelin treated animals consisted of a 2 ul injection with full-length recombinant, purified Reelin protein at a 5 nM concentration. Sham-treated animals were anesthetized, and underwent the surgical procedure but did not undergo cortical impact. All behavioral testing was done during the light cycle at the same time across testing days. Necessary precautions were taken to reduce pain and suffering of animals throughout the study. All studies were performed by personnel blinded to the treatment condition. At time of treatment, the mice had a weight of 12-45 g.

Deep anesthesia was achieved using 1-2% isoflurane in nitrous oxide/oxygen (69/30%) using a nose mask. All animals were fixed in a stereotaxic frame (David Kopf Instruments, Tujunga, CA, USA). TBI injury surgeries consisted of animals subjected to scalp incision to expose the skull, and craniectomy. An electric drill was used to perform the craniectomy of about 2.5 mm radius with coordinates calculated from +0.2 anterior and −0.2 mm lateral right from bregma (Paxinos & Watson, (2005) The mouse brain in stereotaxic coordinates. 5th ed. San Diego, CA: Academic Press). After craniotomy the brain was impacted at the fronto-parietal cortex with a velocity of 6.0 m/s reaching a depth of 1.0 mm below the dura matter layer and remained in the brain for 150 milliseconds (ms). The impactor rod was angled 15° vertically to maintain a perpendicular position in reference to the tangential plane of the brain curvature at the impact surface.

A linear variable displacement transducer (Macrosensors, Pennsauken NJ), which was connected to the impactor, measured the velocity and duration to verify consistency. The analgesic ketoprofen (5 mg kg-1) was administered postoperatively. Mice were kept under close supervision.

Elevated body swing test (EBST) involved handling the animal by its tail and recording the direction of the swings (Borlongan & Sanberg, (1995) Elevated body swing test: a new behavioral parameter for mice with 6-hydroxydopamine-induced hemiparkinsonism. The Journal of neuroscience 15: 5372-5378). The test apparatus consisted of a clear Plexiglas box (40×40×35.5 cm). The animal was gently picked up at the base of the tail, and elevated by the tail until the animal's nose is at a height of 2 inches (5 cm) above the surface. The direction of the swing, either left or right, was counted once the animals head moves sideways approximately 10 degrees from the midline position of the body. After a single swing, the animal was placed back in the Plexiglas box and allowed to move freely for 30 seconds prior to retesting. These steps were repeated 20 times for each animal. Normally, intact mice display a 50% swing bias, that is, the same number of swings to the left and to the right. A 75% swing bias towards one direction was used as criterion of TBI motor deficit.

Forelimb akinesia was tested before and after TBI surgery, young and aged mice from sham control, TBI—without injection, TBI—with mock injection, or TBI with Reelin (Borlongan C V, Hida H, Nishino H (1998) Early assessment of motor dysfunctions aids in successful occlusion of the middle cerebral artery. Neuroreport 9:3615-3621). Ipsilateral and contralateral forepaw strength and motility were scored by two experimentally blinded evaluators using the following forelimb akinesia scale. the naive, sham-lesioned, or hemiparkinsonian mouse was placed individually in an upright Plexiglas cylinder (20 cm in diameter, 30 cm high) and video recorded for 5-15 min while it explored and touched the glass with its forepaws. Forepaw contacts were noted by two experimentally blinded evaluators and later calculated as (no. of right contacts/no. of total contacts). A value of 50% was characterized as normal and score a 1, an animal that touched 80% with its right (ipsilateral) forepaw was considered impaired and scored 2, whereas an animal that touched 90% or more with its right (ipsilateral) forepaw was considered severely impaired and scored 3. Scores were tallied for each individual animal, and then mean scores for treatment groups were used for analyses.

Paw grip involved testing grip strength before and after TBI surgery. An abnormal grip is indicative of impaired neuromuscular function. In this test, mice were held by their bodies against a pole (Ibrahim A G, Raisman G, Li Y (2009) Permanent loss of fore-paw grasping requires complete deprivation of afferent input from a minimum of four dorsal roots of the rmouse brachial plexus. Exp Neurol 215:142-145). Both ipsilateral and contralateral paw grip strength were scored by two experimentally masked evaluators using the following grip strength scale. In a scale of 1 to 3, 1 is normal, 2 is impaired, and 3 is severely impaired. Scores were tallied for each individual animal, and then mean scores for treatment groups were used for analyses.

Repeated measures of ANOVA and post hoc Bonferroni's t-tests for each time point were used to evaluate statistical differences between treatment groups. Differences were considered significant at $p<0.05$. All values are expressed as mean±SEM.

Figure 31:
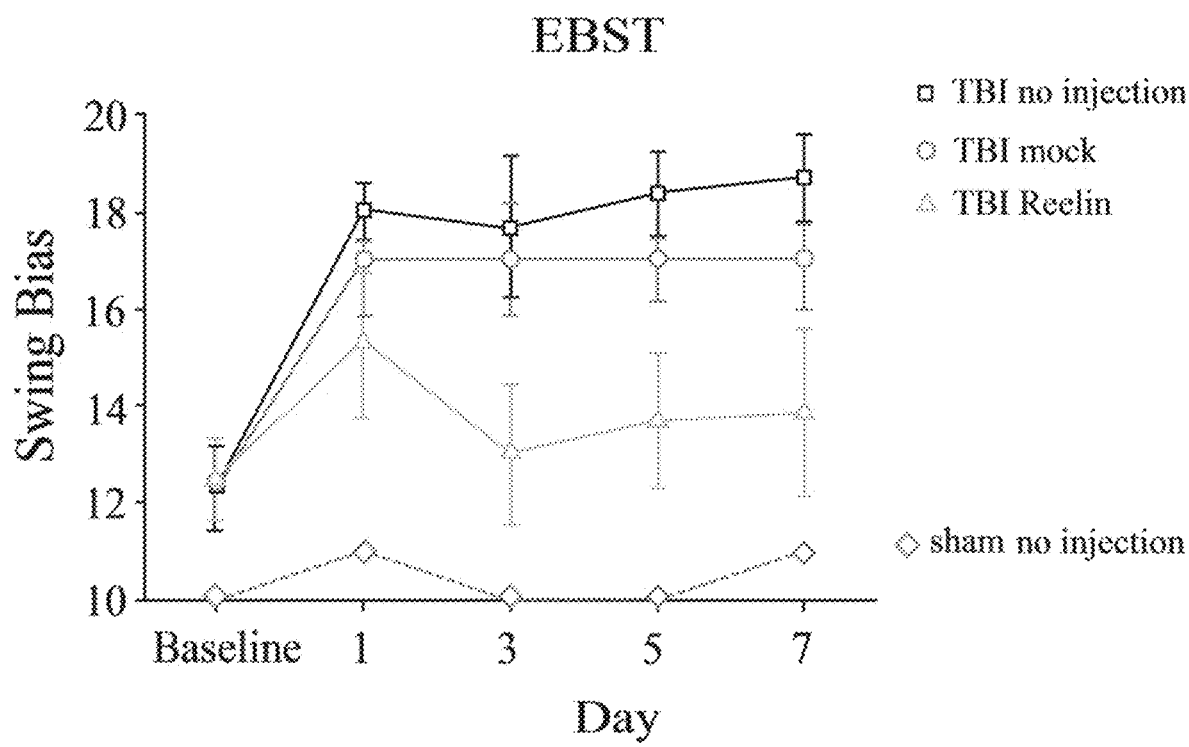
FIG. 31 is a graph showing treatment with Reelin exerts functional recovery in chronic TBI. Elevated body swing tests indicating swing bias for baseline after traumatic brain injury with cortical impactor, which was mitigated with Reelin.
Figure 32:
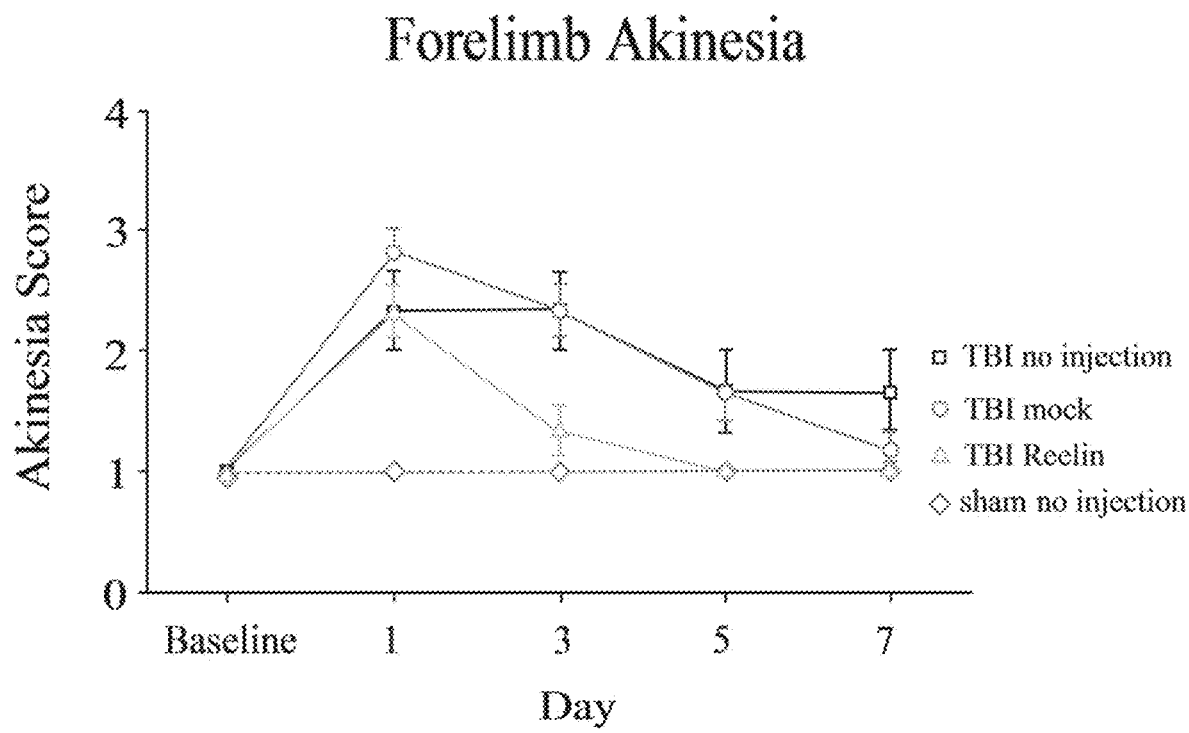
FIG. 32 is a graph showing treatment with Reelin exerts functional recovery in chronic TBI. Limb akinesia indicating loss of voluntary limbs for baseline after traumatic brain injury with cortical impactor, which was mitigated with Reelin.
Figure 33:
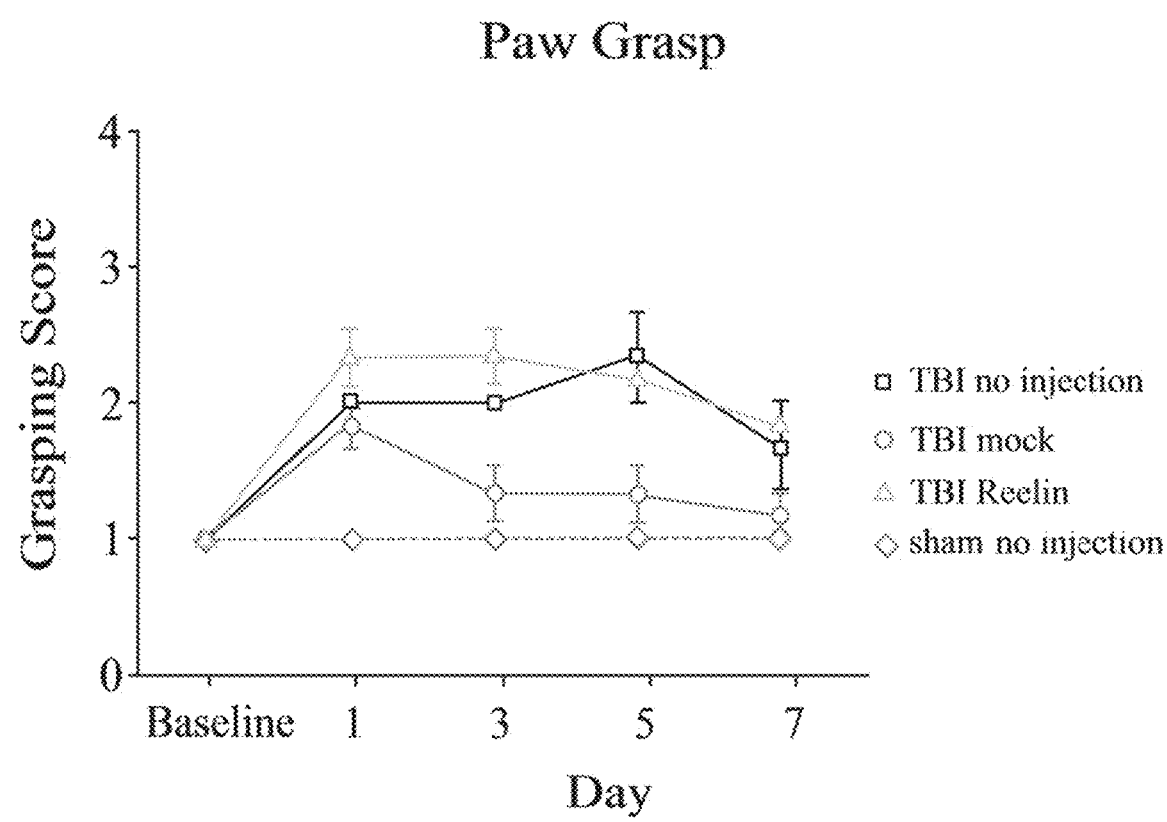
FIG. 33 is a graph showing treatment with Reelin exerts functional recovery in chronic TBI. Paw grip indicating loss of limb strength for baseline after traumatic brain injury with cortical impactor.

Treatment with Reelin displayed improved behavioral recovery in TBI animals. Reelin-treated mice displayed slight swing bias at day 1, which resolved by day 2, as seen in FIG. 31. By comparison, mice treated with TBI and injected with vehicle or without injection displayed higher swing bias throughout the testing. Thus, treatment resulted in recovery diverging at day 2, with Reelin-treated mice improving while vehicle and non-injected mice showing little improvement. Reelin treatment also resulted in improvements to limb akinesia by day 3, as seen in FIG. 32. By day 5, Reelin-treated mice displayed similar limb akinesia to sham-treated animals, whereas TBI-treated mice administered vehicle or not injected continued to show akinesia. Paw grip showed steady improvement in Reelin-treated mice, as seen in FIG. 33.

Chronic loss of lifestly in traumatic brain injury is partly due to improper neuronal cell replacement during healing. Reelin has been found to protect of a subclass of GABA-ergic interneurons, which are neurons expressing an extracellular glycoprotein reelin, in the DG (Shelly, Hippocampal injury Induced Cognitive and Mood Dysfunction, Altered Neurogenesis and Epilepsy: Can Early Neural Stem Cell Grafting Intervention Provide Protection? Epilepsy Behav. 2014 September; 38:117-24). These GABA-ergic interneurons assist in migration of neuronal cells formed from NCSs into the granule cell layer (Gong, et al., Reelin regulates neuronal progenitor migration in intact and epileptic hippocampus. J Neurosci. 2007; 27:1803-1811). Without being bound to any specific theory, the administration of Reelin or Reelin fragments can operate through dendrite formation, retention of GABA-ergic interneurons, or a combination of pathways.

Example 10

Dendritic spines are small protrusions that cover the surface of dendrites and bear the postsynaptic structures that form excitatory synapses. Abnormal shapes or reduced numbers of dendritic spines are found in a number of cognitive diseases, such as Fragile X syndrome, William's syndrome, Rett syndrome, Down's syndrome, Angelman syndrome and autism. A reduction in the number of dendritic spines suggests that a constitutive level of Reelin/lipoprotein receptor-mediated signaling is required for development of dendritic structures, which are crucial for intensive information processing by the neurons. This notion is in agreement with studies showing that heterozygote reeler mice (HRM) exhibit reduced dendritic spine densities and impaired performance in certain learning and memory behaviors. Furthermore, reelin supplementation recovers the spine density defects and associated cognitive disruption. In addition, reelin signal transduction initiates pathways involved in CREB activation, which is essential for early memory gene transcription. This is a common pathway that is disrupted in the above mentioned human cognitive disorders.

Example 11

Recently it was shown that the processing of Reelin by metalloproteinase(s) is essential for normal cortical plate formation (Jossin, et al., Reelin signals through phosphatidylinositol 3-kinase and Akt to control cortical development and through mTor to regulate dendritic growth. Mol Cell Biol. 2007; 27:7113-7124), though the specific enzyme responsible remains as yet unknown. This discovery suggests that metalloproteinase-mediated Reelin processing may be important for directed Reelin signaling in the adult brain as well. Both tPA and MMP-9 are candidate metalloproteinases with clearly demonstrated roles in regulating synaptic plasticity and cognitive function (Bozdagi, et al., In vivo roles for matrix metalloproteinase-9 in mature hippocampal synaptic physiology and plasticity. J Neurophysiol. 2007; 98:334-344; Nagy, et al., Matrix metalloproteinase-9 is required for hippocampal late-phase long-term potentiation and memory. J Neurosci. 2006; 26:1923-1934; Huang, et al., Mice lacking the gene encoding tissue-type plasminogen activator show a selective interference with late-phase longterm potentiation in both Schaffer collateral and mossy fiber pathways. Proc Natl Acad Sci USA. 1996; 93:8699-8704; Pang, P. T., and B. Lu. 2004. Regulation of late-phase LTP and long-term memory in normal and aging hippocampus: role of secreted proteins WA and BDNF. Ageing Res Rev 3:407-430; Zhuo, M., D. M. Holtzman, Y. Li, H. Osaka, J. DeMaro, M. Jacquin, and G. Bu. 2000. Role of tissue plasminogen activator receptor LRP in hippocampal long-term potentiation. J Neurosci 20:542-549; Baranes, et al., Tissue plasminogen activator contributes to the late phase of LTP and to synaptic growth in the hippocampal mossy fiber pathway. Neuron. 1998; 21:813-825).

The efficacy of generating the 370 kDa product to be partially dependent on a candidate Reelin-cleaving enzyme, tPA. This potential mechanism of regulation has profound implications on how this signaling system is integrated into known mechanisms of neuronal regulation and coordinated to participate in physiological processes such as learning and memory. However, Reelin is cleaved at specific sites resulting in a stable pattern of Reelin fragments easily quantified by Western blot analysis. These fragments represent potential signaling molecules with properties unique from full-length Reelin. Recombinant Reelin purified from stably transfected HEK293 cells contains fragments of the same size as the major fragments found in the hippocampus.

Moreover, all that is known regarding Reelin localization in the adult brain has been generated using an antibody that recognizes the N-R2 region. The N-R2 region is present in the full-length (N-R8), N-R2 and N-R6 fragments of Reelin, but not in the other major fragments. Therefore, the 3-epitope mapping approach, as seen in Table 3, afforded unprecedented spatial resolution to monitor changes in Reelin product production and localization.

TABLE 3

Antibodies employed in the 3-epitope approach with properties, source identification and epitope site recognition.

| Antibody | Recognition Site | Animal Source | Commercial Source |
| --- | --- | --- | --- |
| G10 | 164-496 | Ms, mAb | Chemicon, MAB5364 |
| G20 | C-terminus | Gt, pAb | SCBT, sc-7741 |
| CR-50 | 420-450 | Ms, mAb | MBL, D223-3 |
| H-221 | 3239-3460 | Rb, pAb | SCBT, sc-5578 |
| AF3820 | 1221-2661 | Gt, pAb | R&D, AF3820 |
| R4B | 1810-1825 | Ms, mAb | Jossen, et al., 2007 |
| R5A | 1985-2058 | Ms, mAb | Jossen, et al., 2007 |
| Ab12 | 3260-3428 | Ms, mAb | de Berkgeyek, et al., 1998 |
| Ab14 | 3260-3428 | Ms, mAb | de Berkgeyek, et al., 1998 |
| Ab17 | 3260-3428 | Ms, mAb | de Berkgeyek, et al., 1998 |

Figure 34:
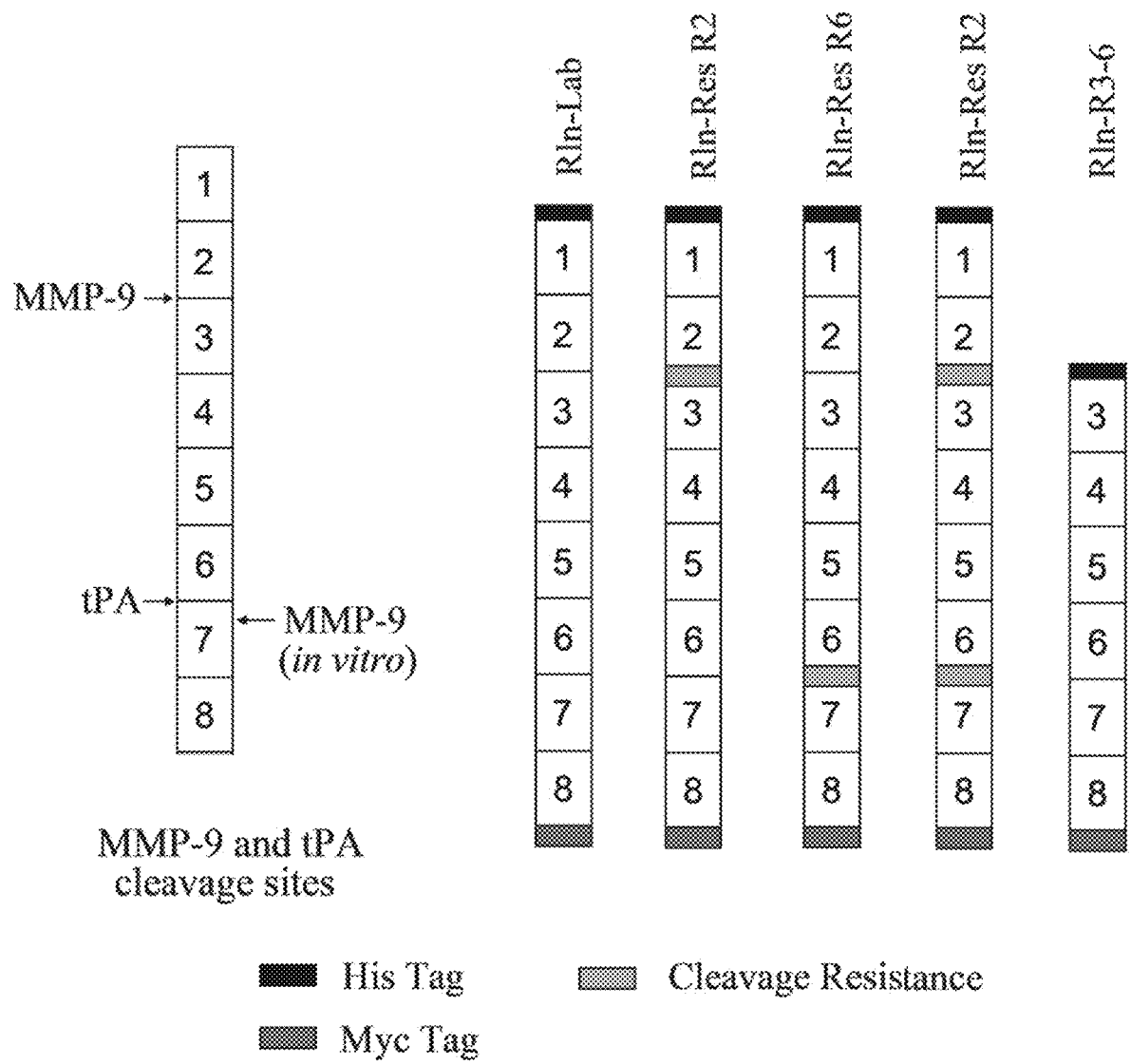
FIG. 34 is an illustration of some constructs used in SA2 and SA3 and sites of Reelin cleavage. MMP-9 can cleave between regions 2 and 3, but has also been shown to cleave in region 7 during in vitro reactions only. tPA can cleave between regions 6 and 7. Proposed constructs are made without the in vitro MMP-9 binding site a with both C and N terminal tags. Rln-Res=Reelin Cleavage Resistant; Rln-Lab=Reelin labile.

In order to characterize specific fragments produced by tPA- and MMP-9-dependent Reel in processing in the context of normal synaptic function and memory formation, cleavage-resistant Reelin mutant constructs were generated using site-directed mutagenesis, as seen in FIG. 34. Reelin mutants include constructs resistant to cleavage (Rln-Res) by tPA at R2-3, to MMP-9 at R6-7 and to both enzymes at R2-3 and R6-7. Fragments mimicking cleavage by tPA or MMP-9 with, or without a cleavage resistant site are also contemplated. One complementary Reelin construct is tagged in an identical fashion as the Rln-Res protein; however, it does not contain the two altered sites for cleavage (Reelin cleavage labile; FIG. 34). A tagged fragment produced with both sites mutated (negative control construct) and a tagged R3-6 fragment shown to bind ApoER2 and VLDLR (potential positive control) is included. The Reelin constructs are sub-cloned into mammalian expression vectors containing N-terminal polyhistidine tags and/or C-terminal Myc tags to allow later recognition of exogenous Reelin. The exact cleavage sites can be identified by using purified full-length Reelin reacted with either tPA or MMP-9 therefore the resultant fragments can be isolated.

Figure 24B:
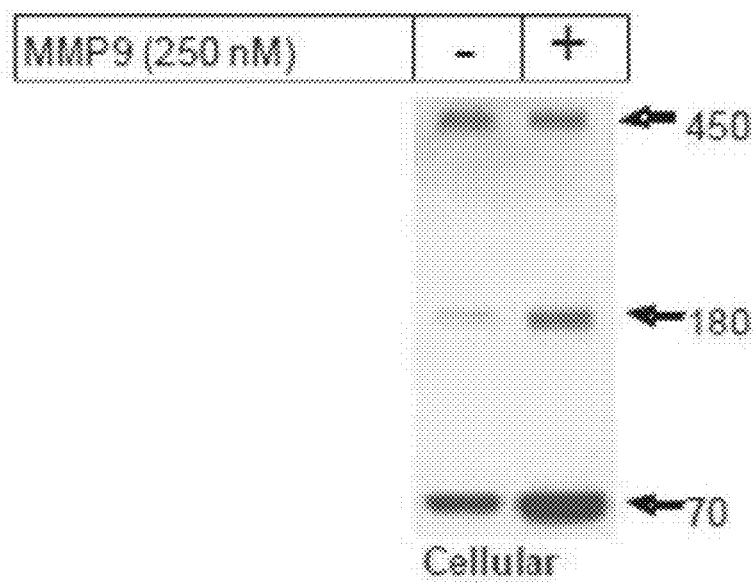
FIG. 24(B) is a blot showing MMP-9 modulates Reelin processing. The ability of MMP-9 (250 nM) to affect Reelin processing in primary cortical neurons was determined after 24 hours in supernatant extracted proteins. Cellular protein extracts were subjected to Western analysis and detection with G10.
Figure 24C:
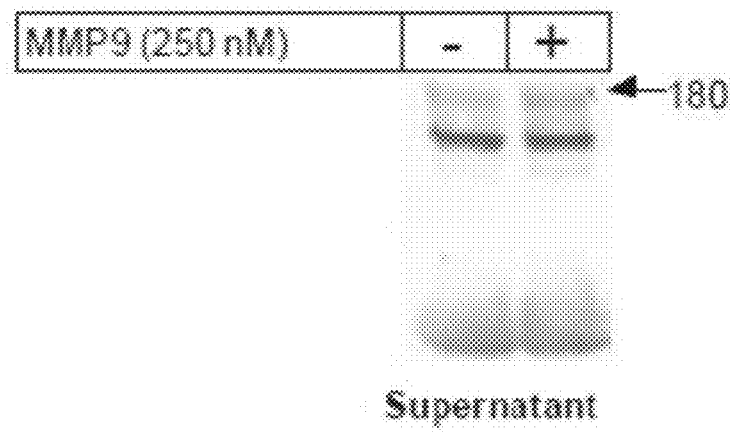
FIG. 24(C) is a blot showing MMP-9 modulates Reelin processing. The ability of MMP-9 (250 nM) to affect Reelin processing in primary cortical neurons was determined after 24 hours in supernatant extracted proteins. Supernatant protein extracts were subjected to Western analysis and detection with G10.
Figure 24D:
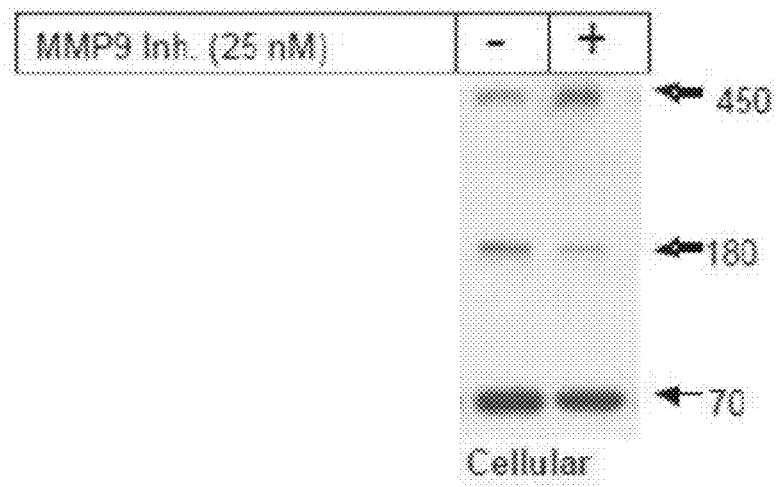
FIG. 24(D) is a blot showing MMP-9 modulates Reelin processing. The ability of the MMP-9 inhibitor (25 nM; Calbiochem 444278) to affect Reelin processing in primary cortical neurons was determined after 24 hours in supernatant extracted protein. Cellular protein extracts were subjected to Western analysis and detection with G10.
Figure 24E:
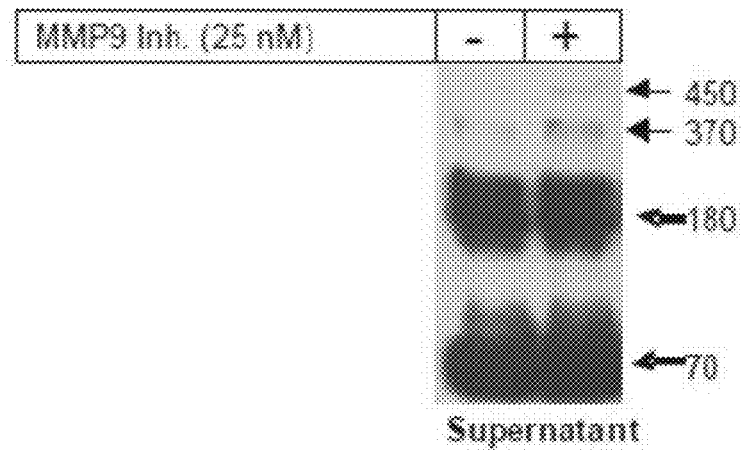
FIG. 24(E) is a blot showing MMP-9 modulates Reelin processing. The ability of the MMP-9 inhibitor (25 nM; Calbiochem 444278) to affect Reelin processing in primary cortical neurons was determined after 24 hours in supernatant extracted protein. Supernatant protein extracts were subjected to West analysis and detection with G10.
Figure 35A:
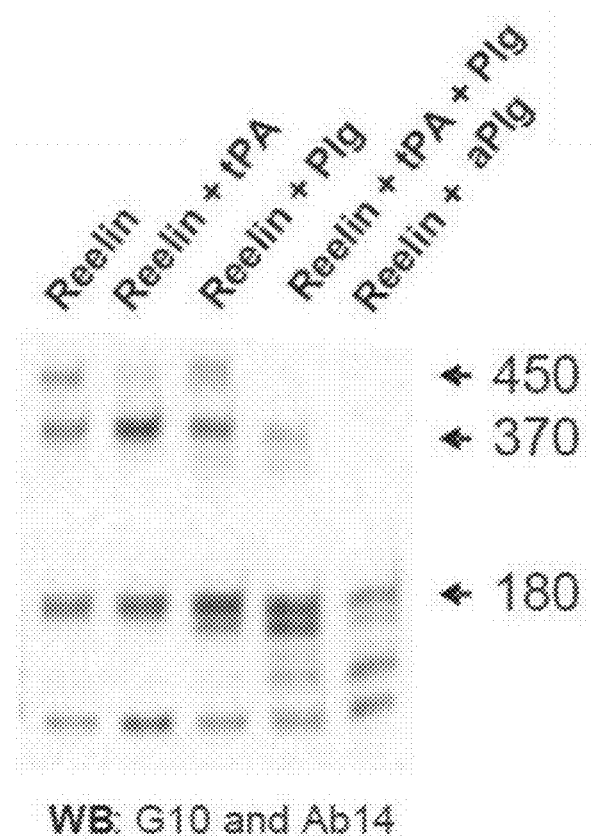
FIG. 35(A) is a blot showing tPA modulates Reelin processing. The ability of tPA/plasminogen to affect Reelin processing was determined by reacting Reelin (50 nM) with tPA (60 ug/ml), inactive plasminogen (18 ug/ml), tPA and plasminogen, and Plasmin (active, 0.5 U/ml) in PBS for 45 minutes at 37° C. Reactions were run on Westerns (at 1:10) and probe with anti-Reelin (G10, an N-R2 recognizing antibody) and anti-Reelin (Ab14, a R7-8 recognizing antibody).
Figure 35B:
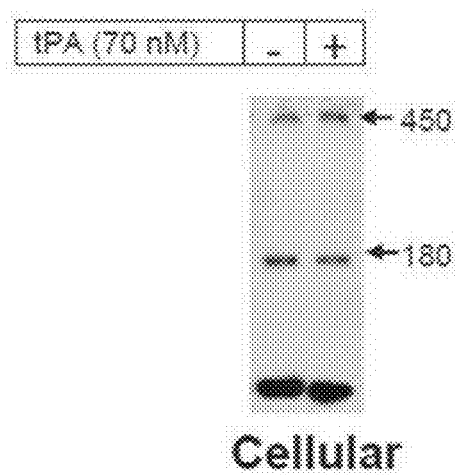
FIG. 35(B) is a blot showing tPA modulates Reelin processing. The ability of tPA to affect Reelin metabolism in primary cortical neurons was determined by incubating cells in fresh supernatant for 24 hours with 70 nM tPA. Cellular protein extracts were subjected to Western analysis and detection with G10.
Figure 35C:
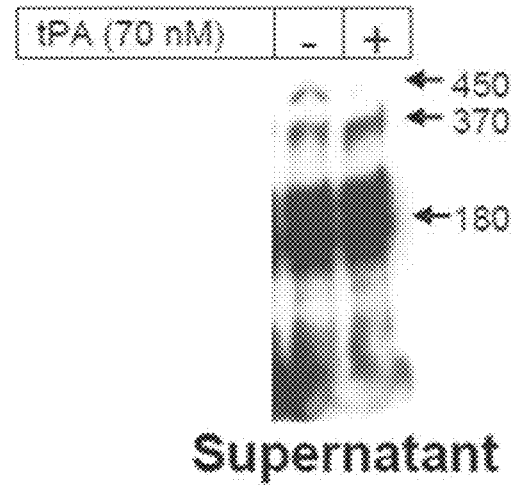
FIG. 35(C) is a blot showing tPA modulates Reelin processing. The ability of tPA to affect Reelin metabolism in primary cortical neurons was determined by incubating cells in fresh supernatant for 24 hours with 70 nM tPA. Supernatant protein extracts were subjected to Western analysis and detection with G10.
Figure 36A:
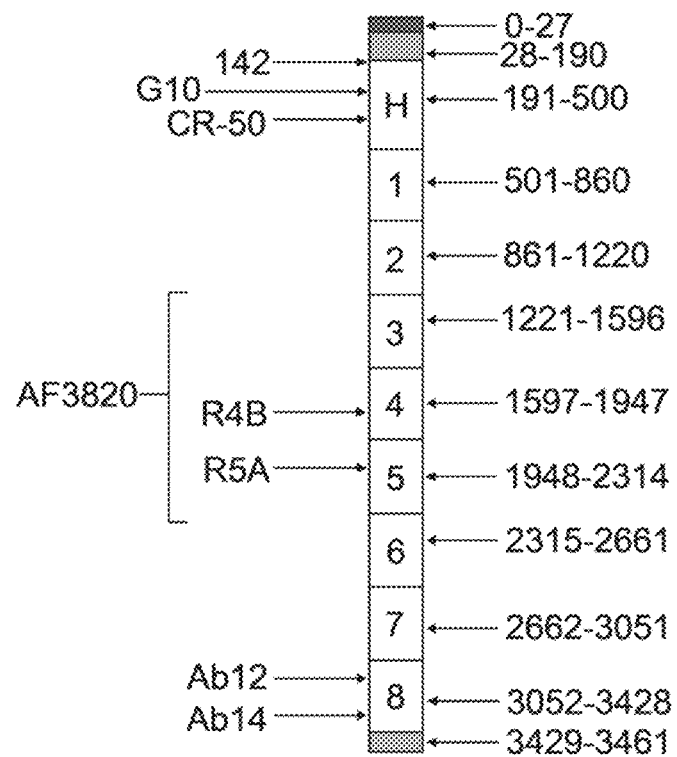
FIG. 36(A) is an illustration of tri-epitope mapping. Reelin consists of an N-terminal region followed by the CR-50 electrostatic domain (light gray), an F-spondin domain (H), and 8 consecutive EGF-like repeats. Various antibodies are shown, indicating the epitopic region of the Reelin structure for the respective antibody.
Figure 36B:
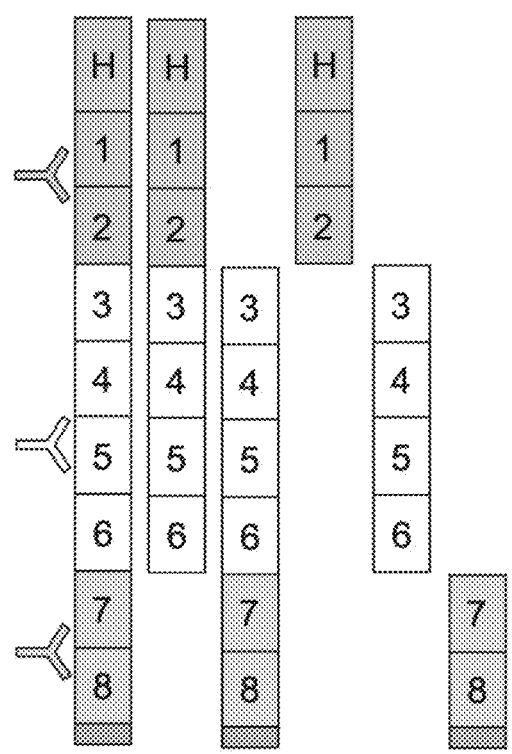
FIG. 36(B) is an illustration of tri-epitope mapping. Antibodies that distinctly recognize the N-R2, R3-R6, and R7-R8 regions of Reelin can be used to determine the distribution of full-length Reelin and its major or fragments.

Reelin is processed by both tPA and MMP-9 to generate the major Reelin fragment products found in vivo, as seen in FIG. 35(A)-(C). As it can be seen, tPA increases the 370 kDa (N-R6) and 80 kDa (R7-8) fragments under cell free conditions, as seen in FIG. 24(A), indicating that tPA cleaves Reelin between R6-R7, as seen in FIG. 27. Cleavage of Reelin by Plasmin results in a spectrum of products of previously unknown identity and specific retention of the 180 kDa fragment. Application of recombinant WA to primary neurons resulted in a complete conversion of extracellular Reelin from full-length to the 370 and 180 kDa forms, and a decrease in intracellular 180 kDa Reelin. Furthermore, MMP-9 increases both the 370 kDa (N-R6) and 180 kDa (N-R2) fragments, as well as a fragment found just below the well-known 180 kDa fragment, as seen in FIGS. 24(B) & (C) and confirmed by inhibition of MMP9, as seen in FIGS. 24(D) & (E). These results under cell free conditions support that MMP-9 can cleave Reelin at both cleavage sites, R2-3 and R6-7; however, application of MMP-9 to primary neurons led to a specific accumulation of the 180 kDa fragment in cells and MMP-9 inhibition for 24 hours led to a dramatic increase in full-length cellular Reelin and decrease in cellular 180 kDa Reelin. These results suggest that under normal conditions, MMP-9 is responsible for cleaving Reelin between R2-R3, as seen on the fragment map of FIG. 34. Taken together, these preliminary data suggest that MMP-9 and tPA are sufficient for generation of the major Reelin fragments found in vivo. Analysis of the structures identified antibodies capable of detecting the various fragments of Reelin, as seen in FIGS. 36(A) & (B). Reelin protein processing in the hippocampus is susceptible to in vitro and in vivo synaptic activity. It also appears that MMP-9 and tPA are involved in the process of Reelin metabolism.

Example 12

Reelin is cleaved at specific sites resulting in a stable pattern of Reelin fragments easily quantified by Western blot analysis. These fragments represent potential signaling molecules with properties unique from full-length Reelin. Recombinant Reelin purified from stably transfected HEK293 cells contains fragments of the same size as the major fragments found in the hippocampus. Application of recombinant Reelin fragment compliment can (1) increase synaptic transmission by facilitating AMPA receptor insertion and increasing NMDA receptor function, (2) reduce silent synapses, (3) modify synaptic morphology and (4) enhance LIP (Qiu & Weeber, Reelin signaling facilitates maturation of CA1 glutamatergic synapses. *J Neurophysiol.* 2007; 97:2312-2321; Qiu, S., K. M. Korwek, A. R. Pratt-Davis, M. Peters, M. Y. Bergman, and E. J. Weeber. 2006. Cognitive disruption and altered hippocampus synaptic function in Reelin haploinsufficient mice. *Neurobiol Learn Mem* 85:228-242).

Receptor expression of ApoER was analyzed upon exposure to Reelin, Mixed hippocampal and cortical neuronal cultures were obtained from embryonic day (E) 18-19 mouse embryos. The cells were plated at high density (~750 cells mm$^{-2}$), and grown in Neurobasal medium (Gibco BRL) supplemented with B27 (Gibco BRL). The cells were subcultured when at 80% confluence. Once the cells were subcultured for the 8th time, Reelin fragment hR3-6 at a concentration of 5 nM was added to the medium and the cells incubated with the Reelin fragment for 1 hour at 37° C. After incubation, the cells were collected by trypisinization, washed with medium and lysed using an SDS-β-mercaptoethanol-based lysing buffer. The proteins were collected from each cell culture and 25 g loaded onto an SDS-PAGE. After electrophoresis, the proteins were transferred to a nylon membrane and probed using anti-ApoER2 antibody (Sigma-Aldrich, LRP8, rabbit anti-hApoER2).

Figure 37:
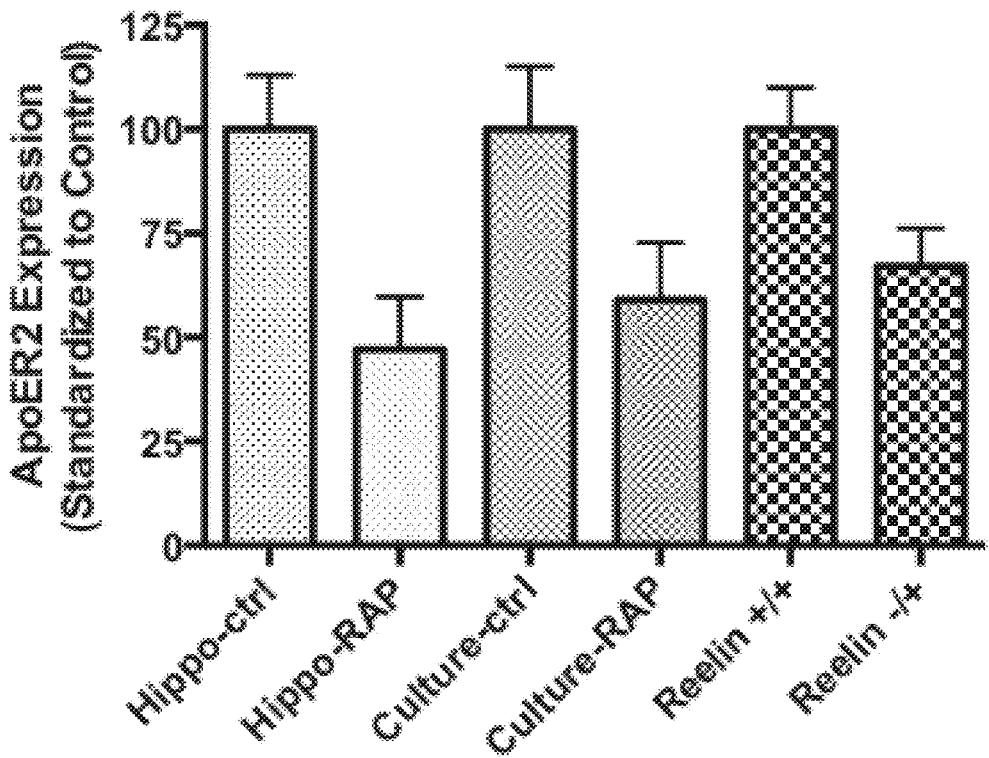
FIG. 37 is a graph showing the effect of RAP on Reelin and ApoER2 expression. Decreased ApoER2 expression is linked with GST-RAP (Receptor associated protein, which binds to all lipoprotein receptors) application in the hippocampus, pre-frontal cortex, and the parietal cortex.
Figure 38A:
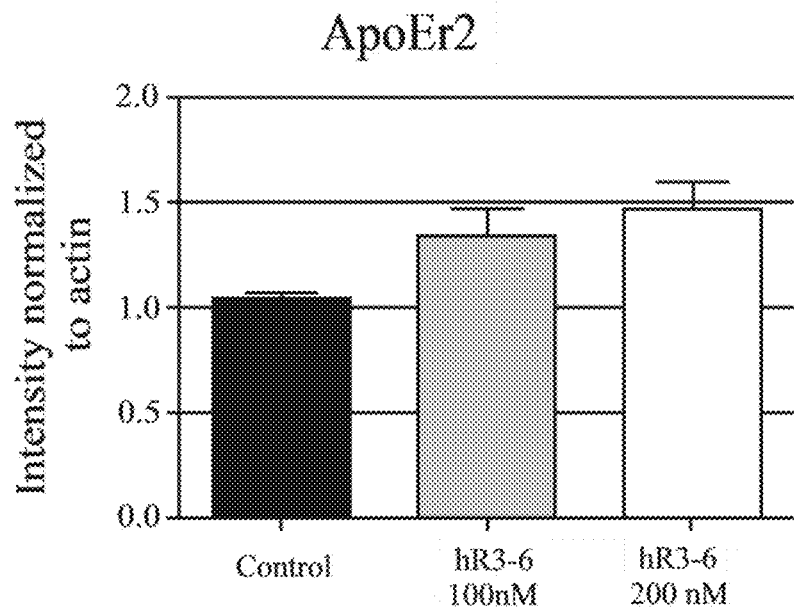
FIG. 38(A) is a blot showing application of hR3-6 increases ApoEr2 expression in primary neuronal cultures. Neurons (E17, DIV8) treated with hR3-6 for 1 hr and probed with Antibody 3326 that recognizes ApoEr2. N=3-4.
Figure 38B:
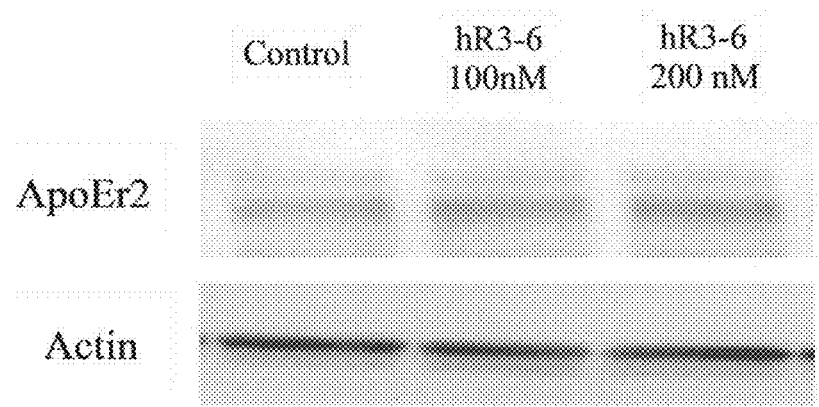
FIG. 38(B) is a graph showing application of hR3-6 increases ApoEr2 expression in primary neuronal cultures. ApoEr2 levels were normalized to actin and quantified from the Western blot.

Treating the cells with GST-RAP (Receptor Associated Protein) showed a substantial drop in receptor expression, as seen in FIG. 37. Thus, blocking Reelin's ability to bind to ApoER2 drives ApoER2 expression down. However, exposing cells to exogenous Reelin resulted in an increase in ApoER2 receptor expression. Further, treating neuronal cells with Reelin fragment increases the expression of ApoEr2 in a dose-dependent manner, as seen in FIGS. 38(A) & (B).

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of the method of treating neurological disorders, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. A therapeutically effective amount of a viral vector composition encoding a Reelin recombinant protein fragment effective at inducing Reelin-dependent Apolipoprotein E Receptor (ApoER) activation and signaling, wherein the Reelin recombinant protein fragment is selected from:
   Reelin fragment repeat R3 through R4,
   Reelin fragment repeat R3 through R5,
   Reelin fragment repeat R3 joined to Reelin fragment repeat R5 (SEQ ID NO: 11, or Reelin fragment repeat R3 joined to Reelin fragment repeat R6 (SEQ ID NO: 9); wherein
   Reelin fragment repeat R3 is encoded by the nucleotide sequence consisting of SEQ ID NO: 2,
   Reelin fragment repeat R4 is encoded by the nucleotide sequence consisting of SEQ ID NO: 3,
   Reelin fragment repeat R5 is encoded by the nucleotide sequence consisting of SEQ ID NO: 4, and
   Reelin fragment repeat R6 is encoded by the nucleotide sequence consisting of SEQ ID NO: 5; and wherein
   a Loop Region encoded by a nucleotide sequence consisting of SEQ ID NO: 6 is disposed between Reelin fragment repeats R3 and R4, and
   a Loop Region encoded by a nucleotide sequence consisting of SEQ ID NO: 7 is disposed between Reelin fragment repeats R4 and R5.

2. The viral vector composition of claim 1, wherein the viral vector is selected from the group consisting of AAV-9, AAV-5, AAV-4, and AAV-1.

* * * * *

SEQUENCE LISTING

```
<160> NUMBER OF SEQ ID NOS: 12

<210> SEQ ID NO 1
<211> LENGTH: 11580
<212> TYPE: DNA
<213> ORGANISM: Homo sapiens

<400> SEQUENCE: 1
cacgcgtggg ctcggcgggg gcccgctccc aggcccgctc ccgagcccgt tccgctcccg      60
```

-continued

```
tccgccttct tctcgccttc tctccgcgtg gctcctccgt cccggcgtct ccaaaactga      120
atgagcgagc ggcgcgtagg gcgscggcgg cggcggcggc ggcggcggcg gcggcatgga      180
gcgcagtggc tgggcccggc agactttcct cctagcgctg ttgctggggg cgacgctgag      240
ggcgcgcgcg gcggctggct attaccccg cttttcgccc ttcttttcc tgtgcaccca       300 ccacggggag ctggaagggg atggggagca gggcgaggtg ctcatttccc tgcatattgc      360
gggcaacccc acctactacg ttccgggaca agaataccat gtgacaattt caacaagcac      420
cttttttgac ggcttgctgg tgacaggact atacacatct acaagtgttc aggcatcaca      480
gagcattgga ggttccagtg ctttcggatt tgggatcatg tctgaccacc agtttggtaa      540
ccagtttatg tgcagtgtgg tagcctctca cgtgagtcac ctgcccacaa ccaacctcag      600
tttcatctgg attgctccac ctgcgggcac aggctgtgtg aatttcatgg ctacagcaac      660
acaccggggc caggttattt tcaaagatgc tttagcccag cagttgtgtg aacaaggagc      720
tccaacagat gtcactgtgc acccacatct agctgaaata catagtgaca gcattatcct      780
gagagatgac tttgactcct accaccaact gcaattaaat ccaaatatat gggttgaatg      840
taacaactgt gagactggag aacagtgtgg cgcgattatg catggcaatg ccgtcacctt      900
ctgtgaacca tatggcccac gagaactgat taccacaggc cttaatacaa caacagcttc      960
tgtcctccaa ttttccattg ggtcaggttc atgtcgcttt agttattcag accccagcat     1020
catcgtgtta tgccaagaa ataactctgc ggactggatt cagctagaga aaattagagc     1080
cccttccaat gtcagcacaa tcatccatat cctctacctt cctgaggacg ccaaagggga     1140
gaatgtccaa tttcagtgga agcaggaaaa tcttcgtgta ggtgaagtgt atgaagcctg     1200
ctgggcctta gataacatct tgatcatcaa ttcagctcac agacaagtcg ttttagaaga     1260
tagtctcgac ccagtggaca caggcaactg gcttttcttc ccaggagcta cagttaagca     1320
tagctgtcag tcagatggga actccattta tttccatgga aatgaaggca gcgagttcaa     1380
ttttgccacc accagggatg tagatctttc cacagaagat attcaagagc aatggtcaga     1440
agaatttgag agccagccta caggatggga tgtcttggga gctgtcattg gtacagaatg     1500
tggaacgata gaatcaggct tatcaatggt cttcctcaaa gatggagaga ggaaattatg     1560
cactccatcc atggacacta ccggttatgg gaacctgagg ttttactttg tgatgggagg     1620
aatttgtgac cctggaaatt tcatgaaaaa tgacataatc ctgtatgcaa aaattgaagg     1680
aagaaaagag catataacac tggatccct ttcctattcc tcatataagg ttccgtcttt      1740
ggtttctgtg gtcatcaatc ctgaacttca gactcctgct accaaatttt gtctcaggca     1800
aaagaaccat caaggacata ataggaatgt ctgggctgta gactttttcc atgtcttgcc     1860
tgttctccct tctacaatgt ctcacatgat acagttttcc atcaatctgg gatgtggaac     1920
gcatcagcct ggtaacagtg tcagcttgga atttttctacc aaccatgggc gctcctggtc     1980
cctccttcac actgaatgct tacctgagat ctgtgctgga ccccacctcc cccacagcac     2040
tgtctactcc tctgaaaact acagtgggtg gaaccgaata acaattcccc ttcctaacgc     2100
agcactaacc cggaacacca ggattcgctg gagacaaaca ggaccaatcc ttggaaacat     2160
gtgggcaatt gataatgttt atattggccc gtcatgtctc aaattctgtt ctggcagagg     2220
acagtgcact agacatggtt gcaagtgtga ccctggattt tctggcccag cttgtgagat     2280
ggcatcccag acattcccaa tgtttattc tgaaagcttt ggcagttcca ggctctcctc      2340
ttaccataac ttttactcta tccgtggtgc tgaagtcagc tttggttgtg gtgtcttggc     2400
cagtggtaag gccctggttt tcaacaaaga agggcggcgt cagctaatta catctttcct     2460
```

-continued

```
tgacagctca caatccaggt ttctccagtt cacactgaga ctggggagca aatctgttct   2520
gagcacgtgc agagcccctg atcagcctgg tgaaggagtt ttgctgcatt attcttatga   2580
taatgggata acttggaaac tcctggagca ttattcatat ctcagctatc atgagcccag   2640
aataatctcc gtagaactac caggtgatgc aaagcagttt ggaattcagt tcagatggtg   2700
gcaaccgtat cattcttccc agagagaaga tgtatgggct attgatgaga ttatcatgac   2760
atctgtgctt ttcaacagca ttagtcttga ctttaccaat cttgtggagg tcactcagtc   2820
tctgggattc taccttggaa atgttcagcc atactgtggc cacgactgga ccctttgttt   2880
tacaggagat tctaaacttg cctcaagtat gcgctatgtg aaacacaat caatgcagat   2940 aggagcatcc tatatgattc agttcagttt ggtgatggga tgtggccaga atacacccc   3000 acacatggac aaccaggtga agctggagta ctcaaccaac acggcctta cctggcacct   3060 cgtccaagaa gaatgccttc aagtatgcc aagttgtcag gaatttacat cagcaagtat   3120
ttaccatgcc agtgagttta cacagtggag gagagtcata gtgcttcttc cccagaaaac   3180
ttggtccagt gctacccgtt tccgctggag ccagagctat tacacagctc aagacgagtg   3240
ggctttggac agcatttaca ttgggcagca gtgccccaac atgtgcagtg ggcatggctc   3300
atgcgatcat ggcatatgca ggtgtgacca ggggtaccaa ggcactgaat gccacccaga   3360
agctgccctt ccgtccacaa ttatgtcaga ttttgagaac cagaatggct gggagtctga   3420
ctggcaagaa gttattgggg gagaaattgt aaaaccagaa caagggtgtg gtgtcatctc   3480
ttctggatca tctctgtact tcagcaaggc tgggaaaaga cagctggtga gttgggacct   3540
ggatacttct tgggtggact tgtccagtt ctacatccag ataggcggag agagtgcttc   3600
atgcaacaag cctgacagca gagaggaggg cgtcctcctt cagtacagca acaatggggg   3660
catccagtgg cacctgctag cagagatgta cttttcagac ttcagcaaac ccagatttgt   3720
ctatctggag cttccagctg ctgccaagac cccttgcacc aggttccgct ggtggcagcc   3780
cgtgttctca ggggaggact atgaccagtg ggcagtcgat gacatcatca ttctgtccga   3840
gaagcagaag cagatcatcc cagttatcaa tccaacttta cctcagaact tttatgagaa   3900
gccagctttt gattacccta tgaatcagat gagtgtgtgg ttgatgttgg ctaatgaagg   3960
aatggttaaa aatgaaacct tctgtgctgc cacaccatca gcaatgatat ttggaaaatc   4020
agatggagat cgatttgcag taactcgaga tttgaccctg aaacctggat atgtgctaca   4080
gttcaagcta acataggtt gtgccaatca attcagcagt actgctccag ttcttcttca   4140
gtactctcat gatgctggta tgtcctggtt tctggtgaaa aaggctgtt acccggcttc   4200 tgcaggcaaa ggatgcgaag gaaactccag agaactaagt gagcccacca tgtatcacac   4260
aggggacttt gaagaatgga caagaatcac cattgttatt ccaaggtctc ttgcatccag   4320
caagaccaga ttccgatgga tccaggagag cagctcacag aaaaacgtgc ctccatttgg   4380
tttagatgga gtgtacatat ccgagccttg tcccagttac tgcagtggcc atggggactg   4440
catttcagga gtgtgtttct gtgacctggg atatactgct gcacaaggaa cctgtgtgtc   4500
aaatgtcccc aatcacaatg agatgttcga taggtttgag gggaagctca gccctctgtg   4560
gtacaagata acaggtgccc aggttggaac tggctgtgga acacttaacg atggcaaatc   4620
tctctacttc aatggccctg ggaaaaggga agcccggacg gtccctctgg acaccaggaa   4680
tatcagactt gttcaatttt atatacaaat tggaagcaaa acttcaggca ttacctgcat   4740
caaaccaaga actagaaatg aagggcttat tgttcagtat tcaaatgaca atgggatact   4800
```

```
ctggcatttg cttcgagagt tggacttcat gtccttcctg gaaccacaga tcatttccat    4860
tgacctgcca caggacgcga agacacctgc aacggcattt cgatggtggc aaccgcaaca    4920
tgggaagcat tcagcccagt gggctttgga tgatgttctt ataggaatga atgacagctc    4980
tcaaactgga tttcaagaca aatttgatgg ctctatagat ttgcaagcca actggtatcg    5040
aatccaagga ggtcaagttg atattgactg tctctctatg gatactgctc tgatattcac    5100
tgaaaacata ggaaaacctc gttatgctga gacctgggat tttcatgtgt cagcatctac    5160 cttttttgcag tttgaaatga gcatgggctg tagcaagccc ttcagcaact cccacagtgt    5220
acagctccag tattctctga caatggcaa ggactggcat cttgtcaccg aagagtgtgt    5280
tcctccaacc attggctgtc tgcattacac ggaaagttca atttacacct cggaaagatt    5340
ccagaattgg aagcggatca ctgtctacct tccactctcc accatttctc ccaggacccg    5400
gttcagatgg attcaggcca actacactgt ggggctgat tcctgggcga ttgataatgt    5460
tgtactggcc tcagggtgcc cttggatgtg ctcaggacga gggatttgtg atgctggacg    5520
ctgtgtgtgt gaccggggct tggtggacc ctattgtgtt cctgttgttc ctctgccctc    5580
gattcttaaa gacgatttca atgggaattt acatcctgac cttggcctg aagtgtatgg    5640 tgcagagagg gggaatctga atggtgaaac catcaaatct ggaacatctc taattttaa    5700 aggggaagga ctaaggatgc ttatttcaag agatctagat tgtacaaata caatgtatgt    5760 ccagtttttca cttagattta tagcaaaaag taccccagag gatctcact ctattctgtt    5820 acaattctcc atcagtggag gaatcacttg gcacctgatg gatgaatttt actttcctca    5880
aacaacgaat atacttttca tcaatgttcc cttgccatac actgcccaaa ccaatgctac    5940
aagattcaga ctctggcaac cttataataa cggtaagaaa aagaaatct ggattgttga    6000 tgacttcatt atcgatggaa ataatgtaaa caaccctgtg atgctcttgg atacatttga    6060
ttttgggccc agagaagaca attggttttt ctatcctggt ggtaacatcg tctttattg    6120 tccatattct tcaagggggg cacctgaaga agattcagct atggtgtttg tttcaaatga    6180
agttggtgag cattccatta ccacccgtga cctaaatgtg aatgagaaca ccatcataca    6240
atttgagatc aacgttggct gttcgactga tagctcatcc gcggatccag tgagactgga    6300
attttcaagg gacttcgggg cgacctggca ccttctgctg cccctctgct accacagcag    6360
cagccacgtc agctctttat gctccaccga gcaccacccc agcagcacct actacgcagg    6420
aaccatgcag ggctggagga gggaggtcgt gcactttggg aagctgcacc tttgtggatc    6480
tgtccgtttc agatggtacc agggatttta ccctgccggc tctcagccag tgacatgggc    6540
cattgataat gtctacatcg gtccccagtg tgaggagatg tgtaatggac aggggagctg    6600
tatcaatgga accaaatgta tatgtgaccc tggctactca ggtccaacct gtaaaataag    6660
caccaaaaat cctgattttc tcaaagatga tttcgaaggt cagctagaat ctgatagatt    6720
cttattaatg agtggtggga aaccatctcg aaagtgtgga atcctttcta gtggaaacaa    6780 cctcttttttc aatgaagatg gcttgcgcat gttgatgaca cgagacctgg atttatcaca    6840
tgctagattt gtgcagttct tcatgagact gggatgtggt aaaggcgttc ctgaccccag    6900
gagtcaaccc gtgctcctac agtattctct caacggtggc ctctcgtgga gtcttcttca    6960
ggagttcctt ttcagcaatt ccagcaatgt gggcaggtac attgccctgg atatccctt    7020 gaaagcccgt tctggttcta ctcgccttcg ctggtggcaa ccgtctgaga atgggcactt    7080
ctacagcccc tgggttatcg atcagattct tattggagga aatatttctg gtaatacggt    7140
cttggaagat gatttcacaa cccttgatag taggaaatgg ctgcttcacc caggaggcac    7200
```

```
caagatgccc gtgtgtggct ctactggtga tgccctggtc ttcattgaaa aggccagcac    7260
ccgttacgtg gtcagcacag acgttgccgt gaatgaggat tccttcctac agatagactt    7320
cgctgcctcc tgctcagtca cagactcttg ttatgcgatt gaattggaat actcagtaga    7380
tcttggattg tcatggcacc cattggtaag ggactgtctg cctaccaatg tggaatgcag    7440
tcgctatcat ctgcaacgga tcctggtgtc agacactttc aacaagtgga ctagaatcac    7500
tctgcctctc cctccttata ccaggtccca agccactcgt ttccgttggc atcaaccagc    7560
tccttttgac aagcagcaga catgggcaat agataatgtc tatatcgggg atggctgcat    7620
agacatgtgc agtggccatg ggagatgcat ccagggaaac tgcgtctgtg atgaacagtg    7680
gggtggcctg tactgtgatg accccgagac ctctcttcca acccaactca agacaactt     7740 caatcgagct ccatccagtc agaactggct gactgtgaac ggagggaaat tgagtacagt    7800
gtgtggagcc gtggcgtcgg gaatggctct ccatttcagt gggggttgta gtcgattatt    7860
agtcactgtg gatctaaacc tcactaatgc tgagttcatc caattttact tcatgtatgg    7920
gtgcctgatt acaccaaaca accgtaacca aggtgttctc ttggaatatt ctgtcaatgg    7980
aggcattacc tggaacctgc tcatggagat tttctatgac cagtacagta agcccggatt    8040
tgtgaatatc cttctccctc ctgatgctaa agagattgcc actcgcttcc gctggtggca    8100
gccaagacat gacggcctgg atcagaacga ctgggccatt gacaatgtcc tcatctcagg    8160
ctctgctgac caaaggaccg ttatgctgga caccttcagc agcgcccag tacccagca     8220 cgagcgctcc cctgcagatg ccggcccgt cggaggatc gcctttgaca tgtttatgga     8280
agacaaaact tcagtgaatg agcactggct attccatgat gattgtacag tagaaagatt    8340
ctgtgactcc cctgatggtg tgatgctctg tggcagtcat gatggacggg aggtgtatgc    8400
agtgacccat gacctgactc ccactgaagg ctggattatg caattcaaga tctcagttgg    8460
atgtaaggtg tctgaaaaaa ttgcccagaa tcaaattcat gtgcagtatt ctactgactt    8520
cggtgtgagt tggaattatc tggtccctca gtgcttgcct gctgacccaa aatgctctgg    8580
aagtgtttct cagccatctg tattctttcc aactaaaggg tggaaaagga tcacctaccc    8640
acttcctgaa agcttagtgg gaaatccggt aaggtttagg ttctatcaga agtactcaga    8700
catgcagtgg gcaatcgata atttctacct gggccctgga tgcttggaca actgcagggg    8760
ccatggagat tgcttaaggg aacagtgcat ctgtgatccg ggatactcag gccaaactg     8820 ctacttgacc cacactctga agactttcct gaaggaacgc tttgacagtg aagaaatcaa    8880
acctgactta tggatgtcct agaaggtgg aagtacttgc actgagtgtg gaattcttgc     8940
cgaggacact gcactctatt ttgggggatc cactgtgaga caagcggtta cacaagattt    9000
ggatcttcga ggtgcaaagt tcctgcaata ctggggcgc atcggtagtg agaacaacat     9060
gacctcttgc catcgtccca tctgccggaa ggaaggcgtg ctgttggact actctaccga    9120
tggaggaatt acctggactt tgctccatga gatggattac cagaaataca tttctgttag    9180
acacgactac atacttcttc ctgaagatgc cctcaccaac acaactcgac ttcgctggtg    9240
gcagcccttt gtgatcagca atggaattgt ggtctctggg gtggagcgtg ctcagtgggc    9300 actgacaac attttgattg gtggagcaga atcaatccc agccaattgg tggacacttt      9360
tgatgatgaa ggcacttccc atgaagaaaa ctggagtttt tacctaatg ctgtaaggac      9420 agcaggattt tgtggcaatc catcctttca cctctattgg ccaaataaaa agaaggacaa    9480
gactcacaat gctctctcct cccgagaact cattatacag ccaggataca tgatgcagtt    9540
```

```
taaaattgtg gtgggttgtg aagccacttc ttgtggtgac cttcattccg taatgctgga    9600
atacactaag gatgcaagat cggattcctg gcagctcgta cagacccagt gccttccttc    9660
ctcttctaac agcattggct gctccccttt ccagttccat gaagccacca tctacaactc    9720
tgtcaacagc tcaagctgga aaagaatcac catccagctg cctgaccatg tctcctctag    9780
tgcaacacag ttccgctgga tccagaaggg agaagaaact gagaagcaaa gctgggcaat    9840
tgaccacgtg tacattggag aggcttgccc caagctctgc agcgggcacg gatactgcac    9900
gaccggtgcc atctgcatct gcgacgagag cttccaaggt gatgactgct ctgttttcag    9960
tcacgacctt cccagttata ttaaagataa ttttgagtcc gcaagagtca ccgaggcaaa   10020
ctgggagacc attcaaggtg gagtcatagg aagtggctgt gggcagctgg cccctacgc    10080
ccatggagac tcactgtact ttaatggctg tcagatcagg caagcagcta ccaagcctct   10140
ggatctcact cgagcaagca aaatcatgtt tgttttgcaa attgggagca tgtcgcagac   10200
ggacagctgc aacagtgacc tgagtggccc ccacgctgtg gacaaggcgg tgctgctgca   10260
atacagcgtc aacaacggga tcacctggca tgtcatcgcc cagcaccagc caaaggactt   10320
cacacaagct cagagagtgt cttacaatgt cccctggag gcacggatga aaggagtctt   10380
actgcgctgg tggcaaccac gccacaatgg aacaggtcat gatcaatggg ctttggacca   10440
tgtggaggtc gtcctagtaa gcactcgcaa acaaaattac atgatgaatt tttcacgaca   10500
acatgggctc agacatttct acaacagaag acgaaggtca cttaggcgat acccatgaag   10560
aatcaaaaag tttattttt ttcttccaac atgtgatgtg ttgctctcca ttcttttaaa   10620
tctcgcacta catctgatat caggaaatat ctgtgaagga cttggtgatt acctgaaagc   10680
ccttctcaag accgagtgta caccactttc ccacactgtg aactaatgac aagtgactta   10740
tttgctcata agtaaatgtc ttcatgttga tgtgtccgtg aaagttgtga tctgttgtaa   10800
tatcagttac agtggcagta ttgacaataa gaaacagttt aacagaaaaa tgaaatttaa   10860
gcacaaaaaa tttaagagat tttatgttta aaatggcatt tagcacagta tttaacattc   10920
ttggtcacaa agctatttaa gtggactgta tttcagctat gtctcatgtt ttatatgatt   10980
aaattatcat tgtttgtcct ttatgtattc tcttctacaa tacaacacat tgaaactgta   11040
tttacttgtt atgttgtaat attttgctgc tgaatttggg gctacttata ttctgcagaa   11100
aattaattga aatacctatt caagaagata gttgtaaaga tattgtatct ctttaatat    11160
actccttaaa aatgtatgtt ggtttagcgt tgttttgtgg ataagaaaaa tgcttgaccc   11220
tgaaatattt tctactttaa attgtggatg aagaccctat ctcccacaaa taagttccca   11280
tttccttgtc taaagatctt tttttaagtg ttctgtggct gatttactaa cagtaactgc   11340
cattttttgt ctgtgataac agagtgattt gtaaaacagt ggttgttttt tcattgtgtt   11400
ttcttcgtgg attgtttttt ctgcgggtca tattcatacc ttctgatgaa gttgtacaac   11460
accagcaaca ttataatggc cctgtagctc tgaatgctat ttgtgtaact gaaaggttgc   11520
actctagggt gaaccaagct ataaaagccc atgcttaaat aaaattatg  tccaaaagcc   11580
```

<210> SEQ ID NO 2
<211> LENGTH: 729
<212> TYPE: DNA
<213> ORGANISM: artificial sequence
<220> FEATURE:
<223> OTHER INFORMATION: Reelin repeat 3

<400> SEQUENCE: 2

```
ttcagcagta ctgctccagt tcttcttcag tactctcatg atgctggtat gtcctggttt      60
```

```
ctggtgaaag aaggctgtta cccggcttct gcaggcaaag gatgcgaagg aaactccaga    120
gaactaagtg agcccaccat gtatcacaca ggggactttg aagaatggac aagaatcacc    180
attgttattc caaggtctct tgcatccagc aagaccagat tccgatggat ccaggagagc    240
agctcacaga aaaacgtgcc tccatttggt ttagatggag tgtacatatc cgagccttgt    300
cccagttact gcagtggcca tggggactgc atttcaggag tgtgtttctg tgacctggga    360
tatactgctg cacaaggaac ctgtgtgtca aatgtcccca atcacaatga gatgttcgat    420
aggtttgagg ggaagctcag ccctctgtgg tacaagataa caggtgccca ggttggaact    480
ggctgtggaa cacttaacga tggcaaatct ctctacttca atggccctgg aaaagggaa    540 gcccggacgg tccctctgga caccaggaat atcagacttg ttcaatttta tatacaaatt    600
ggaagcaaaa cttcaggcat tacctgcatc aaaccaagaa ctagaaatga agggcttatt    660
gttcagtatt caaatgacaa tgggatactc tggcatttgc ttcgagagtt ggacttcatg    720
tccttcctg                                                            729

<210> SEQ ID NO 3
<211> LENGTH: 690
<212> TYPE: DNA
<213> ORGANISM: artificial sequence
<220> FEATURE:
<223> OTHER INFORMATION: Reelin Repeat 4

<400> SEQUENCE: 3
cccttcagca actcccacag tgtacagctc cagtattctc tgaacaatgg caaggactgg     60
catcttgtca ccgaagagtg tgttcctcca accattggct gtctgcatta cacggaaagt    120
tcaatttaca cctcggaaag attccagaat tggaagcgga tcactgtcta ccttccactc    180
tccaccattt ctcccaggac ccggttcaga tggattcagg ccaactacac tgtgggggct    240
gattcctggg cgattgataa tgttgtactg gcctcagggt gccctcggat gtgctcagga    300
cgagggattt gtgatgctgg acgctgtgtg tgtgaccggg gctttggtgg accctattgt    360
gttcctgttg ttcctctgcc ctcgattctt aaagacgatt tcaatgggaa tttacatcct    420
gacctttggc ctgaagtgta tggtgcagag agggggaatc tgaatggtga aaccatcaaa    480
tctggaacat ctctaatttt taaagggaa ggactaagga tgcttatttc aagagatcta    540
gattgtacaa atacaatgta tgtccagttt tcacttagat ttatagcaaa aagtaccccca    600 gagagatctc actctattct gttacaattc tccatcagtg gaggaatcac ttggcacctg    660
atggatgaat tttactttcc tcaaacaacg                                      690

<210> SEQ ID NO 4
<211> LENGTH: 717
<212> TYPE: DNA
<213> ORGANISM: artificial sequence
<220> FEATURE:
<223> OTHER INFORMATION: Reelin Repeat 5

<400> SEQUENCE: 4
gatagctcat ccgcggatcc agtgagactg gaattttcaa gggacttcgg ggcgacctgg     60
caccttctgc tgcccctctg ctaccacagc agcagccacg tcagctcttt atgctccacc    120
gagcaccacc ccagcagcac ctactacgca ggaaccatgc agggctggag gagggaggtc    180
gtgcactttg ggaagctgca cctttgtgga tctgtccgtt tcagatggta ccagggattt    240
taccctgccg gctctcagcc agtgacatgg gccattgata atgtctacat cggtcccag    300
```

| | |
|---|---|
| tgtgaggaga tgtgtaatgg acaggggagc tgtatcaatg gaaccaaatg tatatgtgac | 360 |
| cctggctact caggtccaac ctgtaaaata agcaccaaaa atcctgattt tctcaaagat | 420 |
| gatttcgaag gtcagctaga atctgataga ttcttattaa tgagtggtgg gaaaccatct | 480 |
| cgaaagtgtg gaatcctttc tagtggaaac aacctctttt tcaatgaaga tggcttgcgc | 540 |
| atgttgatga cacgagacct ggatttatca catgctagat ttgtgcagtt cttcatgaga | 600 |
| ctgggatgtg gtaaaggcgt tcctgacccc aggagtcaac ccgtgctcct acagtattct | 660 |
| ctcaacggtg gcctctcgtg gagtcttctt caggagttcc ttttcagcaa ttccagc | 717 |

<210> SEQ ID NO 5
<211> LENGTH: 693
<212> TYPE: DNA
<213> ORGANISM: artificial sequence
<220> FEATURE:
<223> OTHER INFORMATION: Reelin Repeat 6

<400> SEQUENCE: 5

| | |
|---|---|
| gtcacagact cttgttatgc gattgaattg gaatactcag tagatcttgg attgtcatgg | 60 |
| cacccattgg taagggactg tctgcctacc aatgtggaat gcagtcgcta tcatctgcaa | 120 |
| cggatcctgt tgtcagacac tttcaacaag tggactagaa tcactctgcc ctctccctcct | 180 |
| tataccaggt cccaagccac tcgtttccgt tggcatcaac cagctccttt tgacaagcag | 240 |
| cagacatggg caatagataa tgtctatatc ggggatggct gcatagacat gtgcagtggc | 300 |
| catgggagat gcatccaggg aaactgcgtc tgtgatgaac agtggggtgg cctgtactgt | 360 |
| gatgaccccg agacctctct tccaacccaa ctcaaagaca acttcaatcg agctccatcc | 420 |
| agtcagaact ggctgactgt gaacggaggg aaattgagta cagtgtgtgg agccgtggcg | 480 |
| tcgggaatgc ctctccattt cagtgggggt tgtagtcgat tattagtcac tgtggatcta | 540 |
| aacctcacta atgctgagtt catccaattt tacttcatgt atgggtgcct gattacacca | 600 |
| aacaaccgta accaaggtgt tctcttggaa tattctgtca atggaggcat tacctggaac | 660 |
| ctgctcatgg agatttttcta tgaccagtac agt | 693 |

<210> SEQ ID NO 6
<211> LENGTH: 357
<212> TYPE: DNA
<213> ORGANISM: artificial sequence
<220> FEATURE:
<223> OTHER INFORMATION: Reelin Repeat Loop Region 3-4

<400> SEQUENCE: 6

| | |
|---|---|
| gaaccacaga tcatttccat tgacctgcca caggacgcga agacacctgc aacggcattt | 60 |
| cgatggtggc aaccgcaaca tgggaagcat tcagcccagt gggctttgga tgatgttctt | 120 |
| ataggaatga atgacagctc tcaaaactgg atttcaagaca aatttgatgg ctctatagat | 180 |
| ttgcaagcca actggtatcg aatccaagga ggtcaagttg atattgactg tctctctatg | 240 |
| gatactgctc tgatattcac tgaaaacata ggaaaacctc gttatgctga gacctgggat | 300 |
| tttcatgtgt cagcatctac cttttttgcag tttgaaatga gcatgggctg tagcaag | 357 |

<210> SEQ ID NO 7
<211> LENGTH: 381
<212> TYPE: DNA
<213> ORGANISM: artificial sequence
<220> FEATURE:
<223> OTHER INFORMATION: Reelin Repeat Loop Region 4-5

<400> SEQUENCE: 7

```
aatatacttt tcatcaatgt tcccttgcca tacactgccc aaaccaatgc tacaagattc      60
agactctggc aaccttataa taacggtaag aaagaagaaa tctggattgt tgatgacttc     120
attatcgatg gaaataatgt aaacaaccct gtgatgctct tggatacatt tgattttggg    180
cccagagaag acaattggtt tttctatcct ggtggtaaca tcggtcttta ttgtccatat    240
tcttcaaagg gggcacctga agaagattca gctatggtgt ttgtttcaaa tgaagttggt    300
gagcattcca ttaccacccg tgacctaaat gtgaatgaga acaccatcat acaatttgag    360
atcaacgttg gctgttcgac t                                              381

<210> SEQ ID NO 8
<211> LENGTH: 351
<212> TYPE: DNA
<213> ORGANISM: artificial sequence
<220> FEATURE:
<223> OTHER INFORMATION: Reelin Repeat Loop Region 5-6

<400> SEQUENCE: 8
aatgtgggca ggtacattgc cctggagata cccttgaaag cccgttctgg ttctactcgc     60
cttcgctggt ggcaaccgtc tgagaatggg cacttctaca gccccctgggt tatcgatcag   120 attcttattg gaggaaatat ttctggtaat acggtcttgg aagatgattt cacaaccctt   180
gatagtagga aatggctgct tcacccagga ggcaccaaga tgcccgtgtg tggctctact   240
ggtgatgccc tggtcttcat tgaaaaggcc agcacccgtt acgtggtcag cacagacgtt   300
gccgtgaatg aggattcctt cctacagata gacttcgctg cctcctgctc a             351

<210> SEQ ID NO 9
<211> LENGTH: 1895
<212> TYPE: DNA
<213> ORGANISM: artificial sequence
<220> FEATURE:
<223> OTHER INFORMATION: Reelin Fragment R3 and R6

<400> SEQUENCE: 9
aagcttccac catggagcgc agtggctggg cccggcagac tttcctccta gcgctgttgc     60
tgggggcgac gctgagggcg cgcgcgttca gcagtactgc tccagttctt cttcagtact   120
ctcatgatgc tggtatgtcc tggttttctgg tgaaagaagg ctgttacccg gcttctgcag  180
gcaaaggatg cgaaggaaac tccagagaac taagtgagcc caccatgtat cacacagggg  240
actttgaaga atggacaaga atcaccattg ttattccaag gtctcttgca tccagcaaga  300
ccagattccg atggatccag agagcagct cacagaaaaa cgtgcctcca tttggtttag   360
atggagtgta catatccgag ccttgtccca gttactgcag tggccatggg gactgcattt   420
caggagtgtg tttctgtgac ctgggatata ctgctgcaca aggaacctgt gtgtcaaatg   480
tccccaatca caatgagatg ttcgataggt ttgaggggaa gctcagccct ctgtggtaca   540
agataacagg tgcccaggtt ggaactggct gtggaacact taacgatggc aaatctctct   600
acttcaatgg ccctgggaaa agggaagccc ggacggtccc tctggacacc aggaatatca   660
gacttgttca attttatata caaattggaa gcaaaacttc aggcattacc tgcatcaaac   720
caagaactag aaatgaaggg cttattgttc agtattcaaa tgacaatggg atactctggc   780
atttgcttcg agagttggac ttcatgtcct tcctggaacc acagatcatt tccattgacc   840
tgccacagga cgcgaagaca cctgcaacgg catttgatga gtggcaaccg caacatggga   900
agcattcagc ccagtgggct ttggatgatg ttcttatagg aatgaatgac agctctcaaa   960
```

```
ctggatttca agacaaattt gatggctcta taacccttga tagtaggaaa tggctgcttc   1020
acccaggagg caccaagatg cccgtgtgtg gctctactgg tgatgccctg gtcttcattg   1080
aaaaggccag cacccgttac gtggtcagca cagacgttgc cgtgaatgag gattccttcc   1140
tacagataga cttcgctgcc tcctgctcag tcacagactc ttgttatgcg attgaattgg   1200
aatactcagt agatcttgga ttgtcatggc acccattggt aagggactgt ctgcctacca   1260
atgtggaatg cagtcgctat catctgcaac ggatcctggt gtcagacact ttcaacaagt   1320
ggactagaat cactctgcct ctccctcctt ataccaggtc ccaagccact cgtttccgtt   1380
ggcatcaacc agctcctttt gacaagcagc agacatgggc aatagataat gtctatatcg   1440
gggatggctg catagacatg tgcagtggcc atgggagatg catccaggga aactgcgtct   1500
gtgatgaaca gtggggtggc ctgtactgtg atgaccccga gacctctctt ccaacccaac   1560
tcaaagacaa cttcaatcga gctccatcca gtcagaactg gctgactgtg aacggaggga   1620
aattgagtac agtgtgtgga gccgtggcgt cgggaatggc tctccatttc agtgggggtt   1680
gtagtcgatt attagtcact gtggatctaa acctcactaa tgctgagttc atccaattt   1740 acttcatgta tgggtgcctg attacaccaa acaaccgtaa ccaaggtgtt ctcttggaat   1800
attctgtcaa tggaggcatt acctggaacc tgctcatgga gattttctat gaccagtaca   1860
gtgattacaa ggatgacgac gataagtgac tcgag   1895
```

<210> SEQ ID NO 10  
<211> LENGTH: 617  
<212> TYPE: PRT  
<213> ORGANISM: artificial sequence  
<220> FEATURE:  
<223> OTHER INFORMATION: Reelin Protein Fragment R3 and R6

<400> SEQUENCE: 10

```
Met Glu Arg Ser Gly Trp Ala Arg Gln Thr Phe Leu Leu Ala Leu Leu
1               5                   10                  15

Leu Gly Ala Thr Leu Arg Ala Arg Ala Phe Ser Ser Thr Ala Pro Val
            20                  25                  30

Leu Leu Gln Tyr Ser His Asp Ala Gly Met Ser Trp Phe Leu Val Lys
        35                  40                  45

Glu Gly Cys Tyr Pro Ala Ser Ala Gly Lys Gly Cys Glu Gly Asn Ser
    50                  55                  60

Arg Glu Leu Ser Glu Pro Thr Met Tyr His Thr Gly Asp Phe Glu Glu
65                  70                  75                  80

Trp Thr Arg Ile Thr Ile Val Ile Pro Arg Ser Leu Ala Ser Ser Lys
                85                  90                  95

Thr Arg Phe Arg Trp Ile Gln Glu Ser Ser Ser Gln Lys Asn Val Pro
            100                 105                 110

Pro Phe Gly Leu Asp Gly Val Tyr Ile Ser Glu Pro Cys Pro Ser Tyr
        115                 120                 125

Cys Ser Gly His Gly Asp Cys Ile Ser Gly Val Cys Phe Cys Asp Leu
    130                 135                 140

Gly Tyr Thr Ala Ala Gln Gly Thr Cys Val Ser Asn Val Pro Asn His
145                 150                 155                 160

Asn Glu Met Phe Asp Arg Phe Glu Gly Lys Leu Ser Pro Leu Trp Tyr
                165                 170                 175

Lys Ile Thr Gly Ala Gln Val Gly Thr Gly Cys Gly Thr Leu Asn Asp
            180                 185                 190

Gly Lys Ser Leu Tyr Phe Asn Gly Pro Gly Lys Arg Glu Ala Arg Thr
```

```
            195                 200                 205
Val Pro Leu Asp Thr Arg Asn Ile Arg Leu Val Gln Phe Tyr Ile Gln
210                 215                 220

Ile Gly Ser Lys Thr Ser Gly Ile Thr Cys Ile Lys Pro Arg Thr Arg
225                 230                 235                 240

Asn Glu Gly Leu Ile Val Gln Tyr Ser Asn Asp Asn Gly Ile Leu Trp
                245                 250                 255

His Leu Leu Arg Glu Leu Asp Phe Met Ser Phe Leu Glu Pro Gln Ile
            260                 265                 270

Ile Ser Ile Asp Leu Pro Gln Asp Ala Lys Thr Pro Ala Thr Ala Phe
        275                 280                 285

Arg Trp Trp Gln Pro Gln His Gly Lys His Ser Ala Gln Trp Ala Leu
    290                 295                 300

Asp Asp Val Leu Ile Gly Met Asn Asp Ser Ser Gln Thr Gly Phe Gln
305                 310                 315                 320

Asp Lys Phe Asp Gly Ser Ile Thr Leu Asp Ser Arg Lys Trp Leu Leu
                325                 330                 335

His Pro Gly Gly Thr Lys Met Pro Val Cys Gly Ser Thr Gly Asp Ala
            340                 345                 350

Leu Val Phe Ile Glu Lys Ala Ser Thr Arg Tyr Val Ser Thr Asp
        355                 360                 365

Val Ala Val Asn Glu Asp Ser Phe Leu Gln Ile Asp Phe Ala Ala Ser
    370                 375                 380

Cys Ser Val Thr Asp Ser Cys Tyr Ala Ile Glu Leu Glu Tyr Ser Val
385                 390                 395                 400

Asp Leu Gly Leu Ser Trp His Pro Leu Val Arg Asp Cys Leu Pro Thr
                405                 410                 415

Asn Val Glu Cys Ser Arg Tyr His Leu Gln Arg Ile Leu Val Ser Asp
            420                 425                 430

Thr Phe Asn Lys Trp Thr Arg Ile Thr Leu Pro Leu Pro Pro Tyr Thr
        435                 440                 445

Arg Ser Gln Ala Thr Arg Phe Arg Trp His Gln Pro Ala Pro Phe Asp
    450                 455                 460

Lys Gln Gln Thr Trp Ala Ile Asp Asn Val Tyr Ile Gly Asp Gly Cys
465                 470                 475                 480

Ile Asp Met Cys Ser Gly His Gly Arg Cys Ile Gln Gly Asn Cys Val
                485                 490                 495

Cys Asp Glu Gln Trp Gly Gly Leu Tyr Cys Asp Asp Pro Glu Thr Ser
            500                 505                 510

Leu Pro Thr Gln Leu Lys Asp Asn Phe Asn Arg Ala Pro Ser Ser Gln
        515                 520                 525

Asn Trp Leu Thr Val Asn Gly Gly Lys Leu Ser Thr Val Cys Gly Ala
    530                 535                 540

Val Ala Ser Gly Met Ala Leu His Phe Ser Gly Gly Cys Ser Arg Leu
545                 550                 555                 560

Leu Val Thr Val Asp Leu Asn Leu Thr Asn Ala Glu Phe Ile Gln Phe
                565                 570                 575

Tyr Phe Met Tyr Gly Cys Leu Ile Thr Pro Asn Asn Arg Asn Gln Gly
            580                 585                 590

Val Leu Leu Glu Tyr Ser Val Asn Gly Gly Ile Thr Trp Asn Leu Leu
        595                 600                 605

Met Glu Ile Phe Tyr Asp Gln Tyr Ser
    610                 615
```

<210> SEQ ID NO 11
<211> LENGTH: 1937
<212> TYPE: DNA
<213> ORGANISM: artificial sequence
<220> FEATURE:
<223> OTHER INFORMATION: Reelin Fragment R3 and R5

<400> SEQUENCE: 11

```
aagcttccac catggagcgc agtggctggg cccggcagac tttcctccta gcgctgttgc    60
tgggggcgac gctgagggcg cgcgcgttca gcagtactgc tccagttctt cttcagtact   120
ctcatgatgc tggtatgtcc tggtttctgg tgaaagaagg ctgttacccg gcttctgcag   180
gcaaaggatg cgaaggaaac tccagagaac taagtgagcc caccatgtat cacacagggg   240
actttgaaga atggacaaga atcaccattg ttattccaag gtctcttgca tccagcaaga   300
ccagattccg atggatccag gagagcagct cacagaaaaa cgtgcctcca tttggtttag   360
atggagtgta catatccgag ccttgtccca gttactgcag tggccatggg actgcatttt   420
caggagtgtg tttctgtgac ctgggatata ctgctgcaca aggaacctgt gtgtcaaatg   480
tccccaatca caatgagatg ttcgataggt ttgaggggaa gctcagccct ctgtggtaca   540
agataacagg tgcccaggtt ggaactggct gtggaacact aacgatggc aaatctctct    600
acttcaatgg ccctgggaaa agggaagccc ggacggtccc tctggacacc aggaatatca   660
gacttgttca attttatata caaattggaa gcaaaacttc aggcattacc tgcatcaaac   720
caagaactag aaatgaaggg cttattgttc agtattcaaa tgacaatggg atactctggc   780
atttgcttcg agagttggac ttcatgtcct tcctggaacc acagatcatt tccattgacc   840
tgccacagga cgcgaagaca cctgcaacgg catttcgatg gtggcaaccg caacatggga   900
agcattcagc ccagtgggct ttggatgatg ttcttatagg aatgaatgac agctctcaaa   960
ctggatttca agacaaattt gatggctcta tagatgacaa ttggtttttc tatcctggtg  1020
gtaacatcgg tctttattgt ccatattctt caaagggggc acctgaagaa gattcagcta  1080
tggtgtttgt ttcaaatgaa gttggtgagc attccattac cacccgtgac ctaaatgtga  1140
atgagaacac catcatacaa tttgagatca acgttggctg ttcgactgat agctcatccg  1200
cggatccagt gagactggaa ttttcaaggg acttcggggc gacctggcac cttctgctgc  1260
ccctctgcta ccacagcagc agccacgtca gtctcttatg ctccaccgag caccacccca  1320
gcagcaccta ctacgcagga accatgcagg gctggaggag ggaggtcgtg cactttggga  1380
agctgcacct ttgtggatct gtccgtttca gatggtacca gggattttac cctgccggct  1440
ctcagccagt gacatgggcc attgataatg tctacatcgg tccccagtgt gaggagatgt  1500
gtaatggaca ggggagctgt atcaatggaa ccaaatgtat atgtgaccct ggctactcag  1560
gtccaacctg taaataagc accaaaatc ctgattttct caaagatgat ttcgaaggtc    1620
agctagaatc tgatagattc ttattaatga gtggtgggaa accatctcga agtgtggaa   1680
tccttttctag tggaaacaac ctctttttca atgaagatgg cttgcgcatg ttgatgacac  1740
gagacctgga tttatcacat gctagatttg tgcagttctt catgagactg ggatgtggta  1800
aaggcgttcc tgaccccagg agtcaacccg tgctcctaca gtattctctc aacggtggcc  1860
tctcgtggag tcttcttcag gagttccttt tcagcaattc cagcgattac aaggatgacg  1920
acgataagtg actcgag                                                  1937
```

<210> SEQ ID NO 12

-continued

```
<211> LENGTH: 631
<212> TYPE: PRT
<213> ORGANISM: artificial sequence
<220> FEATURE:
<223> OTHER INFORMATION: Reelin Protein Fragment R3 and R5

<400> SEQUENCE: 12

Met Glu Arg Ser Gly Trp Ala Arg Gln Thr Phe Leu Leu Ala Leu Leu
1               5                   10                  15

Leu Gly Ala Thr Leu Arg Ala Arg Ala Phe Ser Ser Thr Ala Pro Val
            20                  25                  30

Leu Leu Gln Tyr Ser His Asp Ala Gly Met Ser Trp Phe Leu Val Lys
        35                  40                  45

Glu Gly Cys Tyr Pro Ala Ser Ala Gly Lys Gly Cys Glu Gly Asn Ser
    50                  55                  60

Arg Glu Leu Ser Glu Pro Thr Met Tyr His Thr Gly Asp Phe Glu Glu
65                  70                  75                  80

Trp Thr Arg Ile Thr Ile Val Ile Pro Arg Ser Leu Ala Ser Ser Lys
                85                  90                  95

Thr Arg Phe Arg Trp Ile Gln Glu Ser Ser Ser Gln Lys Asn Val Pro
            100                 105                 110

Pro Phe Gly Leu Asp Gly Val Tyr Ile Ser Glu Pro Cys Pro Ser Tyr
        115                 120                 125

Cys Ser Gly His Gly Asp Cys Ile Ser Gly Val Cys Phe Cys Asp Leu
    130                 135                 140

Gly Tyr Thr Ala Ala Gln Gly Thr Cys Val Ser Asn Val Pro Asn His
145                 150                 155                 160

Asn Glu Met Phe Asp Arg Phe Glu Gly Lys Leu Ser Pro Leu Trp Tyr
                165                 170                 175

Lys Ile Thr Gly Ala Gln Val Gly Thr Gly Cys Gly Thr Leu Asn Asp
            180                 185                 190

Gly Lys Ser Leu Tyr Phe Asn Gly Pro Gly Lys Arg Glu Ala Arg Thr
        195                 200                 205

Val Pro Leu Asp Thr Arg Asn Ile Arg Leu Val Gln Phe Tyr Ile Gln
    210                 215                 220

Ile Gly Ser Lys Thr Ser Gly Ile Thr Cys Ile Lys Pro Arg Thr Arg
225                 230                 235                 240

Asn Glu Gly Leu Ile Val Gln Tyr Ser Asn Asp Asn Gly Ile Leu Trp
                245                 250                 255

His Leu Leu Arg Glu Leu Asp Phe Met Ser Phe Leu Glu Pro Gln Ile
            260                 265                 270

Ile Ser Ile Asp Leu Pro Gln Asp Ala Lys Thr Pro Ala Thr Ala Phe
        275                 280                 285

Arg Trp Trp Gln Pro Gln His Gly Lys His Ser Ala Gln Trp Ala Leu
    290                 295                 300

Asp Asp Val Leu Ile Gly Met Asn Asp Ser Ser Gln Thr Gly Phe Gln
305                 310                 315                 320

Asp Lys Phe Asp Gly Ser Ile Asp Asp Asn Trp Phe Phe Tyr Pro Gly
                325                 330                 335

Gly Asn Ile Gly Leu Tyr Cys Pro Tyr Ser Ser Lys Gly Ala Pro Glu
            340                 345                 350

Glu Asp Ser Ala Met Val Phe Val Ser Asn Glu Val Gly Glu His Ser
        355                 360                 365

Ile Thr Thr Arg Asp Leu Asn Val Asn Glu Asn Thr Ile Ile Gln Phe
    370                 375                 380
```

-continued

```
Glu Ile Asn Val Gly Cys Ser Thr Asp Ser Ser Ser Ala Asp Pro Val
385                 390                 395                 400

Arg Leu Glu Phe Ser Arg Asp Phe Gly Ala Thr Trp His Leu Leu Leu
            405                 410                 415

Pro Leu Cys Tyr His Ser Ser Ser His Val Ser Ser Leu Cys Ser Thr
            420                 425                 430

Glu His His Pro Ser Ser Thr Tyr Tyr Ala Gly Thr Met Gln Gly Trp
            435                 440                 445

Arg Arg Glu Val Val His Phe Gly Lys Leu His Leu Cys Gly Ser Val
        450                 455                 460

Arg Phe Arg Trp Tyr Gln Gly Phe Tyr Pro Ala Gly Ser Gln Pro Val
465                 470                 475                 480

Thr Trp Ala Ile Asp Asn Val Tyr Ile Gly Pro Gln Cys Glu Glu Met
            485                 490                 495

Cys Asn Gly Gln Gly Ser Cys Ile Asn Gly Thr Lys Cys Ile Cys Asp
            500                 505                 510

Pro Gly Tyr Ser Gly Pro Thr Cys Lys Ile Ser Thr Lys Asn Pro Asp
            515                 520                 525

Phe Leu Lys Asp Phe Glu Gly Gln Leu Glu Ser Asp Arg Phe Leu
            530                 535                 540

Leu Met Ser Gly Gly Lys Pro Ser Arg Lys Cys Gly Ile Leu Ser Ser
545                 550                 555                 560

Gly Asn Asn Leu Phe Phe Asn Glu Asp Gly Leu Arg Met Leu Met Thr
                565                 570                 575

Arg Asp Leu Asp Leu Ser His Ala Arg Phe Val Gln Phe Phe Met Arg
            580                 585                 590

Leu Gly Cys Gly Lys Gly Val Pro Asp Pro Arg Ser Gln Pro Val Leu
            595                 600                 605

Leu Gln Tyr Ser Leu Asn Gly Gly Leu Ser Trp Ser Leu Leu Gln Glu
            610                 615                 620

Phe Leu Phe Ser Asn Ser Ser
625                 630
```